(12) United States Patent
Sagou et al.

(10) Patent No.: US 7,247,355 B2
(45) Date of Patent: Jul. 24, 2007

(54) LIQUID CRYSTAL COMPOUND HAVING CHROMAN RING, LIQUID CRYSTAL COMPOSITION COMPRISING THE COMPOUND AND LIQUID CRYSTAL DISPLAY DEVICE COMPRISING THE COMPOSITION

(75) Inventors: Kouki Sagou, Chiba (JP); Atsuko Fujita, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 11/304,661

(22) Filed: Dec. 16, 2005

(65) Prior Publication Data

US 2006/0131540 A1 Jun. 22, 2006

(30) Foreign Application Priority Data

Dec. 21, 2004 (KR) ...................... 10-2004-0109376

(51) Int. Cl.
- *C09K 19/34* (2006.01)
- *C09K 19/32* (2006.01)
- *C07D 311/04* (2006.01)
- *C07D 311/74* (2006.01)

(52) U.S. Cl. ............ 428/1.1; 252/299.61; 252/299.62; 549/398; 549/399; 549/406; 549/408

(58) Field of Classification Search ................ 428/1.1; 252/299.01, 299.61, 299.62, 299.63; 549/398, 549/399, 406, 408; 570/183

See application file for complete search history.

(56) References Cited

U.S. PATENT DOCUMENTS

2005/0247910 A1* 11/2005 Sugiura et al. ........ 252/299.61

(Continued)

FOREIGN PATENT DOCUMENTS

EP 1 491 612 12/2004

(Continued)

OTHER PUBLICATIONS

Patent Abstracts of Japan vol. 017, No. 309 (C-1070), Jun. 14, 1993 & JP 05 025158 A (Kanto Chem Co Inc), Feb. 2, 1993 * abstract; compound I * *p. 5; compound 30 * * p. 6; compound 40 * * p. 14; compound 80, 82 * * p. 16; compounds 90, 91 *.

(Continued)

*Primary Examiner*—Shean C Wu
(74) *Attorney, Agent, or Firm*—Wenderoth, Lind & Ponack, L.L.P.

(57) ABSTRACT

The present invention relates to a compound having a chroman ring, which has good thermal and optical stability, adequate optical anisotropy, adequate dielectric anisotropy and superior compatibility with other liquid crystal compounds, a liquid crystal composition comprising the compound, and a liquid crystal device comprising the composition.

A compound represented by formula (1) below is provided:

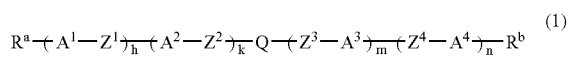

where $R^a$ is hydrogen or $C_1$-$C_{20}$ alkyl; $R^b$ is halogen, —CN, alkyl (at least one hydrogen of which is replaced by halogen), alkenyl (at least one hydrogen of which may be replaced by halogen), or alkoxy (at least one hydrogen of which may be replaced by halogen); each of $A^1$, $A^2$, $A^3$ and $A^4$ is independently 1,4-cyclohexylene, 1,4-cyclohexenylene or 1,4-phenylene, in which any —$CH_2$— may be replaced by —O— or —S—, any —CH= may be replaced by —N= and any hydrogen may be replaced by halogen, methyl or —$CF_3$; each of $Z^1$, $Z^2$, $Z^3$ and $Z^4$ is independently a single bond or $C_1$-$C_4$ alkylene; each of h, k, m and n is independently 0, 1 or 2, the sum of h, k, m and n being 1, 2 or 3; and Q is one of the group represented by formulas (q1), (q2) and (q3) below:

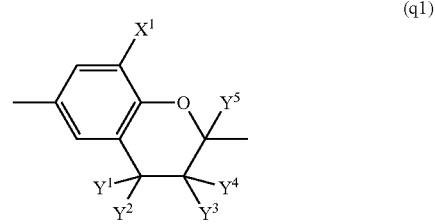

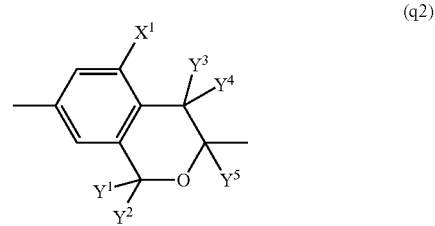

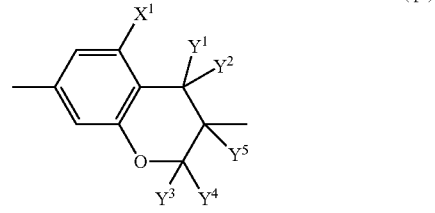

where $X^1$ is hydrogen, halogen, methyl, ethyl, methoxy, ethoxy, —$CF_3$, —$CF_2H$, —$CFH_2$, —$OCF_3$, —$OCF_2H$, or —$OCFH_2$; and each of $Y^1$, $Y^2$, $Y^3$, $Y^4$ and $Y^5$ is independently hydrogen, halogen or methyl.

40 Claims, No Drawings

U.S. PATENT DOCUMENTS

2006/0163536 A1* 7/2006 Matsumoto et al. ... 252/299.61

FOREIGN PATENT DOCUMENTS

| JP | 05-025156 | 2/1993 |
| JP | 06-256337 | 9/1994 |
| JP | 06-256339 | 9/1994 |
| JP | 2001-316347 | 11/2001 |
| WO | 2006-012965 | 2/2006 |

OTHER PUBLICATIONS

Patent Abstracts of Japan vol. 018, No. 656 (C-1286), Dec. 13, 1994 & JP 06 256337 A (Dainippom Ink & Chem Inc), Sep. 13, 1994 * abstract * * p. 6, paragraph 45; figure 14; compounds IB-2 *.

Takehara, S. et al.: "New Chiral Dopants For FLC Materials: Optically Active Cyclic Ethers" Ferroelectrics, Overseas Publishers Associations, Amsterdam, NL, vol. 148, No. 1-4, 1993, pp. 195-202, XP008034869 ISSN: 0015-0193.

* cited by examiner

LIQUID CRYSTAL COMPOUND HAVING CHROMAN RING, LIQUID CRYSTAL COMPOSITION COMPRISING THE COMPOUND AND LIQUID CRYSTAL DISPLAY DEVICE COMPRISING THE COMPOSITION

FIELD OF THE INVENTION

The present invention relates to a liquid crystal compound, a liquid crystal composition and a liquid crystal device. More particularly, it relates to a compound having a chroman ring, a liquid crystal composition comprising the compound and having a nematic phase and a liquid crystal device comprising the composition.

BACKGROUND OF THE INVENTION

Depending on the operation modes of liquid crystal, liquid crystal devices are classified into PC (phase change), TN (twisted nematic), STN (super twisted nematic), BTN (bistable twisted nematic), ECB (electrically controlled birefringence), OCB (optically compensated bend), IPS (in-plane switching), VA (vertical alignment), and so forth. They are classified into PM (passive matrix) and AM (active matrix) types depending on driving modes. PM is classified into static, multiplex, etc., and AM is classified into TFT (thin film transistor), MIM (metal insulator metal), etc.

Physical properties of liquid crystal compositions contained in the devices, such as temperature range of the liquid crystal phase, viscosity, optical anisotropy, threshold voltage, specific resistance and elastic constant, are different depending upon the modes. The compositions are prepared by mixing several liquid crystal compounds. In general, the compounds require stability against water, air, heat, and light, broad temperature range in the liquid crystal phase, low viscosity, adequate optical anisotropy, adequate dielectric anisotropy and good compatibility with other compounds. For a nematic phase, a compound having a high upper limit temperature is preferable. For such liquid crystal phases as nematic phase, smectic phase, etc., a compound having a low lower limit temperature is preferable. A compound having low viscosity contributes to creating devices that have a short response time. Adequate optical anisotropy differs depending on the mode of the device. When driving a device with low voltage, a compound having positively large dielectric anisotropy or one having negatively large dielectric anisotropy is preferable. A compound having small dielectric anisotropy is good for adjusting viscosity, etc. In terms of preparing a composition, a compound having good compatibility with other compounds is preferable. Since a device can be used at a temperature lower than the freezing point, a compound having good compatibility at low temperature is preferable.

No liquid crystal device comprising a compound having a chroman ring has been found. For ferroelectric liquid crystal devices, Japanese Patent Publication No. Hei 6-256337 and Japanese Patent Publication No. Hei 6-256339 disclose the compounds represented by formulas (10a) and (10b) below. However, since these compounds do not have sufficiently large positive dielectric anisotropy, they are not ideal for use in liquid crystal devices in such modes as TN, STN, etc.

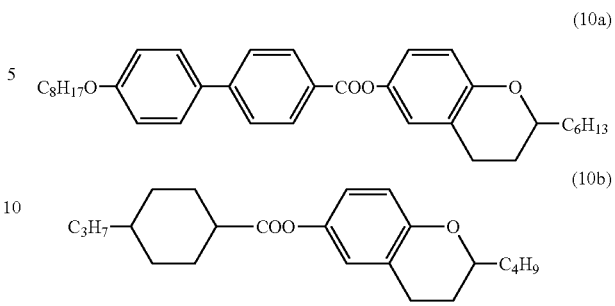

The prior arts can be found in the references listed below. Better liquid crystal compound, liquid crystal composition and liquid crystal device are desirable.

[Patent reference 1] Japanese Patent Publication No. Hei 6-256337
[Patent reference 2] Japanese Patent Publication No. Hei 6-256339
[Patent reference 3] Japanese Publication No. 2001-316347
[Patent reference 4] Japanese Patent Publication No. Hei 5-25158

Technical Objects to be Attained by the Invention

It is the first object of the present invention to provide a compound having the general properties required for a liquid crystal compound, good stability against heat, light, etc., adequate optical anisotropy, adequate dielectric anisotropy and good compatibility with other liquid crystal compounds. It is the second object of the invention to provide a liquid crystal composition comprising the compound and having high upper limit temperature of the nematic phase, low lower limit temperature of the nematic phase, low viscosity, adequate optical anisotropy and low threshold voltage. It is the third object of the invention to provide a liquid crystal device comprising the composition and having a broad available temperature range, short response time, large contrast ratio and low driving voltage.

SUMMARY OF THE INVENTION

The present inventors completed the invention by realizing that a compound having a chroman ring is suitable to solve the above-mentioned problems, and in particular, that it has a sufficiently large positive dielectric anisotropy.

The first invention of the present invention is showed by the following item [1].

[1] A compound represented by formula (1):

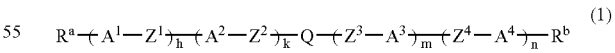

where $R^a$ is hydrogen or $C_1$-$C_{20}$ alkyl (any —$CH_2$— of which may be replaced by —O—, —CH=CH— or —C≡C—); $R^b$ is halogen, —CN, $C_1$-$C_{20}$ alkyl (at least one hydrogen of which is replaced by halogen), $C_2$-$C_{20}$ alkenyl (at least one hydrogen of which may be replaced by halogen), or $C_1$-$C_{20}$ alkoxy (at least one hydrogen of which may be replaced by halogen); each of $A^1$, $A^2$, $A^3$ and $A^4$ is independently 1,4-cyclohexylene, 1,4-cyclohexenylene or 1,4-phenylene, in which any —$CH_2$— may be replaced by —O— or —S—, any —CH= may be replaced by —N= and any hydrogen may be replaced by halogen, methyl or —$CF_3$; each of $Z^1$, $Z^2$, $Z^3$ and $Z^4$ is independently a single bond or $C_1$-$C_4$ alkylene, in which any —$CH_2$— may be replaced by —O—, —S—, —CH=CH—, —CF=CF— or —C≡C— and any hydrogen may be replaced by halogen; each of h, k, m and n is independently 0, 1 or 2, the sum of h, k, m and n being 1, 2 or 3; and Q is one of the groups represented by formulas (q1), (q2) and (q3):

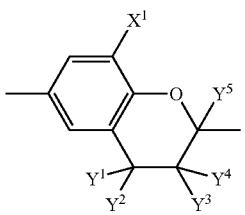

(q1)

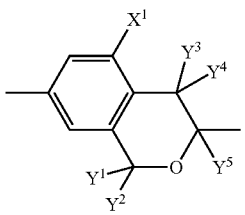

(q2)

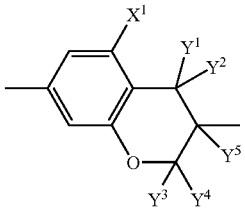

(q3)

where $X^1$ is hydrogen, halogen, methyl, ethyl, methoxy, ethoxy, —$CF_3$, —$CF_2H$, —$CFH_2$, —$OCF_3$, —$OCF_2H$ or —$OCFH_2$; and each of $Y^1$, $Y^2$, $Y^3$, $Y^4$ and $Y^5$ is independently hydrogen, halogen or methyl.

DETAILED DESCRIPTION OF THE INVENTION

Terms used herein are defined as follows. Liquid crystal compound refers to a compound having such a liquid crystal phase as nematic phase, smectic phase, etc. or a compound useful as a component of a liquid crystal composition although not having a liquid crystal phase. Liquid crystal compound, liquid crystal composition and liquid crystal device may be referred to as compound, composition and device, respectively. A liquid crystal device refers to a liquid crystal display panel or a liquid crystal display module. Upper limit temperature of the nematic phase refers to the transition temperature from the nematic phase to the isotropic phase. It may be simply referred to as upper limit temperature. Lower limit temperature of the nematic phase may be simply referred to as lower limit temperature. The compound represented by formula (1) may be referred to as compound (1). Other compounds may be referred to in a similar manner. In formulas (2) to (9), symbols B, D, E, etc. surrounded by hexagons correspond to ring B, ring D, ring E, etc., respectively. Amount of compound given in percentage is the weight percentage (wt %) based on the total weight of the composition. The expression "any" applies not only to randomness in position but also to ramdomness in numbers. For example, the expression "any A may be replaced by B, C or D" includes the followings: one A is replaced by any one of B, C and D; more than one A is replaced by any one of B, C and D; and more than one A is replaced by more than one of B, C and D. An example of the case "more than one A is replaced by more than one of B, C and D" is where one A is replaced by B and another A is replaced by C or D. In the present invention, it is not desirable that two neighboring —$CH_2$—'s are replaced by —O— or —S— to give —O—O—, —O—S— or —S—S—. Unless specified otherwise, alkyl refers to both linear and branched alkyl. The same applies to alkylene. For example, butyl may be any one of n-butyl, 2-methylpropyl and 1,1-dimethylethyl.

The present invention is constructed of the above item [1] and the following items from [2] to [34].

[2] The compound as set forth in the item [1], in which Q is the group represented by formula (q1), $X^1$ is hydrogen and each of $Y^1$, $Y^2$, $Y^3$, $Y^4$ and $Y^5$ is independently hydrogen or fluorine.

[3] The compound as set forth in the item [1], in which Q is the group represented by formula (q1), $X^1$ is fluorine and each of $Y^1$, $Y^2$, $Y^3$, $Y^4$ and $Y^5$ is independently hydrogen or fluorine.

[4] The compound as set forth in the item [1], in which Q is the group represented by formula (q2), $X^1$ is hydrogen or fluorine and each of $Y^1$, $Y^2$, $Y^3$, $Y^4$ and $Y^5$ is independently hydrogen or fluorine.

[5] The compound as set forth in the item [1], in which Q is the group represented by formula (q3), $X^1$ is hydrogen or fluorine and each of $Y^1$, $Y^2$, $Y^3$, $Y^4$ and $Y^5$ is independently hydrogen or fluorine.

[6] A compound represented by one of the formulas (1-1) to (1-5) below:

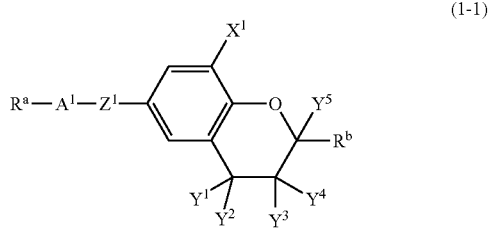

(1-1)

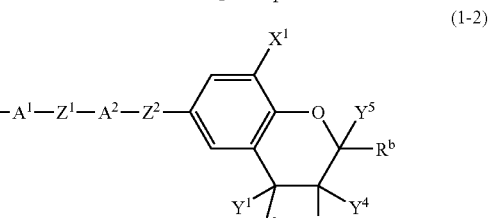

(1-2)

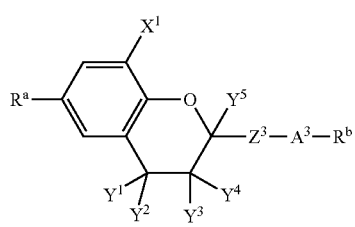

(1-3)

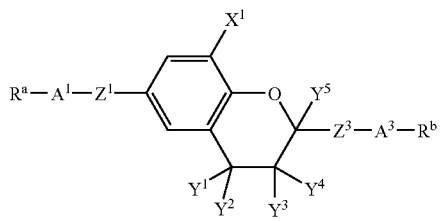

(1-4)

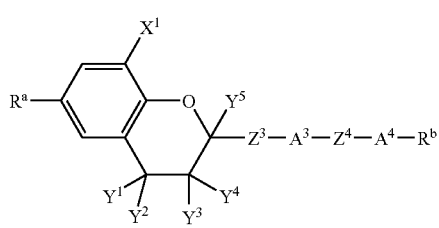

(1-5)

where $R^a$ is hydrogen, $C_1$-$C_{10}$ alkyl, $C_1$-$C_{10}$ alkoxy or $C_2$-$C_{10}$ alkenyl; $R^b$ is halogen, —CN, $C_1$-$C_{10}$ alkyl (at least one hydrogen of which is replaced by halogen), $C_2$-$C_{10}$ alkenyl (at least one hydrogen of which may be replaced by halogen) or $C_1$-$C_{10}$ alkoxy (at least one hydrogen of which may be replaced by halogen); each of $A^1$, $A^2$, $A^3$ and $A^4$ is independently 1,4-cyclohexylene, 1,3-dioxane-2,5-diyl, pyrimidine-2,5-diyl or 1,4-phenylene (any hydrogen of which may be replaced by fluorine); each of $Z^1$, $Z^2$, $Z^3$ and $Z^4$ is independently a single bond, —CH$_2$CH$_2$—, —CH$_2$O—, —OCH$_2$—, —CF$_2$CH$_2$—, —CH$_2$CF$_2$—, —CF$_2$O— or —OCF$_2$—; $X^1$ is hydrogen or fluorine; and each of $Y^1$, $Y^2$, $Y^3$, $Y^4$, and $Y^5$ independently hydrogen, halogen or methyl.

[7] The compound as set forth in the item [6], in which $X^1$ is fluorine.

[8] The compound as set forth in the item [6], in which $X^1$ is fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —CH$_2$CH$_2$—; each of $Y^1$, $Y^2$, $Y^3$ and $Y^4$ is independently hydrogen, fluorine or methyl; and $Y^5$ is hydrogen.

[9] The compound as set forth in the item [6], in which $X^1$ is fluorine; $R^a$ is hydrogen, $C_1$-$C_7$ alkyl or $C_2$-$C_7$ alkenyl; $R^b$ is halogen, —CN, —OCF$_3$, —OCF$_2$H or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —CH$_2$CH$_2$—; each of $Y^1$, $Y^2$, $Y^3$ and $Y^4$ is hydrogen; and $Y^5$ is fluorine or chlorine.

[10] The compound as set forth in the item [6], in which $X^1$ is fluorine; $R^a$ is hydrogen, $C_1$-$C_7$ alkyl or $C_2$-$C_7$ alkenyl; $R^b$ is halogen, —CN, —OCF$_3$, —OCF$_2$H or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; each of $Y^1$, $Y^2$, $Y^3$ and $Y^4$ is independently hydrogen, fluorine or methyl; and $Y^5$ is hydrogen.

[11] The compound as set forth in the item [6], in which $X^1$ is fluorine; $R^a$ is hydrogen, $C_1$-$C_7$ alkyl or $C_2$-$C_7$ alkenyl; $R^b$ is halogen, —CN, —OCF$_3$, —OCF$_2$H or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; and each of $Y^1$, $Y^2$, $Y^3$, $Y^4$ and $Y^5$ is hydrogen.

[12] The compound as set forth in the item [6], in which $X^1$ is hydrogen.

[13] The compound as set forth in the item [6], in which $X^1$ is hydrogen; $R^a$ is hydrogen, $C_1$-$C_7$ alkyl or $C_2$-$C_7$ alkenyl; $R^b$ is halogen, —CN, —OCF$_3$, —OCF$_2$H or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —CH$_2$CH$_2$—; each of $Y^1$, $Y^2$, $Y^3$ and $Y^4$ is independently hydrogen, fluorine or methyl; and $Y^5$ is hydrogen.

[14] The compound as set forth in the item [6], in which $X^1$ is hydrogen; $R^a$ is hydrogen, $C_1$-$C_7$ alkyl or $C_2$-$C_7$ alkenyl; $R^b$ is halogen, —CN, —OCF$_3$, —OCF$_2$H or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —CH$_2$CH$_2$—; each of $Y^1$, $Y^2$, $Y^3$ and $Y^4$ is hydrogen; and $Y^5$ is fluorine or chlorine.

[15] The compound as set forth in the item [6], in which $X^1$ is hydrogen; $R^a$ is hydrogen, $C_1$-$C_7$ alkyl or $C_2$-$C_7$ alkenyl; $R^b$ is halogen, —CN, —OCF$_3$, —OCF$_2$H or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; each of $Y^1$, $Y^2$, $Y^3$ and $Y^4$ is independently hydrogen, fluorine or methyl; and $Y^5$ is hydrogen.

[16] The compound as set forth in the item [6], in which $X^1$ is hydrogen; $R^a$ is hydrogen, $C_1$-$C_7$ alkyl or $C_2$-$C_7$ alkenyl; $R^b$ is halogen, —CN, —OCF$_3$, —OCF$_2$H or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; and each of $Y^1$, $Y^2$, $Y^3$, $Y^4$ and $Y^5$ is hydrogen.

[17] A compound represented by any one of the following formulas (1-6) to (1-10):

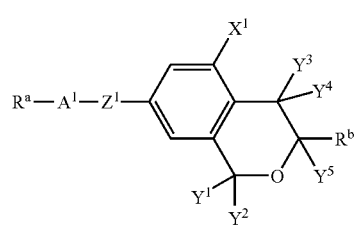

(1-6)

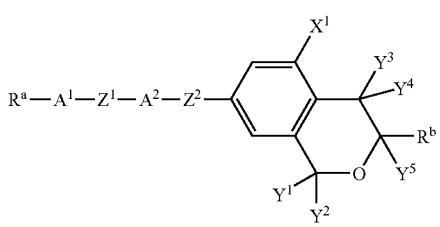

(1-7)

-continued

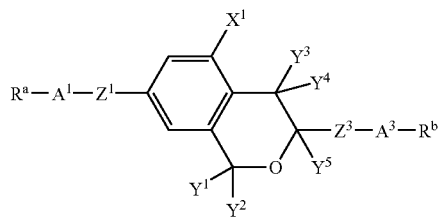
(1-8)

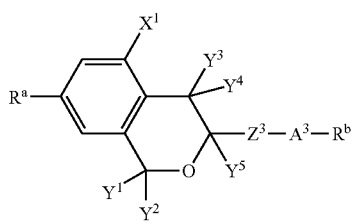
(1-9)

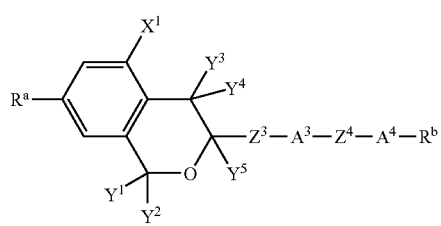
(1-10)

where $R^a$ is hydrogen, $C_1$-$C_{10}$ alkyl, $C_1$-$C_{10}$ alkoxy or $C_2$-$C_{10}$ alkenyl; $R^b$ is halogen, —CN, $C_1$-$C_{10}$ alkyl (at least one hydrogen of which is replaced by halogen), $C_1$-$C_{10}$ alkoxy (at least one hydrogen of which may be replaced by halogen) or $C_2$-$C_{10}$ alkenyl (at least one hydrogen of which may be replaced by halogen); each of $A^1$, $A^2$, $A^3$ and $A^4$ is independently 1,4-cyclohexylene, 1,3-dioxane-2,5-diyl, pyrimidine-2,5-diyl or 1,4-phenylene (any hydrogen of which may be replaced by fluorine); each of $Z^1$, $Z^2$, $Z^3$ and $Z^4$ is independently a single bond, —$CH_2CH_2$—, —$CH_2O$—, —$OCH_2$—, —$CF_2CH_2$—, —$CH_2CF_2$—, —$CF_2O$— or —$OCF_2$—; $X^1$ is hydrogen or fluorine; and each of $Y^1$, $Y^2$, $Y^3$, $Y^4$ and $Y^5$ is independently hydrogen, halogen or methyl.

[18] The compound as set forth in the item [17], in which $X^1$ is hydrogen or fluorine; $R^a$ is hydrogen, $C_1$-$C_7$ alkyl or $C_2$-C7 alkenyl; $R^b$ is halogen, —CN, —$OCF_3$, —$OCF_2H$ or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —$CH_2CH_2$—; each of $Y^1$, $Y^2$, $Y^3$ and $Y^4$ is independently hydrogen, fluorine or methyl; and $Y^5$ is hydrogen.

[19] The compound as set forth in the item [17], in which $X^1$ is hydrogen or fluorine; $R^a$ is hydrogen, $C_1$-$C_7$ alkyl or $C_2$-$C_7$ alkenyl; $R^b$ is halogen, —CN, —$OCF_3$, —$OCF_2H$ or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —$CH_2CH_2$—; each of $Y^1$, $Y^2$, $Y^3$ and $Y^4$ is hydrogen; and $Y^5$ is fluorine or chlorine.

[20] The compound as set forth in the item [17], in which $X^1$ is hydrogen or fluorine; $R^a$ is hydrogen, $C_1$-$C_7$ alkyl or $C_2$-$C_7$ alkenyl; $R^b$ is halogen, —CN, —$OCF_3$, —$OCF_2H$ or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; each of $Y^1$, $Y^2$, $Y^3$ and $Y^4$ is independently hydrogen, fluorine or methyl; and $Y^5$ is hydrogen.

[21] The compound as set forth in the item [17], in which $X^1$ is hydrogen or fluorine; $R^a$ is hydrogen, $C_1$-$C_7$ alkyl or $C_2$-$C_7$ alkenyl; $R^b$ is halogen, —CN, —$OCF_3$, —$OCF_2H$ or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; and each of $Y^1$, $Y^2$, $Y^3$, $Y^4$ and $Y^5$ is hydrogen.

[22] A compound represented by any one of the following formulas (1-11) to (1-15):

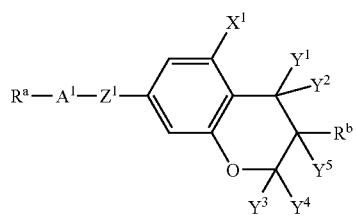
(1-11)

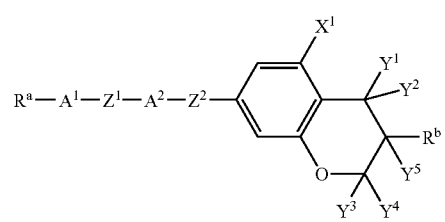
(1-12)

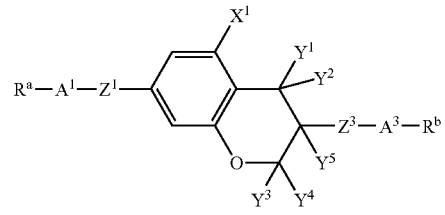
(1-13)

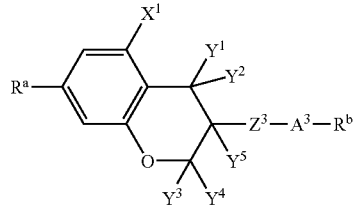
(1-14)

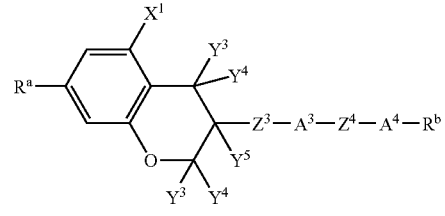
(1-15)

where $R^a$ is hydrogen, $C_1$-$C_{10}$ alkyl, $C_1$-$C_{10}$ alkoxy or $C_2$-$C_{10}$ alkenyl; $R^b$ is halogen, —CN, $C_1$-$C_{10}$ alkyl (at least one hydrogen of which is replaced by halogen), $C_1$-$C_{10}$ alkoxy (at least one hydrogen of which may be-replaced by halogen) or $C_2$-$C_{10}$ alkenyl (at least one hydrogen of which may be replaced by halogen); each of $A^1$, $A^2$, $A^3$ and $A^4$ is independently 1,4-cyclohexylene, 1,3-dioxane-2,5-diyl, pyrimidine-2,5-diyl or 1,4-phenylene (any hydrogen of which may be replaced by fluorine); each of $Z^1$, $Z^2$, $Z^3$ and $Z^4$ is independently a single bond, —$CH_2CH_2$—, —$CH_2O$—, —$OCH_2$—, —$CF_2CH_2$—, —$CH_2CF_2$—, —$CF_2O$— or —$OCF_2$—; $X^1$ is hydrogen or fluorine; and each of $Y^1$, $Y^2$, $Y^3$, $Y^4$ and $Y^5$ is independently hydrogen, halogen or methyl.

[23] The compound as set forth in the item [22], in which $X^1$ is hydrogen or fluorine; $R^a$ is hydrogen, $C_1$-$C_7$ alkyl or $C_2$-$C_7$ alkenyl; $R^b$ is halogen, —CN, —$OCF_3$, —$OCF_2H$ or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —$CH_2CH_2$—; each of $Y^1$, $Y^2$, $Y^3$ and $Y^4$ is independently hydrogen, fluorine or methyl; and $Y^5$ is hydrogen.

[24] The compound as set forth in the item [22], in which $X^1$ is hydrogen or fluorine; $R^a$ is hydrogen, $C_1$-$C_7$ alkyl or $C_2$-$C_7$ alkenyl; $R^b$ is halogen, —CN, —$OCF_3$, —$OCF_2H$ or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —$CH_2CH_2$—; each of $Y^1$, $Y^2$, $Y^3$ and $Y^4$ is hydrogen; and $Y^5$ is fluorine or chlorine.

[25] The compound as set forth in the item [22], in which $X^1$ is hydrogen or fluorine; $R^a$ is hydrogen, $C_1$-$C_7$ alkyl or $C_2$-$C_7$ alkenyl; $R^b$ is halogen, —CN, —$OCF_3$, —$OCF_2H$ or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; each of $Y^1$, $Y^2$, $Y^3$ and $Y^4$ is independently hydrogen, fluorine or methyl; and $Y^5$ is hydrogen.

[26] The compound as set forth in the item [22], in which $X^1$ is hydrogen or fluorine; $R^a$ is hydrogen, $C_1$-$C_7$ alkyl or $C_2$-$C_7$ alkenyl; $R^b$ is halogen, —CN, —$OCF_3$, —$OCF_2H$ or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; and each of $Y^1$, $Y^2$, $Y^3$, $Y^4$ and $Y^5$ is hydrogen.

[27] A liquid crystal composition which comprises any compound as set forth in the item [1] to [26] and may comprise at least one optically active compound.

[28] A liquid crystal composition which comprises any compound as set forth in the item [1] to [26] and at least one compound selected from the group consisting of the compounds represented by formulas (2), (3) and (4), and may comprise at least one optically active compound.

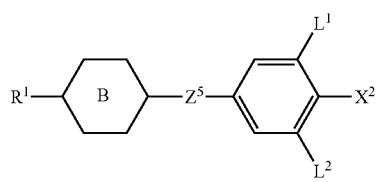
(2)

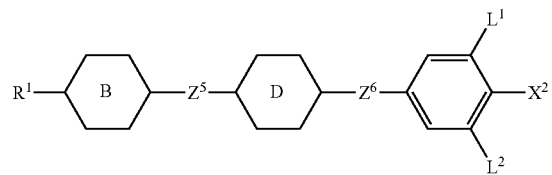
(3)

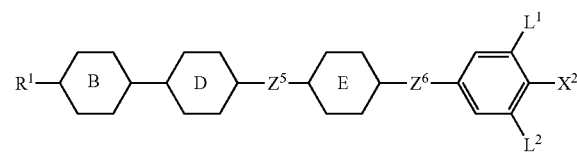
(4)

where $R^1$ is $C_1$-$C_{10}$ alkyl (any —$CH_2$— of which may be replaced by —O— or —CH=CH— and any hydrogen of which may be replaced by fluorine); $X^2$ is fluorine, chlorine, —$OCF_3$, —$OCHF_2$, —$CF_3$, —$CHF_2$, —$CH_2F$, —$OCF_2CHF_2$ or —$OCF_2CHFCF_3$; each of ring B and ring D is independently 1,4-cyclohexylene, 1,3-dioxane-2,5-diyl or 1,4-phenylene (any hydrogen of which may be replaced by fluorine), ring E is 1,4-cyclohexylene or 1,4-phenylene (any hydrogen of which may be replaced by fluorine); each of $Z^5$ and $Z^6$ is independently —$(CH_2)_2$—, —$(CH_2)_4$—, —COO—, —$CF_2O$—, —$OCF_2$—, —CH=CH— or a single bond; and each of $L^1$ and $L^2$ is independently hydrogen or fluorine.

[29] A liquid crystal composition which comprises any compound as set forth in the item [1] to [26] and at least one compound selected from the group consisting of the compounds represented by formulas (5) and (6), and may comprise at least one optically active compound.

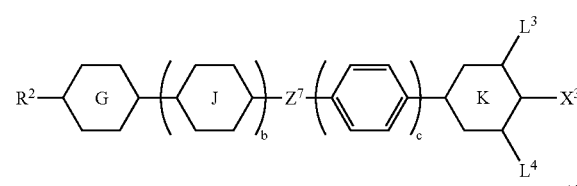
(5)

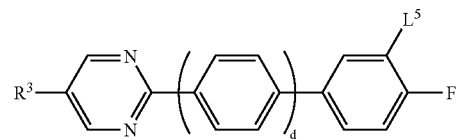
(6)

where each of $R^2$ and $R^3$ is independently $C_1$-$C_{10}$ alkyl (any —$CH_2$— of which may be replaced by —O— or —CH=CH— and any hydrogen of which may be replaced by fluorine); $X^3$ is —CN or —C≡C—CN; ring G is 1,4-cyclohexylene, 1,4-phenylene, 1,3-dioxane-2,5-diyl or pyrimidine-2,5-diyl; ring J is 1,4-cyclohexylene, pyrimidine-2,5-diyl or 1,4-phenylene (any hydrogen of which may be replaced by fluorine); ring K is 1,4-cyclohexylene or 1,4-phenylene; $Z^7$ is —$(CH_2)_2$—, —COO—, —$CF_2O$—, —$OCF_2$— or a single bond; each of $L^3$, $L^4$ and $L^5$ is independently hydrogen or fluorine; and each of b, c and d is independently 0 or 1.

A liquid crystal composition which comprises any compound as set forth in the item [1] to [26] and at least one compound selected from the group consisting of the compounds represented by formulas (7) to (9), and may comprise at least one optically active compound.

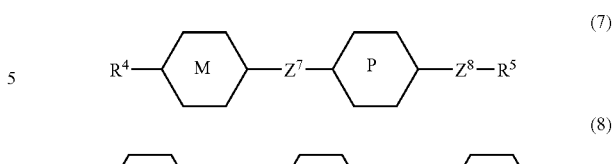

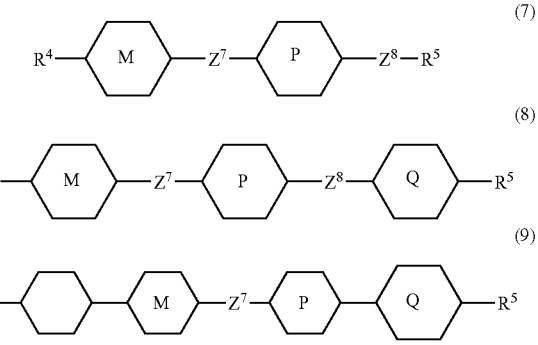

where each of $R^4$ and $R^5$ is independently $C_1$-$C_{10}$ alkyl (any —$CH_2$— of which may be replaced by —O— or —CH=CH— and any hydrogen of which may be replaced by fluorine); each of ring M, ring P and ring Q is independently 1,4-cyclohexylene, pyrimidine-2,5-diyl or 1,4-phenylene (any hydrogen of which may be replaced by fluorine); and each of $Z^7$ and $Z^8$ is independently —C≡C—, —COO—, —(CH$_2$)$_2$—, —CH=CH— or a single bond.

[33] The composition of [29] which further comprises at least one compound selected from the group consisting of the compounds represented by formulas (7), (8) and (9):

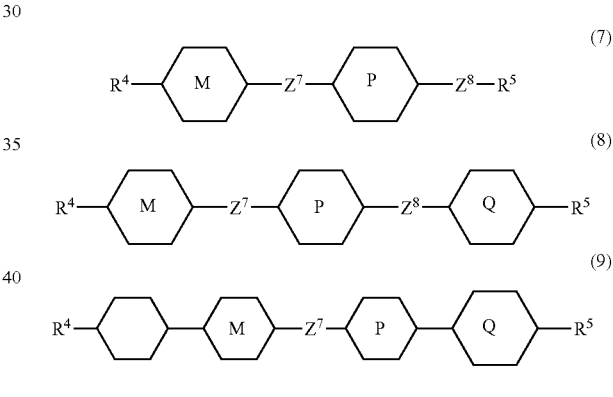

where each of $R^4$ and $R^5$ is independently $C_1$-$C_{10}$ alkyl (any —$CH_2$— of which may be replaced by —O— or —CH=CH— and any hydrogen of which may be replaced by fluorine); each of ring M, ring P and ring Q is independently 1,4-cyclohexylene, pyrimidine-2,5-diyl or 1,4-phenylene (any hydrogen of which may be replaced by fluorine); and each of $Z^7$ and $Z^8$ is independently —C≡C—, —COO—, —(CH$_2$)$_2$—, —CH=CH— or a single bond.

where each of $R^4$ and $R^5$ is independently $C_1$-$C_{10}$ alkyl (any —$CH_2$— of which may be replaced by —O— or —CH=CH— and any hydrogen of which may be replaced by fluorine); each of ring M, ring P and ring Q is independently 1,4-cyclohexylene, pyrimidine-2,5-diyl or 1,4-phenylene (any hydrogen of which may be replaced by fluorine); each of $Z^7$ and $Z^8$ is independently —C≡C—, —COO—, —(CH$_2$)$_2$—, —CH=CH— or a single bond.

[31] The composition of [28] which further comprises at least one compound selected from the group consisting of the compounds represented by formulas (5) and (6).

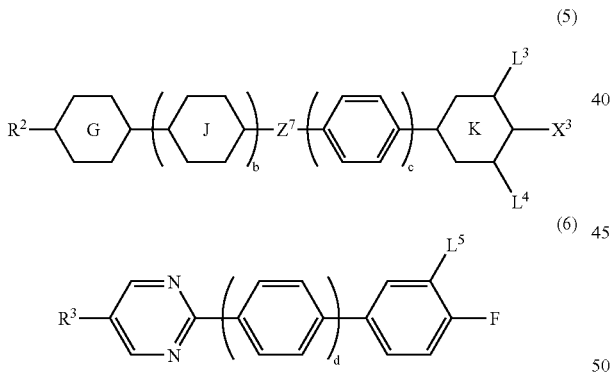

where each of $R^2$ and $R^3$ is independently $C_1$-$C_{10}$ alkyl (any —$CH_2$— of which may be replaced by —O— or —CH=CH— and any hydrogen of which may be replaced by fluorine); $X^3$ is —CN or —C≡C—CN; ring G is 1,4-cyclohexylene, 1,4-phenylene, 1,3-dioxane-2,5-diyl or pyrimidine-2,5-diyl; ring J is 1,4-cyclohexylene, pyrimidine-2,5-diyl or 1,4-phenylene (any hydrogen of which may be replaced by fluorine); ring K is 1,4-cyclohexylene or 1,4-phenylene; $Z^7$ is —(CH$_2$)$_2$—, —COO—, —CF$_2$O—, —OCF$_2$— or a single bond; each of $L^3$, $L^4$ and $L^5$ is independently hydrogen or fluorine; and each of b, c and d is independently 0 or 1.

The composition of [28] which further comprises at least one compound selected from the group consisting of the compounds represented by formulas (7), (8) and (9):

[34] A liquid crystal device comprising any liquid crystal composition of [27] to [33].

The compound of the present invention is represented by formula (1) below:

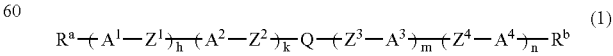

In formula (1), $R^a$ is hydrogen or $C_1$-$C_{20}$ alkyl (any —$CH_2$— of which may be replaced by —O—, —CH=CH— or —C≡C—). Examples of $R^a$ are hydrogen, alkyl, alkoxy, alkoxyalkyl, alkenyl, alkenyloxy and alkinyl.

Specifically, it may be hydrogen, methyl, ethyl, propyl, butyl, pentyl, hexyl, heptyl, octyl, methoxy, ethoxy, propoxy, butoxy, pentyloxy, hexyloxy, heptyloxy, methoxymethyl, methoxyethyl, methoxypropyl, ethoxymethyl, ethoxyethyl, ethoxypropyl, propoxymethyl, butoxymethyl, pentoxymethyl, vinyl, 1-propenyl, 2-propenyl, 1-butenyl, 2-butenyl, 3-butenyl, 1-pentenyl, 2-pentenyl, 3-pentenyl, 4-pentenyl, 2-propenyloxy, 2-butenyloxy, 2-pentenyloxy, 1-propinyl or 1-pentinyl.

Preferable examples of $R^a$ are hydrogen, $C_1$-$C_{10}$ alkyl, $C_1$-$C_{10}$ alkoxy and $C_2$-$C_{10}$ alkenyl. More preferable examples of $R^a$ are hydrogen, $C_1$-$C_7$ alkyl and $C_2$-$C_7$ alkenyl. Specifically, they are hydrogen, methyl, ethyl, propyl, butyl, pentyl, vinyl, 1-propenyl, 2-propenyl, 1-butenyl, 2-butenyl, 3-butenyl, 1-pentenyl, 2-pentenyl, 3-pentenyl, 4-pentenyl, 2-hexenyl and 3-hexenyl. Preferable steric arrangement of —CH=CH— in alkenyl depends on the position of double bond. In such alkenyls as 1-propenyl, 1-butenyl, 1-pentenyl, 1-hexenyl, 3-pentenyl and 3-hexenyl, trans arrangement is preferable. In such alkenyls as 2-butenyl, 2-pentenyl and 2-hexenyl, cis arrangement is preferable.

In formula (1), $R^b$ is halogen, —CN, $C_1$-$C_{20}$ alkyl (at least one hydrogen of which is replaced by halogen), $C_2$-$C_{20}$ alkenyl (at least one hydrogen of which may be replaced by halogen) or $C_1$-$C_{20}$ alkoxy (at least one hydrogen of which may be replaced by halogen). Examples of $R^b$ are halogen, alkoxy, alkenyl, halogenated alkyl, halogenated alkoxy and halogenated alkenyl. Preferable examples of $R^b$ are halogen, —CN, —OCF$_3$, —OCF$_2$H and $C_1$-$C_7$ alkyl (at least one hydrogen of which is replaced by fluorine). Preferable examples of the halogen are fluorine and chlorine. Examples of the $C_1$-$C_7$ alkyl (at least one hydrogen of which is replaced by fluorine) are —CF$_3$, —CHF$_2$, —CH$_2$F, —CF$_2$CF$_3$, —CF$_2$CHF$_2$, —CF$_2$CH$_2$F, —CH$_2$CF$_3$, —CH$_2$CF$_2$H, —CH$_2$CH$_2$F and —CH$_2$CH$_2$CH$_2$F.

Besides the examples given above, $R^a$ and $R^b$ may be optically active, branched groups.

In formula (1), each of $A^1$, $A^2$, $A^3$ and $A^4$ is independently 1,4-cyclohexylene, 1,4-cyclohexenylene or 1,4-phenylene. In the rings, any —CH$_2$— may be replaced by —O— or —S—, any —CH= may be replaced by —N= and any hydrogen may be replaced by halogen, —CH$_3$ or —CF$_3$. Preferable examples of $A^1$, $A^2$, $A^3$ or $A^4$ are as follows.

(15-1)

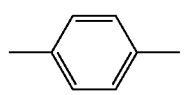

(15-2)

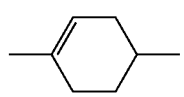

(15-3)

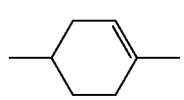

(15-4)

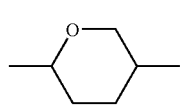

(15-5)

-continued

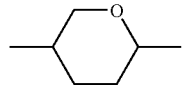

(15-6)

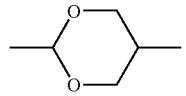

(15-7)

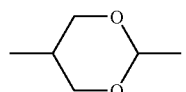

(15-8)

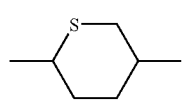

(15-9)

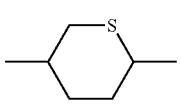

(15-10)

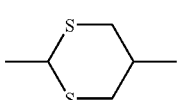

(15-11)

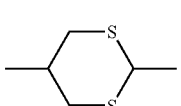

(15-12)

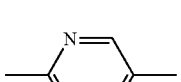

(15-13)

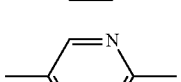

(15-14)

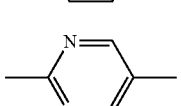

(15-15)

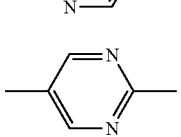

(15-16)

(15-17)

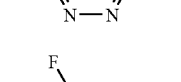

(16-1)

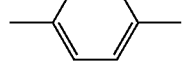

(16-2)

-continued
(16-3)
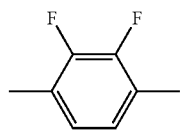
(16-4)
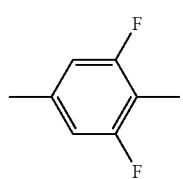
(16-5)
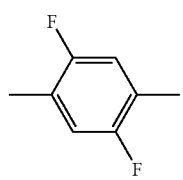
(16-6)
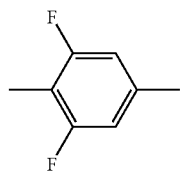
(16-7)
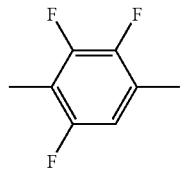
(16-8)
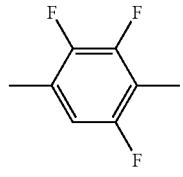
(16-9)
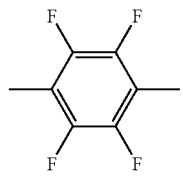
(16-10)
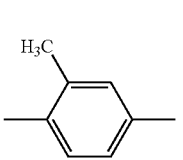
(16-11)
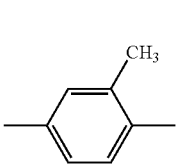
-continued
(16-12)
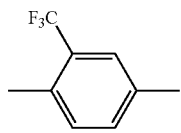
(16-13)
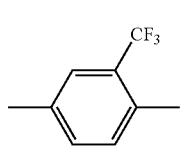
(16-14)
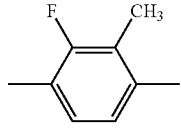
(16-15)
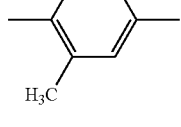
(16-16)
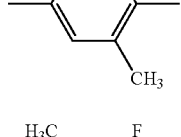
(16-17)
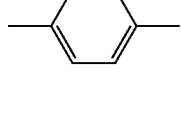
(16-18)
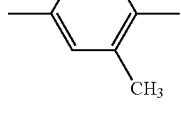
(16-19)
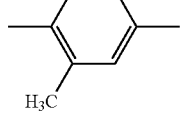
(16-20)
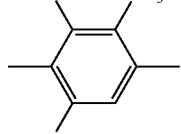

-continued

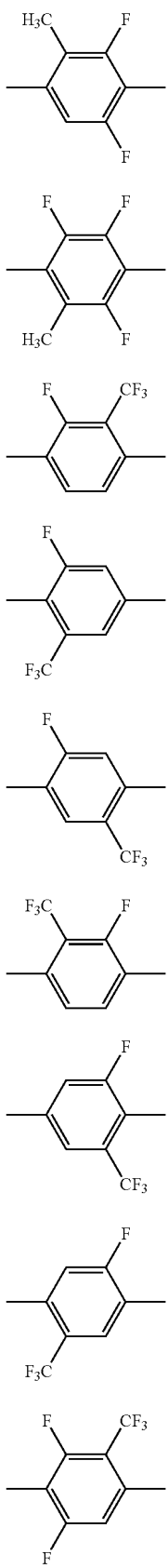

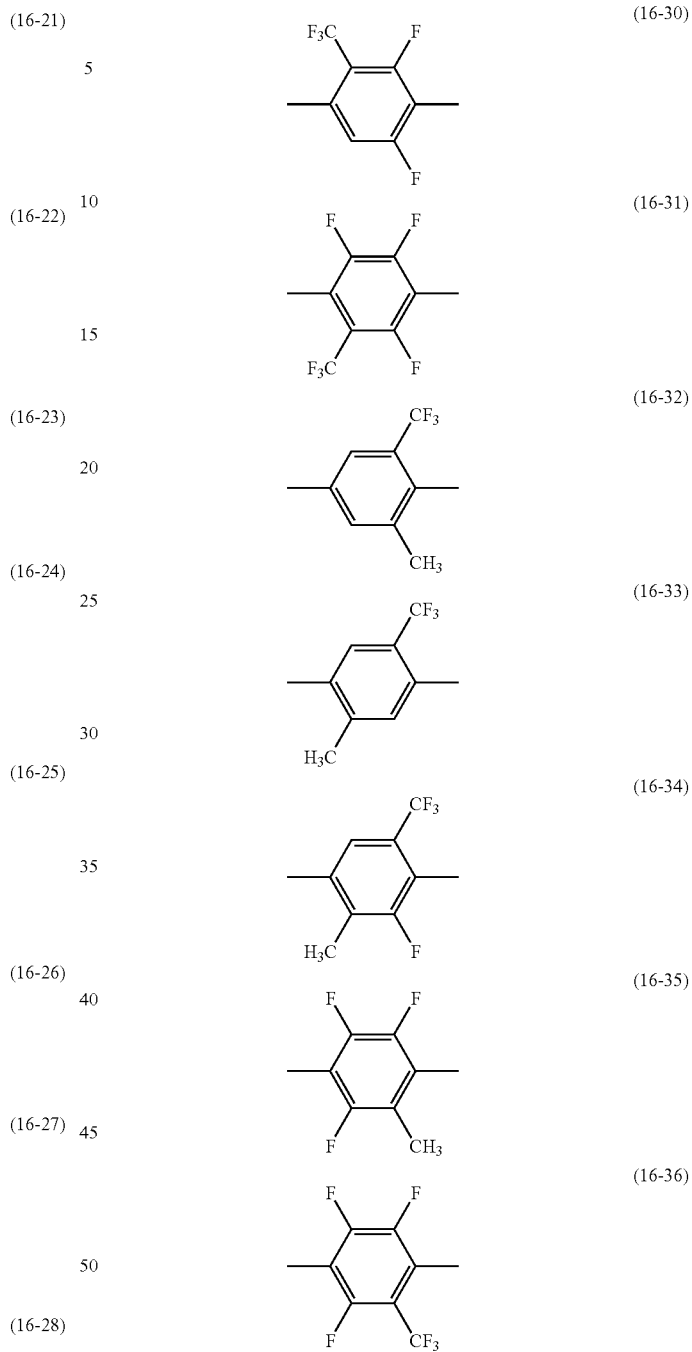

Among them, more preferable examples of $A^1$, $A^2$, $A^3$ or $A^4$ are (15-1) to (15-8), (15-15), (15-16), (16-1), (16-2), (16-4) to (16-6) and (16-10) to (16-22). Preferable steric arrangement of 1,4-cyclohexylene and 1,3-dioxane-2,5-diyl is trans, rather than cis.

In formula (1), each of $Z^1$, $Z^2$, $Z^3$ and $Z^4$ is independently a single bond or $C_1$-$C_4$ alkylene. In the alkylene, any —CH$_2$— may be replaced by —O—, —S—, —CH=CH—, —CF=CF— or —C≡C— and any hydrogen may be replaced by halogen. Preferable examples of $Z^1$, $Z^2$, $Z^3$ or $Z^4$ are a single bond, —CH$_2$CH$_2$—, —CH$_2$O—, —OCH$_2$—, —CF$_2$CH$_2$—, —CH$_2$CF$_2$—, —CF$_2$O— and —OCF$_2$—. More preferable examples of $Z^1$, $Z^2$, $Z^3$ or $Z^4$ are a single bond and —CH$_2$CH$_2$—.

Q is any group represented by formulas (q1), (q2) and (q3).

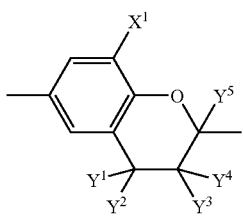
(q1)

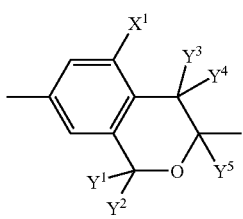
(q2)

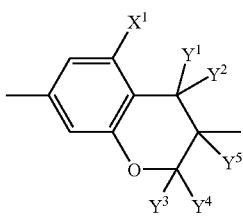
(q3)

where $X^1$ is hydrogen, halogen, methyl, ethyl, methoxy, ethoxy, —CF$_3$, —CF$_2$H, —CFH$_2$, —OCF$_3$, —OCF$_2$H or —OCFH$_2$ and each of $Y^1$, $Y^2$, $Y^3$, $Y^4$ and $Y^5$ is independently hydrogen, halogen or methyl. Particularly preferable examples of $X^1$ are hydrogen and fluorine. Particularly preferable examples of $Y^1$, $Y^2$, $Y^3$ or $Y^4$ are hydrogen, fluorine and methyl. And, particularly preferable examples of $Y^5$ are hydrogen, fluorine and chlorine.

Preferable examples of the group represented by formula (q1) are formulas (17-1) to (17-24) below.

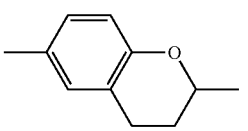
(17-1)

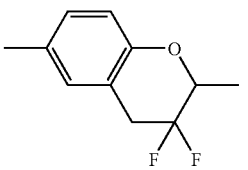
(17-2)

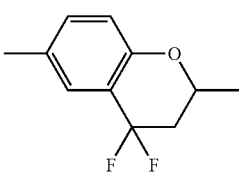
(17-3)

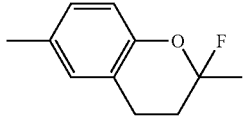
(17-4)

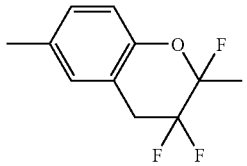
(17-5)

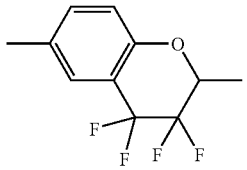
(17-6)

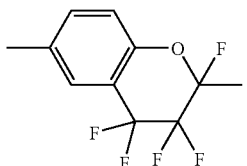
(17-7)

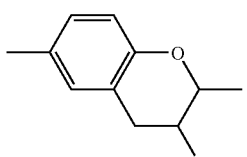
(17-8)

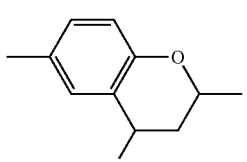
(17-9)

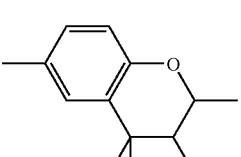
(17-10)

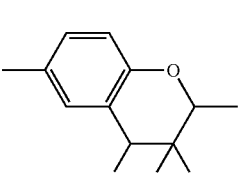
(17-11)

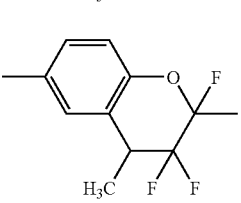
(17-12)

-continued
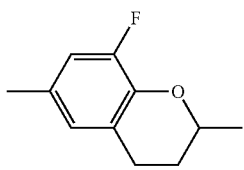 (17-13)
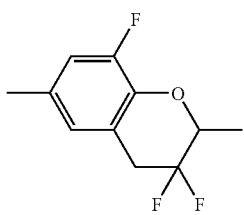 (17-14)
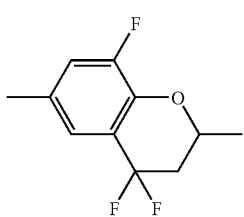 (17-15)
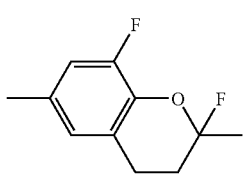 (17-16)
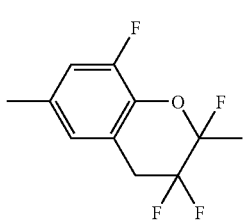 (17-17)
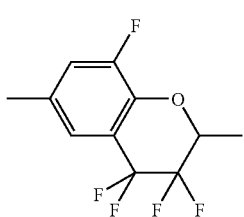 (17-18)
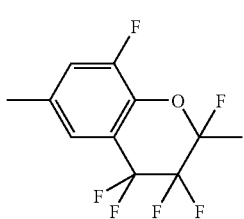 (17-19)
-continued
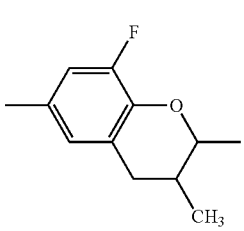 (17-20)
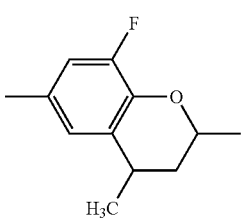 (17-21)
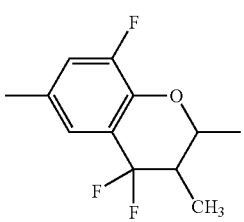 (17-22)
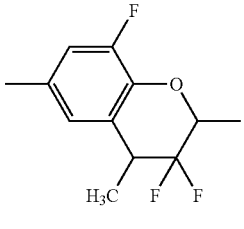 (17-23)
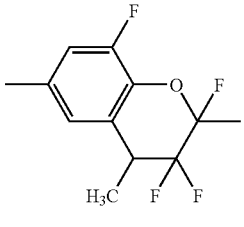 (17-24)
Among them, formulas (17-1) to (17-4), formula (17-8), formula (17-9), formulas (17-13) to (17-16), formula (17-20) and formula (17-21) are more preferable.
Preferable examples of the group represented by formula (q2) are formulas (18-1) to (18-24) below.
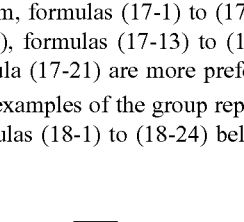 (18-1)
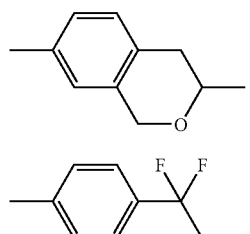 (18-2)

-continued
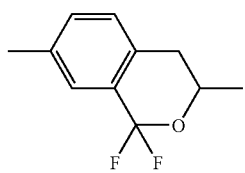 (18-3)
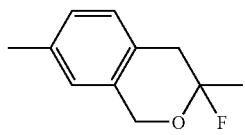 (18-4)
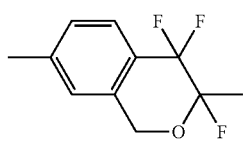 (18-5)
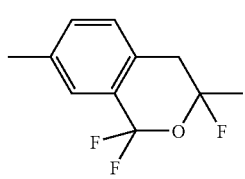 (18-6)
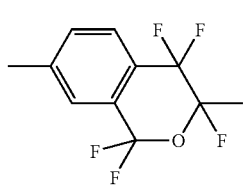 (18-7)
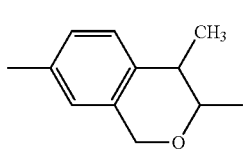 (18-8)
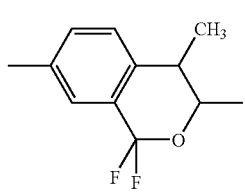 (18-9)
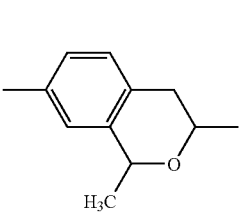 (18-10)
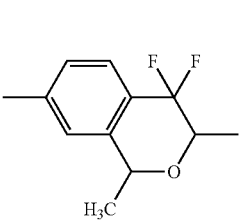 (18-11)
-continued
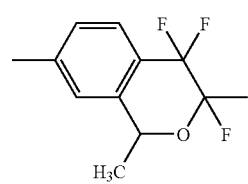 (18-12)
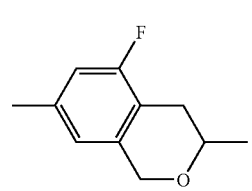 (18-13)
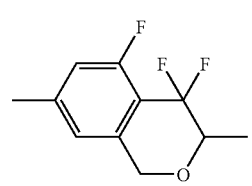 (18-14)
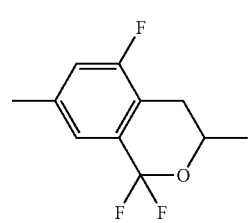 (18-15)
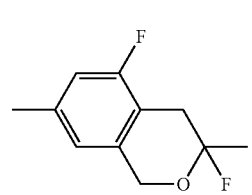 (18-16)
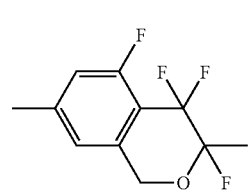 (18-17)
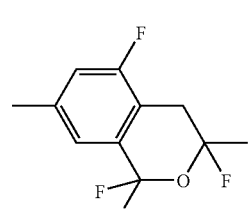 (18-18)
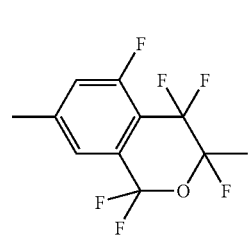 (18-19)

-continued
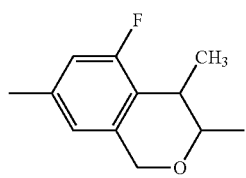 (18-20)
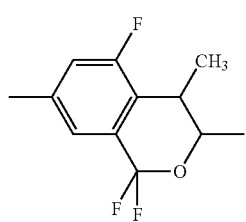 (18-21)
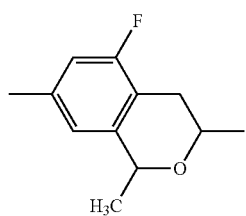 (18-22)
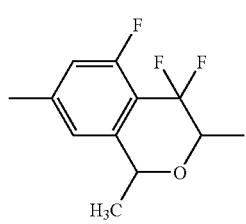 (18-23)
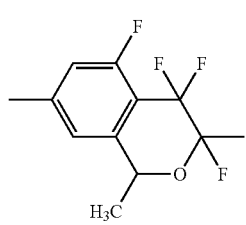 (18-24)
Among them, formulas (18-1) to (18-4), formula (18-8), formula (18-10), formulas (18-13) to (18-16), formula (18-20) and formula (18-22) are more preferable.
Preferable examples of the group represented by formula (q3) are formulas (19-1) to (19-24) below.
(19-1)
(19-2)
-continued
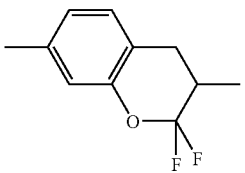 (19-3)
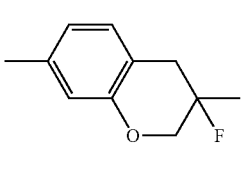 (19-4)
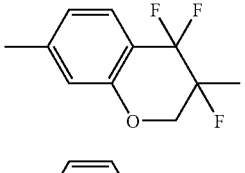 (19-5)
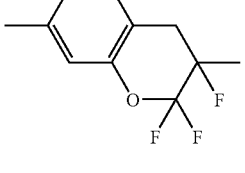 (19-6)
 (19-7)
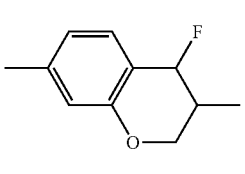 (19-8)
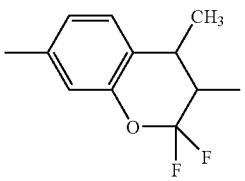 (19-9)
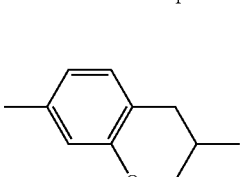 (19-10)
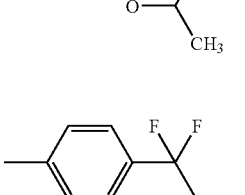 (19-11)

-continued

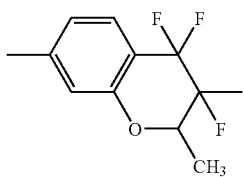
(19-12)

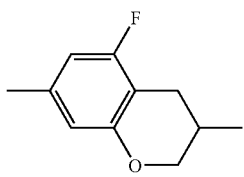
(19-13)

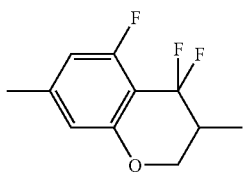
(19-14)

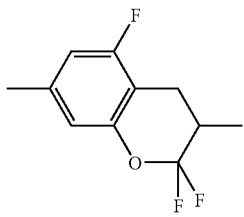
(19-15)

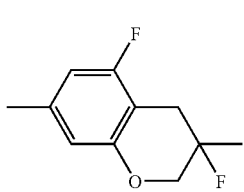
(19-16)

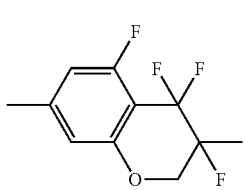
(19-17)

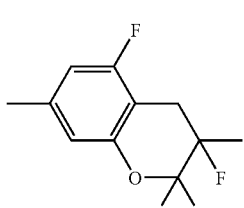
(19-18)

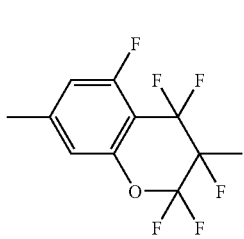
(19-19)

-continued

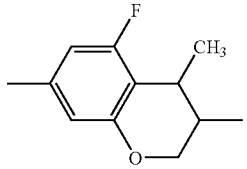
(19-20)

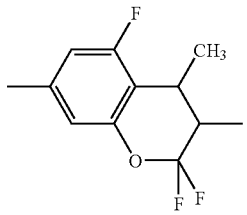
(19-21)

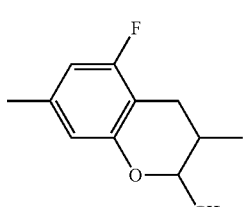
(19-22)

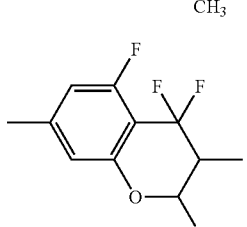
(19-23)

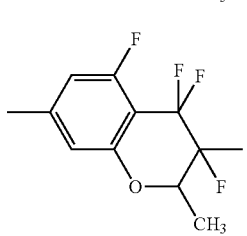
(19-24)

Among them, formulas (19-1) to (19-4), formula (19-8), formula (19-10), formulas (19-13) to (19-16), formula (19-20) and formula (19-22) are more preferable.

In formula (1), each of h, k, m and n is independently 0, 1 or 2, the sum of h, k, m and n being 1, 2 or 3. When the sum is 1, the compound has two rings including the chroman ring Q. When the sum is 2, the compound has three rings including the chroman ring Q. When the sum is 3, the compound has four rings including the chroman ring Q. When there is a hetero ring such as 1,3-dioxane-2,5-diyl, pyridine-2,5-diyl and pyrimidine-2,5-diyl, the other ring is preferably not a hetero ring. The compound (1) may contain isotopes like $^2$H (deuterium) and $^{13}$C in a higher proportion than that present in nature. Even in such cases, physical properties of the compound are not significantly different.

The compound (1) is physically and chemically very stable under the conditions in which the device is typically used and has good compatibility with other liquid crystal compounds. A composition comprising the compound is stable under the conditions in which the device is typically used. Even when the composition is kept at low temperature, the compound is not deposited as crystal (or smectic phase).

Such physical properties as optical anisotropy, dielectric anisotropy, etc. may be adjusted as desired by selecting appropriate terminal groups and bonding groups of the compound (1). Effects that terminal groups $R^a$ and $R^b$, rings $A^1, A^2, A^3$ and $A^4$ and bonding groups $Z^1, Z^2, Z^3$ and $Z^4$ have on the physical properties of the compound (1) are described herein below.

If $R^a$ is hydrogen, alkyl, alkenyl or alkoxy and $R^b$ is —OCF$_3$, —OCHF$_2$, —CF$_3$, —CHF$_2$, fluorine, chlorine or —CN, the compound (1) has a very large positive dielectric anisotropy. Such a compound can be used to reduce threshold voltage of the composition. If $R^a$ is hydrogen, alkyl or alkenyl and $R^b$ is —CF$_3$, —CHF$_2$ or fluorine, the compound (1) has large positive dielectric anisotropy and low viscosity. Such a compound can be used to adjust viscosity of the composition. If $R^a$ is hydrogen, alkyl or alkenyl and $R^b$ is —OCF$_3$, —OCHF$_2$ or fluorine, the compound has large positive dielectric anisotropy and good compatibility with other liquid crystal compounds. Such a compound can be used to adjust dielectric anisotropy, upper limit temperature or viscosity of the composition. Depending on the use of the composition, adequate functional groups are selected to obtain ideal physical properties.

The following can be said about the compound (1) applying the general rule for liquid crystal compounds. If $R^a$ or $R^b$ is a linear chain, the compound (1) has broad temperature range in the liquid and low viscosity. If $R^a$ or $R^b$ is a branched chain, the compound (1) has good compatibility with other liquid crystal compounds. If $R^a$ or $R^b$ is an optically active group, the compound (1) becomes a useful chiral dopant. By adding the compound to a composition, reverse twisted domain in the device can be prevented. If $R^a$ or $R^b$ is not an optically active group, the compound (1) is useful as the component of a composition. When $R^a$ or $R^b$ is alkenyl, preferable steric arrangement is determined by the position of double bond. An alkenyl compound having a preferable steric arrangement has high upper limit temperature or broad temperature range in the liquid crystal phase. These are explained in detail in *Mol. Cryst. Liq. Cryst.*, 1985, 131, 109 and *Mol. Cryst. Liq. Cryst.*, 1985, 131, 327.

If $A^1, A^2, A^3$ and $A^4$ are pyridine-2,5-diyl, 1,3-dioxane-2,5-diyl or 1,4-phenylene any hydrogen of which is replaced by halogen, the compound (1) has a large positive dielectric anisotropy. If the rings are pyridine-2,5-diyl, pyrimidine-2,5-diyl, pyridazine-3,6-diyl or 1,4-phenylene (any hydrogen of which may be replaced by halogen), the compound (1) has large optical anisotropy. If $A^1$ or $A^2$ is 1,4-cyclohexylene, 1,4-cyclohexenylene or 1,3-dioxane-2,5-diyl, the compound (1) has small optical anisotropy.

If at least two rings are 1,4-cyclohexylene, the compound (1) has high upper limit temperature, small optical anisotropy and low viscosity. If at least one ring is 1,4-phenylene, the compound (1) has relatively large optical anisotropy and a large orientational order parameter. If at least two rings are 1,4-phenylene, the compound (1) has large optical anisotropy, broad temperature range in the liquid crystal phase and high upper limit temperature.

If bonding group $Z^1$, $Z^2$ or $Z^3$ is a single bond, —(CH$_2$)$_2$—, —CH$_2$O—, —CF$_2$O—, —OCF$_2$—, —CH═CH—, —CF═CF— or —(CH$_2$)$_4$—, the compound (1) has low viscosity. If the bonding group is a single bond, —(CH$_2$)$_2$—, —OCF$_2$—, —CF$_2$O— or —CH═CH—, the compound (1) has lower viscosity. If the bonding group is —CH═CH—, the compound (1) has broad temperature range in the liquid crystal phase and large elastic constant ratio of $K_{33}/K_{11}$ ($K_{33}$=bend elastic constant, $K_{11}$=splay elastic constant). If the bonding group is —C≡C—, the compound (1) has large optical anisotropy.

If the compound (1) has two or three rings including the chroman ring, it has low viscosity. If it has three or four rings including the chroman ring, the compound (1) has high upper limit temperature. As described above, a compound having ideal physical properties can be obtained by selecting appropriate terminal groups, rings and bonding groups and number of rings. Thus, the compound (1) is very useful in the composition for devices such as PC, TN, STN, ECB, OCB, IPS and VA.

Preferable examples of the compound (1) are the compounds represented by formulas (1-1) to (1-15).

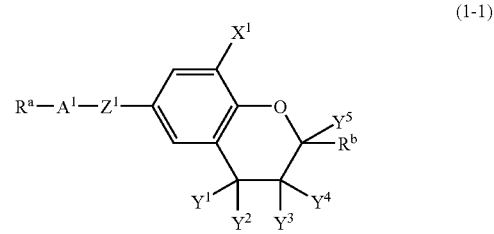

(1-1)

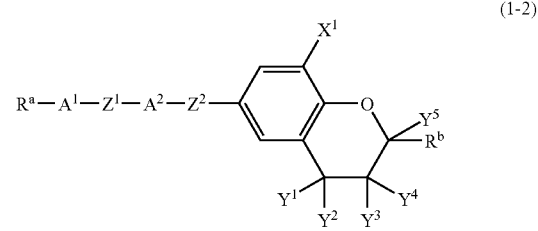

(1-2)

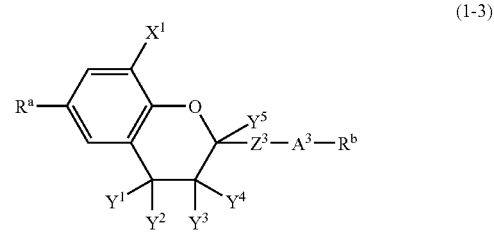

(1-3)

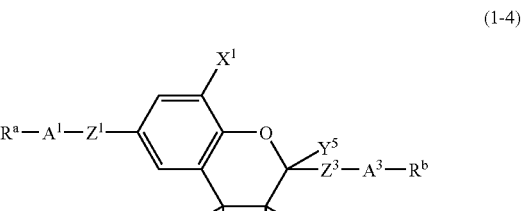

(1-4)

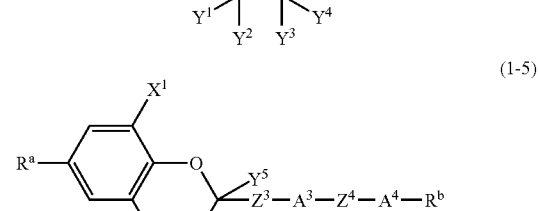

(1-5)

-continued

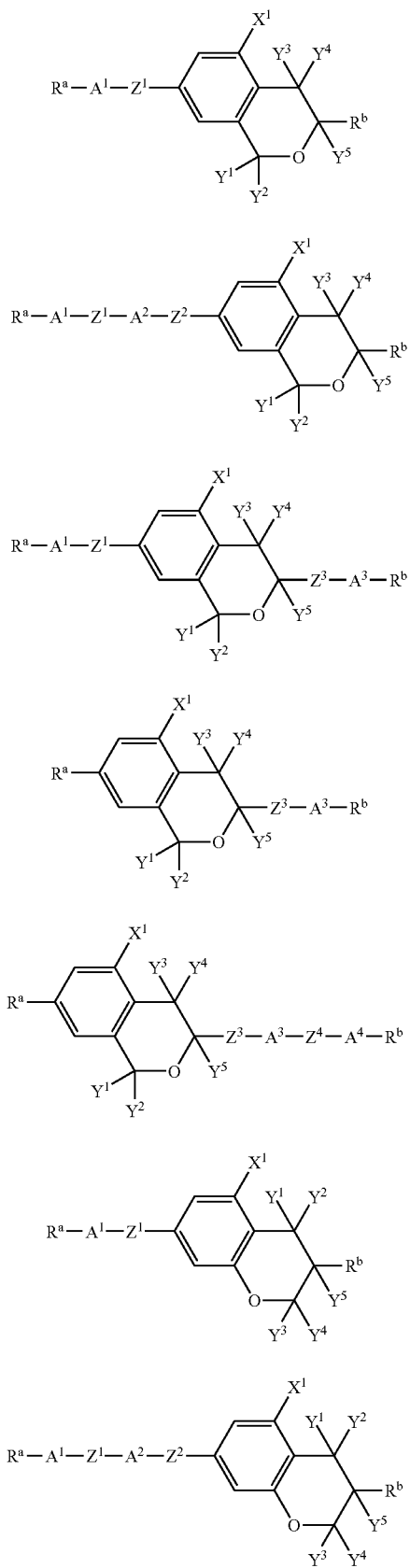

(1-6)
(1-7)
(1-8)
(1-9)
(1-10)
(1-11)
(1-12)

-continued

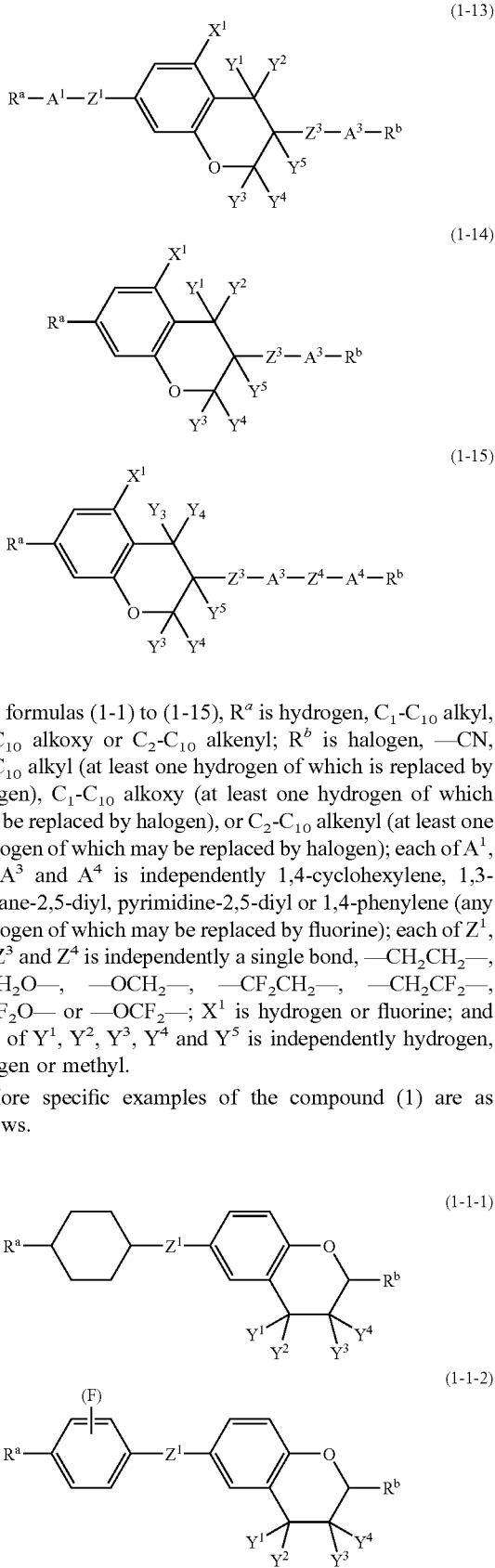

(1-13)
(1-14)
(1-15)

In formulas (1-1) to (1-15), $R^a$ is hydrogen, $C_1$-$C_{10}$ alkyl, $C_1$-$C_{10}$ alkoxy or $C_2$-$C_{10}$ alkenyl; $R^b$ is halogen, —CN, $C_1$-$C_{10}$ alkyl (at least one hydrogen of which is replaced by halogen), $C_1$-$C_{10}$ alkoxy (at least one hydrogen of which may be replaced by halogen), or $C_2$-$C_{10}$ alkenyl (at least one hydrogen of which may be replaced by halogen); each of $A^1$, $A^2$, $A^3$ and $A^4$ is independently 1,4-cyclohexylene, 1,3-dioxane-2,5-diyl, pyrimidine-2,5-diyl or 1,4-phenylene (any hydrogen of which may be replaced by fluorine); each of $Z^1$, $Z^2$, $Z^3$ and $Z^4$ is independently a single bond, —CH$_2$CH$_2$—, —CH$_2$O—, —OCH$_2$—, —CF$_2$CH$_2$—, —CH$_2$CF$_2$—, —CF$_2$O— or —OCF$_2$—; $X^1$ is hydrogen or fluorine; and each of $Y^1$, $Y^2$, $Y^3$, $Y^4$ and $Y^5$ is independently hydrogen, halogen or methyl.

More specific examples of the compound (1) are as follows.

(1-1-1)
(1-1-2)

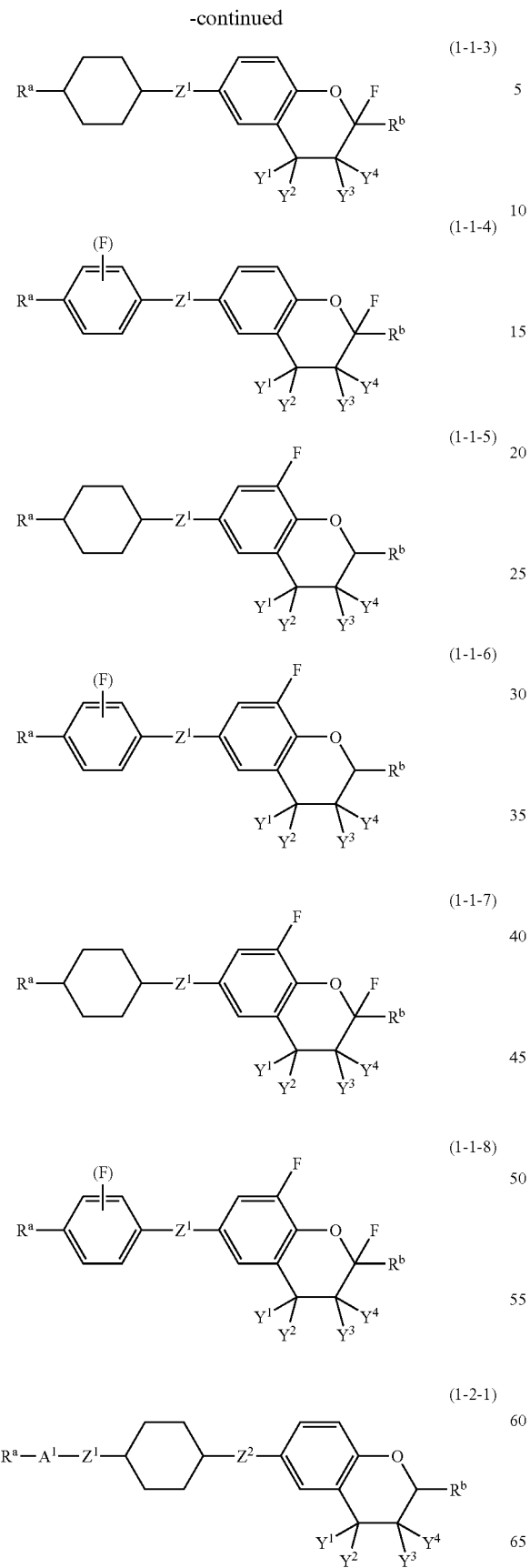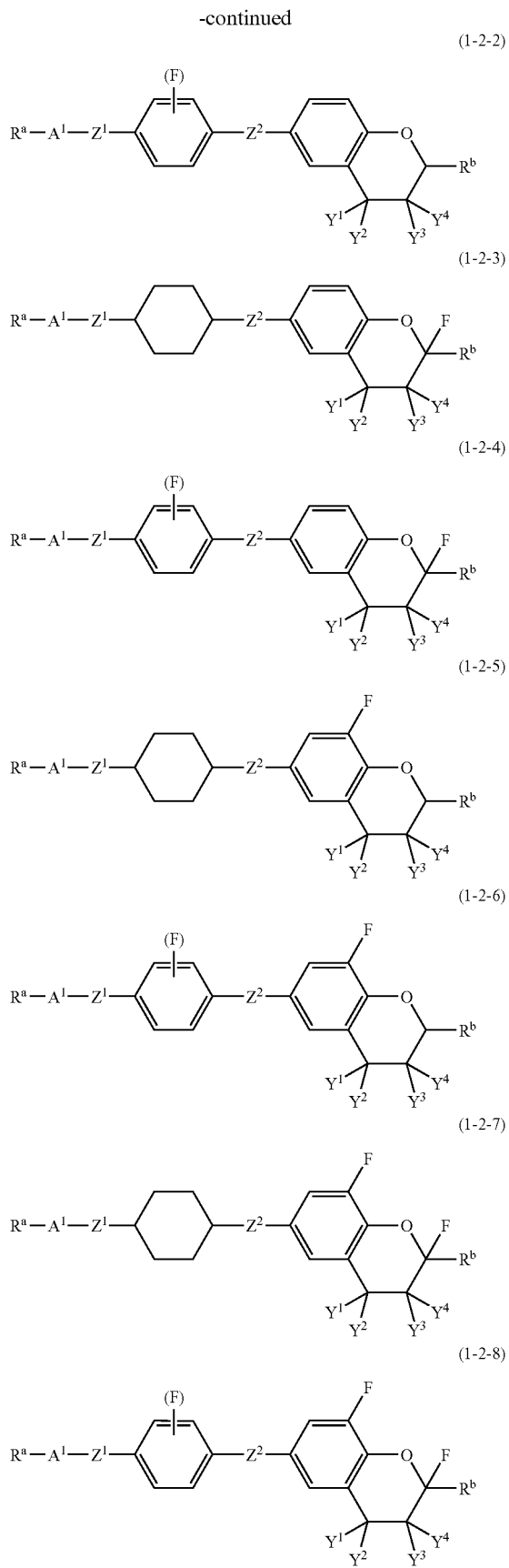

-continued (1-3-1) — chroman with R$^a$ on benzo ring, O in pyran, Z$^3$—cyclohexyl—R$^b$; Y$^1$,Y$^2$,Y$^3$,Y$^4$ substituents.

(1-3-2) — as (1-3-1) but terminal ring is phenyl with (F).

(1-3-3) — as (1-3-1) with F at 2-position of chroman.

(1-3-4) — as (1-3-2) with F at 2-position of chroman.

(1-3-5) — as (1-3-1) with F at 8-position of chroman.

(1-3-6) — as (1-3-2) with F at 8-position of chroman.

(1-3-7) — as (1-3-5) with additional F at 2-position.

(1-3-8) — as (1-3-6) with additional F at 2-position.

(1-4-1) — R$^a$—cyclohexyl—Z$^1$—chroman—Z$^3$—A$^3$—R$^b$.

(1-4-2) — R$^a$—phenyl(F)—Z$^1$—chroman—Z$^3$—A$^3$—R$^b$.

(1-4-3) — as (1-4-1) with F at 2-position of chroman.

(1-4-4) — as (1-4-2) with F at 2-position of chroman.

(1-4-5) — as (1-4-1) with F at 8-position of chroman.

(1-4-6) — as (1-4-2) with F at 8-position of chroman.

(1-4-7) — as (1-4-5) with additional F at 2-position.

-continued
(1-4-8)
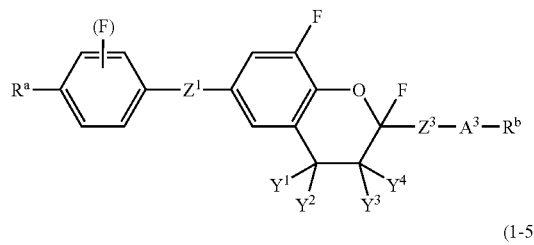
(1-5-1)
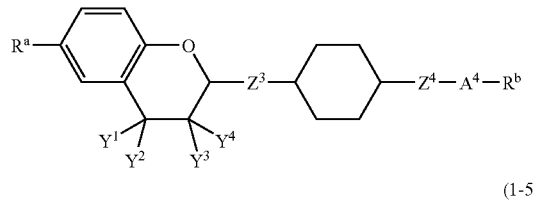
(1-5-2)
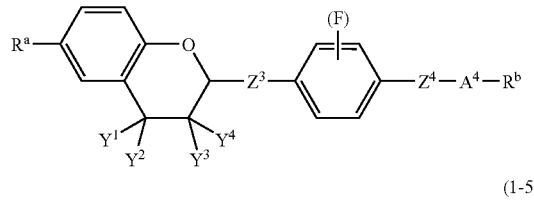
(1-5-3)
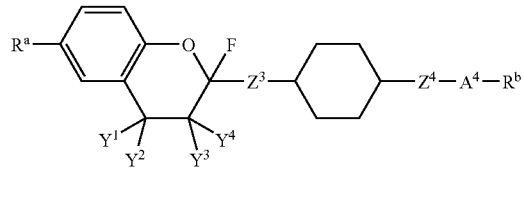
(1-5-4)
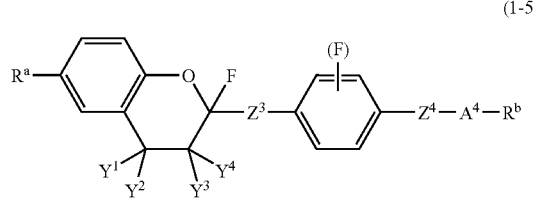
(1-5-5)
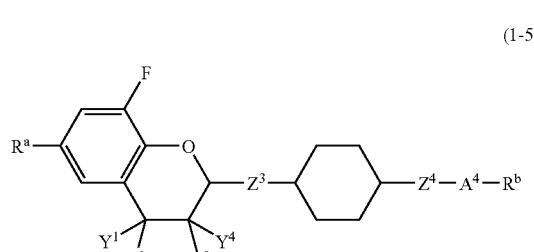
(1-5-6)
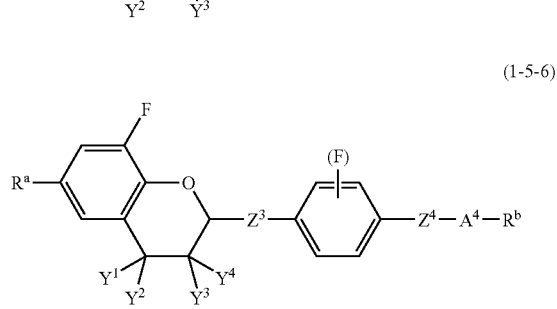
-continued
(1-5-7)
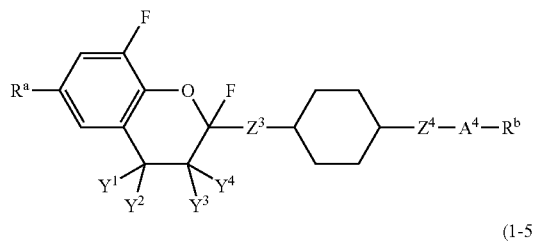
(1-5-8)
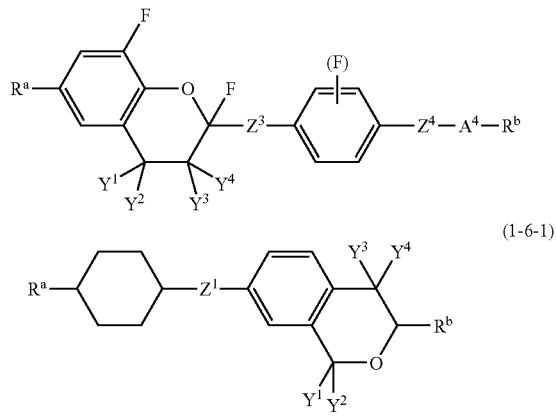
(1-6-1)
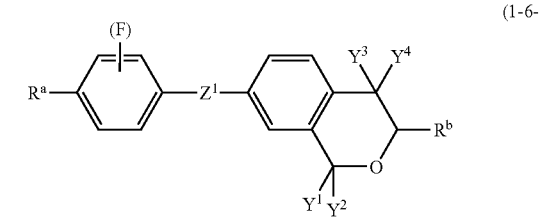
(1-6-2)
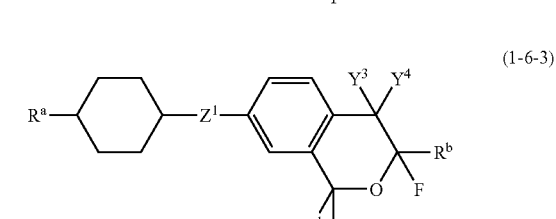
(1-6-3)
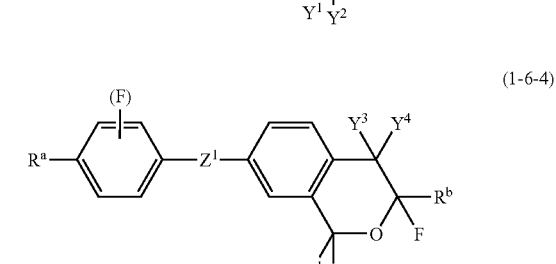
(1-6-4)
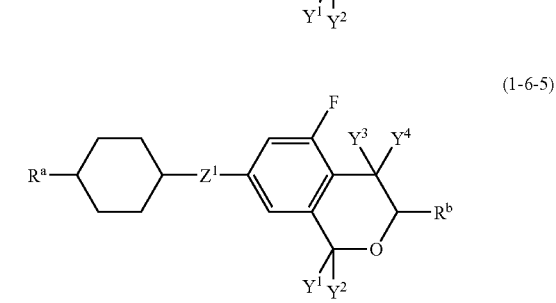
(1-6-5)

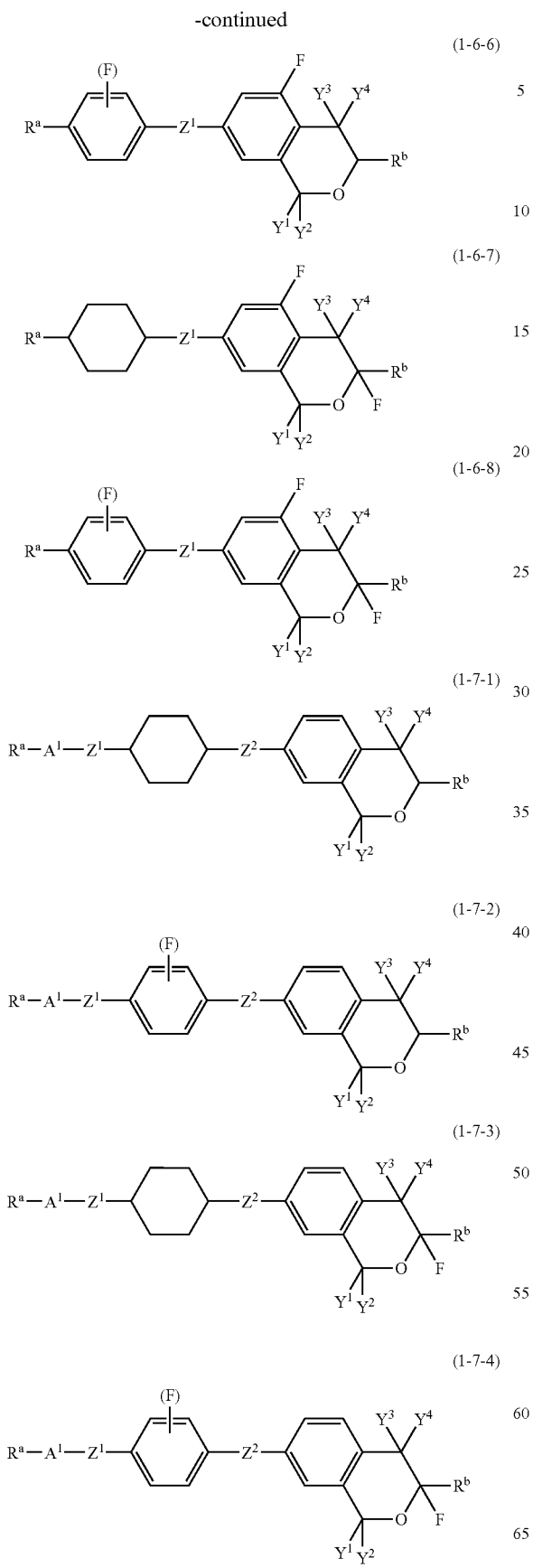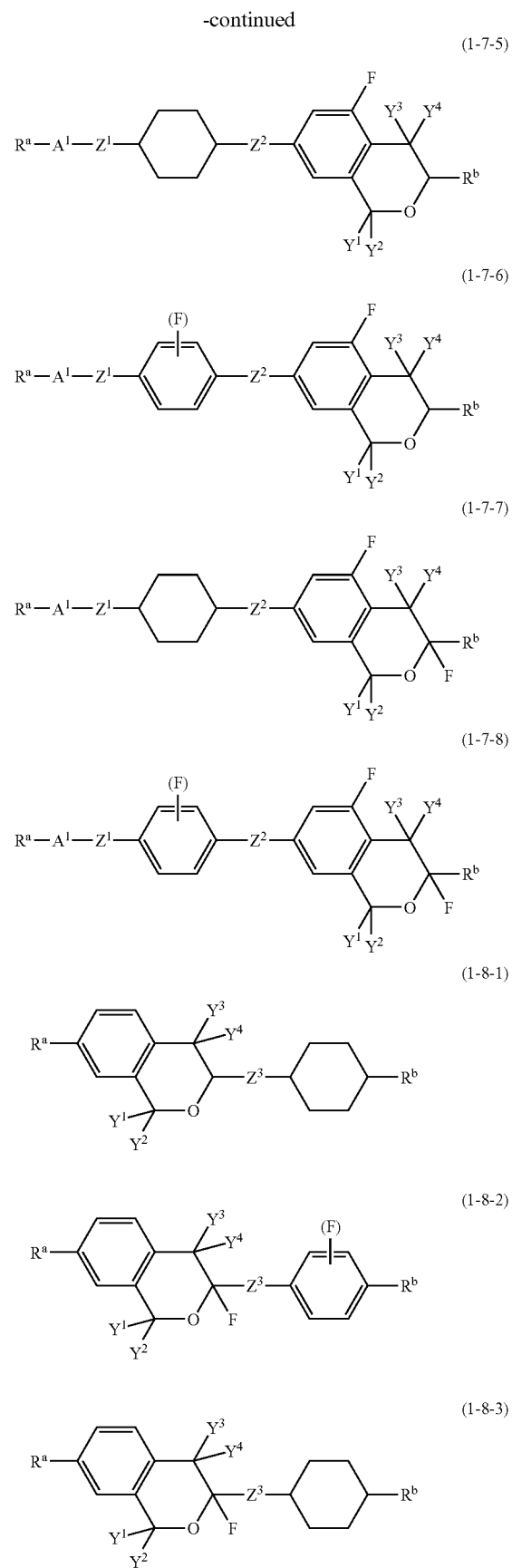

-continued
(1-8-4)
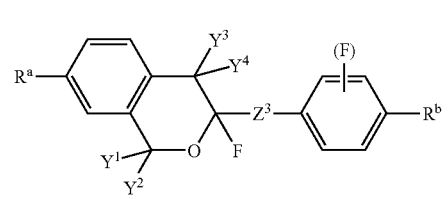
(1-8-5)
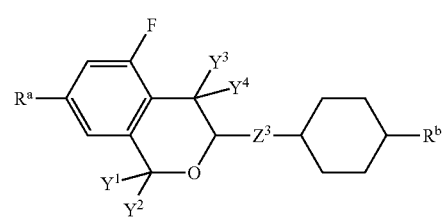
(1-8-6)
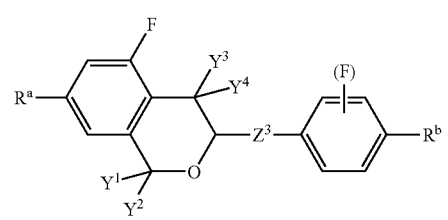
(1-8-7)
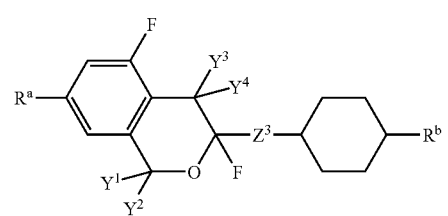
(1-8-8)
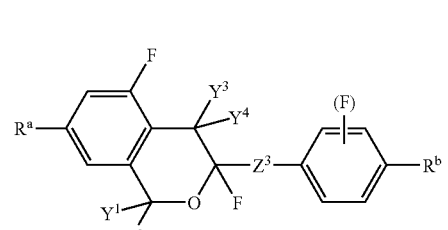
(1-9-1)
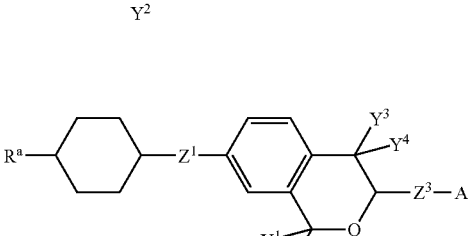
(1-9-2)
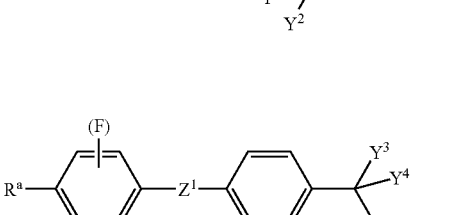
-continued
(1-9-3)
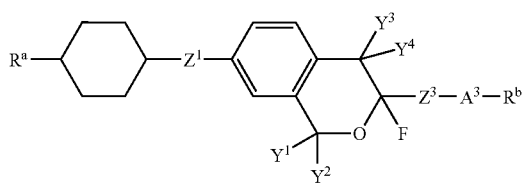
(1-9-4)
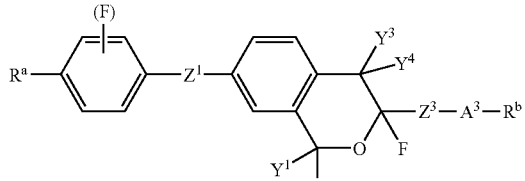
(1-9-5)
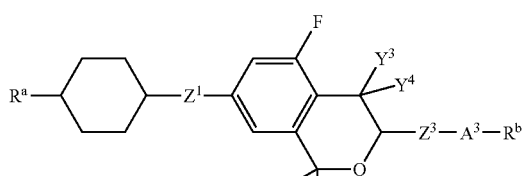
(1-9-6)
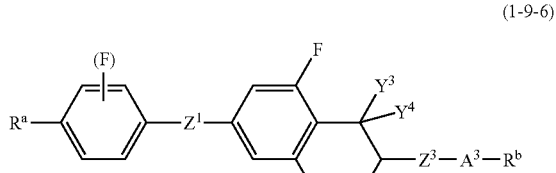
(1-9-7)
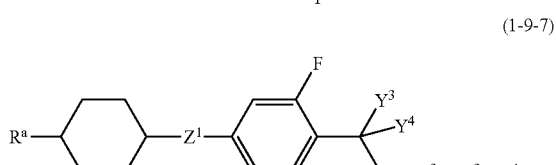
(1-9-8)
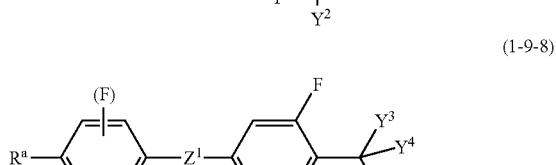
(1-10-1)
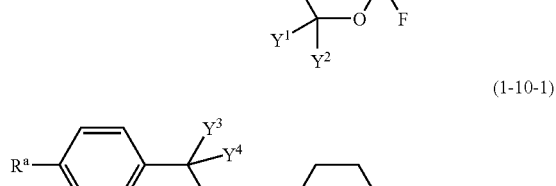

-continued
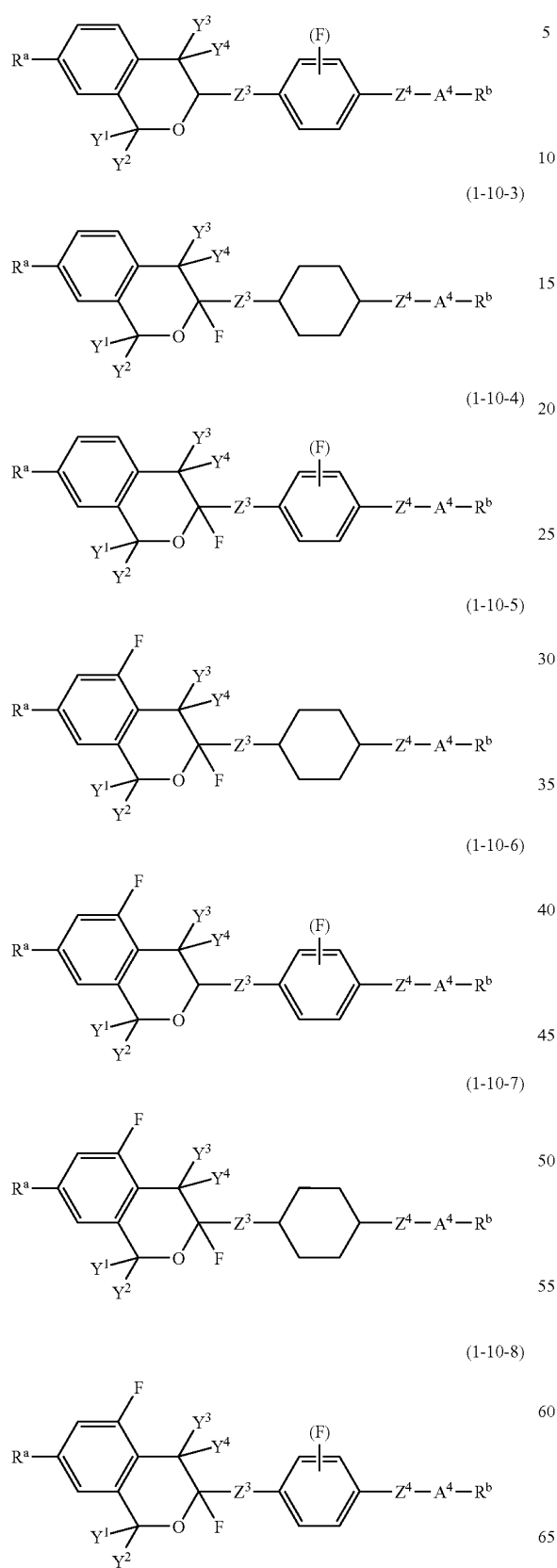
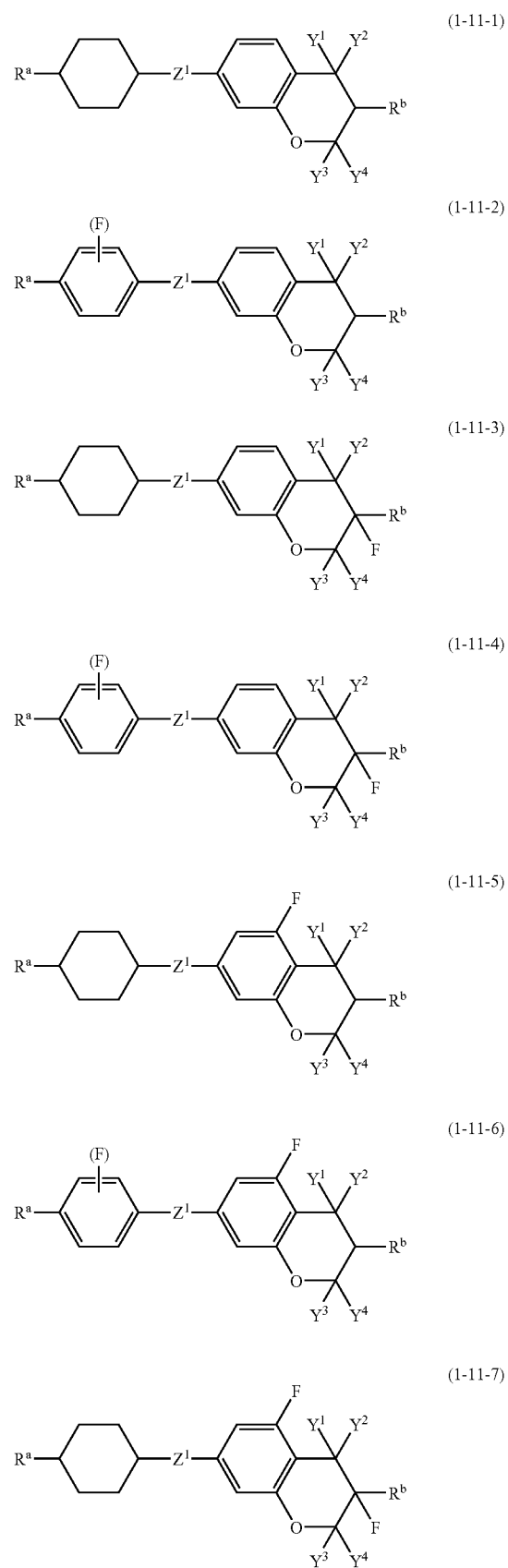

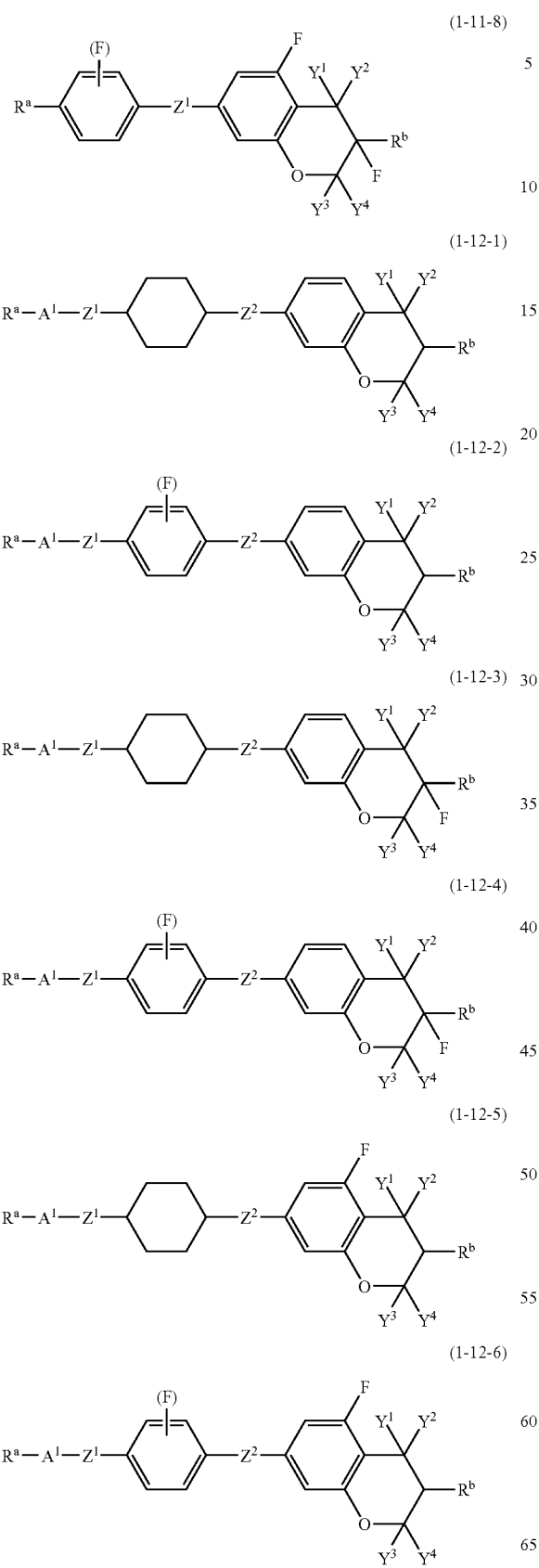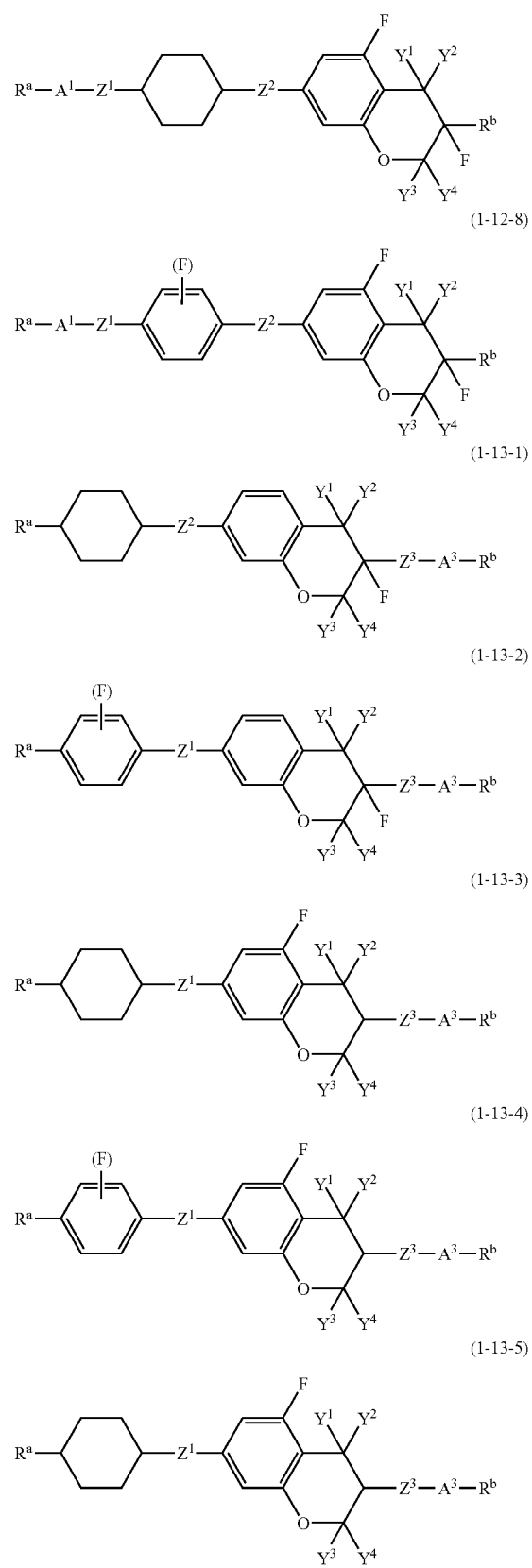

-continued
(1-13-6)
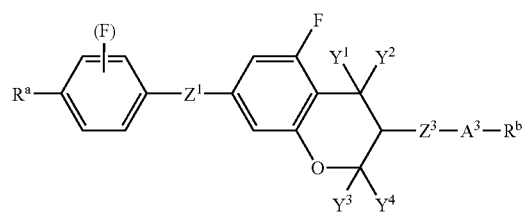
(1-13-7)
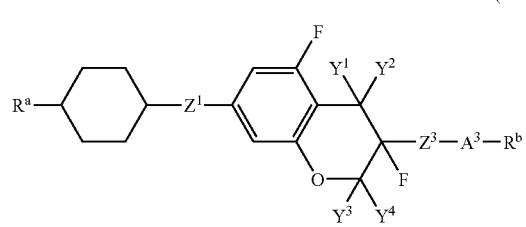
(1-13-8)
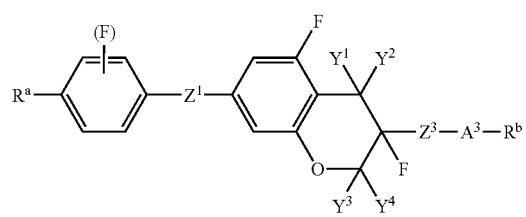
(1-14-1)
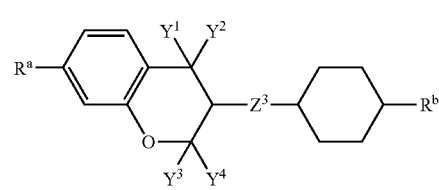
(1-14-2)
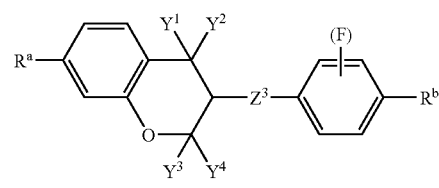
(1-14-3)
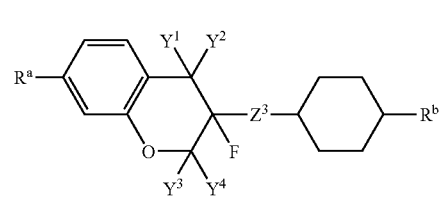
(1-14-4)
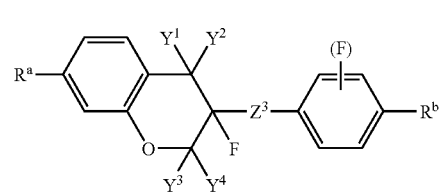
-continued
(1-14-5)
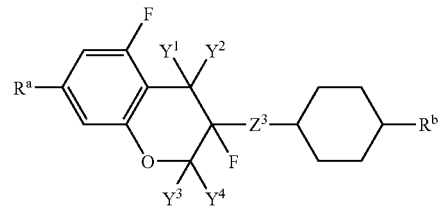
(1-14-6)
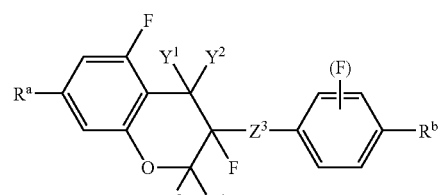
(1-14-7)
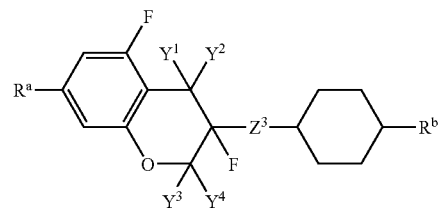
(1-14-8)
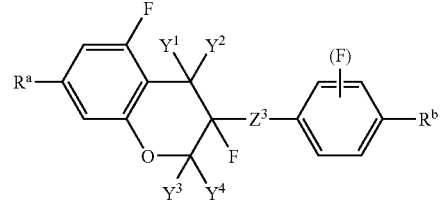
(1-15-1)
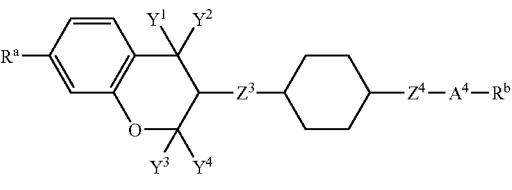
(1-15-2)
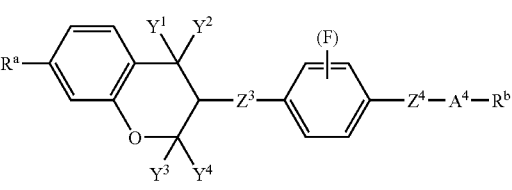
(1-15-3)

-continued (1-15-4)
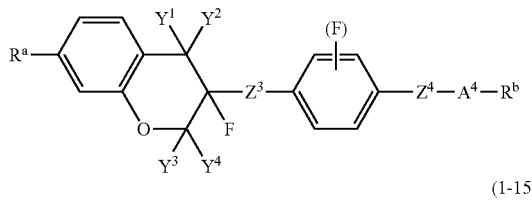

(1-15-5)
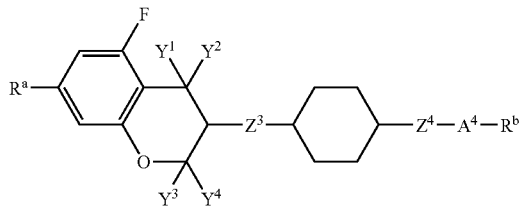

(1-15-6)
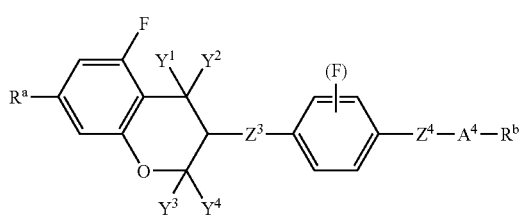

(1-15-7)
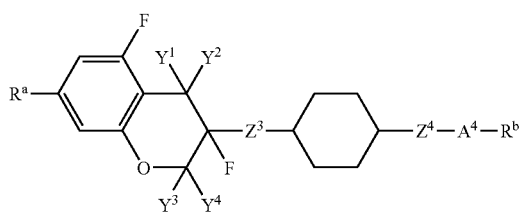

(1-15-8)
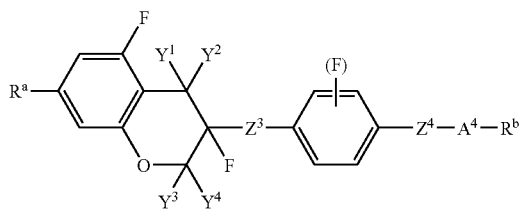

In formulas (1-1-1) to (1-15-8), $R^a$, $R^b$, $A^1$-$A^4$, $Z^1$-$Z^4$, $X^1$ and $Y^1$-$Y^4$ are the same as in formulas (1) to (15). In the above formulas the following ring structure refers to a benzene ring (one or two hydrogen of which may be replaced by fluorine).

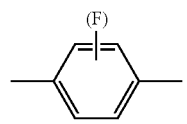

The compound (1) can be synthesized by adequately adjusting conventional organic synthesis methods. Methods of introducing the desired terminal group, ring and bonding group to the starting material are presented in Organic Syntheses (John Wiley & Sons, Inc), Organic Reactions (John Wiley & Sons, Inc), Comprehensive Organic Synthesis (Pergamon Press) and Lecture on New Experimental Chemistry (Maruzen), etc. An example of producing the bonding group $Z^1$, $Z^2$, $Z^3$ or $Z^4$ is explained through a scheme. In the scheme, $MSG^1$ or $MSG^2$ is a primary organic group having at least one ring. In the scheme, more than one $MSG^1$s (or $MSG^2$s) may be identical or different. Compounds (1A) to (1K) correspond to the compound (1).

(I) Formation of Single Bond

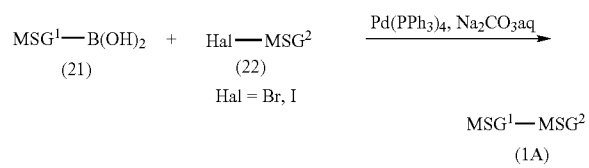

Aryl borate (21) and the compound (22), which is prepared by a known method, are reacted in an aqueous carbonate solution in the presence of a catalyst such as tetrakis(triphenylphosphine)palladium to synthesize the compound (1A). The compound (1A) may also be synthesized by reacting the compound (23), which is prepared by a known method, with n-butyllithium, further reacting it with zinc chloride and reacting it with the compound (22) in the presence of a catalyst such as dichlorobis(triphenylphosphine)palladium.

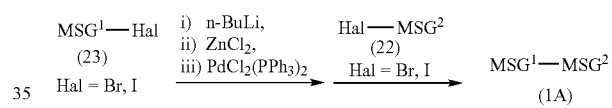

(II) Formation of —$CF_2O$— and —$OCF_2$—

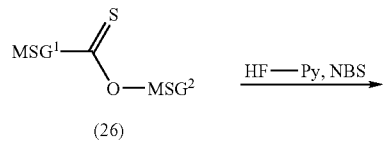

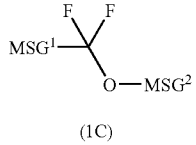

The compound (1B) is treated with a sulfurizer such as Lawesson's reagent to obtain the compound (26). The compound (26) is fluorinated with hydrogen fluoride-pyridine complex and NBS(N-bromosuccinimide) to synthesize the compound (1C) having —$CF_2O$— (see M. Kuroboshi et al., *Chem. Lett.*, 1992, 827.). The compound (1C) may also be prepared by fluorinating the compound (26) with (diethylamino)sulfur trifluoride (DAST) (see W. H. Bunnelle et al., *J. Org. Chem.* 1990, 55, 768.). A compound having —$OCF_2$— may be prepared by this method. These bonding groups may also be formed by the method presented in Peer. Kirsch et al., *Anbew. Chem. Int. Ed.* 2001, 40, 1480.

(III) Formation of —CH═CH—

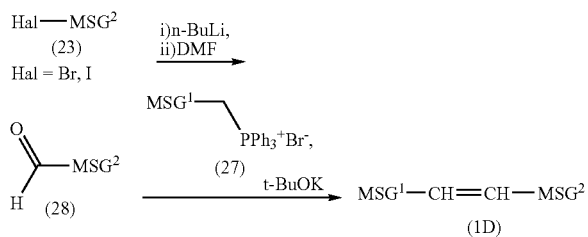

The compound (23) is treated with n-butyllithium and reacted with a formamide such as N,N-dimethylformamide (DMF) to obtain the aldehyde (28). The phosphonium salt (27), which is prepared by a known method, is treated with a base such as potassium t-butoxide to obtain enylide, which is further reacted with the aldehyde (28) to synthesize the compound (1D). Cis isomers may be obtained depending on the reaction condition. In that case, they can be isomerized into trans isomers by the known method.

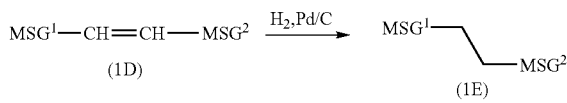

The compound (1D) is hydrogenated in the presence of a catalyst such as palladium/carbon to synthesize the compound (1E).

(V) Formation of —(CH$_2$)$_4$—

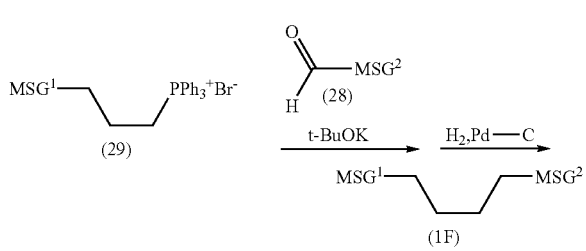

The phosphonium salt (29) is used instead of the phosphonium salt (27) to obtain a compound having —(CH$_2$)$_2$— and —CH═CH— according to the method of (III) or (IV). The resultant compound is hydrogenated through contact to synthesize the compound (1F).

(VI) Formation of —C≡C—

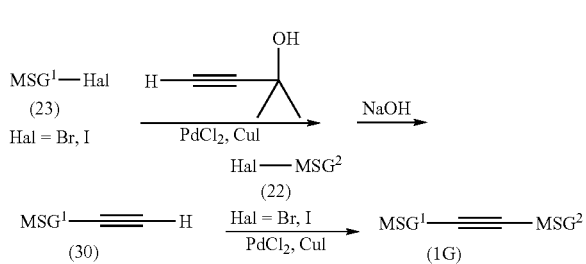

The compound (23) is reacted with 2-methyl-3-butyne-2-ol in the presence of dichloropalladium and halogenated copper catalysts and deprotected in a basic condition to obtain the compound (30). The compound (30) is reacted with the compound (22) in the presence of dichloropalladium and halogenated copper catalysts to synthesize the compound (1G).

(VII) Formation of —CF═CF—

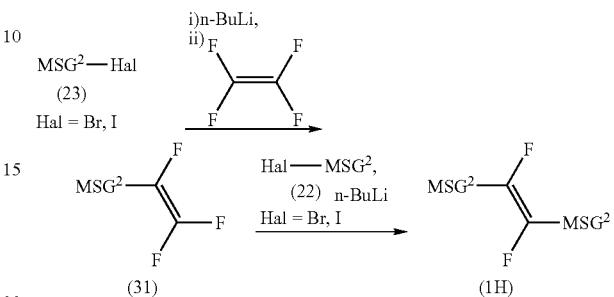

The compound (23) is treated with n-butyllithium and reacted with tetrafluoroethylene to obtain the compound (31). The compound (22) is treated with n-butyllithium and reacted with the compound (31) to synthesize the compound (1H).

(VIII) Formation of —CH$_2$O— or —OCH$_2$—

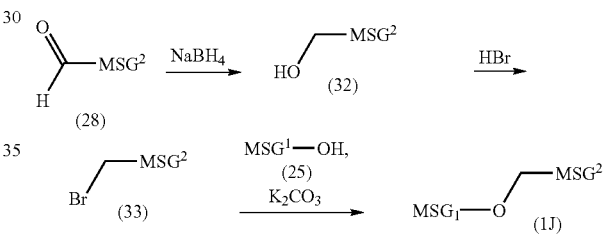

The compound (28) is reduced with a reducing agent such as sodium borohydride to obtain the compound (32), which is halogenated with hydrobromic acid, etc. to obtain the compound (33). The compound (33) is reacted with the compound (25) in the presence of potassium carbonate, etc. to synthesize the compound (1J).

(IX) Formation of —(CH$_2$)$_3$O— or —O(CH$_2$)$_3$—

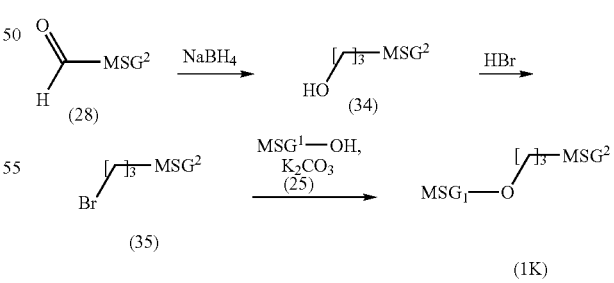

The compound (1K) is synthesized using the compound (34) instead of compound (32) according to the method of (VIII).

(X) Formation of —(CF$_2$)$_2$—

Diketone (—COCO—) is fluorinated with sulfur tetrafluoride in the presence of hydrogen fluoride catalyst according to the method presented in *J. Am. Chem. Soc.*, 2001, 123, 5414. to obtain a compound having —$(CF_2)_2$—.

Methods for synthesizing $A^1$, $A^2$, $A^3$ or $A^4$ are described herein below.

Starting materials to obtain such rings as 1,4-cyclohexylene, 1,3-dioxane-2,5-diyl, 1,4-phenylene, 2-fluoro-1,4-phenylene, 2,3-difluoro-1,4-phenylene, pyridine-2,5-diyl and pyrimidine-2,5-diyl can be purchased or synthesized by well-known methods. Thus, description will only be given on the compound (37) and the compound (41).

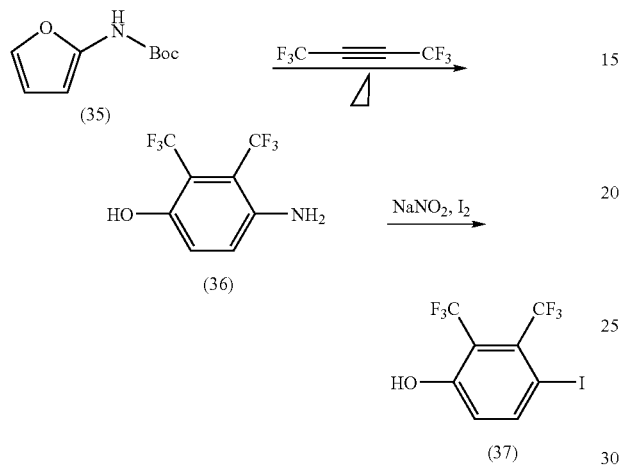

The structural unit of 2,3-bistrifluoromethylphenylene is synthesized according to the method presented in *Org. Lett.*, 2000, 2(21), 3345. Diels-Alder reaction of the furan (35) and 1,1,1,4,4,4-hexafluoro-2-butyne is carried out at high temperature to synthesize the aniline (36), which is transformed into the iodide (37) by Sandmire reaction according to the method presented in *Org. Synth. Coll.*, Vol. 2, 1943, 355. The iodide (37) is transformed into the compound (1) by a general organic synthesis.

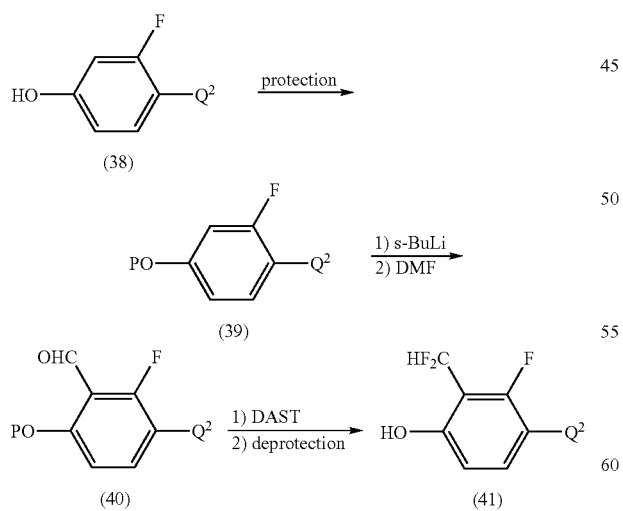

The structural unit of 2-difluoromethyl-3-fluorophenylene is synthesized as follows. The hydroxy group of the compound (38) is protected by an adequate protecting group to obtain the compound (39). Symbol P represents the protecting group. The compound (39) is treated with sec-butyllithium, and then reacted with N,N-dimethylformamide (DMF) to obtain the aldehyde (40), which is fluorinated with diethylaminosulfur trifluoride (DAST) and deprotected to obtain the phenol (41). The phenol (41) is transformed into the compound (1) by a general organic synthesis. In the scheme above, symbol $Q^2$ represents the following group.

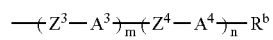

Methods of forming Q are described herein below. The compounds (q1a), (q2a) and (q3a) are synthesized first to synthesize a benzopyran ring derivative. The compound (1) is synthesized from one of the three compounds. Methods of synthesizing the compounds (q1a), (q2a) and (q3a) are described first, as examples.

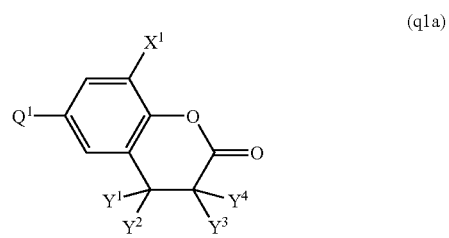

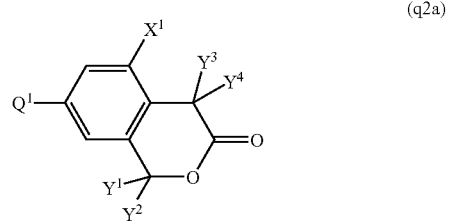

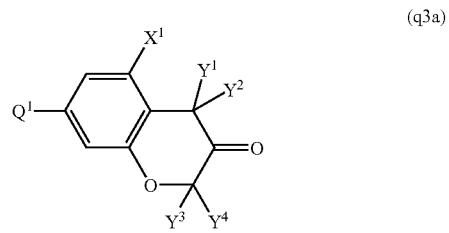

where $Q^1$ is the group represented by the following formula:

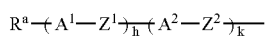

1) Synthesis of Compound (q1a)

The compound (52), a starting material, can be easily synthesized by a general organic synthesis method, particularly using schemes (I) to (X) above. General synthesis examples (A) to (C) to derive the compound (52) are described herein below.

(A) Synthesis of Compound (52) when $A^2$ is Cyclohexylene and $Z^2$ is a Single Bond or Alkylene

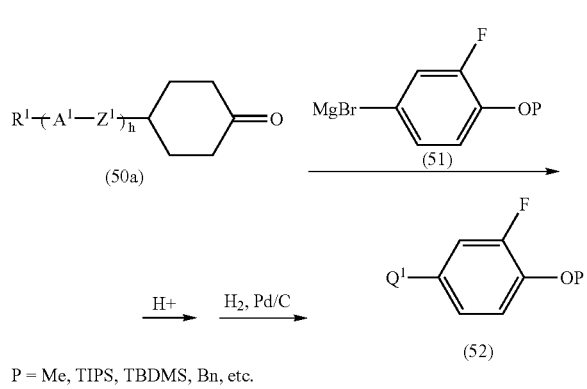

P = Me, TIPS, TBDMS, Bn, etc.

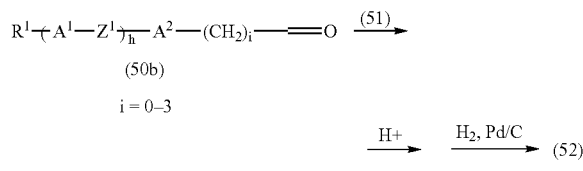

i = 0–3

(where P stands for a protecting group, Me stands for methyl, TIPS stands for triisopropylsilyl, TBDMS stands for t-butyldimethylsilyl, Bn stands for benzyl and i is 0-3.)

First, the cyclohexanone derivative (50a) or the carbonyl derivative (50b) is prepared by an organic synthesis method. Grignard reaction using an adequate Grignard reagent (51), dehydration using an acid and hydrogenation using Pd catalyst are performed in sequence. Then, isomerization using aluminium chloride is performed, if necessary, to derive the compound (52).

(B) Synthesis of Compound (52) when $A^2$ is Phenylene, Pyrimidine, etc. and $Z^2$ is a Single bond, Alkylene, Alkenylene, Alkinylene or —$CH_2$—

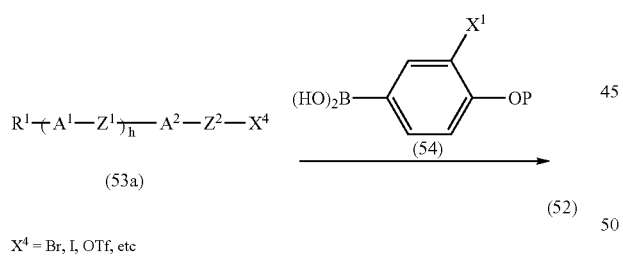

$X^4$ = Br, I, OTf, etc

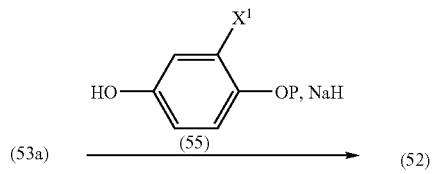

(where $X^4$ represents bromine, iodine or triflate (OTf) and $X^1$ represents hydrogen, halogen, methyl or —$CF_3$.)

First, the compound (53a) or the compound (53b) is prepared by an organic synthesis method. Then, coupling is performed using a boric acid derivative (54) or Williamson etherification is performed with a phenol derivative (55), for example, to derive the compound (52).

(C) Synthesis of Compound (52) when $Z^2$ is —$CF_2O$—

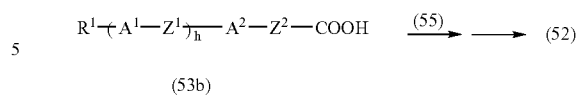

First, the compound (53c) is prepared by an organic synthesis method. The compound is esterified with a phenol derivative (55), etc. Then, the compound (52) can be easily derived by the scheme (II) described above.

Next, synthesis methods of the compound (52) and the compound (q1a) are described. First, the compounds (52) to (57) are derived by the following scheme.

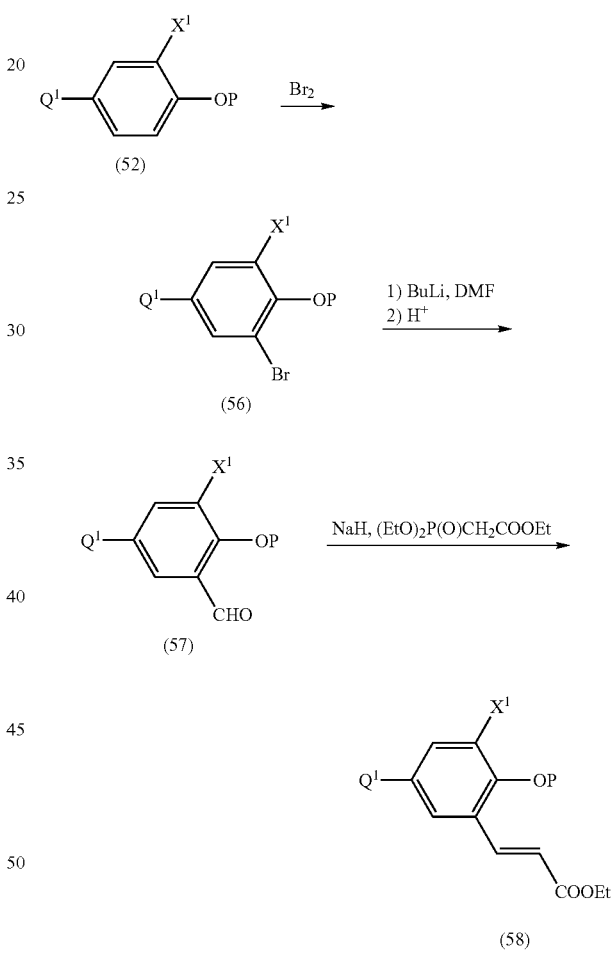

The compound (52) is brominated and treated with butyllithium. Then, it is reacted with N,N-dimethylformamide (DMF), etc. to obtain an aldehyde (57). An enylide obtained by treating ethyl diethylphosphonoacetate with a base such as sodium hydride is reacted with the compound (57) to obtain the compound (58).

Next, synthesis methods of the compound (58) and the compound (q1a) are described.

(I-1) Synthesis of Compound (61)

The compound (61) may be prepared by the following method, as an example.

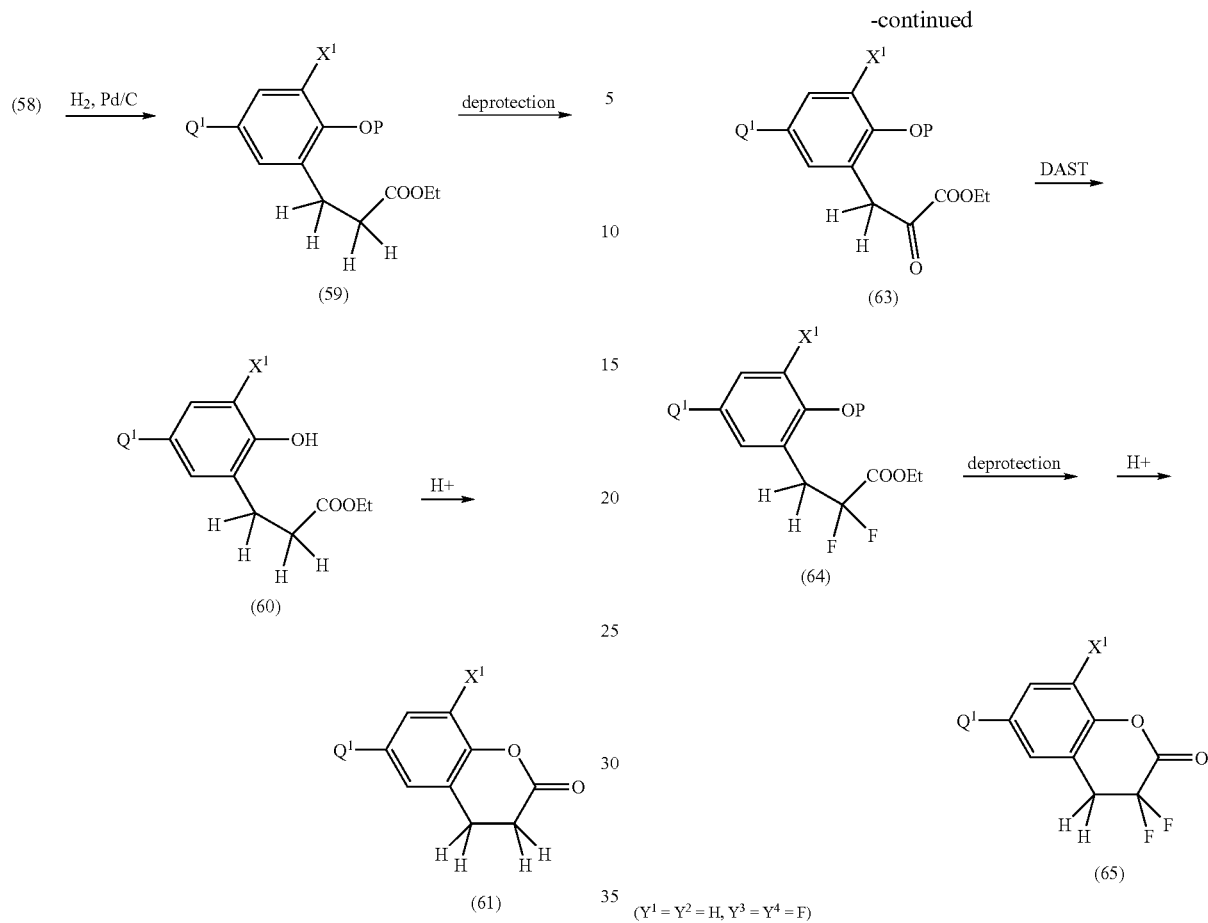

The compound (58) is hydrogenated in the presence of palladium catalyst. Then, the protecting group of the phenol is removed under the condition given in, for example, Protective Groups in Organic Synthesis (Greene, John Wiley & Sons, Inc). The resultant compound (60) is cyclodehydrated using p-toluenesulfonic acid, etc. to obtain the compound (61).

(I-2) Synthesis of Compound (65)

The compound (65) may be prepared by the following method, as an example.

The compound (58) is reacted with m-chloroperbenzoic acid to derive the epoxide (62). Then, sodium acetate is added to obtain the compound (63). Next, the compound (63) is fluorinated using such fluorinator as diethylaminosulfur trifluoride (DAST). Then, deprotection and dehydration-cyclization are performed as described in (I-1) to obtain the compound (65).

(I-3) Synthesis of Compound (67)

The compound (67) may be prepared by the following method, as an example.

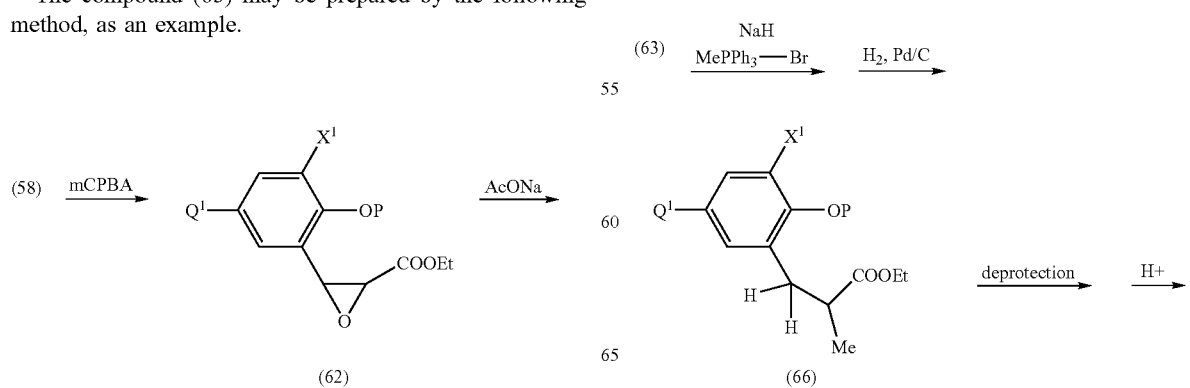

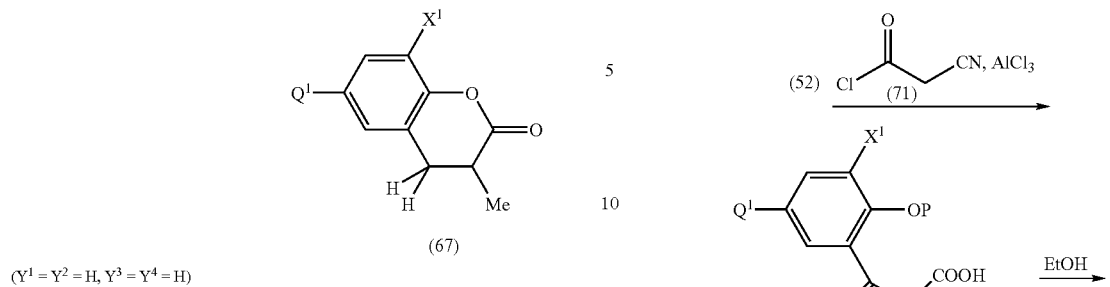

($Y^1 = Y^2 = H, Y^3 = Y^4 = H$)

Wittig reaction and hydrogenation are performed on the compound (63) to derive the compound (66). Then, the compound (67) can be obtained by the same method described in (I-1).

(I-4) Synthesis of Compound (70)

The compound (70) may be prepared by the following method, as an example.

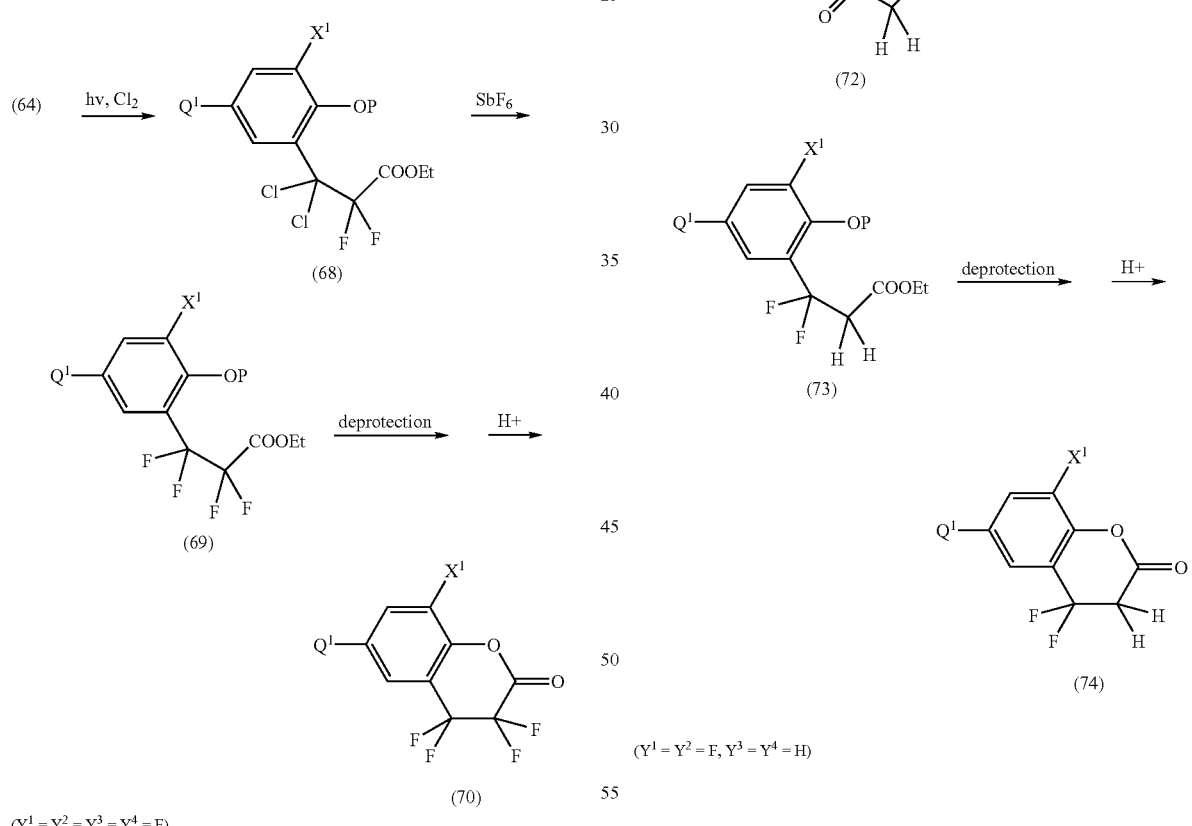

($Y^1 = Y^2 = Y^3 = Y^4 = F$)

The compound (64) is derived into the chloride (68) by photoreaction of chlorine. It is fluorinated with antimony fluoride to derive the compound (69). Then, the compound (70) can be obtained by the same method described in (I-1).

(I-5) Synthesis of Compound (74)

The compound (74) may be prepared by the following method, as an example.

($Y^1 = Y^2 = F, Y^3 = Y^4 = H$)

A mixture of the compound (52) and cyanoacetic chloride is reacted with aluminium chloride to obtain the compound (71). It is derived to generate the compound (72) using ethanol and base. After fluorinating it using DAST, the compound (74) can be obtained by the same method described in (I-1).

(I-6) Synthesis of Compound (76)

The compound (76) may be prepared by the following method, as an example.

2) Synthesis of Compound (q2a)

(II-1) Synthesis of Compound (83)

Starting material is the compound (56). An exemplary scheme of deriving the compounds (56) to (83) is described herein below.

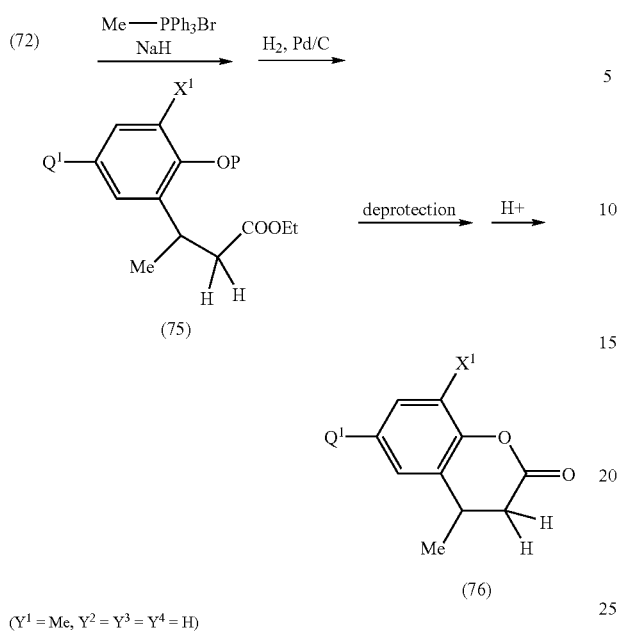

Wittig reaction and hydrogenation are performed for the compound (72) to derive the compound (75). Then, the compound (76) can be obtained by the same method described in (I-1).

(I-7) Synthesis of Compound (78)

The compound (78) may be prepared by the following method, as an example.

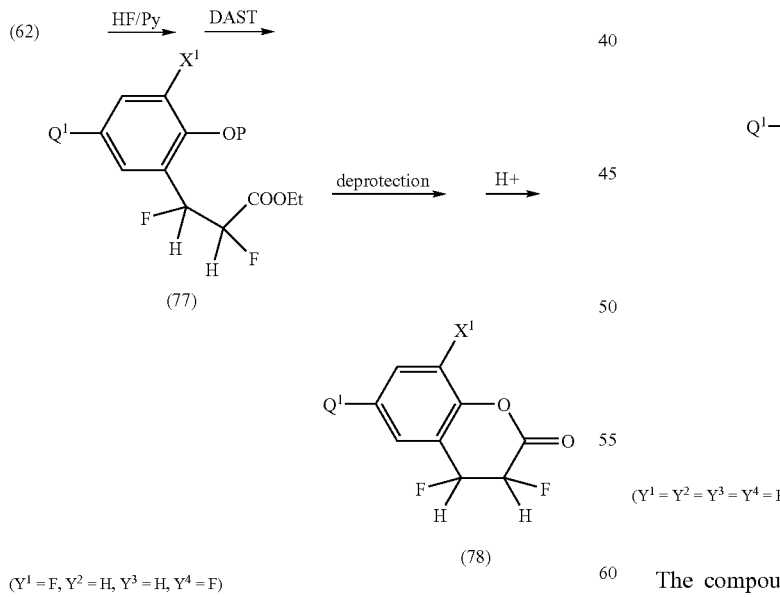

Hydrogen fluoride-pyridine is added to the compound (62) and fluorination is performed using DAST to obtain the compound (77). Then, the compound (78) can be obtained by the same method described in (I-1).

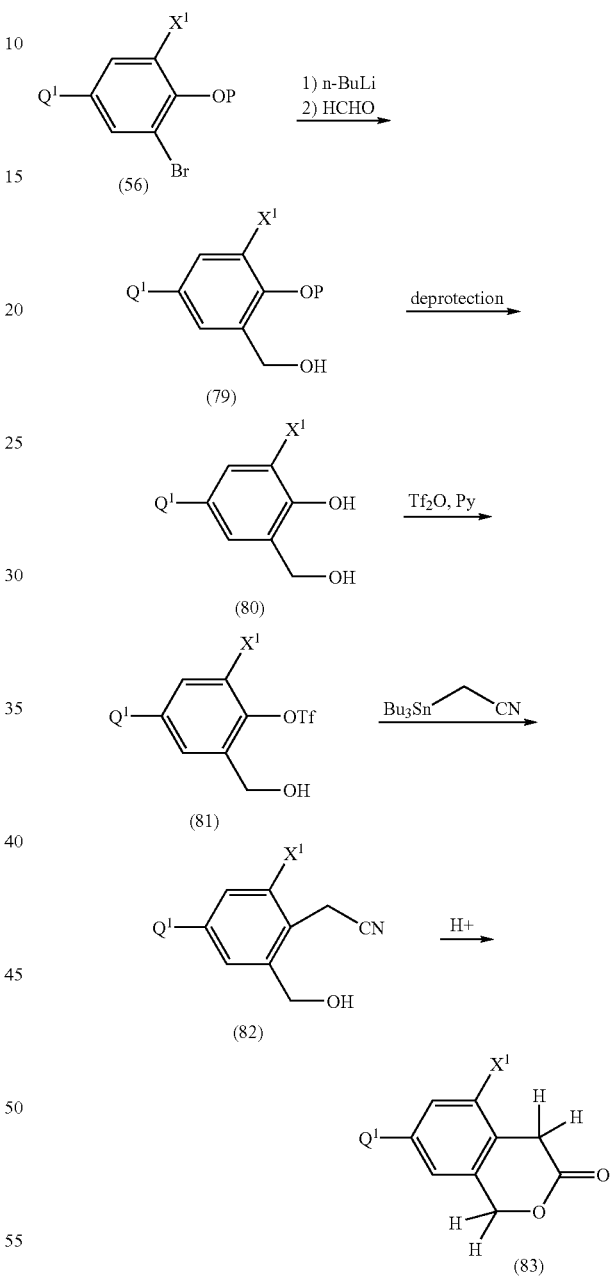

The compound (56) is treated with n-butyllithium and reacted with formaldehyde to obtain the compound (79). After removing the protecting group under adequate condition as described in (I-1), the triflate (81) is obtained using trifluoromethanesulfonic acid anhydride (Tf2O) and pyridine. Next, a mixture of the compound (81) and an organotin compound is coupled in the presence of palladium catalyst to derive the compound (82). Then, dehydration-cyclization is performed using p-toluenesulfonic acid, etc. to obtain the compound (83).

(II-2) Synthesis of Compound (85)

The compound (85) may be prepared by the following method, as an example.

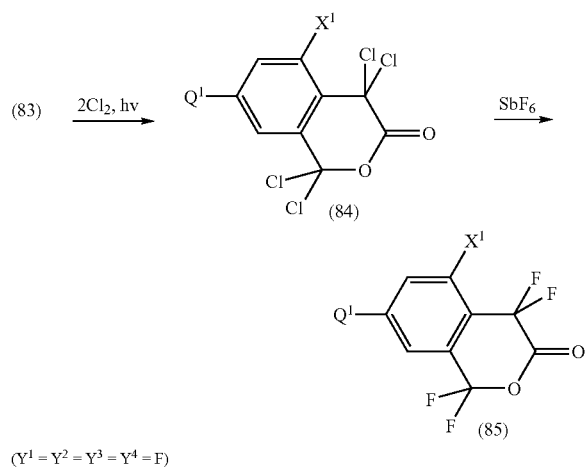

The chloride (84) is derived from the compound (83) by photoreaction with excess chlorine, and then fluorinated with antimony fluoride to obtain the compound (85).

(II-3) Synthesis of Compound (87)

The compound (87) may be prepared by the following method, as an example.

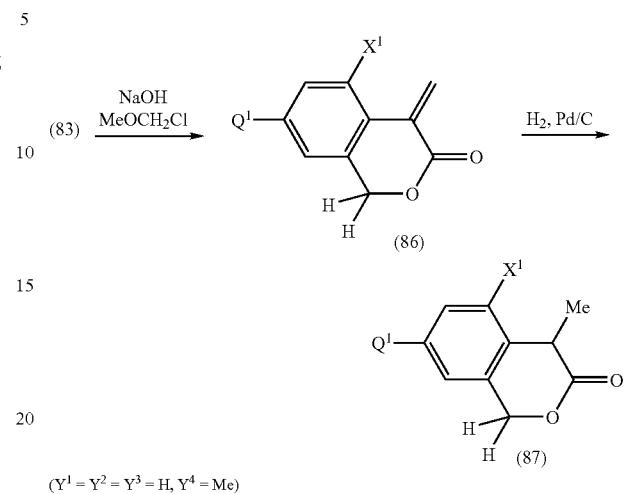

The compound (83) is derived to the compound (86) using sodium hydroxide and methyl chloromethoxide. Then, hydrogenation is performed to the compound (86) in the presence of palladium catalyst to obtain the compound (87).

(II-4) Synthesis of Compound (94)

The compounds (50a), (50b), (53a) or compound (53b) may be easily derived to the compound (88) by the same method used to synthesize the compound (52).

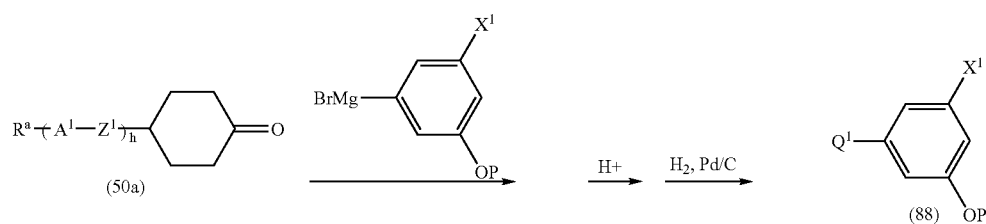

P = Me, TIPS, TBDMS, Bn, etc.

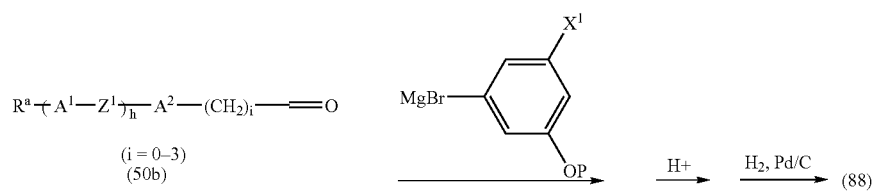

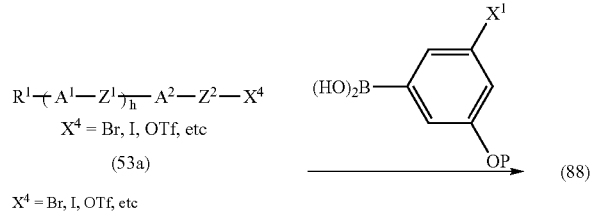

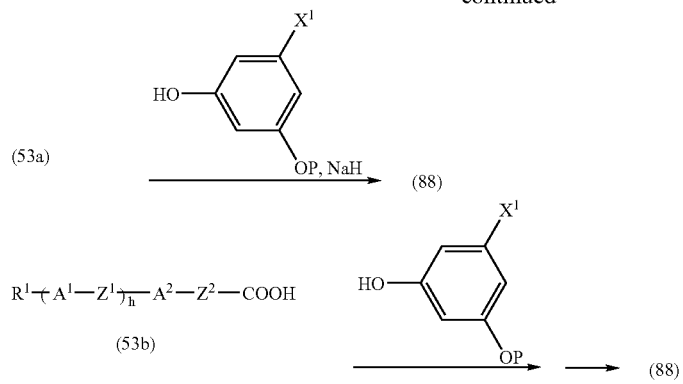

From the compound (88), the compound (94) can be synthesized, for example, by the following method.

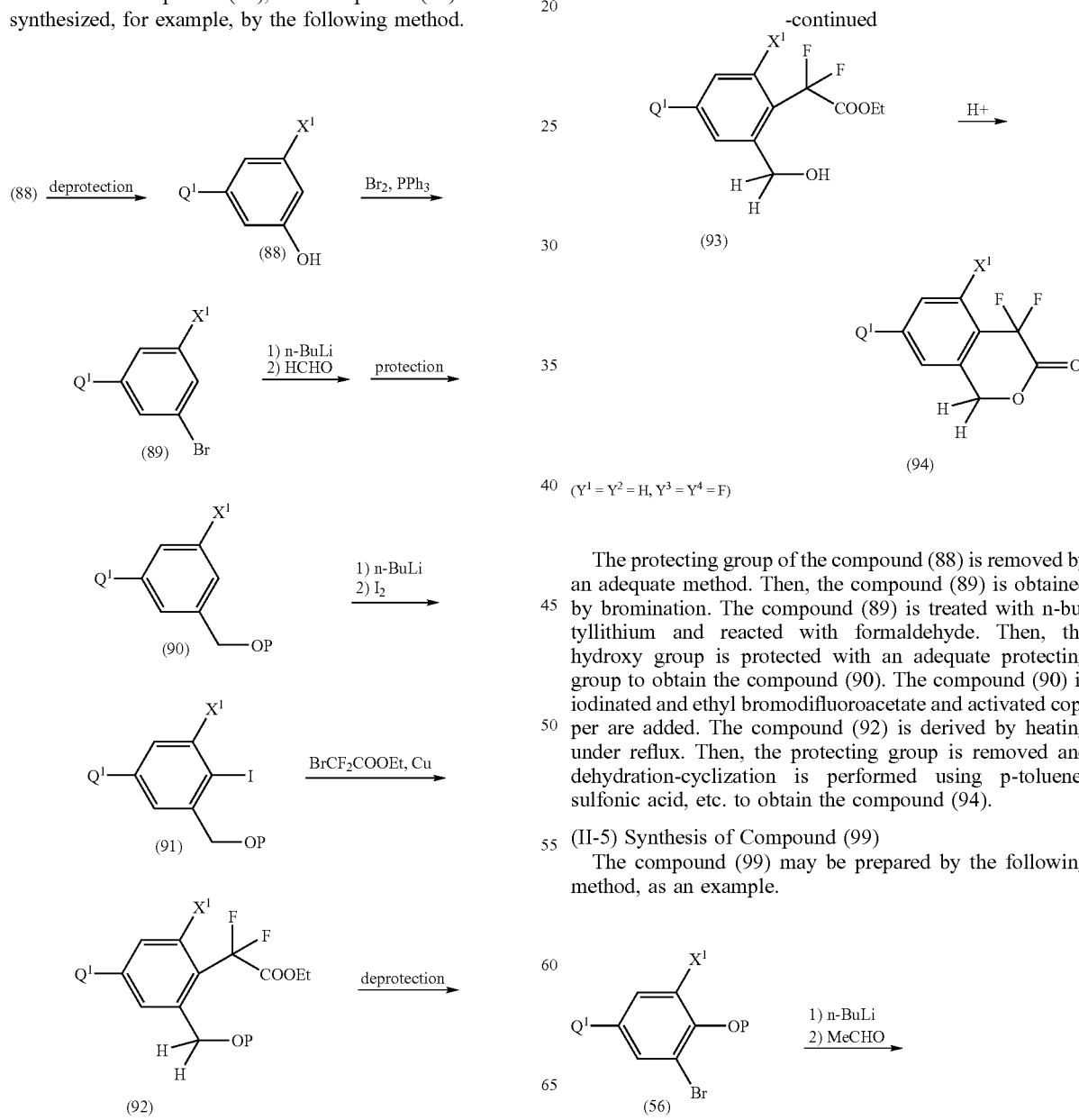

$(Y^1 = Y^2 = H, Y^3 = Y^4 = F)$

The protecting group of the compound (88) is removed by an adequate method. Then, the compound (89) is obtained by bromination. The compound (89) is treated with n-butyllithium and reacted with formaldehyde. Then, the hydroxy group is protected with an adequate protecting group to obtain the compound (90). The compound (90) is iodinated and ethyl bromodifluoroacetate and activated copper are added. The compound (92) is derived by heating under reflux. Then, the protecting group is removed and dehydration-cyclization is performed using p-toluenesulfonic acid, etc. to obtain the compound (94).

(II-5) Synthesis of Compound (99)

The compound (99) may be prepared by the following method, as an example.

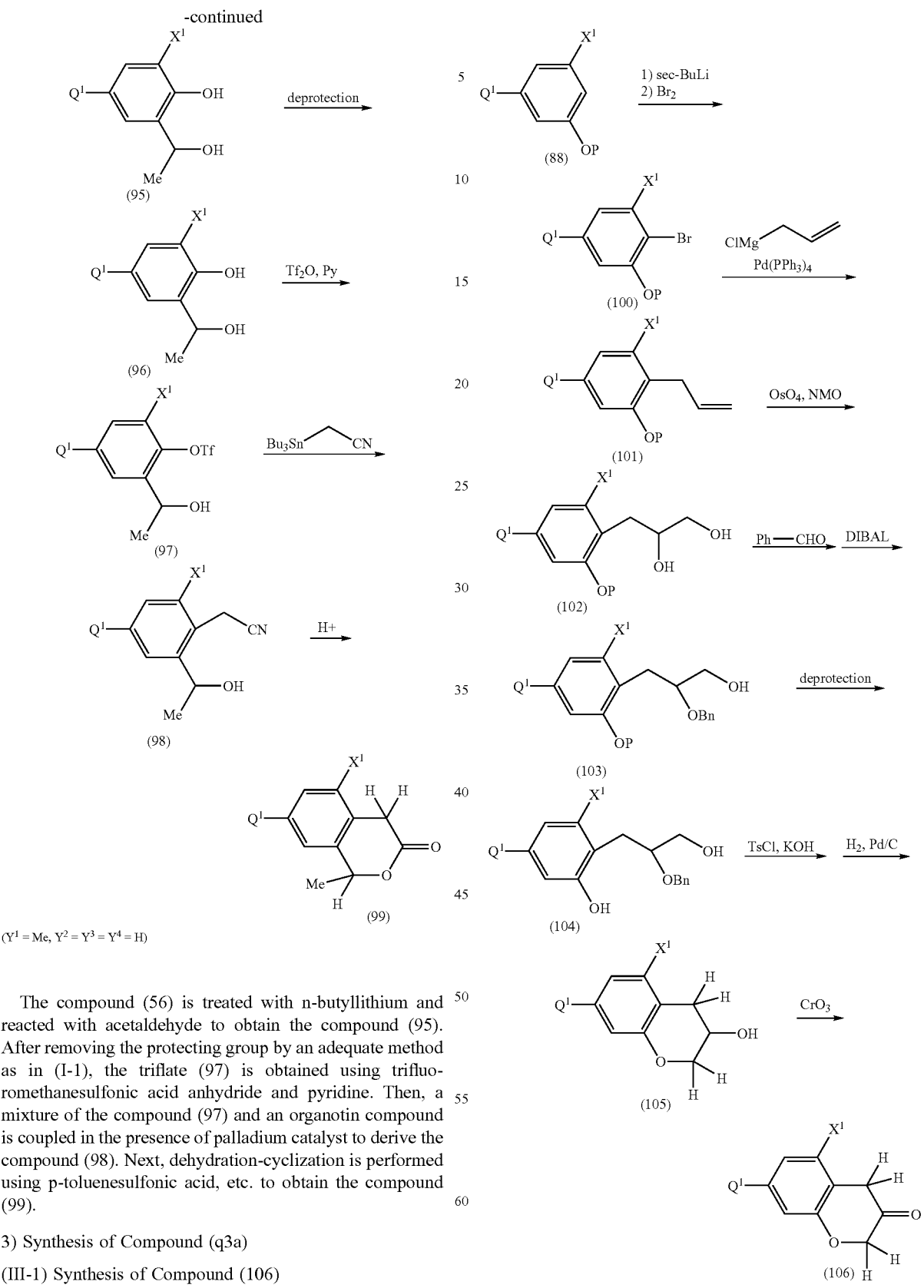

The compound (56) is treated with n-butyllithium and reacted with acetaldehyde to obtain the compound (95). After removing the protecting group by an adequate method as in (I-1), the triflate (97) is obtained using trifluoromethanesulfonic acid anhydride and pyridine. Then, a mixture of the compound (97) and an organotin compound is coupled in the presence of palladium catalyst to derive the compound (98). Next, dehydration-cyclization is performed using p-toluenesulfonic acid, etc. to obtain the compound (99).

3) Synthesis of Compound (q3a)

(III-1) Synthesis of Compound (106)

Starting material is the compound (88). Exemplary schemes of deriving the compounds (88) to (106) are described herein below.

n-Butyllithium and bromine are added to the compound (97) to obtain the compound (100). Then, coupling with arylmagnesium chloride in the presence of palladium catalyst to obtain the compound (101). The resultant compound (101) is oxidized with osmium tetroxide, with N-methyl-morpholine-N-oxide (NMO) as coupling oxidant, to obtain the compound (102). Next, the compound (102) is reacted with benzaldehyde and reduced with diisobutylaluminum hydride (DIBAL) to obtain the compound (103). After removing the protecting group by an adequate method, cyclization using tosyl chloride and potassium hydroxide and hydrogenation are performed to transform the benzyl group into the hydroxy group. Then, the compound (105) is derived. Subsequently, oxidation is performed, for example, by Jones oxidation using chromic acid, to obtain the compound (106).

(III-2) Synthesis of Compound (108)

The compound (108) may be prepared by the following method, as an example.

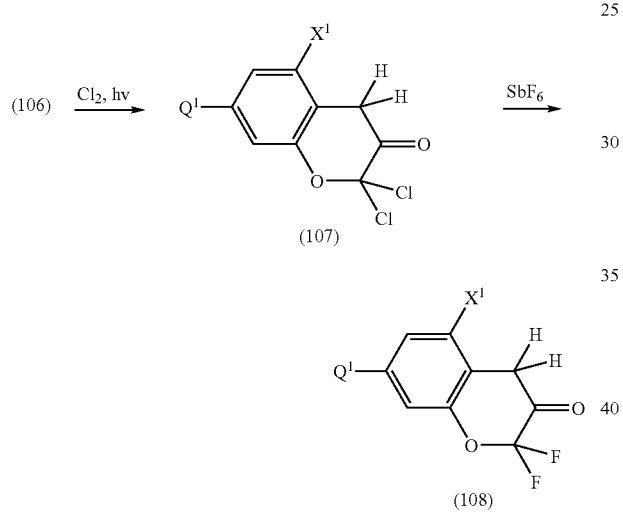

($Y^1 = Y^2 = H, Y^3 = Y^4 = F$)

The compound (106) is photoreacted with chlorine to derive the chloride (107). Then, it is fluorinated with antimony fluoride to obtain the compound (108).

(III-3) Synthesis of Compound (110)

The compound (110) may be prepared by the following method, as an example.

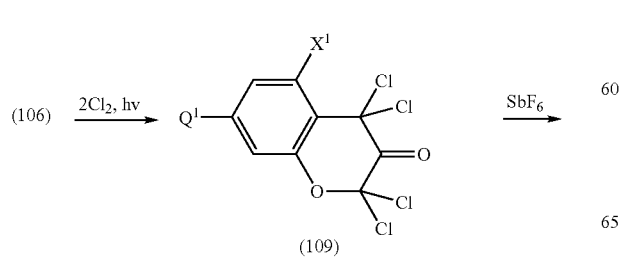

-continued

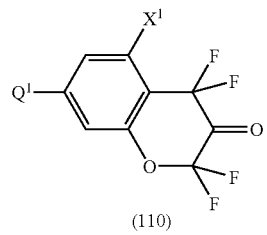

($Y^1 = Y^2 = Y^3 = Y^4 = F$)

The compound (106) is photoreacted with excess chlorine to derive the chloride (109). Then, it is fluorinated with antimony fluoride to obtain the compound (110).

(III-4) Synthesis of Compound (112)

The compound (112) may be prepared by the following method, as an example.

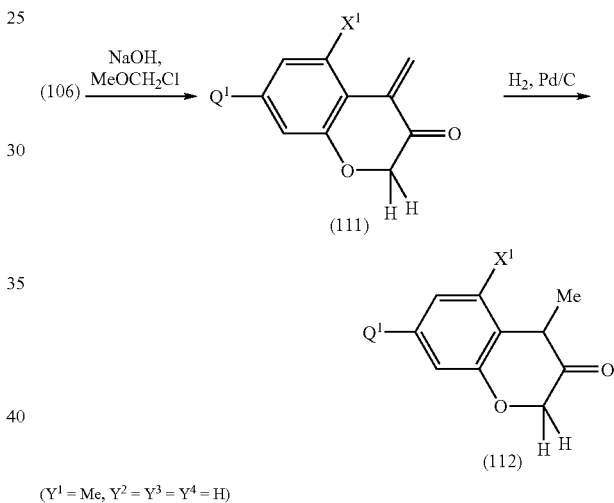

($Y^1 = Me, Y^2 = Y^3 = Y^4 = H$)

The compound (106) is derived to the compound (111) using sodium hydroxide and methyl chloromethoxide. Then, it is hydrogenated in the presence of palladium catalyst to obtain the compound (112).

(III-5) Synthesis of Compound (110)

The compound (110) may be prepared by the following method, as an example.

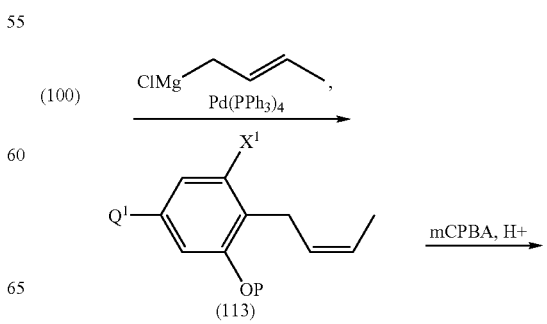

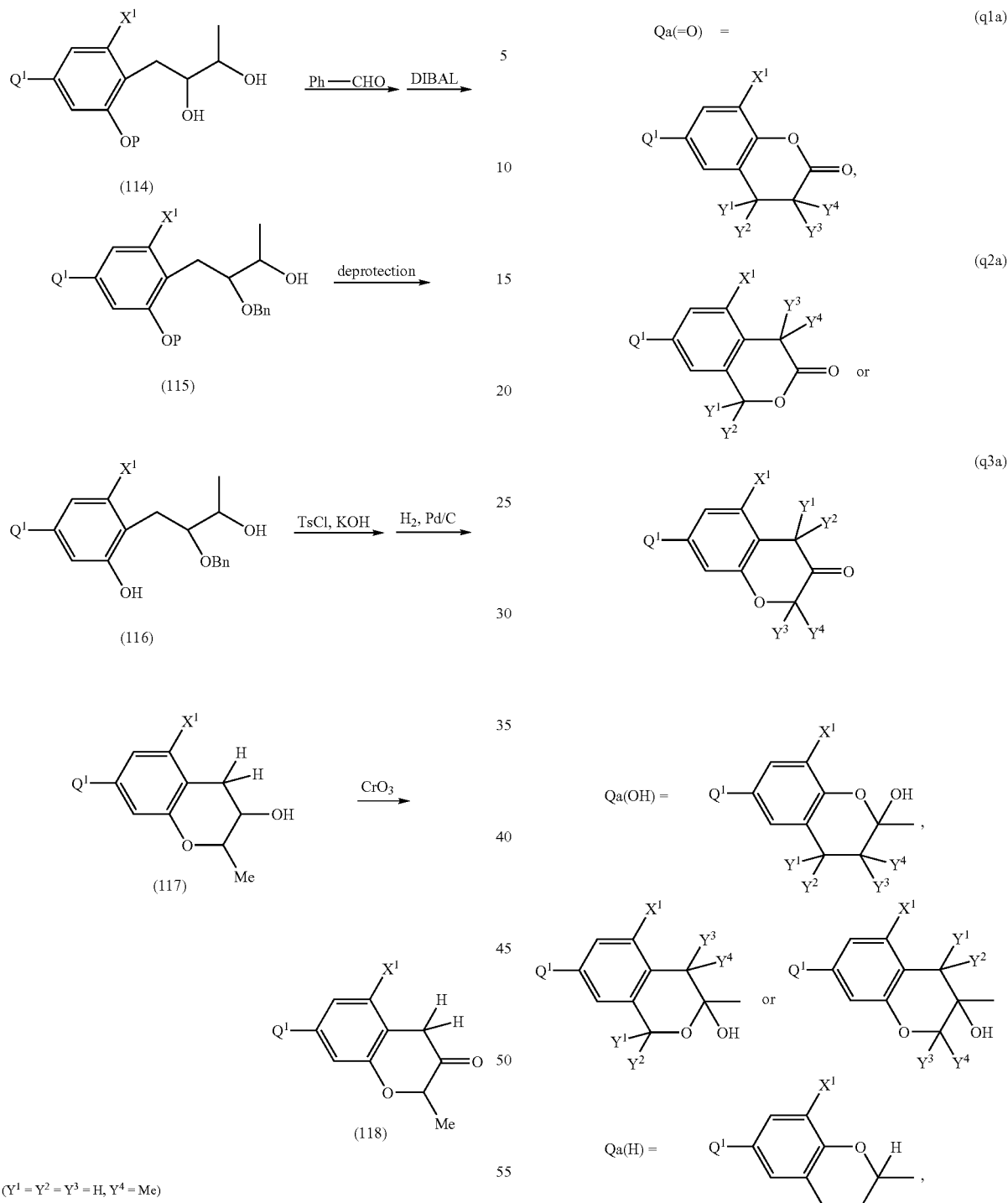
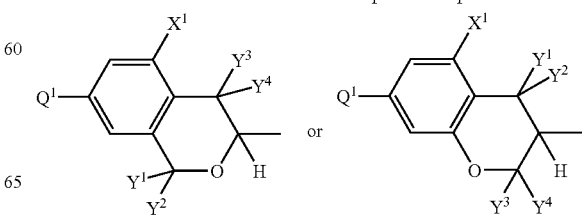
The compound (100) is coupled with 2-butenylmagnesium chloride using palladium catalyst to obtain the compound (113). Then, the compound (118) can be obtained by the same method of (III-1).
Next, methods of binding the compound (Qa(═O)) with $Q^2$ are described. Here, the compound (Qa(═O)) refers to any of the compounds (q1a), (q2a) or (q3a). Compounds Qa(OH), Qa(H), Qa(F) and Qa(Cl) have similar meanings.

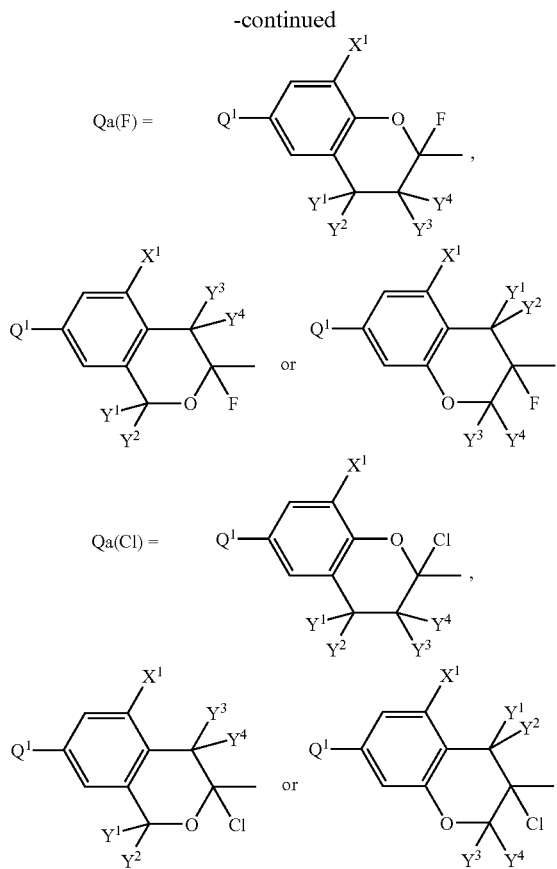
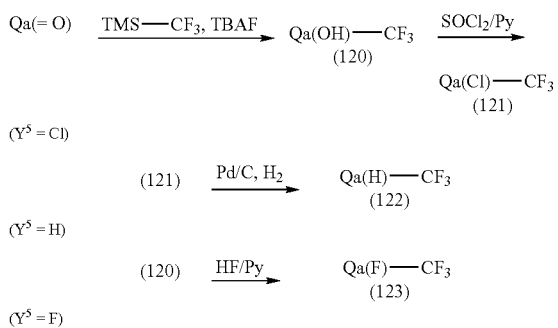

(1) Synthesis of a Compound in which m and n are 0

(IV-1) Synthesis of Compounds (121), (122) and (123)
An exemplary synthesis scheme of the compounds (121), (122) and (123) is as follows.

Qa(=O) $\xrightarrow{\text{TMS—CF}_3,\text{ TBAF}}$ Qa(OH)—CF$_3$ $\xrightarrow{\text{SOCl}_2/\text{Py}}$
(120)

Qa(Cl)—CF$_3$
(121)
($Y^5$ = Cl)

(121) $\xrightarrow{\text{Pd/C, H}_2}$ Qa(H)—CF$_3$
(122)
($Y^5$ = H)

(120) $\xrightarrow{\text{HF/Py}}$ Qa(F)—CF$_3$
(123)
($Y^5$ = F)

The compound (Qa(=O)) is reacted, for example, with trifluoromethyltrimethylsilane and tetrabutylammonium fluoride (TBAF) to obtain the compound (120). The compound (120) is reacted with thionyl chloride to obtain the compound (121), which is hydrogenated to the compound (122). The compound (123) can be obtained by reacting the compound (120) with hydrogen fluoride-pyridine.

(IV-2) Synthesis of Compound (126)
The compound (126) may be prepared by the following method, as an example.

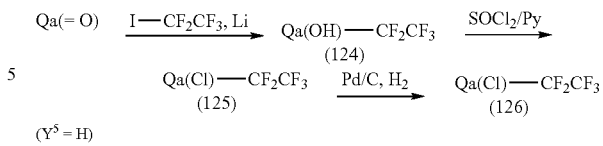

Iodoperfluoroethane reacted with metallic lithium is reacted with the compound (Qa(=O)) to obtain the compound (124). Then, the compound (126) can be obtained by the same method of (IV-I).

(IV-3) Synthesis of Compounds (128), (129) and (130)
An exemplary synthesis scheme of the compounds (128), (129) and (130) is as follows.

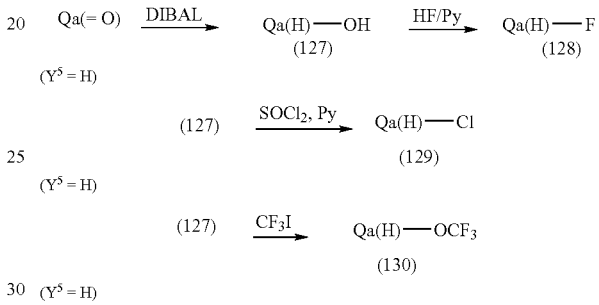

The compound (Qa(=O)) is reduced with DIBAL to obtain the compound (127). This compound is reacted with hydrogen fluoride-pyridine to obtain the compound (128). The compound (128) is reacted with thionyl chloride to obtain the compound (129). The compound (130) is obtained by etherifying the compound (128) with iodotrifluoromethane.

(2) Synthesis of Compound with Either m or n being 0

(IV-4) Synthesis of Compounds (131), (133) and (134)
An exemplary synthesis scheme of the compounds (131), (133) and (134) is as follows.

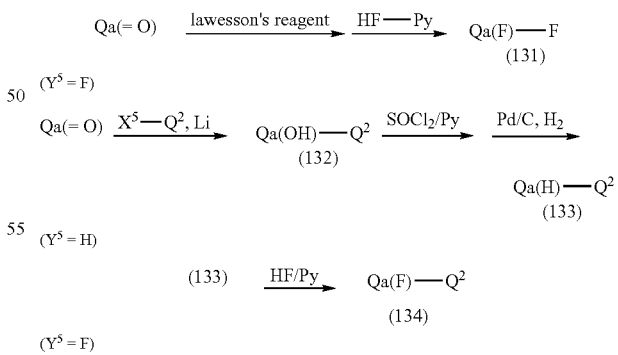

(where $Q^2$ is the same as above and $X^5$ is iodine, bromine or chlorine.)

The compound (Qa(=O)) is derived into a thioester compound using a Rosson's reagent. Then, it is reacted with hydrogen fluoride-pyridine to obtain the compound (131).

Halide of $Q^2$ reacted with metallic lithium is reacted with the compound (Qa(═O)) to obtain the compound (132), which is chlorinated using thionyl chloride and hydrogenated to obtain the compound (133). The compound (134) may be obtained by reacting the compound (132) with hydrogen fluoride-pyridine.

(IV-5) Synthesis of Compounds (137) and (138)

An exemplary synthesis scheme of the compounds (138) and (139) is as follows.

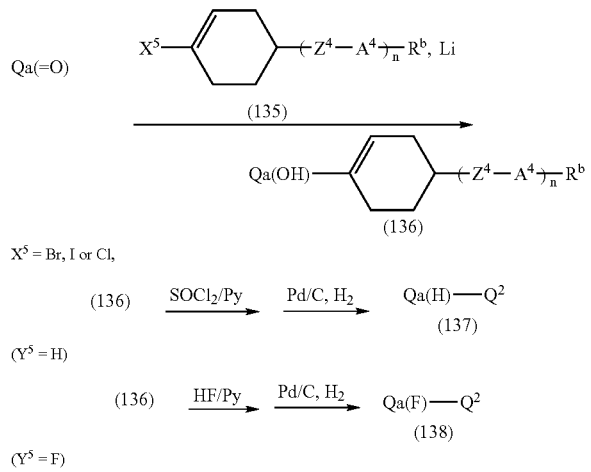

Halide of a cyclohexene derivative (135) reacted with metallic lithium is reacted with the compound (Qa(═O)) to obtain the compound (136). The compound (136) is chlorinated and hydrogenated in the same manner of (IV-4) to obtain the compound (137). The compound (138) can be obtained by performing hydrogenation after the reaction with hydrogen fluoride-pyridine.

The compound (1) can also be prepared by the following scheme.

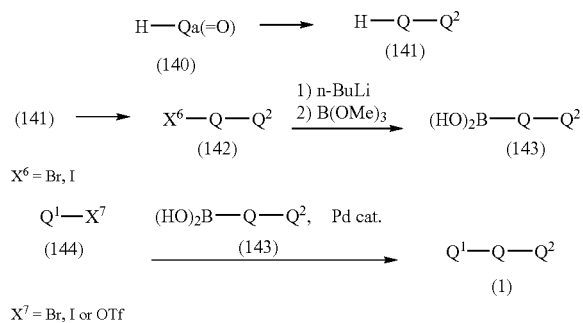

(where $Q^1$ and $Q^2$ are the same as above, $X^6$ is bromine or chlorine and $X^7$ is bromine, iodine or triflate (OTf).)

First, the compounds (140) and (141) can be synthesized by the methods of (IV-1) to (IV-5). The compound (141) is transformed into the boric acid derivative (143) using trimethyl borate, etc. Then, the compound (143) is coupled with a halide of $Q^1$ (144) using palladium catalyst, etc. to obtain the compound (1).

An appropriate synthesis method of the compound (1) is selected considering such factors as functional groups, chemical property of rings, convenience of synthesis, and so forth.

Hereunder is given a description of the composition of the present invention. The liquid crystal composition of the invention comprises at least one of the compounds (1) and may comprise at least one optically active compound. The compound (1) in the composition may be a mixture of different compounds. A preferable liquid crystal composition of the invention comprises other liquid crystal compounds, in addition to the compound of the invention. In this case, the major component, or at least one compound selected from the compounds (1), makes up 1-99%.

The first preferable example of the composition comprises at least one of the compounds (1) and at least one compound selected from the group consisting of the compounds (2) to (4) and may comprise at least one optically active compound.

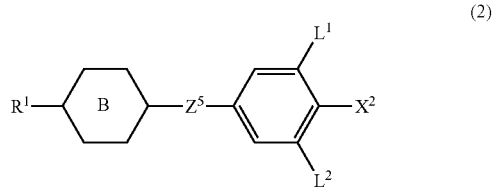

(2)

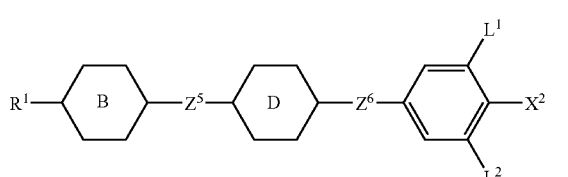

(3)

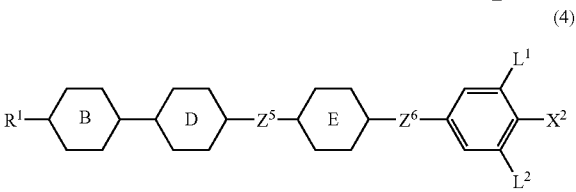

(4)

where $R^1$ is $C_1$-$C_{10}$ alkyl (any —$CH_2$— of which may be replaced by —O— or —CH═CH— and any hydrogen of which may be replaced by fluorine); $X^2$ is fluorine, chlorine, —$OCF_3$, —$OCHF_2$, —$CF_3$, —$CHF_2$, —$CH_2F$, —$OCF_2CHF_2$ or —$OCF_2CHFCF_3$; each of ring B and ring D is independently 1,4-cyclohexylene, 1,3-dioxane-2,5-diyl or 1,4-phenylene (any hydrogen of which may be replaced by fluorine); ring E is 1,4-cyclohexylene or 1,4-phenylene (any hydrogen of which may be replaced by fluorine); each of $Z^5$ and $Z^6$ is independently —$(CH_2)_2$—, —$(CH_2)_4$—, —COO—, —$CF_2O$—, —$OCF_2$—, —CH═CH— or a single bond; and each of $L^1$ and $L^2$ is independently hydrogen or fluorine.

Since the compounds (2) to (4) have large positive dielectric anisotropy, they are mainly used in compositions for AM-TN devices. In these compositions, the compounds make up 1-99%, preferably in 10-97%, and more preferably in 40-95%.

The second example of the liquid crystal composition of the invention comprises at least one of the compounds (1) and at least one compound selected from the group consisting of the compounds (5) and (6) and may comprise at least one optically active compound.

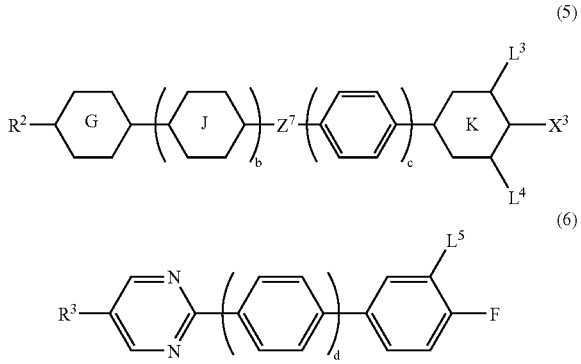

where each $R^2$ and $R^3$ is independently $C_1$-$C_{10}$ alkyl (any —$CH_2$— of which may be replaced by —O— or —CH=CH— and any hydrogen of which may be replaced by fluorine); $X^3$ is —CN or —C≡C—CN; ring G is 1,4-cyclohexylene, 1,4-phenylene, 1,3-dioxane-2,5-diyl or pyrimidine-2,5-diyl; ring J is 1,4-cyclohexylene, pyrimidine-2,5-diyl or 1,4-phenylene (any hydrogen of which may be replaced by fluorine); ring K is 1,4-cyclohexylene or 1,4-phenylene; $Z^7$ is —$(CH_2)_2$—, —COO—, —$CF_2O$—, —$OCF_2$— or a single bond; each of $L^3$, $L^4$ and $L^5$ is independently hydrogen or fluorine; and each of b, c and d is independently 0 or 1.

Since the compounds (5) and (6) have very large positive dielectric anisotropy, they are mainly used in compositions for STN devices. In these compositions, these compounds make up 1-99%, preferably in 10-97%, and more preferably in 40-95%.

The third example of the liquid crystal composition of the invention comprises at least one of the compounds (1) and at least one compound selected from the group consisting of the compounds (7) to (9) and may comprise at least one optically active compound.

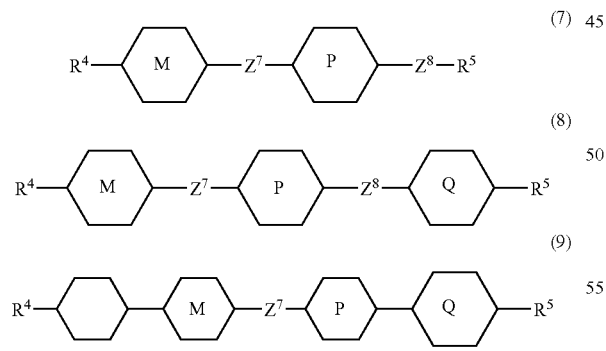

where each of $R^4$ and $R^5$ is independently $C_1$-$C_{10}$ alkyl (any —$CH_2$— of which may be replaced by —O— or —CH=CH— and any hydrogen of which may be replaced by fluorine); each of ring M, ring P and ring Q is independently 1,4-cyclohexylene, pyrimidine-2,5-diyl or 1,4-phenylene (any hydrogen of which may be replaced by fluorine); and each of $Z^7$ and $Z^8$ is independently —C≡C—, —COO—, —$(CH_2)_2$—, —CH=CH— or a single bond.

The compounds (7), (8) and (9) have small dielectric anisotropy. The compound (7) is mainly used to adjust viscosity or optical anisotropy. The compounds (8) and (9) are used to increase upper limit temperature in order to broaden temperature range of the liquid crystal phase or to adjust optical anisotropy. When a large amount of the compounds (7), (8) and (9) is added, the composition has a higher threshold voltage, and consequently, a lower viscosity. Thus, they can be used in a large amount, as long as the threshold voltage requirement of the composition is satisfied.

The fourth example of the liquid crystal composition of the invention comprises at least one of the compounds (1), at least one compound selected from the group consisting of the compounds (2) to (4) and at least one compound selected from the group consisting of the compounds (5) and (6) and may comprise at least one optically active compound.

The fifth example of the liquid crystal composition of the invention comprises at least one of the compounds (1), at least one compound selected from the group consisting of the compounds (2) to (4) and at least one compound selected from the group consisting of the compounds (7) to (9) and may comprise at least one optically active compound. In the composition, the content of the compounds (2) to (4) is the same as above and that of the compounds (7) to (9) is preferably 60% or less, more preferably 40% or less.

The sixth example of the liquid crystal composition of the invention comprises at least one of the compounds (1), at least one compound selected from the group consisting of the compounds (5) and (6) and at least one compound selected from the group consisting of the compounds (7) to (9) and may comprise at least one optically active compound. In the composition, the content of the compound (5) or (6) is the same as above and that of the compounds (7) to (9) is preferably 60% or less, more preferably 40% or less.

Preferable examples of the compounds (2) to (9) are compounds (2-1) to (2-9), compounds (3-1) to (3-97), compounds (4-1) to (4-33), compounds (5-1) to (5-56), compounds (6-1) to (6-3), compounds (7-1) to (7-11), compounds (8-1) to (8-21) and compounds (9-1) to (9-6). In these compounds, $R^1$, $R^2$, $R^3$, $R^4$, $R^5$, $X^1$ and $X^2$ are the same as in formulas (2) to (9).

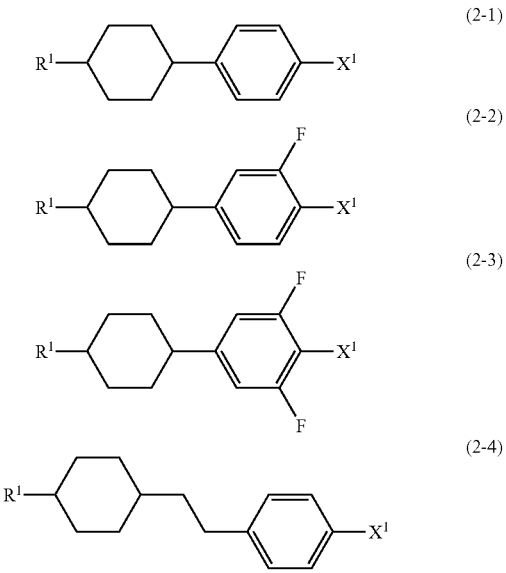

-continued
(2-5)
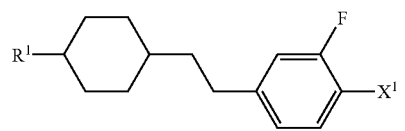
(2-6)
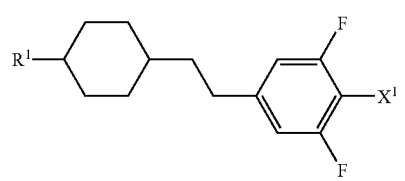
(2-7)
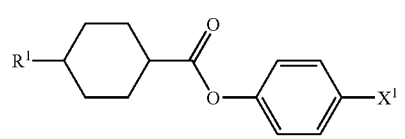
(2-8)
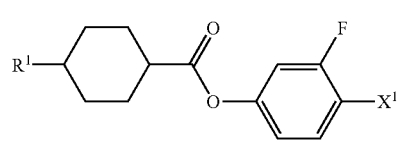
(2-9)
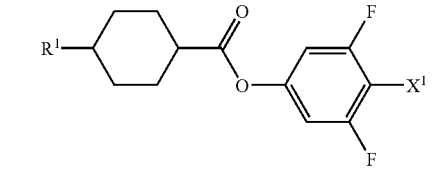
(3-1)
(3-2)
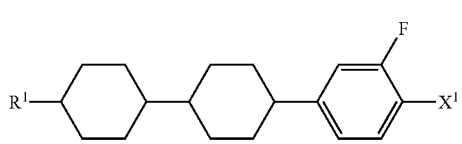
(3-3)
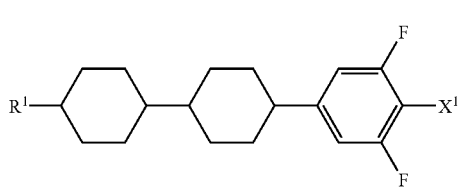
(3-4)
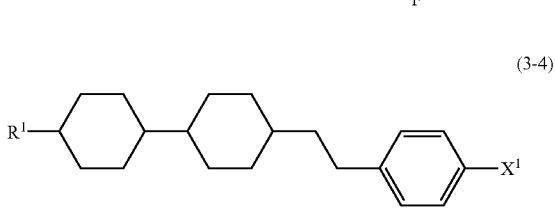
(3-5)
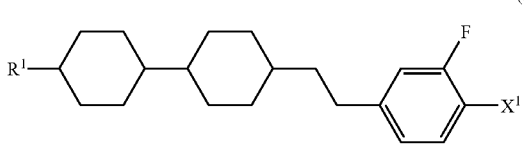
-continued
(3-6)
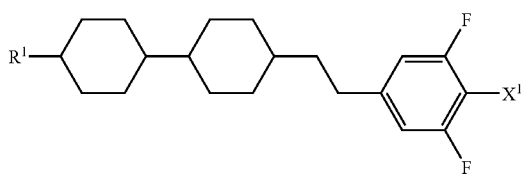
(3-7)
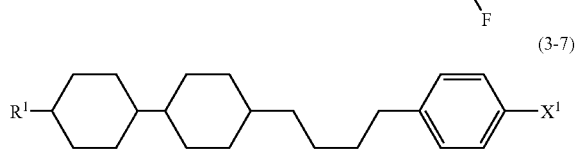
(3-8)
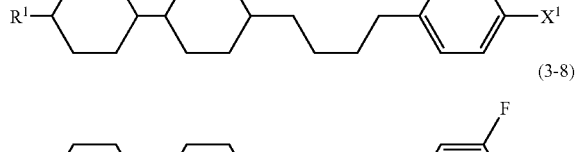
(3-9)
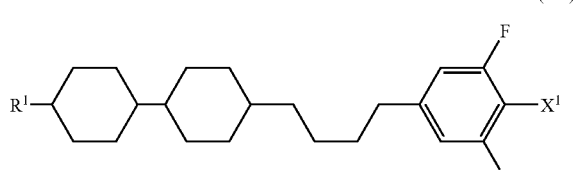
(3-10)
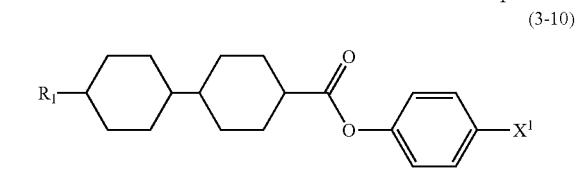
(3-11)
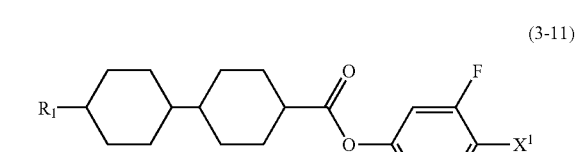
(3-12)
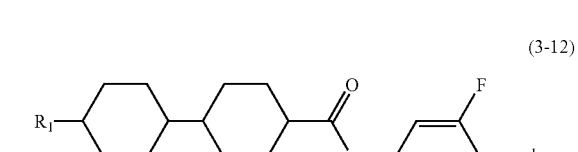
(3-13)
(3-14)
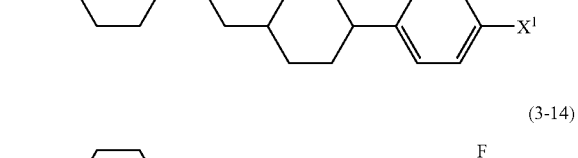

-continued
(3-15)
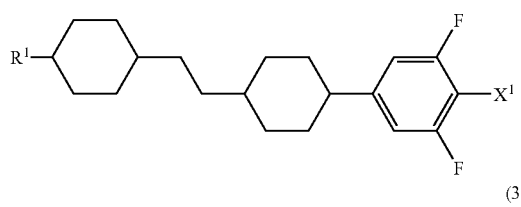
(3-16)
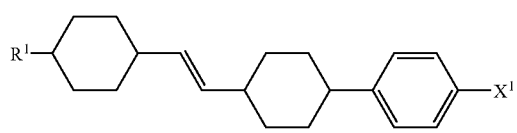
(3-17)
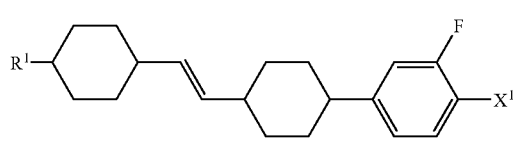
(3-18)
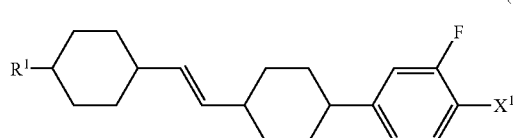
(3-19)
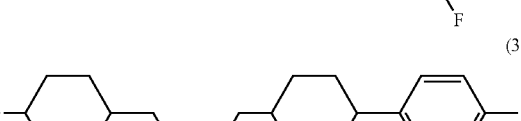
(3-20)
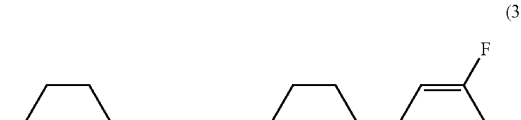
(3-21)
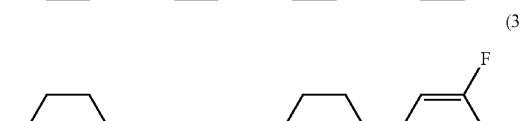
(3-22)
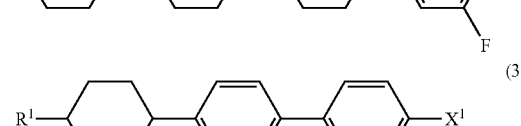
(3-23)
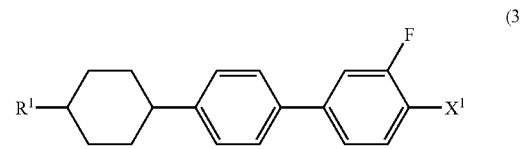
(3-24)
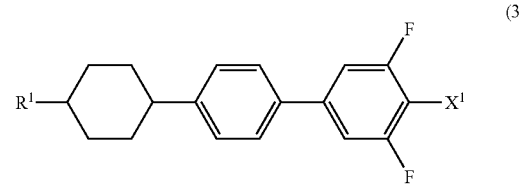
-continued
(3-25)
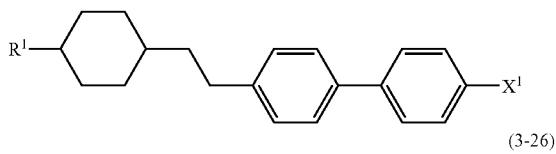
(3-26)
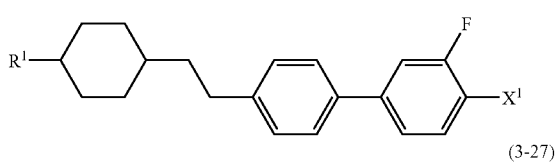
(3-27)
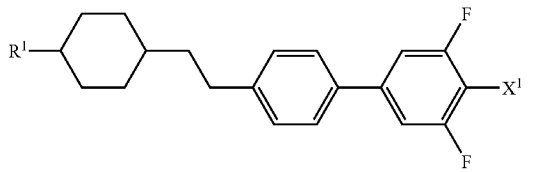
(3-28)
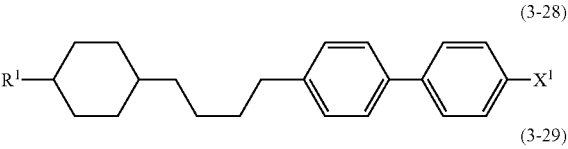
(3-29)
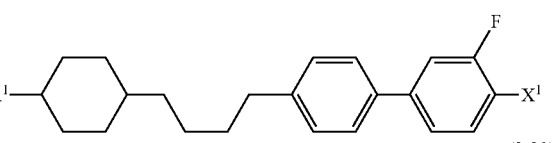
(3-30)
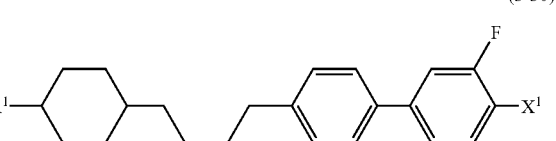
(3-31)
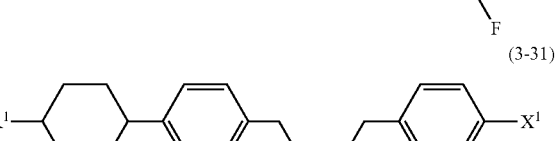
(3-32)
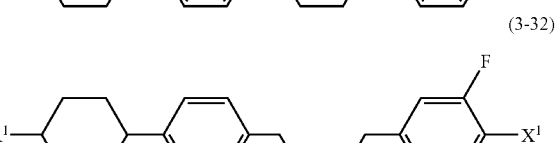
(3-33)
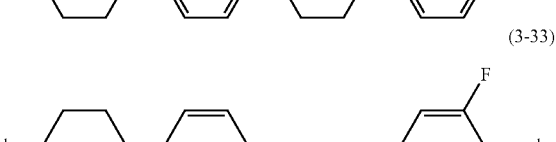
(3-34)
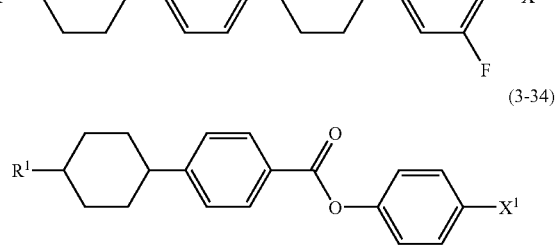

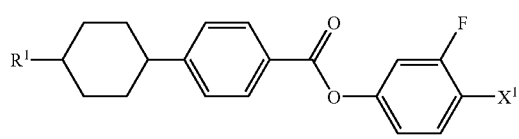
(3-35)
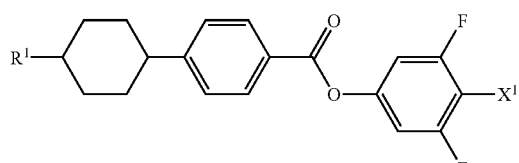
(3-36)
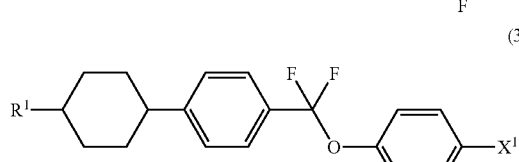
(3-37)
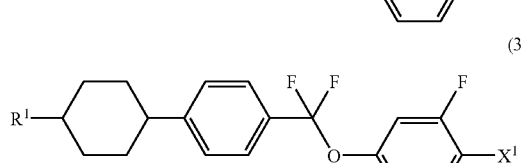
(3-38)
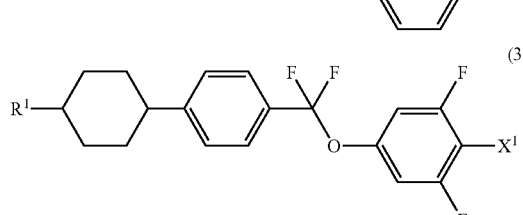
(3-39)
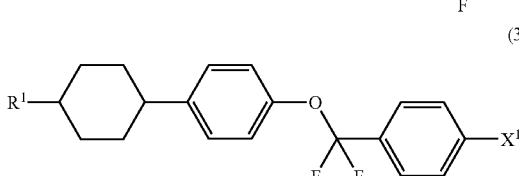
(3-40)
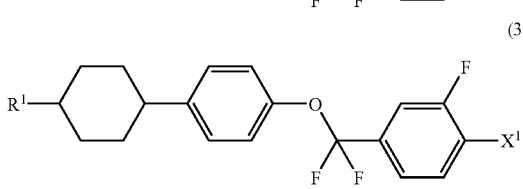
(3-41)
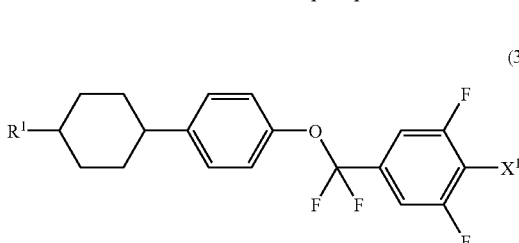
(3-42)
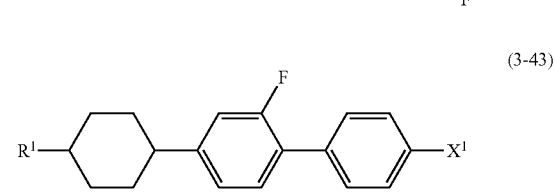
(3-43)
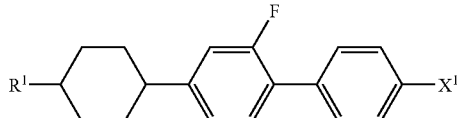
(3-44)
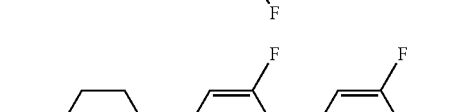
(3-45)
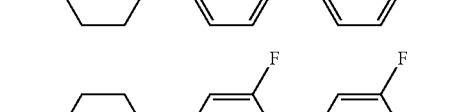
(3-46)
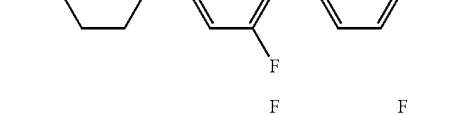
(3-47)
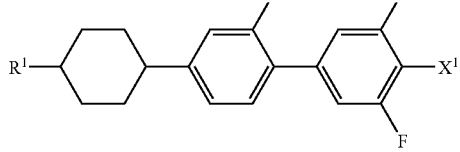
(3-48)
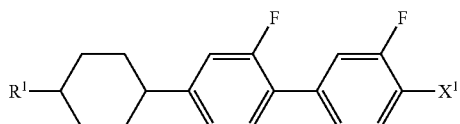
(3-49)
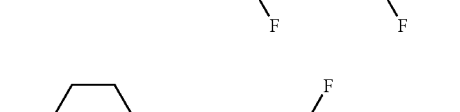
(3-50)
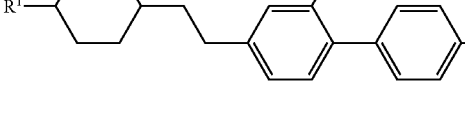
(3-51)
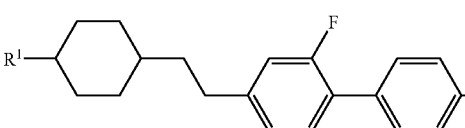
(3-52)

(3-53) 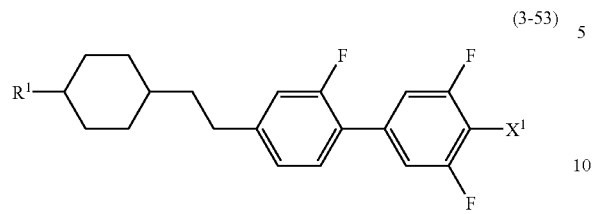
(3-54) 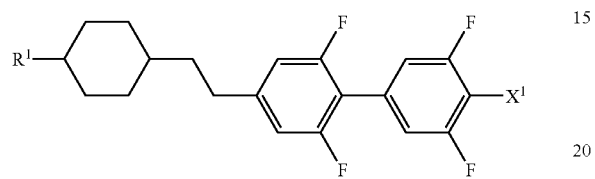
(3-55) 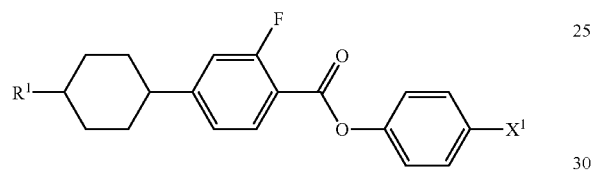
(3-56) 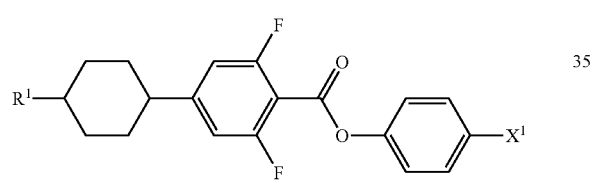
(3-57) 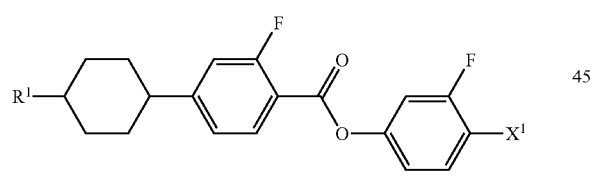
(3-58) 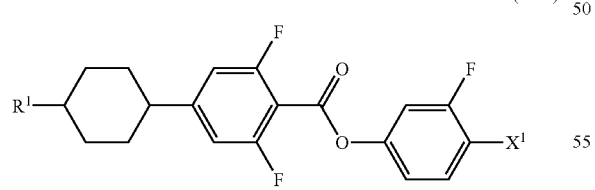
(3-59) 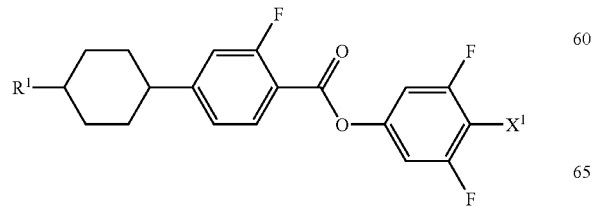
(3-60) 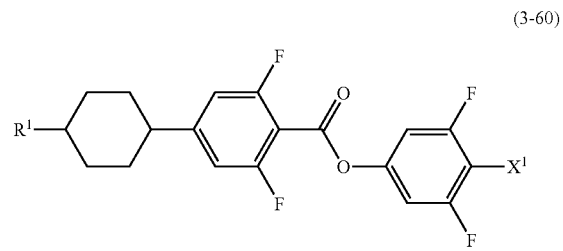
(3-61) 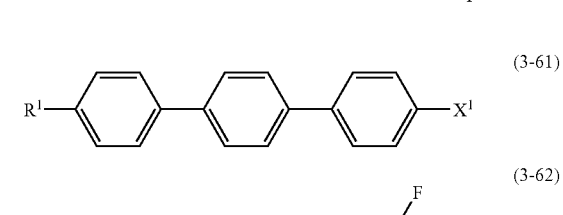
(3-62) 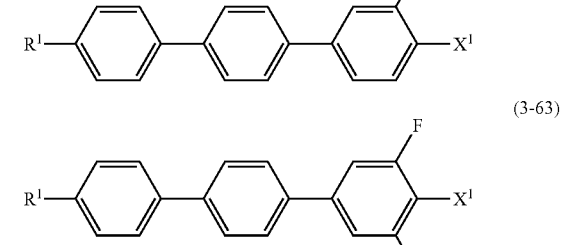
(3-63) 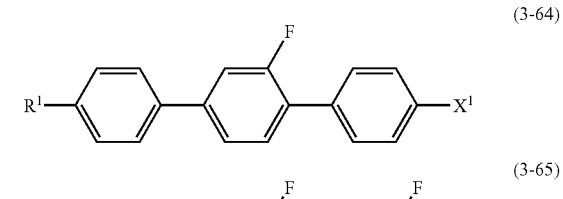
(3-64) 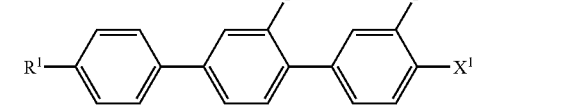
(3-65) 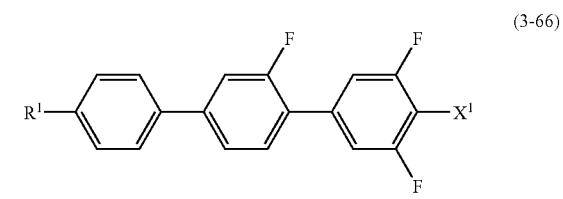
(3-66) 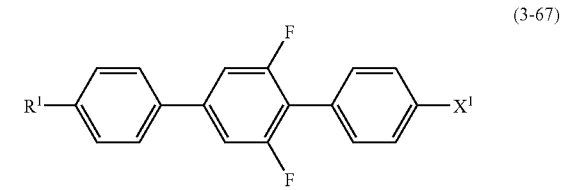
(3-67) 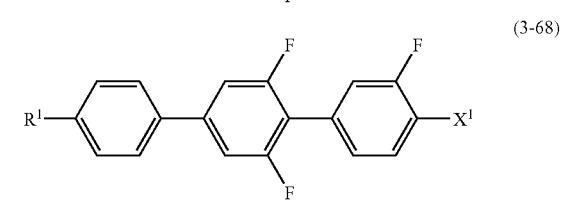
(3-68)

-continued
(3-69)
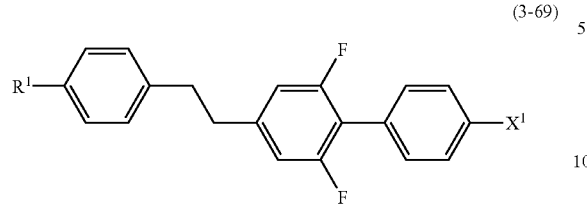
(3-70)
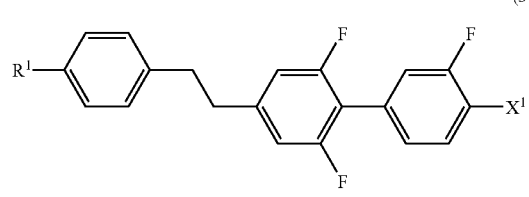
(3-71)
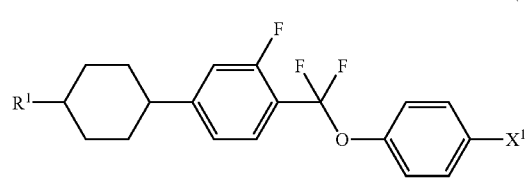
(3-72)
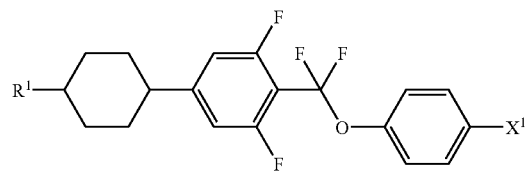
(3-73)
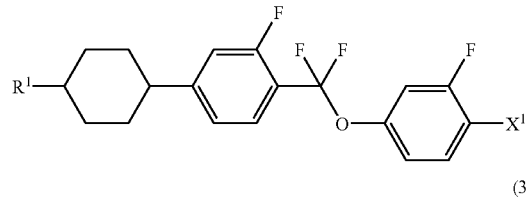
(3-74)
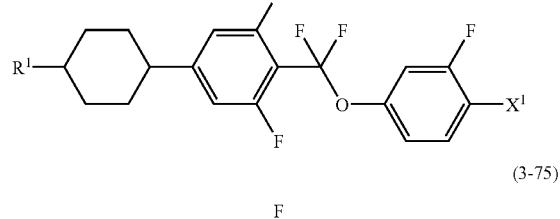
(3-75)
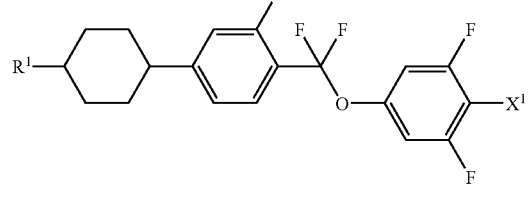
-continued
(3-76)
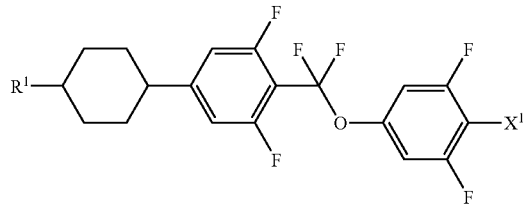
(3-77)
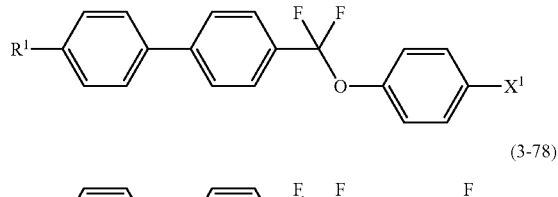
(3-78)
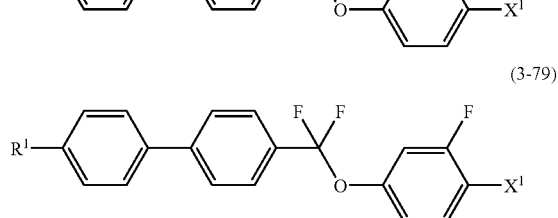
(3-79)
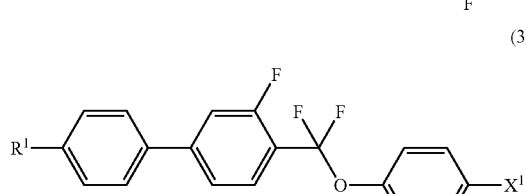
(3-80)
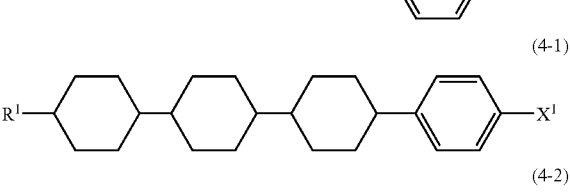
(4-1)
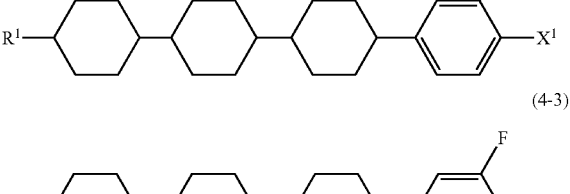
(4-2)
(4-3)
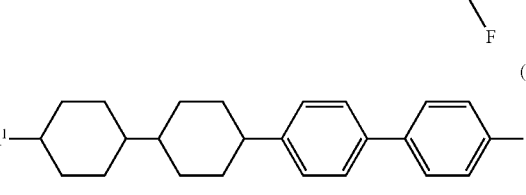
(4-4)

-continued
(4-5)
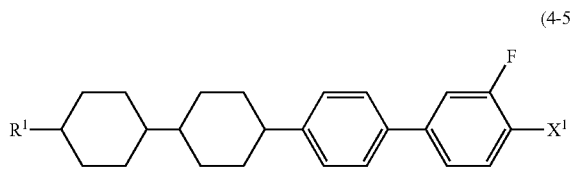
(4-6)
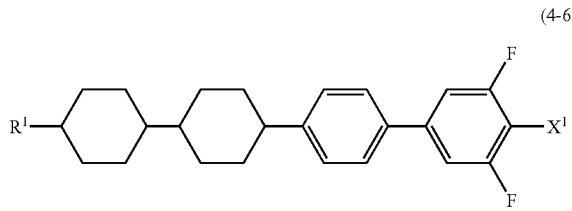
(4-7)
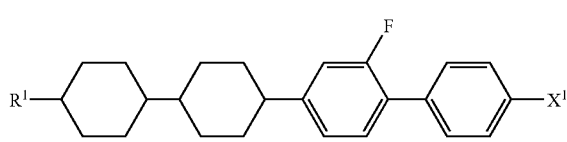
(4-8)
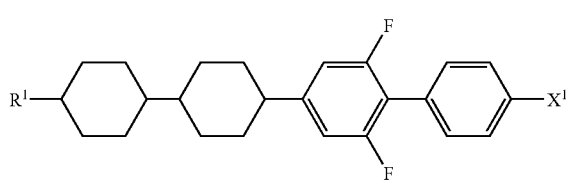
(4-9)
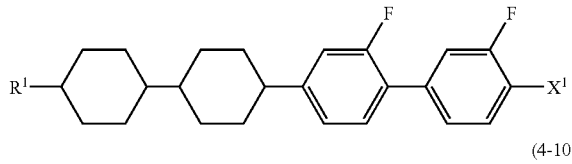
(4-10)
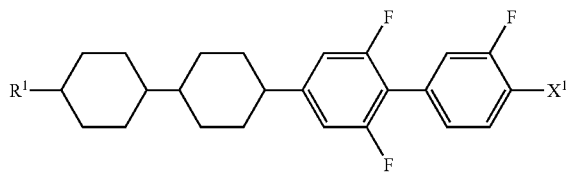
(4-11)
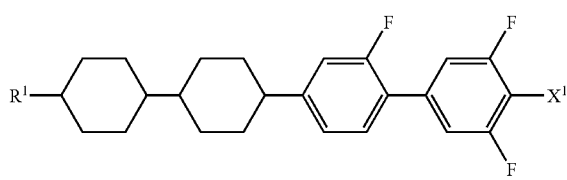
(4-12)
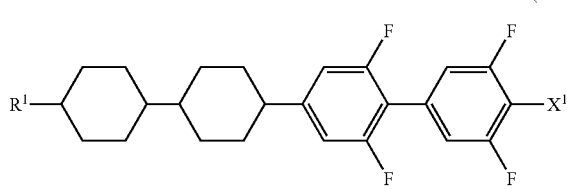
-continued
(4-19)
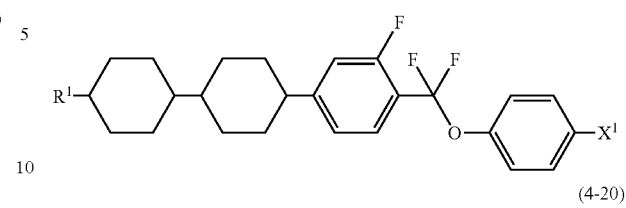
(4-20)
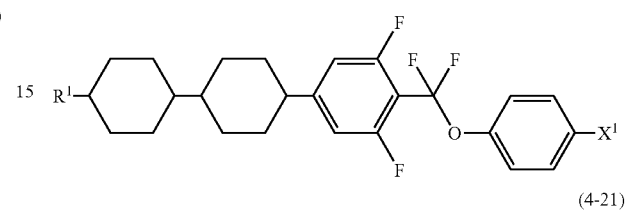
(4-21)
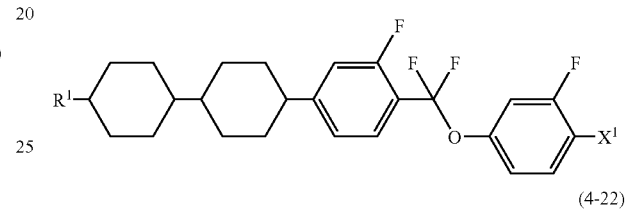
(4-22)
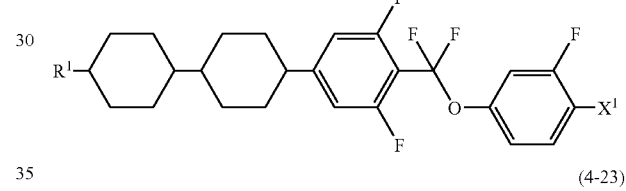
(4-23)
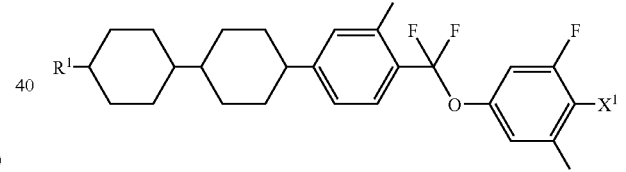
(4-24)
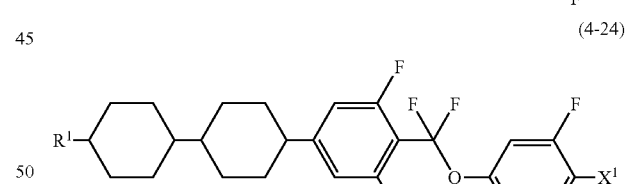
(4-25)
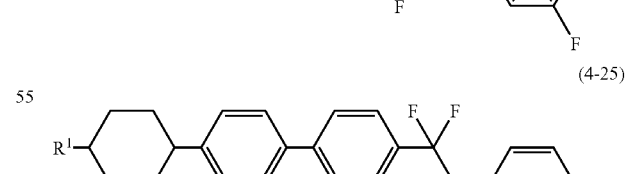
(4-26)
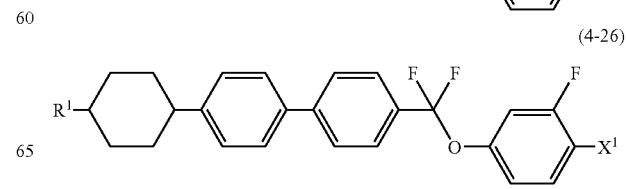

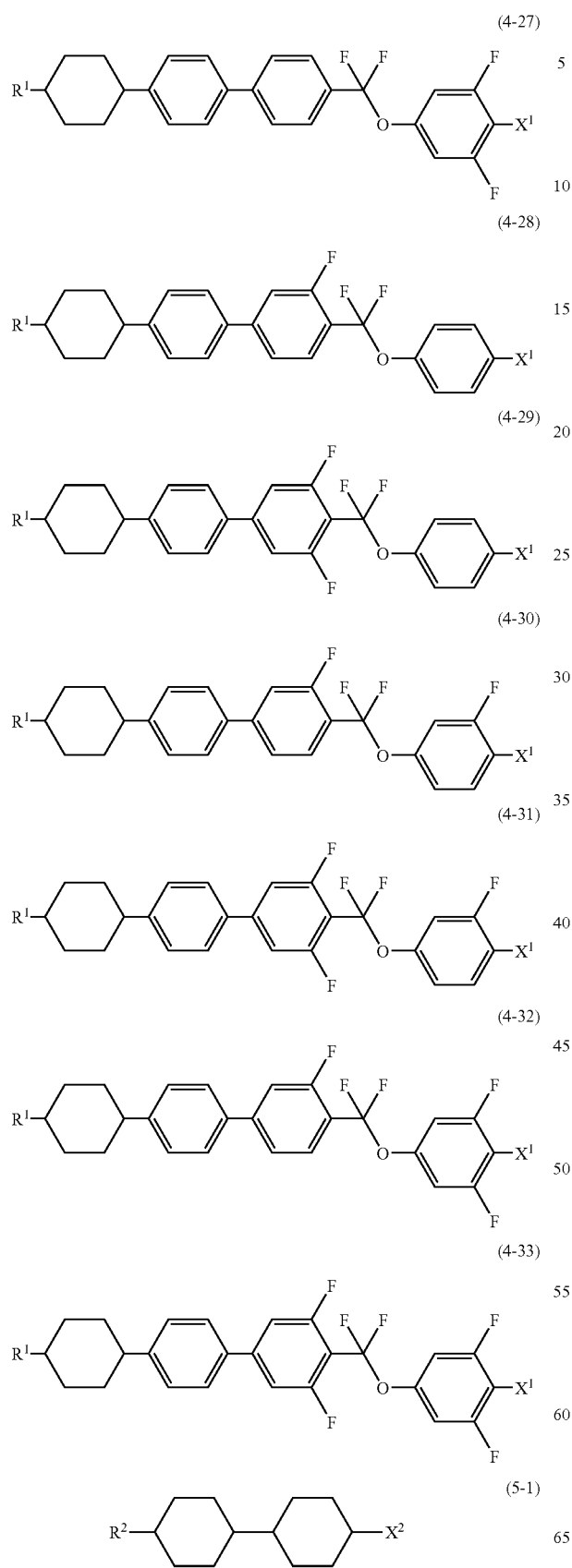
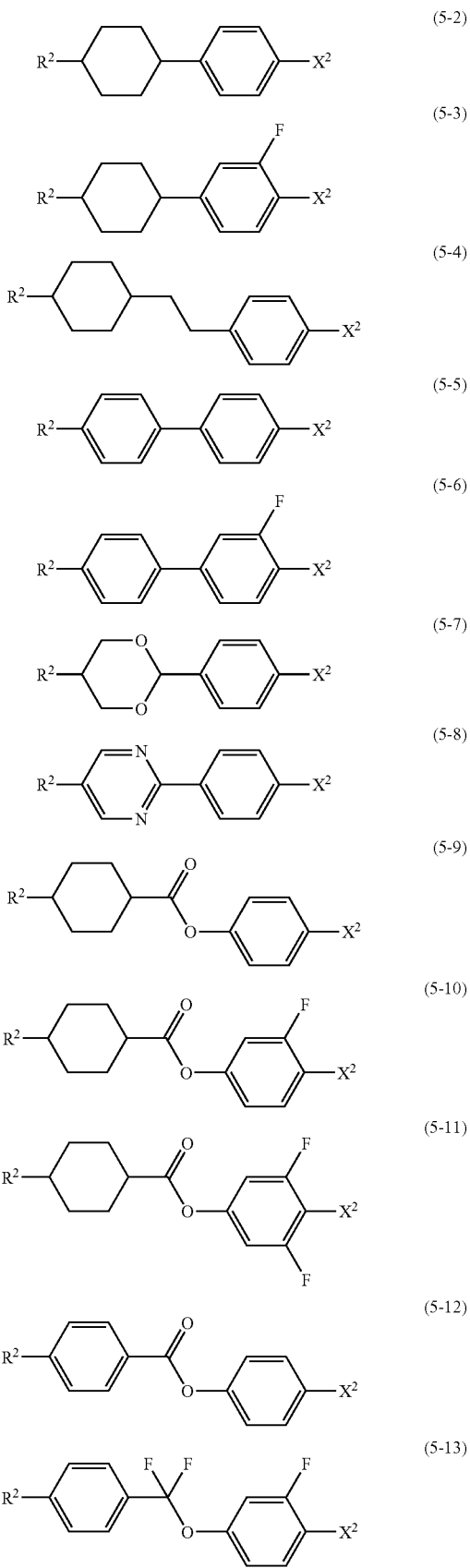

-continued
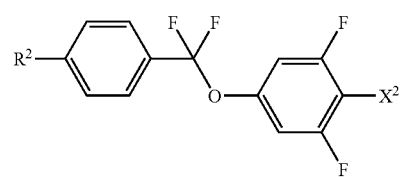
(5-14)
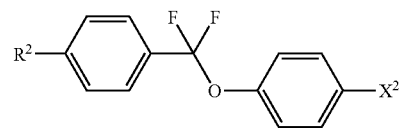
(5-15)
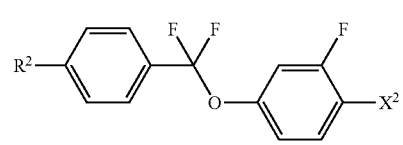
(5-16)
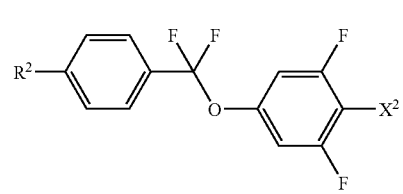
(5-17)
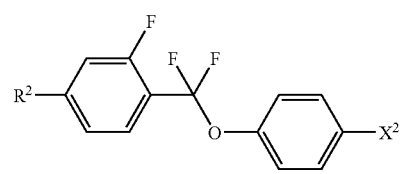
(5-18)
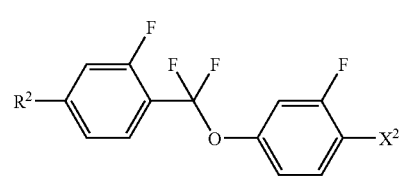
(5-19)
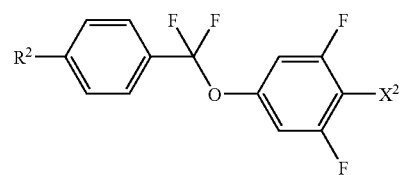
(5-20)
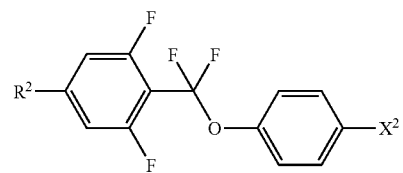
(5-21)
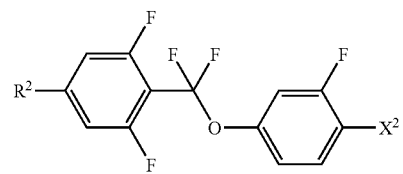
(5-22)
-continued
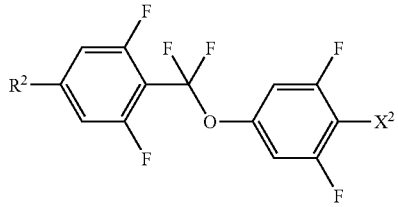
(5-23)
(5-24)
(5-25)
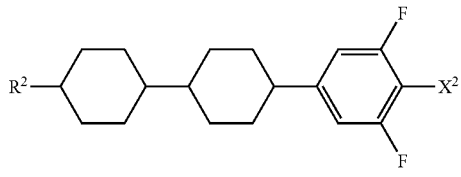
(5-26)
(5-27)
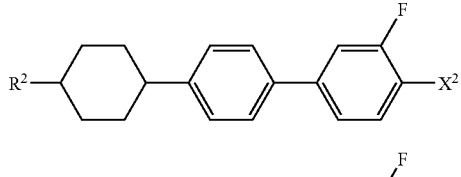
(5-28)
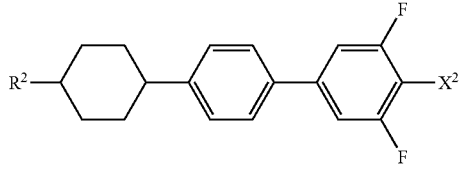
(5-29)
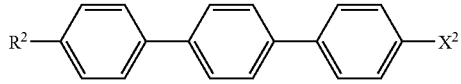
(5-30)
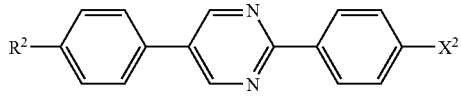
(5-31)
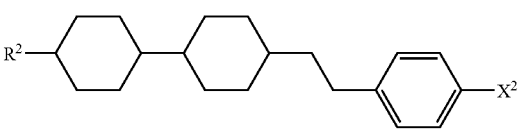
(5-32)
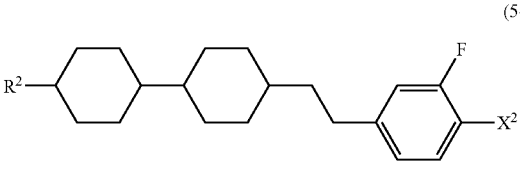
(5-33)

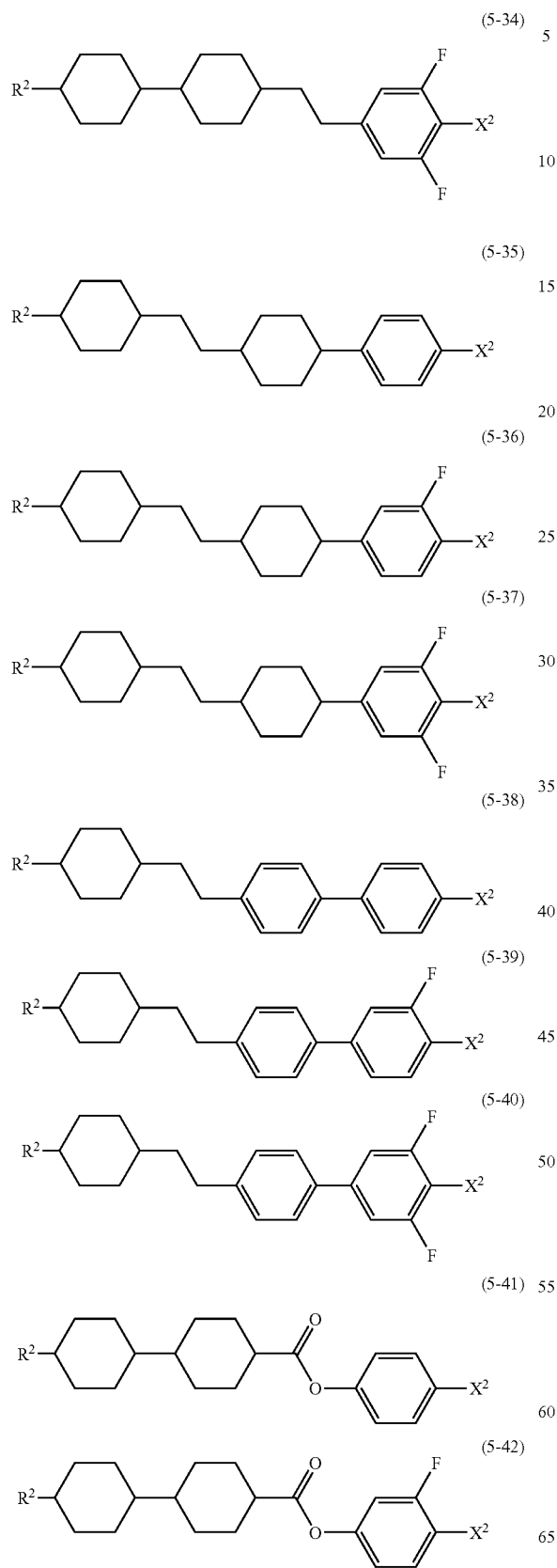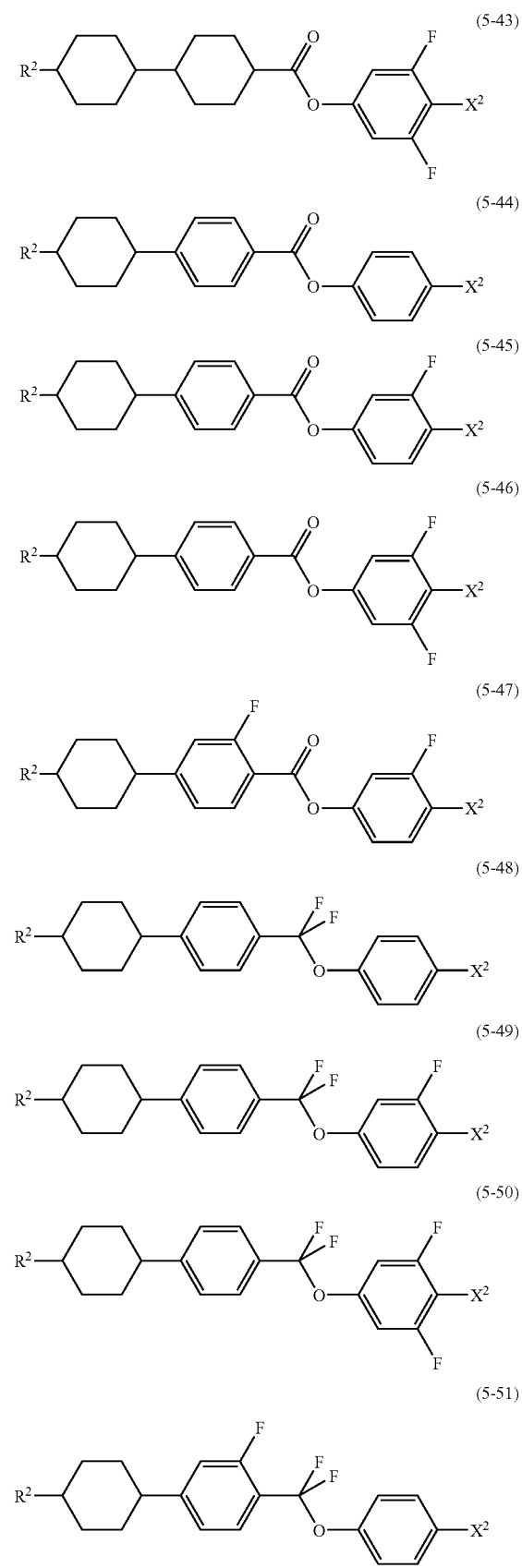

-continued (5-52)

(5-53)

(5-54)

(5-55)

(5-56)

(6-1)

(6-2)

(6-3)

(7-1)

(7-2)

-continued (7-3)

(7-4)

(7-5)

(7-6)

(7-7)

(7-8)

(7-9)

(7-10)

(7-11)

(8-1)

(8-2)

(8-3)

(8-4)

(8-5) 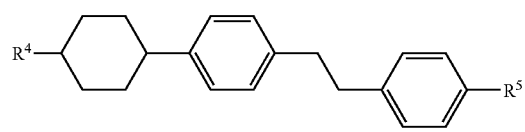
(8-6) 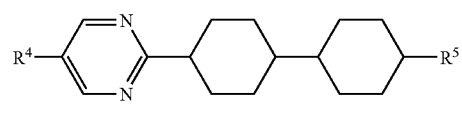
(8-7) 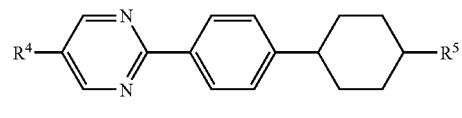
(8-8) 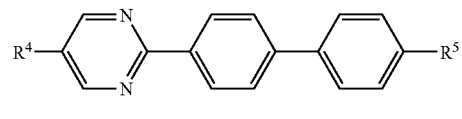
(8-9) 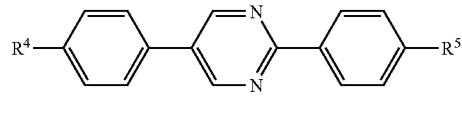
(8-10) 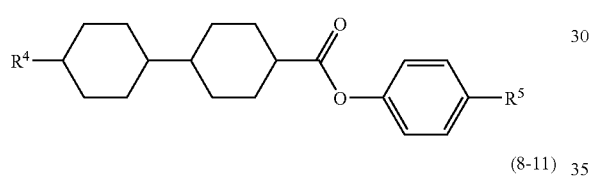
(8-11) 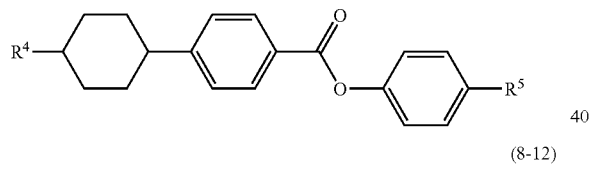
(8-12) 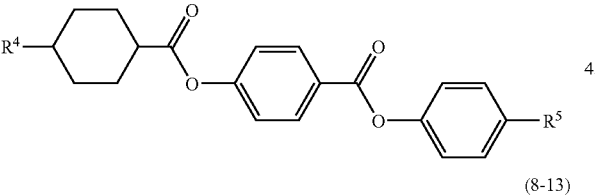
(8-13) 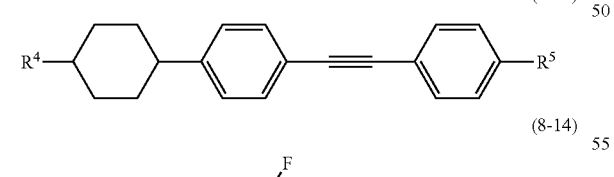
(8-14) 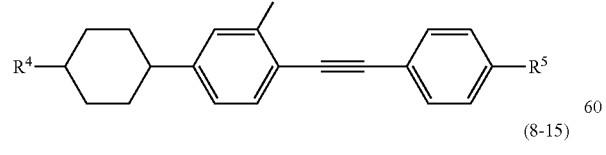
(8-15) 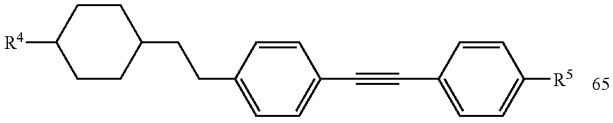
(8-16) 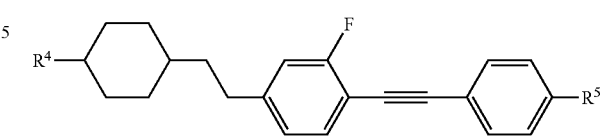
(8-17) 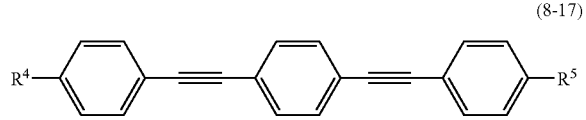
(8-18) 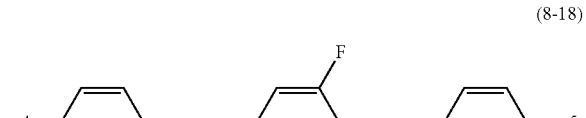
(8-19) 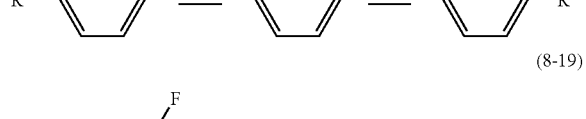
(8-20) 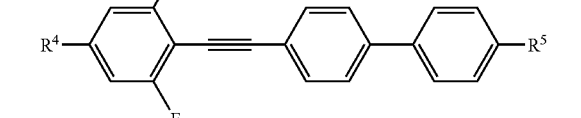
(8-21) 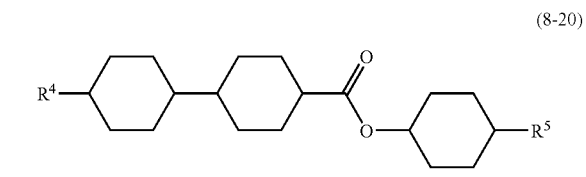
(9-1) 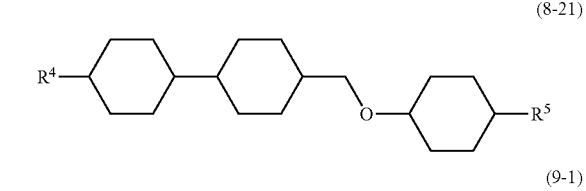
(9-2) 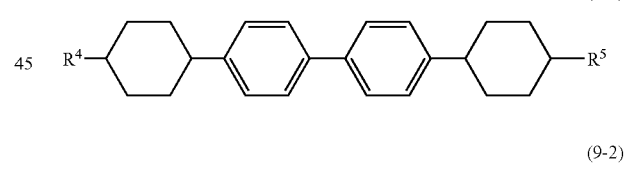
(9-3) 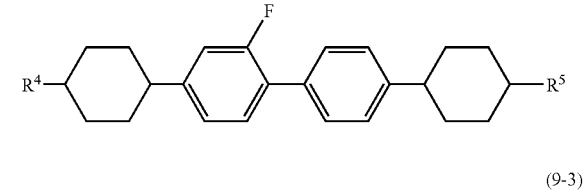
(9-4) 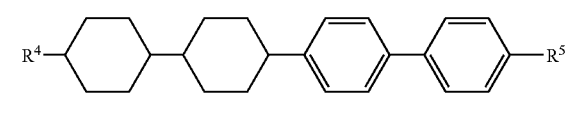

-continued
(9-5)
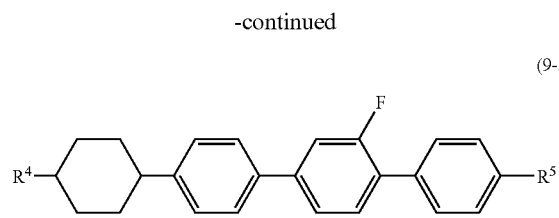
(9-6)
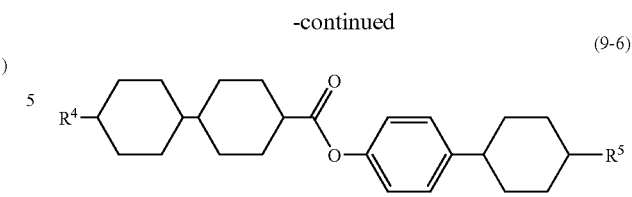
Preferable examples of the optically active compound are as follows.
(Op-1)
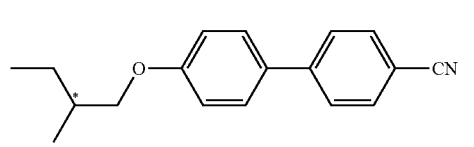
(Op-2)
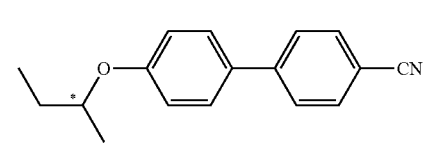
(Op-3)
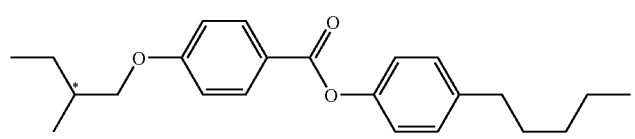
(Op-4)
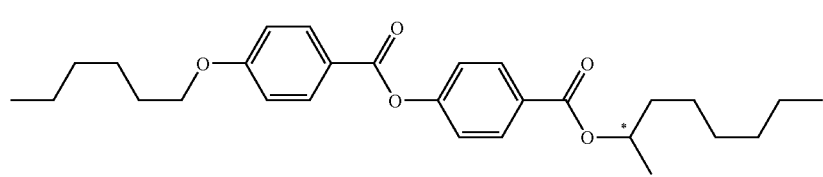
(Op-5)
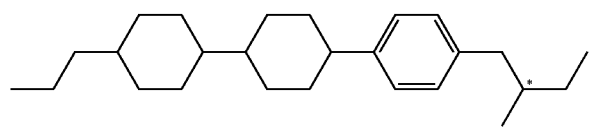
(Op-6)
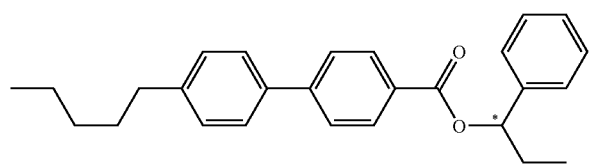
(Op-7)
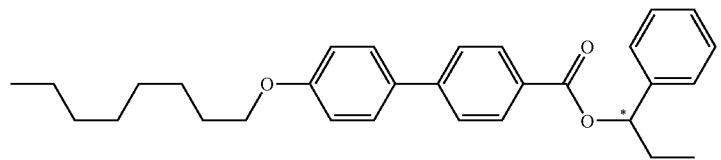
(Op-8)
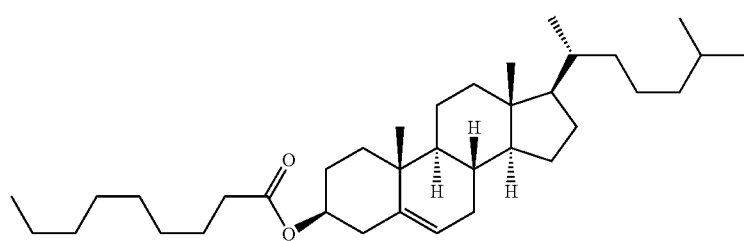

-continued

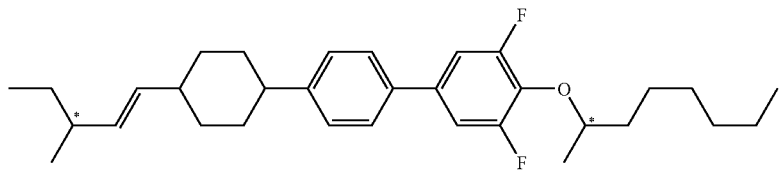
(Op-9)

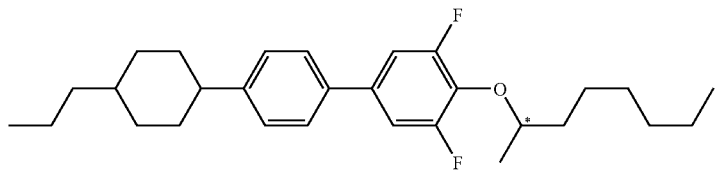
(Op-10)

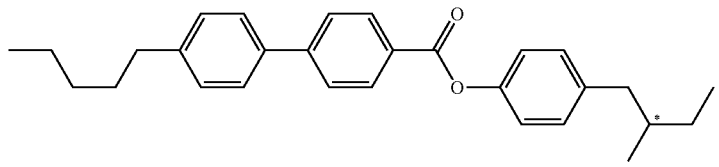
(Op-11)

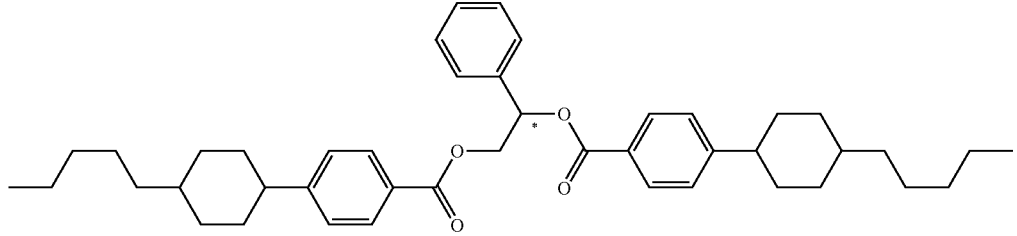
(Op-12)

The composition of the present invention is prepared by a known method. For example, the component compounds are mixed and dissolved by heating. Appropriate additives well known by one skilled in the art may be added to the composition to adjust physical properties of the composition. A dichroic pigment such as melocyanine, styryl, azo, azomethine, azoxy, quinophthalone, anthraquinone and tetrazine may be added to prepare a composition for a GH device. A chiral dopant may be added to offer a twist angle by inducing a spiral structure of the liquid crystal. An example of the chiral dopant is the optically active compounds (Op-1) to (Op-12).

The chiral dopant is added to the composition to adjust the twist pitch. Preferably, the pitch for a TN device and a TN-TFT device is in the range of 40-200 μm. For a STN device, a pitch of 6-20 μm is preferable. For a BTN device, a pitch of 1.5-4 μm is preferable. In the composition for a PC device, the chiral dopant is added in relatively large amounts. At least two chiral dopants may be added to adjust temperature dependence of the l pitch.

The composition of the present invention may be used in PC, TN, STN, BTN, ECB, OCB, IPS and VA devices. These devices may be driven by PM or AM. The composition may be used in a microcapsuled NCAP (nematic curvilinear aligned phase) device or a PD (polymer dispersed) device in which 3-dimensional polymer network is formed in the composition, for example a PN (polymer network) device.

EXAMPLES

Hereinafter, the present invention is described in further detail through examples. However, the following examples do not limit the present invention. With regard to phase transition temperature, C, N and I stand for crystal, nematic phase and isotropic phase, respectively. Phase transition presented in parentheses means that it is monotropic. Temperatures are in ° C. The obtained compound was analyzed by NMR, mass spectroscopy, etc. In NMR spectra, s stands for singlet, d stands for doublet, t stands for triplet and m stands for multiplet. Amount of the compound (percentage) is wt % based on the total weight of the composition.

Physical properties were measured by EIAJ ED-2521A of the Standard of Electronic Industries Association of Japan or modification thereof.

<Upper Limit Temperature of Nematic Phase (NI; ° C.)>

A sample was put on the hot plate of a melting point measuring device equipped with a polarizing microscope and heated at a rate of 1° C./min. Temperature was recorded when part of the sample transited from the nematic phase into isotropic liquid. Upper limit temperature of the nematic phase may be simply put as "upper limit temperature."

<Lower Limit Temperature of Nematic Phase (TC; ° C.)>

A sample having a nematic phase was kept in a freezer at 0° C., −10° C., −20° C., −30° C. and −40° C. for 10 days, while observing the liquid crystal phase. For example, if the sample was in the nematic phase at −20° C. and transited to crystal (or smectic phase) at −30° C., TC was recorded as "<−20° C.". Lower limit temperature of the nematic phase may be simply put as "lower limit temperature."

<Compatibility>

Several compounds having similar structure were mixed to prepare mother liquid crystal having a nematic phase. The compound to be tested was mixed with the mother liquid crystal to obtain a composition. The mixing ratio was, for example, 15% the compound and 85% the mother liquid crystal. The composition was kept at low temperature, for example −20° C. or −30° C., for 30 days. Whether a part of the composition transited to crystal (or smectic phase) was observed. The mixing ratio and temperature were changed, as necessary. As a result, the conditions under which transition takes place or not were identified. These conditions become standard of compatibility.

<Optical Anisotropy (Refractive Anisotropy; Δn; Measured at 25° C.)>

Measurement was taken with light having a wavelength of 589 nm using an Abbe refractometer in which a polarizing plate was attached to the eyepiece. Surface of the main prism was rubbed along one direction and the sample was dropped on the main prism. Refractive index $n_\|$ was measured when the polarizing direction was parallel with the rubbing direction. Refractive index no was measured when the polarizing direction was perpendicular to the rubbing direction. Optical anisotropy was calculated by the equation $\Delta n = n_\| - n\perp$. Optical anisotropy was determined by this method for a composition sample. For a compound sample, the compound was mixed with an adequate composition to determine optical anisotropy. Optical anisotropy of the compound was determined by extrapolation.

<Dielectric Anisotropy (Δε; Measured at 25° C.)>

For a compound sample, the compound was mixed with an adequate composition to determine dielectric anisotropy. Dielectric anisotropy of the compound was determined by extrapolation. The sample was interposed in a liquid crystal cell comprising a pair of glass plates spaced by about 9 μm and having a twist angle of 80°. A voltage of 20 V was applied to the cell to determine permittivity along the longer axis of the liquid crystal molecule ($\epsilon_\|$). A voltage of 0.5 V was applied to determine permittivity along the shorter axis ($\epsilon\perp$). Dielectric anisotropy was calculated by the equation $\Delta\epsilon = \epsilon_\| - \epsilon\perp$.

<Threshold Voltage (Vth; Measured at 25° C.; V)>

For a compound sample, the compound was mixed with an adequate composition to determine threshold voltage. Threshold voltage of the compound was determined by extrapolation. The sample was interposed in a liquid crystal device in a normally white mode, which comprises a pair of glass plates spaced by (0.5/Δn) μm and has a twist angle of 80°. Here, Δn is the optical anisotropy value determined above. A rectangular wave with a frequency of 32 Hz was applied to the device. Voltage of the rectangular wave was increased until transmittivity of light passing the device reached 90%. The voltage value was recorded.

Example 1

Synthesis of Compound (M2-01)

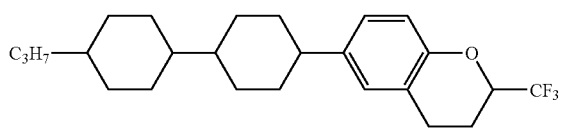

(M2-01)

The compound (M2-01) (2-trifluoromethyl-6-(trans-4-(trans-4-propylcyclohexyl)cyclohexyl)chroman) was synthesized by the following scheme.

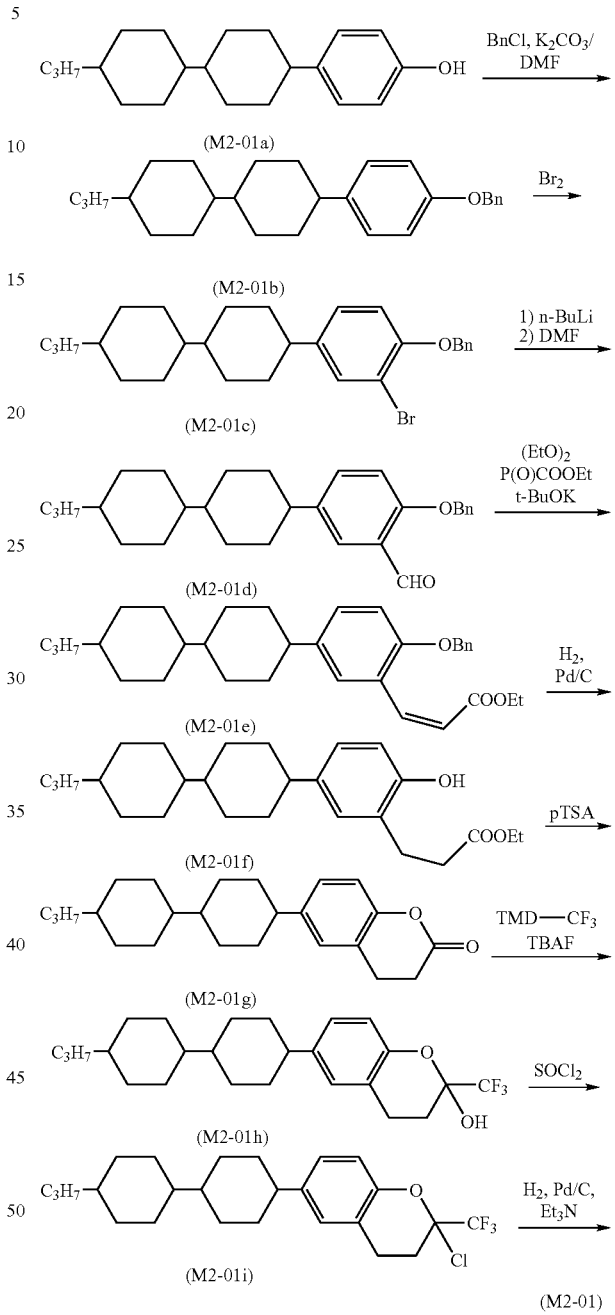

(Step 1):

A DMF solution (70 mL) containing the compound (M2-01a) (15.0 g) and potassium carbonate (13.8 g) was heated to 45° C. under nitrogen atmosphere. Stirring was carried out for 1 hour at 90° C. while adding benzyl bromide (6.84 g) dropwise. The solution was poured in water and extracted with toluene (100 mL). Following washing with aqueous sodium bicarbonate and water and condensing, the compound (M2-02b) (19.1 g) was obtained. A dichloromethane solution (100 mL) containing the compound (M2-01b) (19.1 g) was cooled to 0° C. under nitrogen atmosphere. Stirring was performed for 30 minutes while adding bromine (8.61 g) dropwise. The solution was poured in water and toluene (100 mL) was added. Following washing with aqueous sodium thiosulfate and water and condensing, the residues were purified by silica gel column chromatography and the compound (M2-01c) (17.7 g) was isolated. Then, a THF solution (100 mL) containing the compound (M2-01c) (17.7 g) was cooled to −65° C. under nitrogen atmosphere and a sec-butyllithium/cyclohexane solution (37.7 mL (1.00 mol/L)) was added dropwise. After stirring at that temperature for 1 hour, a THF (10 mL) containing N,N'-dimethylformamide (4.13 g) was added dropwise and stirring was carried out for another hour. The solution was poured in aqueous 1N-HCl and extracted two times with toluene (300 mL). Following washing with water and condensing, the residues were purified by silica gel column chromatography and the compound (M2-01d) (10.9 g) was isolated.

(Step 2):

A THF solution (25 mL) containing ethyl diethylphosphonoacetate (7.00 g) was cooled to −40° C. under nitrogen atmosphere and potassium t-butoxide (3.50 g) was added slowly. After stirring for 1 hour, the compound (M2-01d) (10.9 g) was added to the THF solution (30 mL) dropwise. Stirring was performed for another hour. The solution was poured in water and extracted with toluene (200 mL). Following washing with water and condensing, the residues were purified by silica gel column chromatography and the compound (M2-01e) (12.5 g) was isolated. To a toluene (15 mL)/isopropyl alcohol (30 mL) mixture solution containing the compound (M2-01e) (12.5 g) was added Pd/C (1.0 g) catalyst. A hydrogen pressure of 1.0 kPa was applied to the reactor and stirring was performed for a day at room temperature. The resultant solution was filtered and condensed to obtain the compound (M2-01f) (10.4 g). To a toluene solution (50 mL) containing the compound (M2-01f) (10.4 g), hydrated p-toluenesulfonic acid (1.0 g) was added. Removing ethanol and toluene with a Dean-Stark apparatus, the solution was heated for 1 hour while refluxing. Toluene (30 mL) was added again and the solution was heated for another hour while refluxing. The solution was poured in water and toluene (100 mL) was added. Following washing with aqueous sodium bicarbonate and water and condensing, the residues were purified by silica gel column chromatography and the compound (M2-01g) (8.79 g) was obtained.

(Step 3):

A THF solution (10 mL) containing the compound (M2-01g) (3.00 g) was cooled to 0° C. under nitrogen atmosphere. Then, a THF solution (5 mL) containing (trifluoromethyl)trimethylsilane (1.56 g) was added dropwise and a tetrabutylammonium fluoride (TBAF)/THF solution (0.1 mL (1.0 mol/L)) was added. After stirring for 1 hour at room temperature, another TBAF/THF solution (11 mL) was added dropwise and stirring was performed for 3 hours. The solution was poured in water and extracted with toluene (100 mL). Following washing with water and condensing, the residues were purified by silica gel column chromatography and the compound (M2-01h) (3.38 g) was obtained. To a toluene solution (15 mL) containing the compound (M2-01h) (3.38 g), a small amount of pyridine (0.1 mL) was added under nitrogen atmosphere. The solution was stirred for 1 hour at 45° C. while adding thionyl chloride (1.04 g) dropwise. The solution was poured in water and toluene (300 mL) was further added. Following washing with water, aqueous sodium bicarbonate and water, in sequence, and condensing, the residues were purified by silica gel column chromatography and the compound (M2-02i) (3.34 g) was obtained. To a toluene (3 mL)/isopropyl alcohol (6 mL)/triethylamine (0.5 mL) mixture solution containing the compound (M2-01i) (2.00 g), Pd/C (0.50 g) catalyst was added. A hydrogen pressure of 3 kPa was applied to the reactor and stirring was performed at room temperature for 2 days. The solution was filtered and toluene (100 mL) was added. Following washing with aqueous 1N—HCR, water, aqueous sodium bicarbonate and water, in sequence, and condensing, the residues were purified by silica gel column chromatography. After purification by recrystallization filtration, the compound (M2-01) (1.42 g) was obtained.

$^1$H-NMR (CDCl$_3$): 0.90 (t, 3H), 1.07-1.36 (m, 15H), 1.52-1.87 (m, 8H), 1.89 (dt, 1H), 2.20 (m, 1H), 2.50 (tt, 1H), 2.95 (m, 2H), 4.40 (m, 1H), 6.96 (d, 1H), 7.01 (d, 1H), 7.07-7.08 (dd, 1H). $^{19}$F (CDCl$_3$): −79.1 (d, 3F). MS: 408.2 (M$^+$).

Example 2

Synthesis of Compound M 2-03)

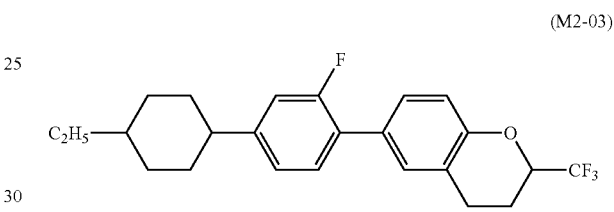

The compound (M2-03) (2-trifluoromethyl-6-(2-fluoro-4-(trans-4-ethylcyclohexyl)phenyl)chroman) was synthesized by the following scheme.

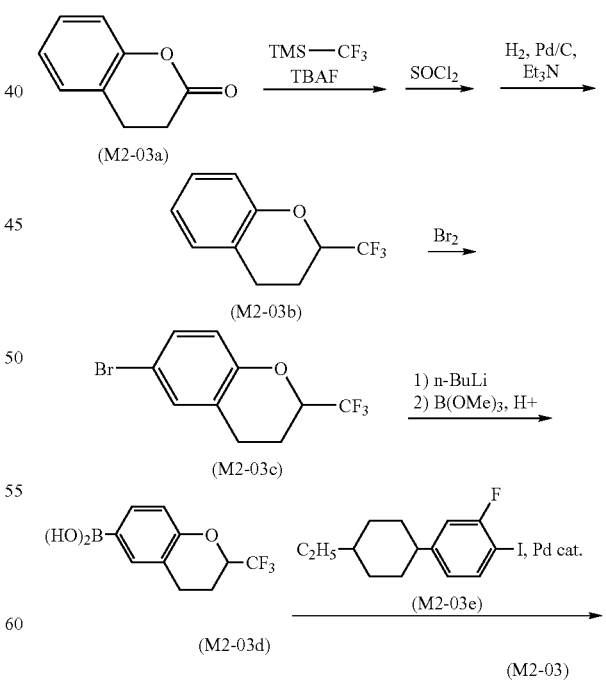

(Step 1):

The compound (M2-03a), a starting material, can be purchased from Aldrich, etc. The compound (M2-03b) (28.2 g) was obtained in the same manner of (Step 3) of Example 1 from the compound (M2-03a) (30.0 g). A dichloromethane (100 mL) solution containing the compound (M2-03b) (28.2 g) was cooled to 0° C. under nitrogen atmosphere and bromine (24.6 g) was added dropwise. The solution was poured in water and dichloromethane (100 mL) was further added. Following washing with aqueous sodium thiosulfate and water, in sequence, and condensing, the residues were purified by silica gel column chromatography and the compound (M2-03c) (31.8 g) was isolated. Then, a THF solution (150 mL) containing the compound (M2-03c) (31.8 g) was cooled to −65° C. under nitrogen atmosphere and a n-butyllithium/n-hexane solution (87.0 mL (1.56 mol/L)) was added dropwise. After stirring for 1 hour at that temperature, trimethyl borate (15.3 g) was added dropwise. After heating to room temperature, stirring was performed for another hour. The solution was slowly poured into 1N—HCl solution and extracted two times with diethyl ether (300 mL). Following washing with water and condensing, the residues were removed by recrystallization filtration to obtain the compound (M2-03d) (18.1 g)

(Step 2):

To a mixture solution of the compound (M2-03d) (1.50 g), the compound (M2-03e) (1.93 g), potassium carbonate (3.21 g), tetrabutylammonium bromide (0.56 g), toluene (5 mL) and ethanol (5 mL), Pd/C (0.10 g) catalyst was added under nitrogen atmosphere. The solution was stirred for 5 hours at 75° C. The solution was poured in water and toluene (100 mL) was added. Following washing with aqueous sodium bicarbonate and water, in sequence, and condensing, the residues were purified by silica gel column chromatography and recrystallization filtration to obtain the compound (M2-03) (1.34 g).

$^1$H-NMR (CDCl$_3$): 0.91 (t, 3H), 1.04-1.46 (m, 7H), 1.91 (dt, 4H), 2.07 (dt, 1H), 2.24 (m, 1H), 2.49 (tt, 1H), 2.93 (m, 2H), 4.41 (m, 1H), 6.96-7.05 (m, 3H), 7.28-7.340 (m, 3H), $^{19}$F (CDCl$_3$): −79.2 (d, 3F), −119.3 (dd, 1F) MS: 406.2 (M$^+$)

Example 3

Synthesis of Compound (M7-32)

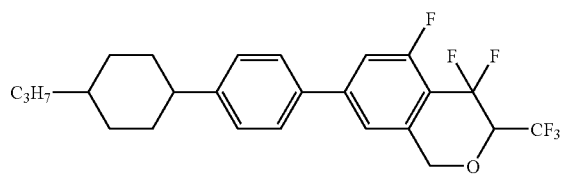

The compound (M7-32) (3-trifluoromethyl-4,4-difluoro-5-fluoro-7-(4-(trans-4-propylcyclohexyl)phenyl)isochroman) can be prepared by the following scheme.

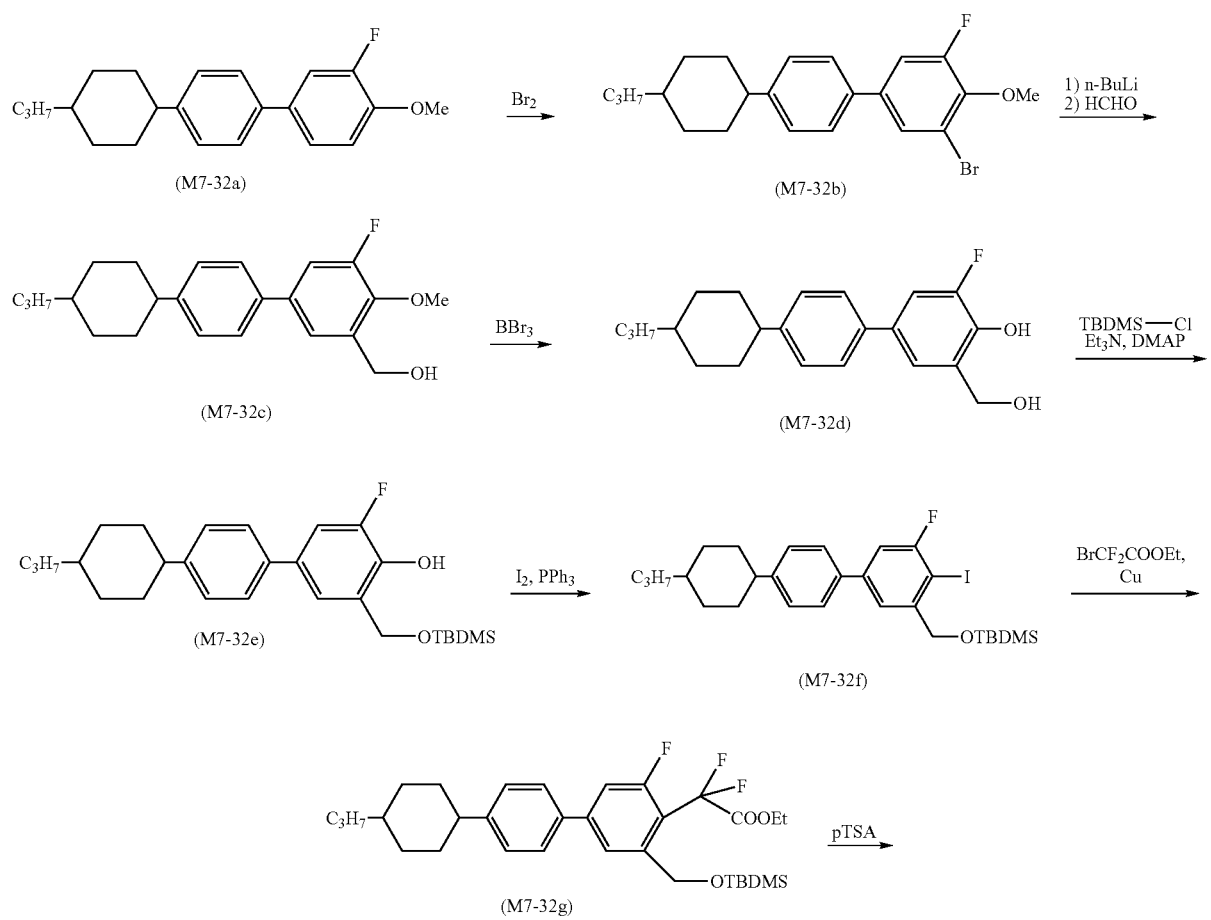

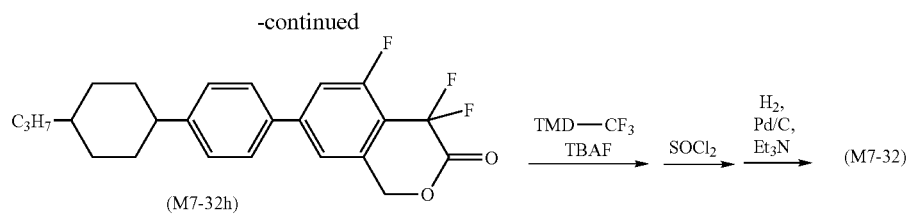

(Step 1):

A dichloromethane solution containing the compound (M7-32a) is cooled to 0° C. under nitrogen atmosphere and bromine is added dropwise. The solution is poured in water and dichloromethane is added. Following washing with aqueous sodium thiosulfate and water, in sequence, and condensing the residues are purified by silica gel column chromatography to isolate the compound (M7-32b). A THF solution containing the compound (M7-32b) is cooled to −65° C. under nitrogen atmosphere and n-butyllithium/n-hexane solution is added dropwise. After stirring for 1 hour at that temperature, formaldehyde is added dropwise. After heating to room temperature, stirring is performed for 1 hour. The solution is poured in 1N—HCl solution and extracted two times with toluene. Following washing with water, aqueous sodium bicarbonate and water, in sequence, and condensing, the residues are purified by silica gel column chromatography to isolate the compound (M7-32c). A dichloromethane solution containing the compound (M7-32c) is cooled to −20° C. under nitrogen atmosphere and boron tribromide is added dropwise. After heating to room temperature, stirring is performed for 5 hours. The solution is poured in icy water and extracted two times with toluene. Following washing with water, aqueous sodium bicarbonate and water, in sequence, and condensing, the compound (M7-32d) is obtained.

(Step 2):

To a mixture solution of the compound (M7-32d), triethylamine, DMAP((4-dimethylamino)pyridine) and dichloromethane, tert-butyldimethylsilyl chloride is slowly added at room temperature under nitrogen atmosphere. Stirring is performed at that temperature for 2 hours. The solution is poured in water and dichloromethane is added. Following washing with water and condensing, the compound (M7-32e) is obtained. To a mixture solution of the compound (M7-32e), imidazole and toluene is added triphenylphosphine at room temperature under nitrogen atmosphere. Stirring is performed for 1 hour at that temperature while adding iodine dropwise. The solution is poured in water and toluene is added. Following washing with aqueous sodium thiosulfate and water, in sequence, and condensing, the residues are purified by silica gel column chromatography to isolate the compound (M7-32f). Then, recrystallization filtration is performed to remove impurities.

(Step 3):

To a DMSO (dimethylsulfoxide) solution containing the compound (M7-32f), ethyl bromodifluoroacetate and activated copper powder are added in sequence, under nitrogen atmosphere. Then, stirring is performed at 80° C. for 6 hours. The solution is poured in water, extracted with toluene, and precipitates including copper are filtered out. The solution is washed with aqueous 1N—HCl and water, in sequence, and condensed further. The residues are purified by silica gel column chromatography and recrystallization filtration to isolate the compound (M7-32g). To a toluene solution containing the compound (M7-32g), hydrated p-toluenesulfonic acid is added. Ethanol is removed by a Dean-Stark apparatus while heating for 1 hour with reflux. Toluene is added further and the solution is heated for another hour with reflux. The solution is poured in water and toluene is added. Following washing with aqueous sodium bicarbonate and water, in sequence, and condensing, the residues are purified by silica gel column chromatography and recrystallization filtration to obtain the compound (M7-32h).

(Step 4):

The compound (M7-32) is obtained from the compound (M7-32h) in the same manner of (Step 3) of Example 1.

Example 4

Synthesis of Compound (M9-14)

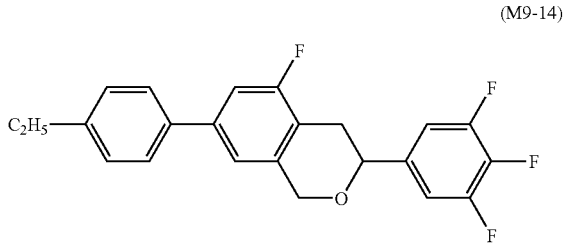

The compound (M9-14) (3-(3,4,5-trifluorophenyl)-5-fluoro-7-(4-ethylphenyl)isochroman) was synthesized by the following scheme.

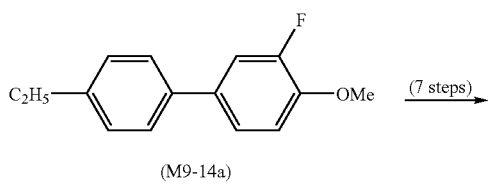

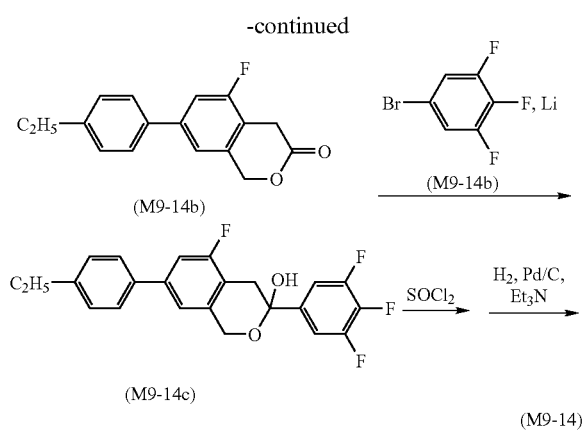

(Step 1):

The compound (M9-14b) (4.22 g) was obtained from the compound (M9-14a) (30.0 g) in the same manner of (Step 1) to (Step 3) of Example 3.

(Step 2):

Finely cut lithium (0.20 g) was slowly added to THF (20 mL) under argon atmosphere. 1-Bromo-3,4,5-trifluorobenzene (1.98 g) wad added dropwise at 60° C. and stirring was performed at that temperature for 1 hour. The solution was cooled to 0° C. and a THF solution (10 mL) containing the compound (M9-02a) (2.11 g) was added dropwise. Then, stirring was performed for another hour at room temperature. The solution was poured in water and extracted two times with toluene (100 mL). Following washing with water and condensing, the compound (M9-14b) (2.17 g) was obtained.

(Step 3):

To a toluene solution (30 mL) containing the compound (M9-14b) (2.17 g), a small amount of pyridine (0.10 g) was added under nitrogen atmosphere. Thionyl chloride (0.71 g) was added dropwise at 45° C. and stirring was performed at that temperature for 1 hour. The solution was poured in water and toluene (100 mL) was added. Following washing with water, aqueous sodium bicarbonate and water, in sequence, and condensing, the residues were purified by silica gel column chromatography to obtain the compound (M9-14c) (1.99 g). To a mixture solution of toluene (3 mL)/isopropyl alcohol (6 mL)/triethylamine (0.50 mL) containing the compound (M9-14c) (1.99 g), Pd/C (0.20 g) catalyst was added. A hydrogen pressure of 3 kPa was applied to the reactor and stirring was performed at room temperature for 2 days. The solution was filtered and toluene (100 mL) was added. The solution was washed with aqueous 1N—HCR, water, aqueous sodium bicarbonate and water, in sequence, and condensed. The residues were purified by silica gel column chromatography and recrystallization filtration to obtain the compound (M9-14) (1.04 g).

$^1$H-NMR (CDCl$_3$): 0.96 (t, 3H), 2.65(m, 2H), 2.94(m, 2H), 4.58(d, 2H), 4.66(m, 1H), 6.82-6.85 (m, 2H), 6.97-7.07 (m, 4H), 7.31-7.38 (m, 2H). $^{19}$F (CDCl3): −119.2 (dd, 1F), −135.4 (m, 2F), −163.1 (m, 1F).

MS: 386.1 (M$^+$).

Example 5

Synthesis of Compound (M12-02)

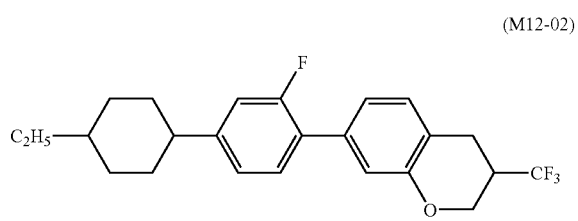

The compound (M12-02) (3-trifluoromethyl-7-(2-fluoro-4-(trans-4-ethylcyclohexyl)phenyl)chroman) was synthesized by the following scheme.

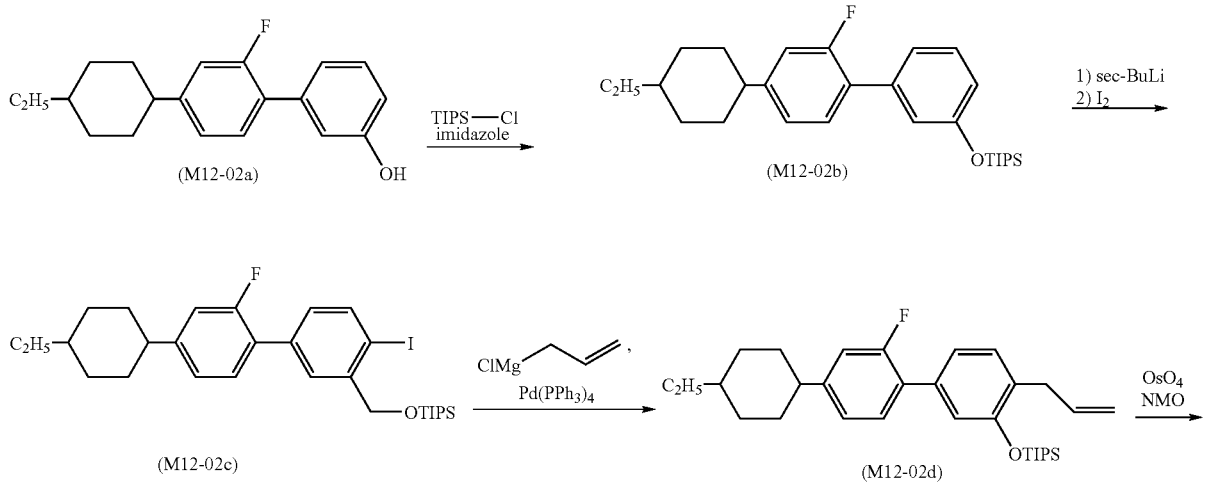

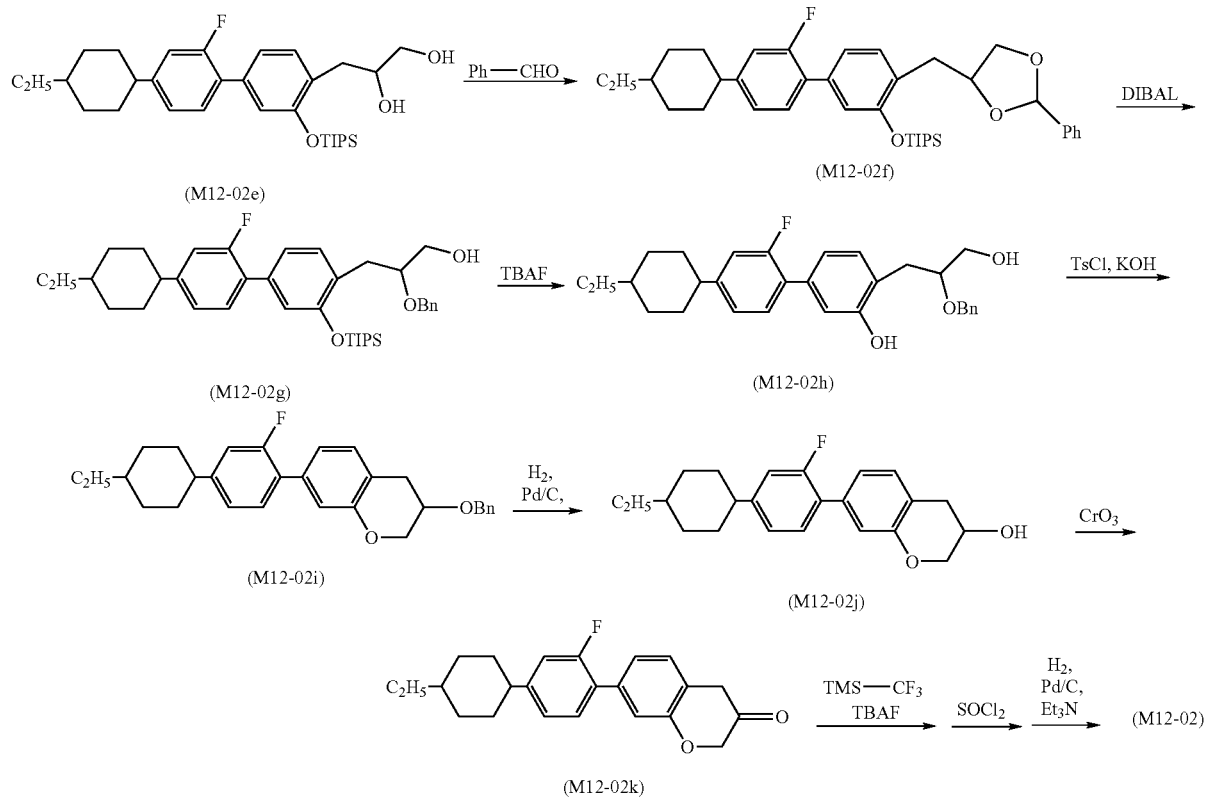

(Step 1):

A mixture solution of the compound (M12-02a) (20.0 g), imidazole (11.4 g) and dichloromethane (200 mL) was cooled to 0° C. under nitrogen atmosphere. Triisopropylsilyl chloride (15.5 g) was slowly added and stirring was performed for 1 hour at that temperature. The solution was poured in water. Following washing with water and condensing, the compound (M12-02b) (27.1 g) was obtained. A THF (270 mL) solution containing the compound (M12-02b) (27.1 g) was cooled to −65° C. under nitrogen atmosphere. sec-Butyllithium/cyclohexane solution (59.6 mL (1.00 mol/L)) was added dropwise and stirring was performed for 1 hour at that temperature. After adding a THF (50 mL) solution containing iodine (18.2 g) dropwise, the solution was stirred for 30 minutes at room temperature. The solution was poured in water and extracted with toluene (500 mL) two times. Following washing with aqueous sodium thiosulfate and water, in sequence, and condensing, the residues were treated with silica gel column chromatography to isolate the compound (M12-02c) (14.9 g). A THF (100 mL) solution containing the compound (M12-02c) (14.9 g) was cooled to 0° C. under nitrogen atmosphere and tetrakis(triphenylphosphine)palladium (0.150 g) was added. Then, arylmagnesium chloride/THF solution (16.0 mL (2.0 mol/L)) was added and the solution was stirred at room temperature for 5 hours. The solution was poured in 1N—HCl solution and extracted two times with toluene (200 mL). Following washing with water, aqueous sodium bicarbonate and water, in sequence, and condensing, the residues were purified by silica gel column chromatography to isolate the compound (M12-02d) (8.76 g).

(Step 2):

To a mixture solution of osmium tetraoxide (0.45 g), N-methylmorpholine-N-oxide (NMO) (1.97 g), water (10 mL), and acetonitrile (5 mL) was slowly added the compound (M12-02d) (8.76 g) at room temperature under nitrogen atmosphere. Stirring was performed at that temperature for 5 hours. The solution was poured in icy water and toluene (100 mL) was added. The solution was washed with water, aqueous sodium thiosulfate and water, in sequence, and condensed to obtain the compound (M12-02e) (6.80 g). To a mixture solution containing the compound (M12-02e) (6.74 g), benzaldehyde (1.62 g) and toluene (100 mL), p-toluenesulfonic acid anhydride (0.50 g) was added. The solution was heated for 1 hour while removing water using a Dean-Stark apparatus. The solution was poured in water and toluene (100 mL) was added. Following washing with water, aqueous sodium bicarbonate and water, in sequence, and condensing, the residues were purified by silica gel column chromatography to obtain the compound (M12-02f) (7.47 g).

(Step 3):

A THF (70 mL) solution containing the compound (M12-02f) (7.47 g) was cooled to −40° C. under nitrogen atmosphere and diisobutyl aluminum hydride/toluene solution (13.3 mL (1.0 mol/L)) was added dropwise. Stirring was performed at room temperature for 1 hour. The solution was poured in 1N—HCl solution and extracted two times with toluene (200 mL). The solution was washed with water and condensed to obtain the compound (M12-02g) (6.23 g). A THF (60 mL) solution containing the compound (M12-02g) (6.23 g) was cooled to 0° C. under nitrogen atmosphere and TBAF/THF solution (15 mL (1.0 mol/L)) was added dropwise. The solution was stirred at that temperature for 2 hours. The solution was poured in water and extracted with toluene (200 mL). Following washing with water and condensing, the residues were purified by silica gel column chromatography to obtain the compound (M12-02h) (4.42 g). To a mixture solution of the compound (M12-02h) (4.42 g), potassium hydroxide (1.07 g) and dioxane (40 mL), tosyl chloride (1.91 g) was added under nitrogen atmosphere. The solution was heated for 3 hours with reflux. The solution was poured in water and extracted with toluene (200 mL). Following washing with water and condensing, the residues were purified by silica gel column chromatography to obtain the compound (M12-02i) (3.48 g).

(Step 4):

To a toluene (10 mL)/ethanol (10 mL) mixture solution containing the compound (M12-02i) (3.48 g), Pd/C (0.20 g) catalyst was added. A hydrogen pressure of 1 kPa was applied to the reactor and stirring was performed for a day at room temperature. The solution was filtered and condensed to obtain the compound (M12-02j) (2.72 g). An acetone (20 mL) solution containing the compound (M12-02j) (2.72 g) was cooled to 0° C. under nitrogen atmosphere. A Jones' reagent (2.87 mL (2.67 mol/L)) was added dropwise and stirring was performed at room temperature for 2 hours. The solution was extracted two times with diethyl ether (100 mL). Following washing with aqueous sodium thiosulfate, aqueous sodium bicarbonate and water, in sequence, and condensing, the residues were purified by silica gel column chromatography and recrystallization filtration to obtain the compound (M12-02k) (2.16 g).

(Step 5):

The compound (M12-02) (1.37 g) was obtained from the compound (M12-02k) (1.50 g) in the same manner of (Step 3) of Example 1.

$^1$H-NMR (CDCl$_3$): 0.92 (t, 3H), 1.04-1.46 (m, 8H), 2.24 (m, 1H), 2.49 (t, 2H), 2.93 (m, 2H), 4.49 (dd, 2H), 6.93-7.03 (m, 4H), 7.26-7.31 (m, 2H). $^{19}$F (CDCl$_3$): −79.1 (d, 3F), −119.2 (dd, 1F) MS: 406.2 (M$^+$).

Example 6

Synthesis of Compound (M12-03)

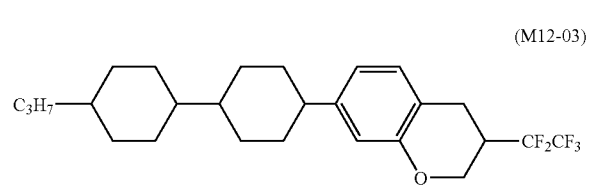

(M12-03)

The compound (M12-03) (3-perfluoroethyl-7-(trans-4-(trans-4-propylcyclohexyl)cyclohexyl)chroman) can be prepared by the following scheme.

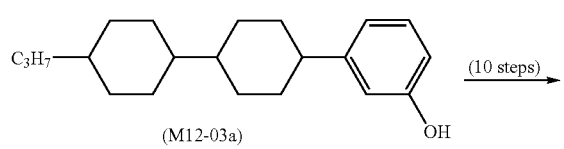

(M12-03a)

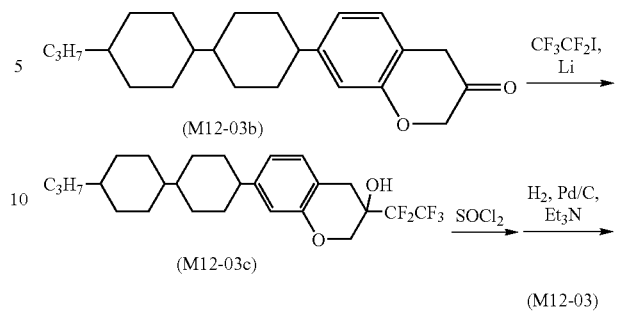

(Step 1):

The compound (M2-03b) is obtained from the compound (M2-03a) in the similar manner of (Step 1) to (Step 4) of Example 5. (Step 2) Finely cut lithium is slowly added to THF under nitrogen atmosphere. Then, perfluoroethyl iodide is added and ultransonic waves are applied for 1 hour at room temperature. After removing the ultrasonicator, a THF solution containing the compound (M12-03b) is added dropwise at room temperature. After stirring for 2 hours at that temperature, the solution is poured in 1N—HCl and extracted two times with toluene. Following washing with water, aqueous sodium bicarbonate and water, in sequence, and condensing, the residues are purified by silica gel column chromatography to obtain the compound (M12-03c). Then, the compound (M12-03) can be obtained from the compound (M12-03c) in the same manner of (Step 2) of Example 4.

Example 7

Synthesis of Compound (M2-27)

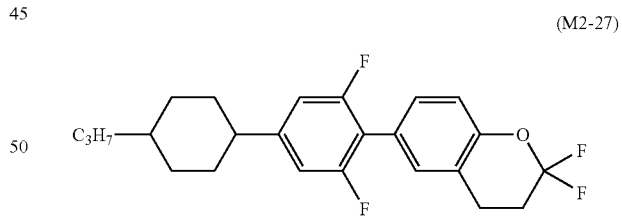

(M2-27)

The compound (M12-27) (2,2-difluoro-6-(2,6-difluoro-4-(4-propylphenyl)phenyl)chroman) can be prepared by the following scheme.

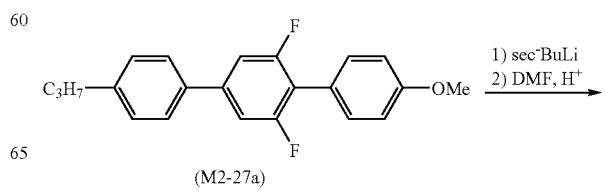

(M2-27a)

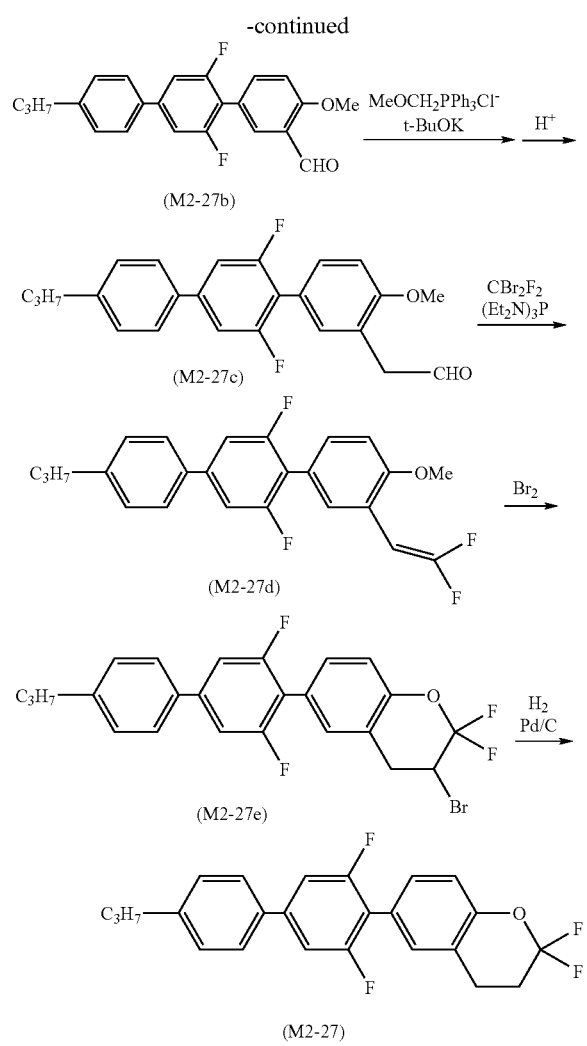

After stirring at room temperature for 1 hour, a THF solution (10 mL) containing the compound (M2-27c) (4.70 g) was added at 40° C. dropwise and stirring was performed at that temperature for 4 hours. The solution was poured in water and extracted with toluene (100 mL). Following washing with water, aqueous 3N—HCl, aqueous sodium bicarbonate and water, in sequence, and condensing, the residues were purified by silica gel column chromatography and the compound (M2-27d) (4.10 g) was obtained. Then, a dichloromethane solution (30 mL) containing the compound (M2-27d) was cooled to −10° C. under nitrogen atmosphere. Stirring was performed for 30 minutes while adding bromine (1.15 g) dropwise. The solution was poured in water and dichloromethane (50 mL) was added. Following washing with aqueous sodium thiosulfate and water and condensing, the residues were purified by silica gel column chromatography and the compound (M2-27e) was obtained.

(Step 3):

To a toluene (10 mL)/isopropyl alcohol (10 mL)/triethyamine (1 mL) mixture solution containing the compound (M2-27e) (2.00 g), Pd/C (0.30 g) catalyst was added. A hydrogen pressure of 3 kPa was applied to the reactor and stirring was performed at room temperature for 2 days. The solution was filtered and toluene (100 mL) was added. Following washing with aqueous 1N—HCl, water, aqueous sodium dicarbonate and water, in sequence, and condensing, the residue were purified by silica gel column chromatography. After purification by recrystallization filtration, the compound (M2-27) (3.00 g) was obtained.

$^1$H-NMR (CDCl$_3$): 0.980 (t, 3H), 1.64-1.73 (m, 2H), 2.36-2.43 (m, 2H), 2.65 (t, 2H), 3.04 (t, 2H), 7.06 (d, 1H), 7.20 (d, 1H), 7.28-7.31 (m, 3H), 7.36 (d, 1H), 7.50-7.52 (m, 2H). $^{19}$F (CDCl$_3$): −69.9(t, 2F), −115.3 (d, 2F). MS: 400 (M$^+$)

Example 8

Synthesis of Compound (M4-25)

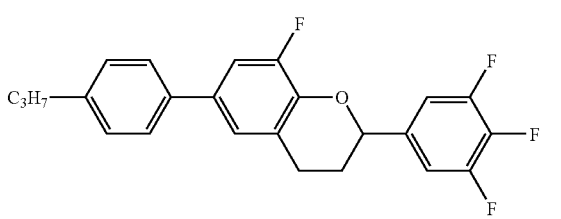

The compound (M4-25) (2-(3,4,5-trifluorophenyl)-6-(4-propylphenyl)-8-fluorochroman) can be prepared by the following scheme.

(Step 1):

The compound (M2-27b) (6.50 g) was obtained in the similar manner of (Step 1) of Example 1 from the compound (M2-27a) (10.0 g). A THF solution (30 mL) containing methoxymethylphosphonium chloride (7.31 g) was cooled to 0° C. under nitrogen atmosphere, and then potassium t-butoxide (1.99 g) was added slowly. After stirring 1 hour at that temperature, a THF solution (30 mL) containing the compound (M2-27b) (6.50 g) was added dropwise. Stirring was performed for another hour. The solution was poured in water and extracted two times with toluene (100 mL). Following washing with water and condensing, the residues were purified by silica gel column chromatography and the product was isolated. Then, an acetone (50 mL) solution containing the product (6.30 g), and aqueous 3N—HCl (20 mL) was heated for 2 hours while refluxing. The solution was poured in water and extracted with toluene (100 mL). Following washing with water and condensing, the compound (M2-27c) (M2-27c) (4.70 g) was obtained.

(Step 2):

A THF solution (12 mL) containing dibromodifluoromethane (3.90 g) was cooled to 0° C. under nitrogen atmosphere and a THF solution (20 mL) containing tris (diethylamino)phosphine (9.47 g) was added dropwise.

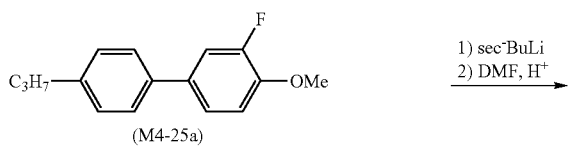

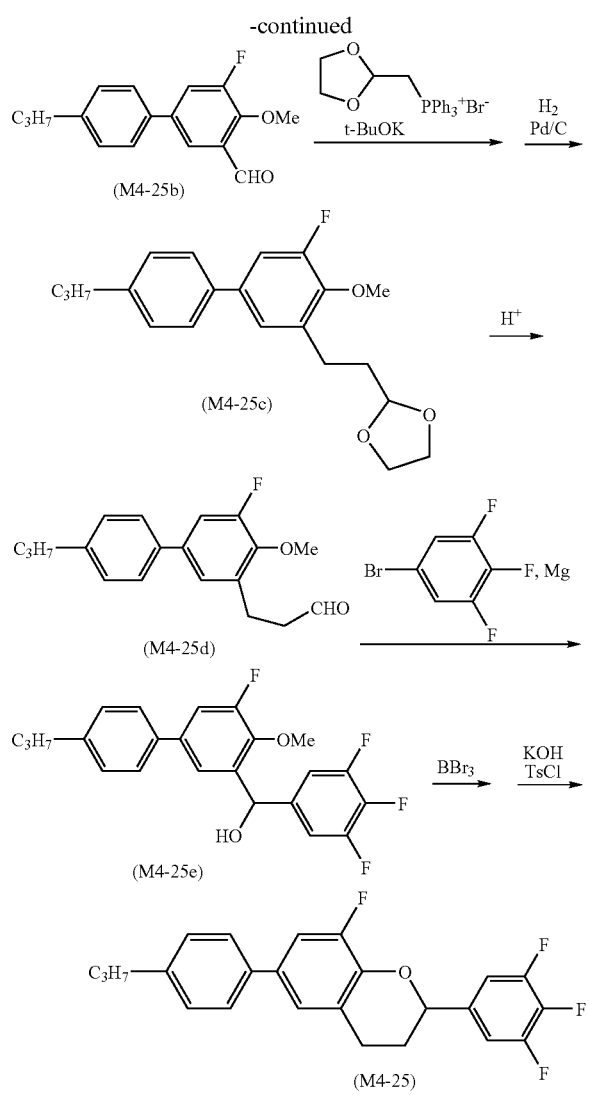

(Step 1):

The compound (M4-25b) (12.2 g) was obtained in the similar manner of (Step 1) of Example 1 from the compound (M4-25a) (20.0 g). A THF solution (50 mL) containing (1,3-dioxane-2-yl-methyl)triphenylphosphonium bromide (11.4 g) was cooled to −30° C. under nitrogen atmosphere and potassium t-butoxide (2.97 g) was added slowly. After stirring 1 hour at that temperature, a THF solution (20 mL) containing the compound (M4-25b) (6.00 g) was added to the THF solution (20 mL) dropwise. Stirring was performed for another hour. The solution was poured in water and extracted two times with toluene (100 mL). Following washing with water and condensing, the residues were purified by silica gel column chromatography and the product was isolated. To a toluene (15 mL)/isopropyl alcohol (15 mL) mixture solution containing the compound (M4-25c) was added Pd/C (0.50 g) catalyst. A hydrogen pressure of 1.0 kPa was applied to the reactor and stirring was performed for a day at room temperature. The resultant solution was filtered and condensed to obtain the compound (M4-25c) (6.00 g).

(Step 2):

A toluene solution (30 mL) containing the compound (M4-25c) (6.00 g) and formic acid (18 mL) was heated for 2 hours while refluxing the solution was poured in water and toluene (100 mL) was added. Following washing with water and condensing, the compound (M4-25d) (4.30 g) was obtained. Then, a THF solution (10 mL) containing magnesium (0.383 g) was heated to 40° C. under nitrogen atmosphere and a THF solution (10 mL) containing 1-bromo-3, 4,5-trifluorobenzene (3.33 g) was added dropwise. After stirring at 30° C. for a hour, a THF (20 mL) containing the compound (M4-25e) (4.30 g) was added dropwise and stirring was carried out for another hour. The solution was poured in aqueous 1N—HCl and extracted two times with toluene. Following washing with water and condensing, the compound (M4-25e) was obtained.

(Step 3):

A dichloromethane solution (30 mL) containing the compound (M4-25e) (5.80 g) was cooled to −20° C. under nitrogen atmosphere and boron tribromide (4.04 g) was added dropwise. After heating to room temperature, stirring was performed for 5 hours. The solution was poured in icy water and dichloromethane (100 mL) was added. Following washing with water, aqueous sodium bicarbonate and water, in sequence, and condensing, the product (5.10 g) was obtained. Then, to a dioxane solution (50 mL) containing the product (5.10 g) and potassium hydroxide (2.84 g), tosyl chloride (2.91 g) was added under nitrogen atmosphere. After heating to 80° C., stirring was performed for 3 hours. The solution was poured in water and extracted two times with toluene (100 mL). Following washing with water, aqueous sodium bicarbonate and water, in sequence, and condensing, the residues were purified by silica gel column chromatography and recrystallization filtration to obtain the compound (M4-25) (2.20 g).

$^1$H-NMR (CDCl$_3$): 0.969 (t, 3H), 1.64-1.71 (m, 2H), 2.03-2.10 (m, 2H), 2.25-2.29(m, 2H), 2.62 (t, 2H), 2.84-2.90 (m, 1H), 3.01-3.08(m, 1H), 5.07-5.10(m, 1H), 7.08 (m, 3H), 7.18-7.21 (m, 1H), 7.23(d, 2H), 7.43-7.44 (m. 2H). $^{19}$F (CDCl$_3$): −134.1(m, 2F), −137.0(d, 1F), −161.7 (d, 1F). MS: 400 (M$^+$)

Example 9

Examples of the compound (1) that can be prepared by Example 1 to 8 are as follows.

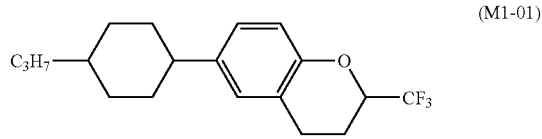

(M1-01)

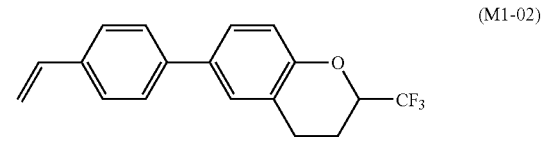

(M1-02)

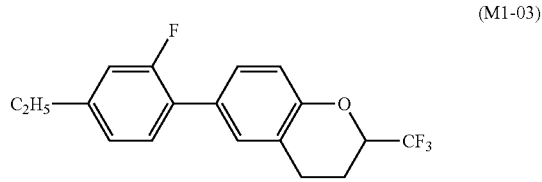

(M1-03)

-continued
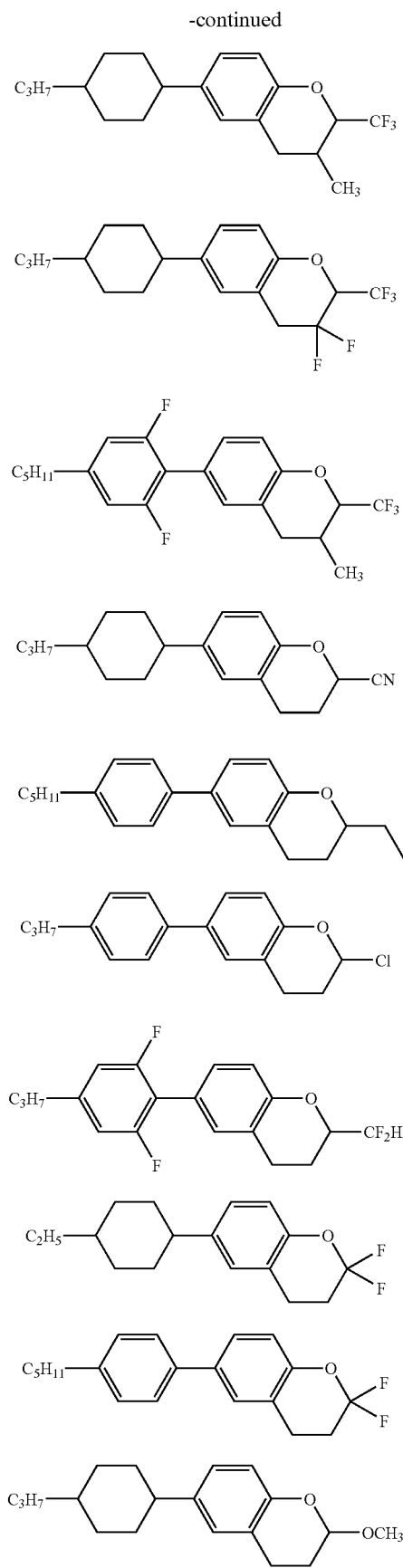
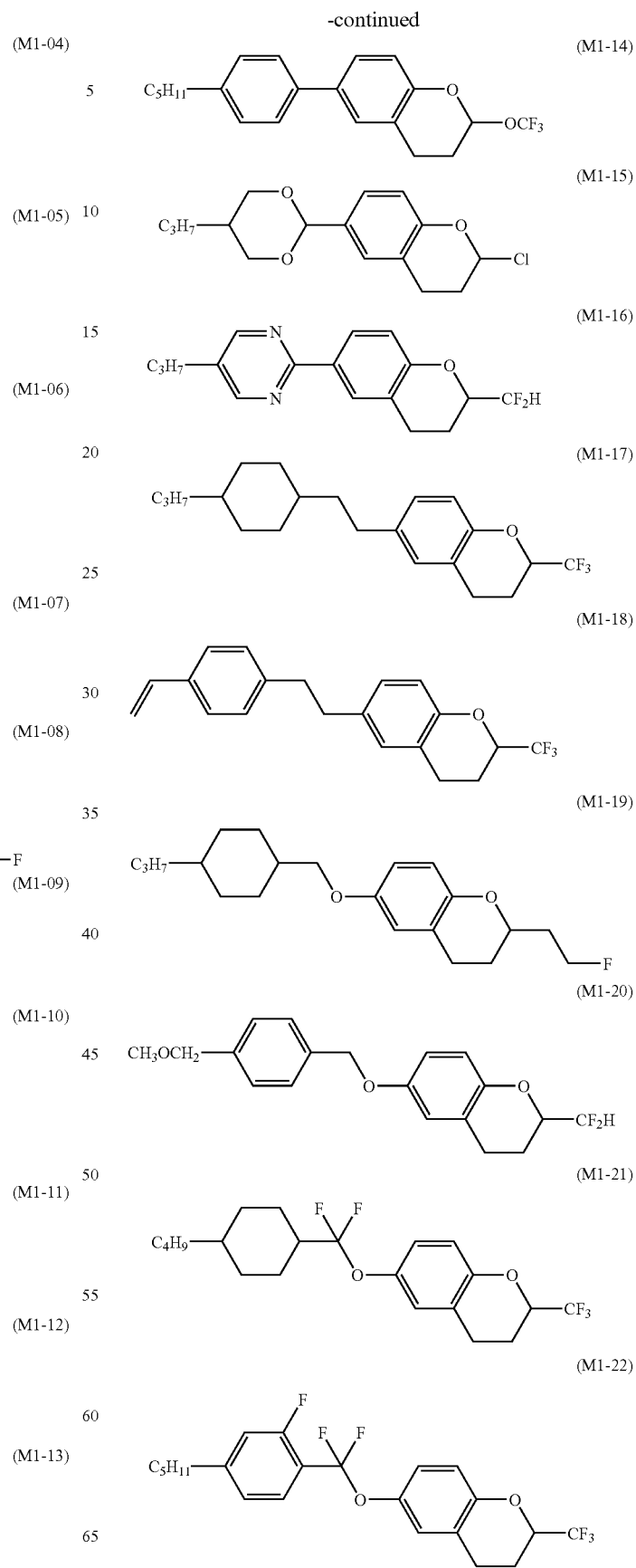

-continued
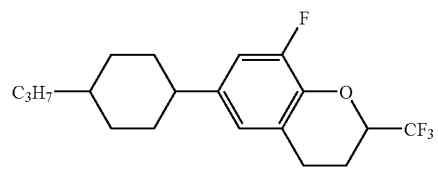 (M1-31)
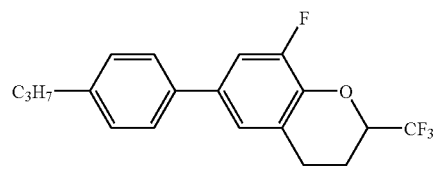 (M1-32)
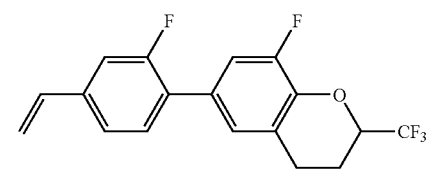 (M1-33)
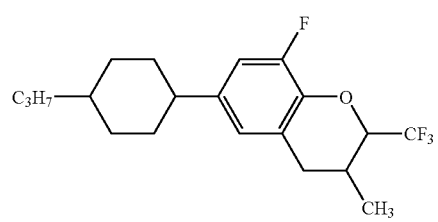 (M1-34)
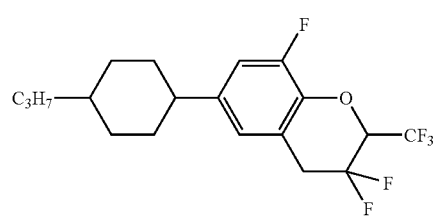 (M1-35)
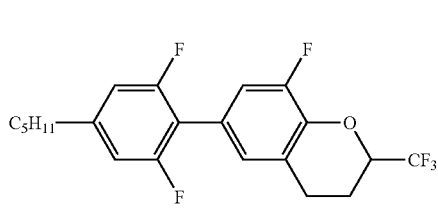 (M1-36)
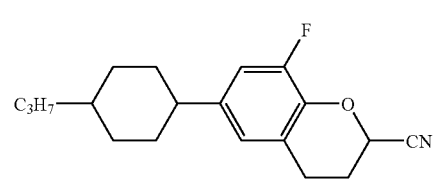 (M1-37)
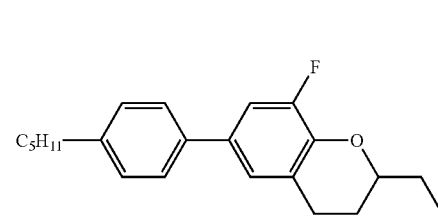 (M1-38)
-continued
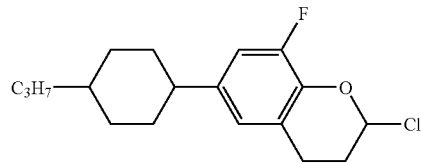 (M1-39)
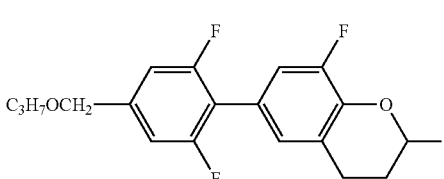 (M1-40)
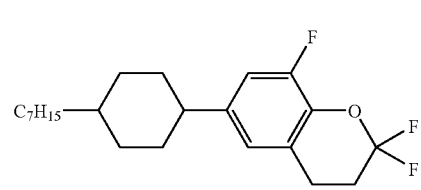 (M1-41)
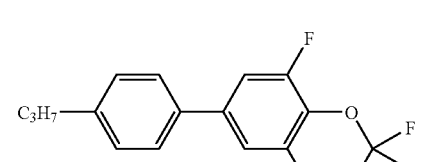 (M1-42)
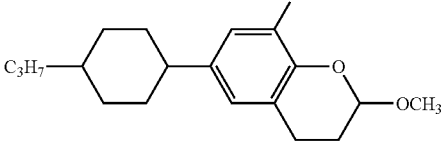 (M1-43)
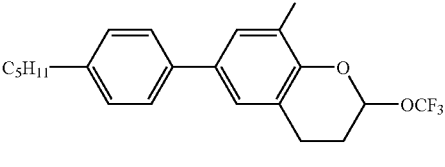 (M1-44)
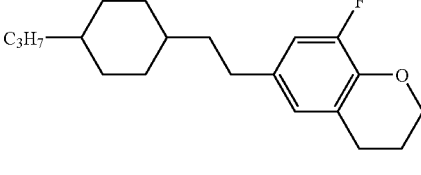 (M1-45)
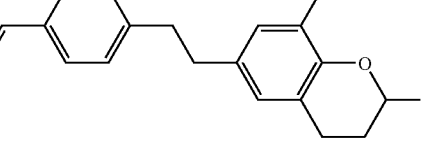 (M1-46)
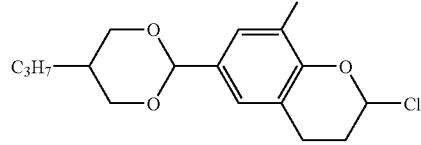 (M1-47)

-continued (M1-48), (M1-49), (M1-50), (M1-51), (M1-52), (M2-01), (M2-02), (M2-03), (M2-04), (M2-05), (M2-06), (M2-07), (M2-08), (M2-09), (M2-10), (M2-11)

-continued
(M2-12)
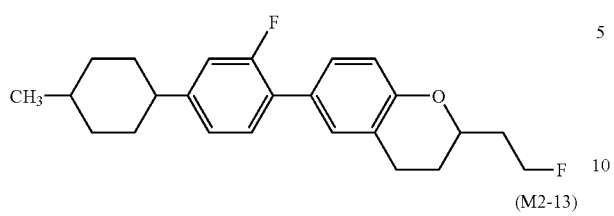
(M2-13)
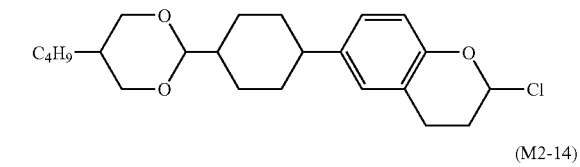
(M2-14)
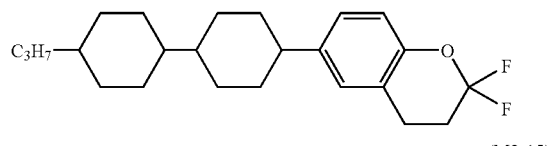
(M2-15)
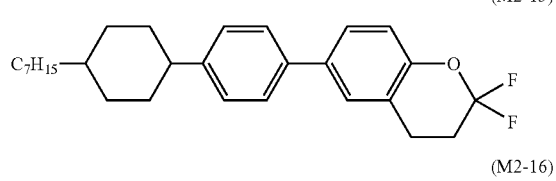
(M2-16)
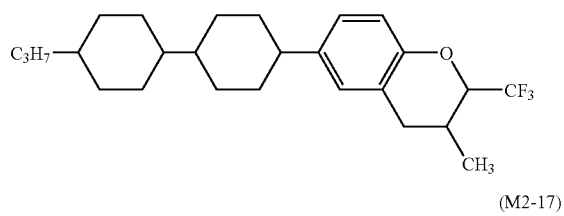
(M2-17)
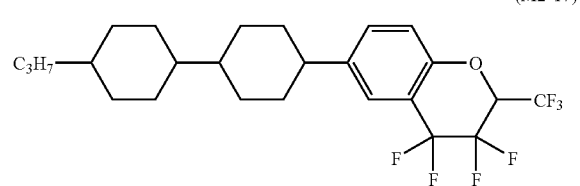
(M2-18)
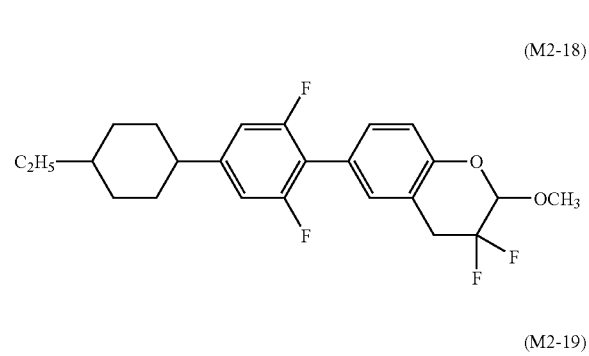
(M2-19)
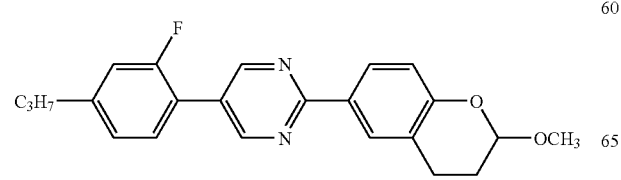
-continued
(M2-20)
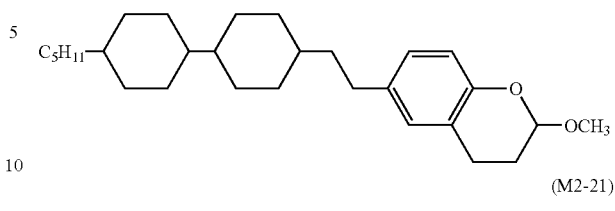
(M2-21)
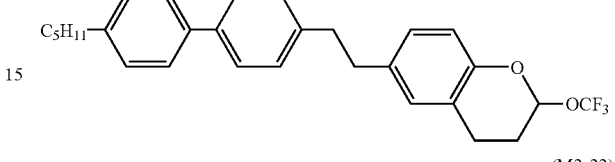
(M2-22)
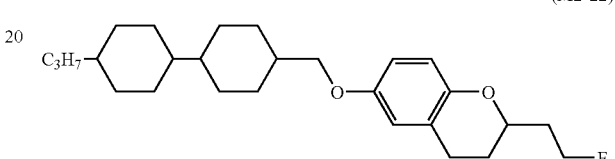
(M2-23)
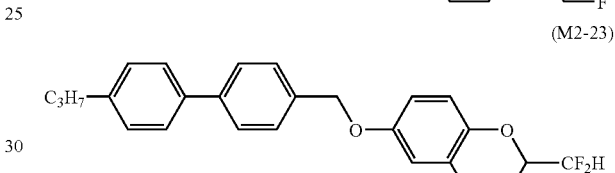
(M2-24)
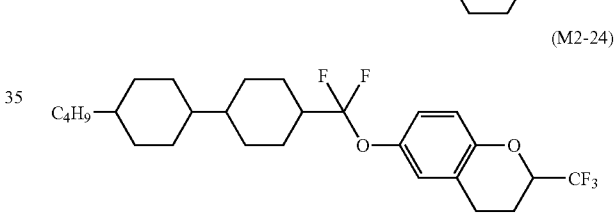
(M2-25)
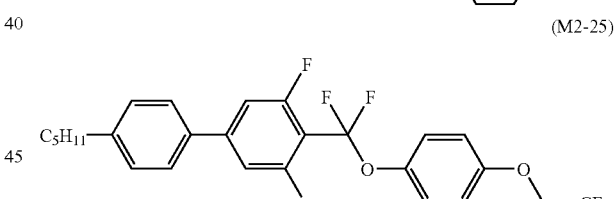
(M2-26)
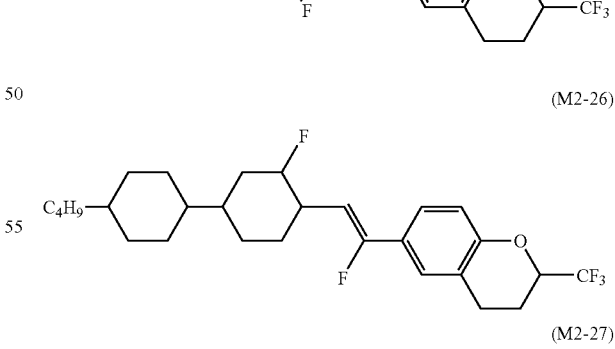
(M2-27)
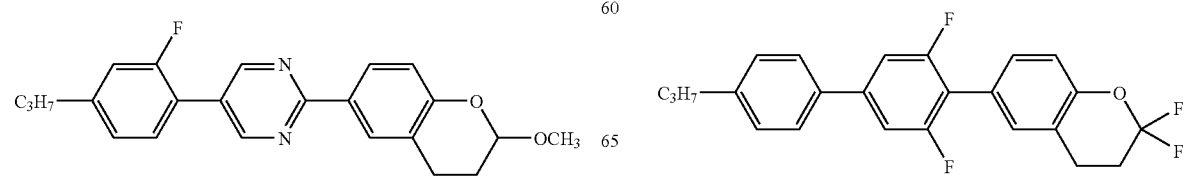

-continued
(M2-28)
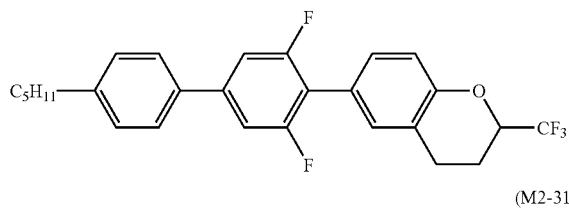
(M2-31)
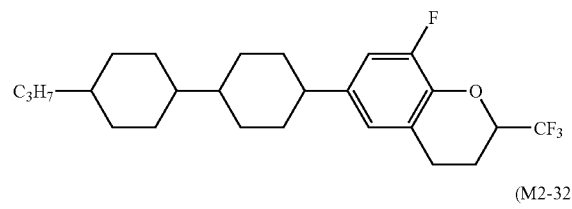
(M2-32)
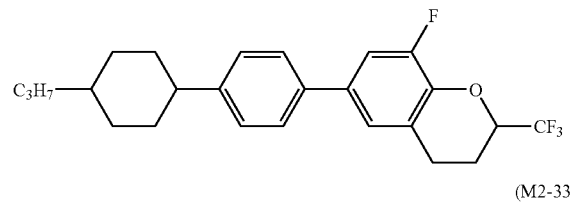
(M2-33)
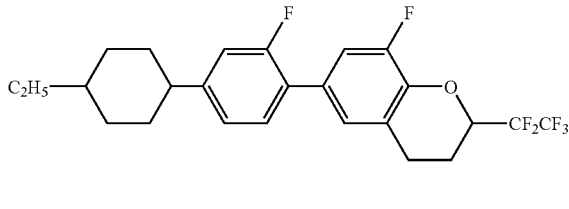
(M2-34)
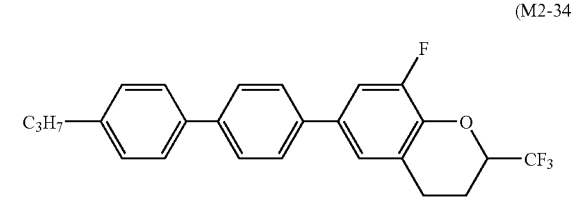
(M2-35)
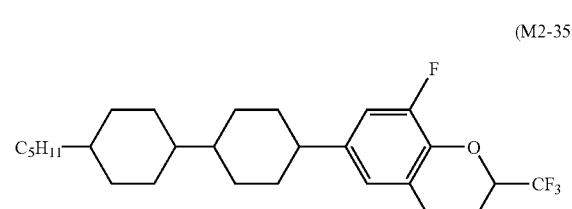
(M2-36)
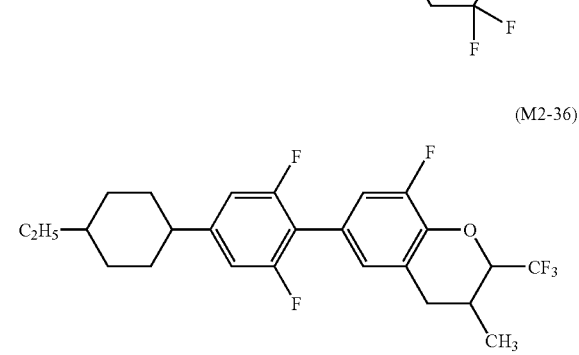
-continued
(M2-37)
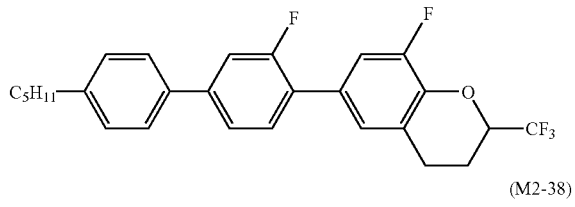
(M2-38)
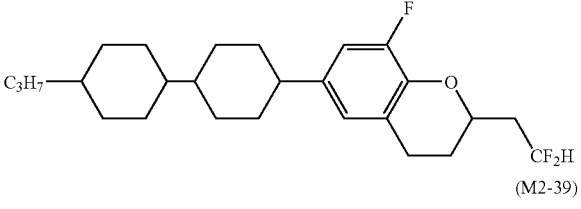
(M2-39)
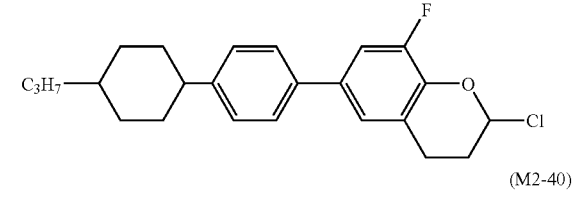
(M2-40)
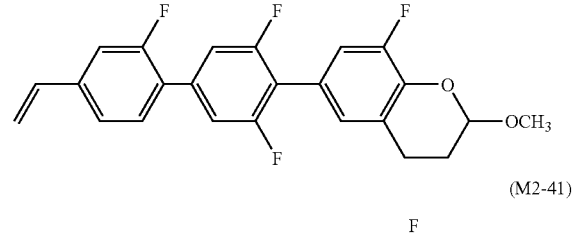
(M2-41)
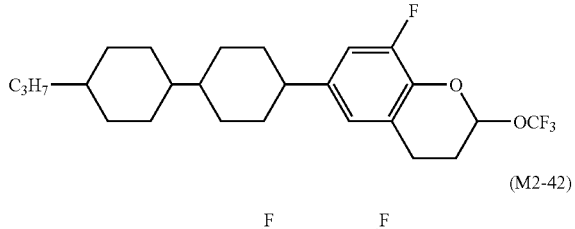
(M2-42)
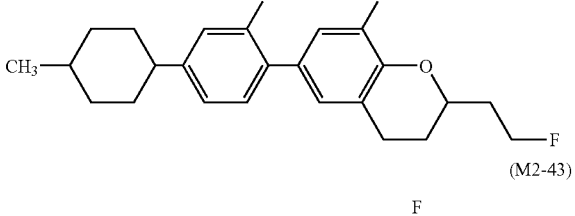
(M2-43)
(M2-44)
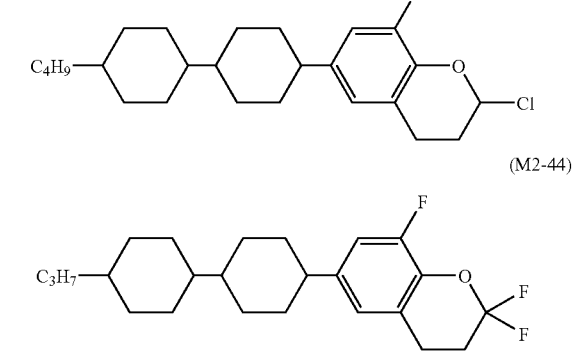

-continued
(M2-45)
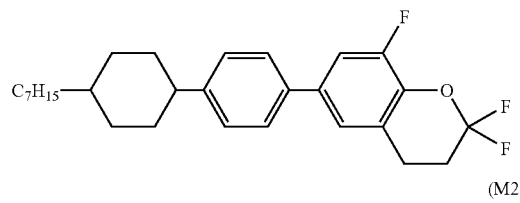
(M2-46)
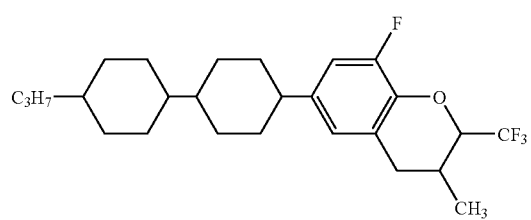
(M2-47)
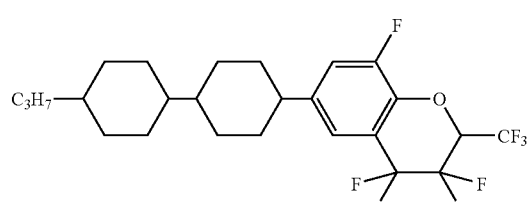
(M2-48)
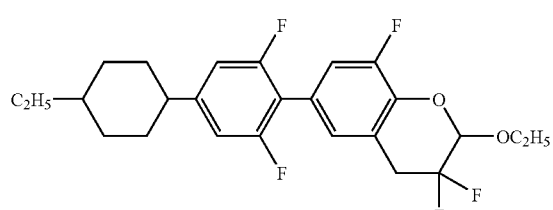
(M2-49)
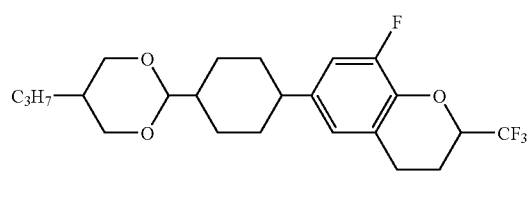
(M2-50)
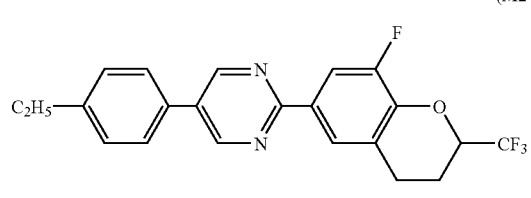
(M2-51)
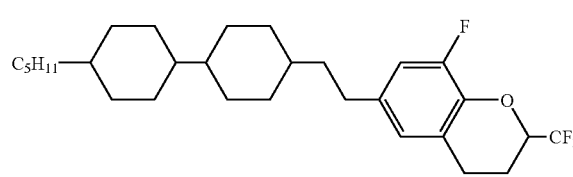
-continued
(M2-52)
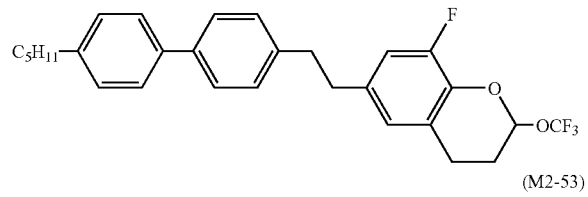
(M2-53)
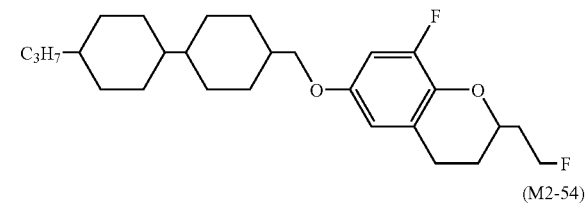
(M2-54)
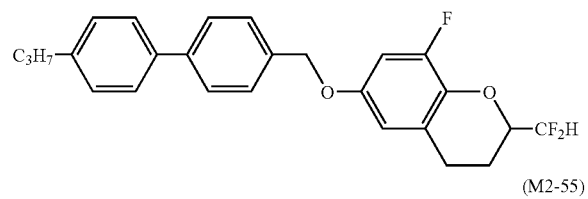
(M2-55)
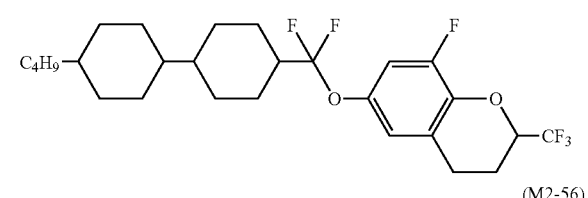
(M2-56)
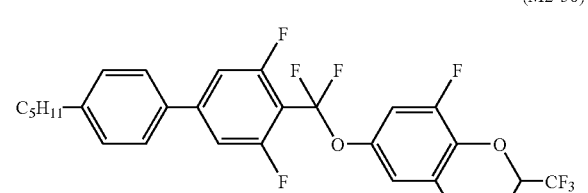
(M2-57)
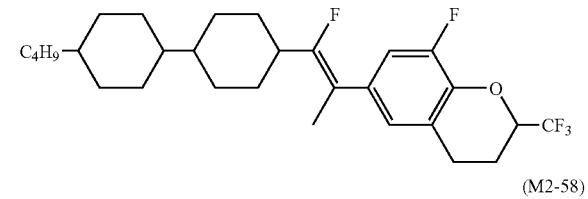
(M2-58)
(M2-59)
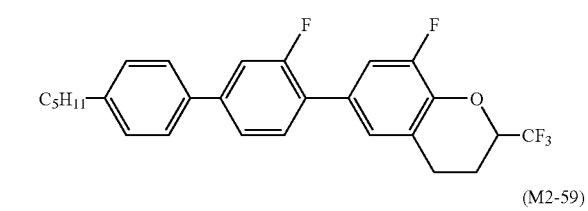

-continued
(M3-01)
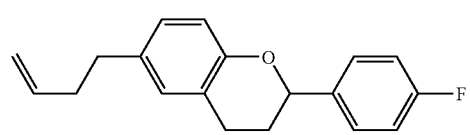
(M3-02)
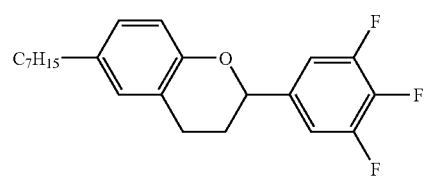
(M3-03)
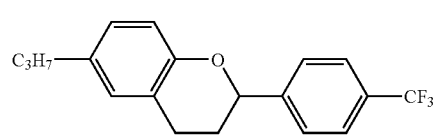
(M3-04)
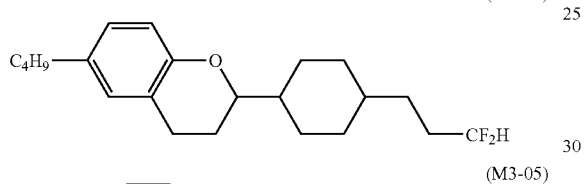
(M3-05)
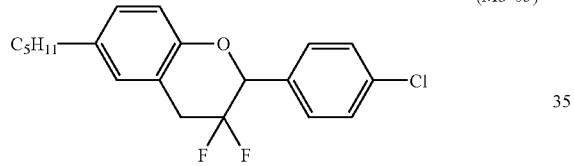
(M3-06)
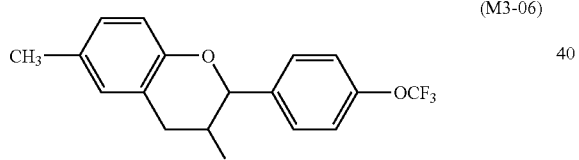
(M3-07)
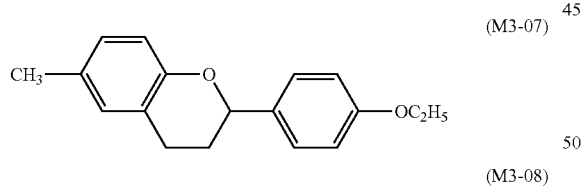
(M3-08)
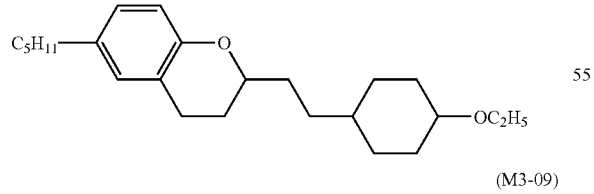
(M3-09)
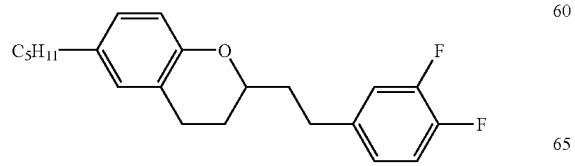
-continued
(M3-10)
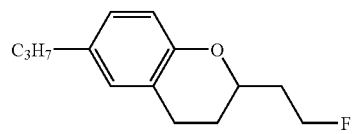
(M3-11)
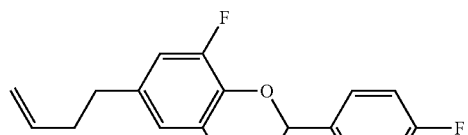
(M3-12)
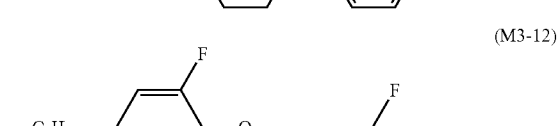
(M3-13)
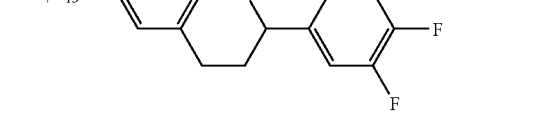
(M3-14)
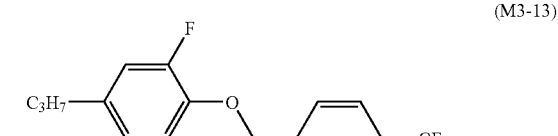
(M3-15)
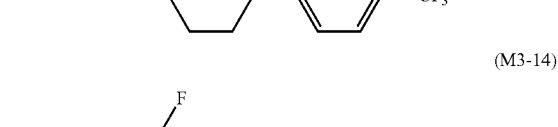
(M3-16)
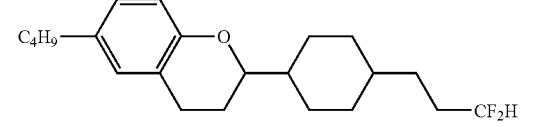
(M3-17)
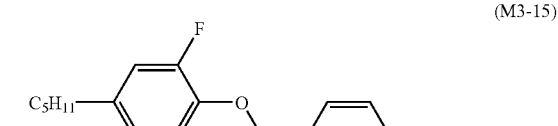

-continued
(M3-18)
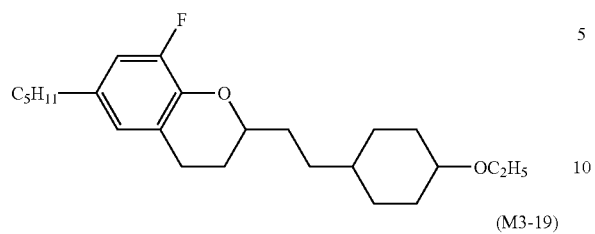
(M3-19)
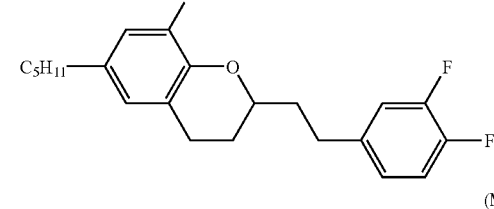
(M3-20)
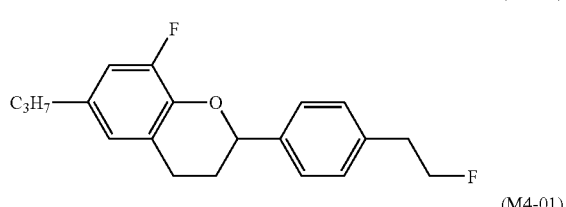
(M4-01)
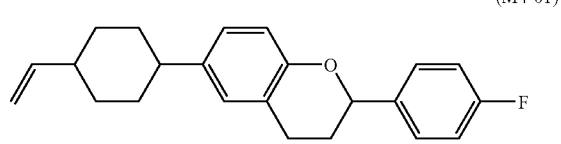
(M4-02)
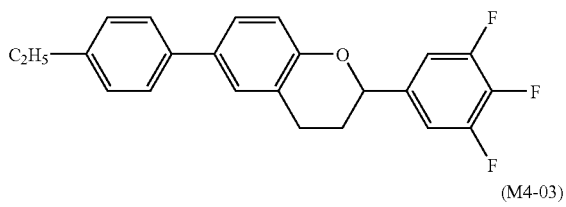
(M4-03)
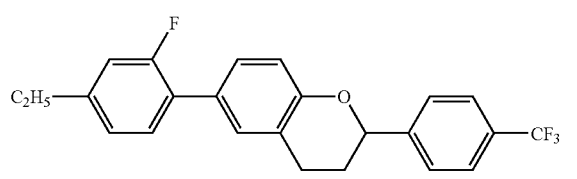
(M4-04)
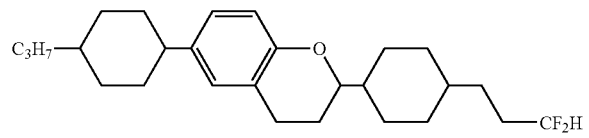
(M4-05)
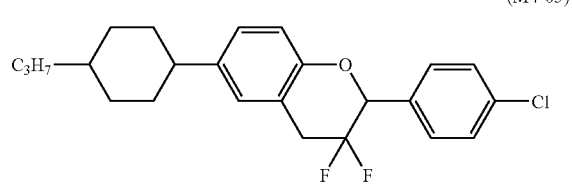
-continued
(M4-06)
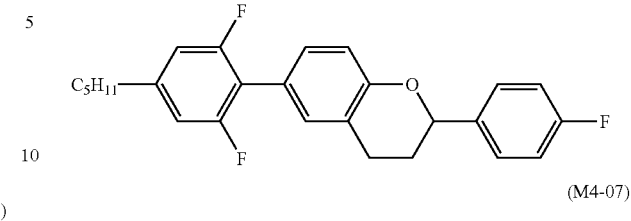
(M4-07)
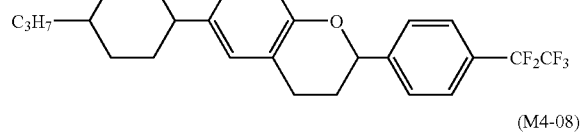
(M4-08)
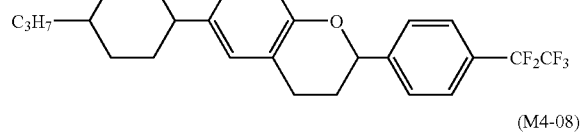
(M4-09)
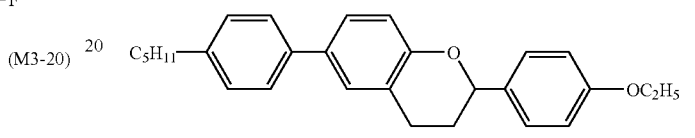
(M4-10)
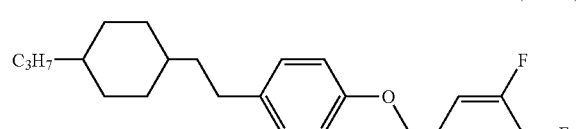
(M4-11)
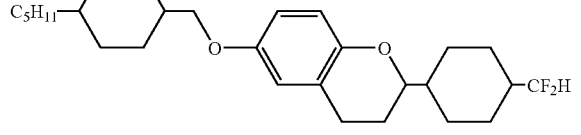
(M4-12)
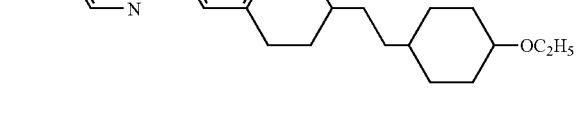
(M4-13)
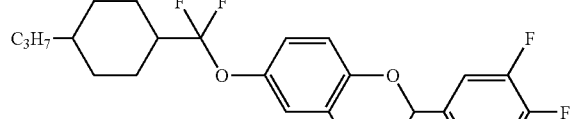

(M4-14)
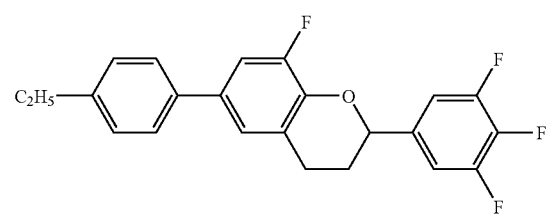
(M4-15)
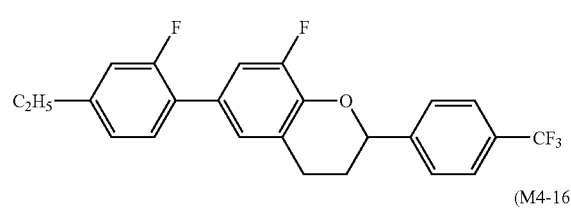
(M4-16)
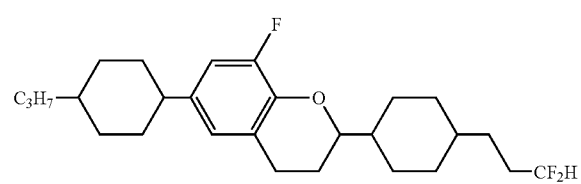
(M4-17)
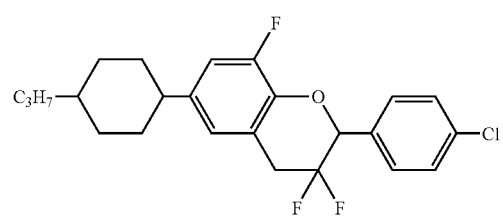
(M4-18)
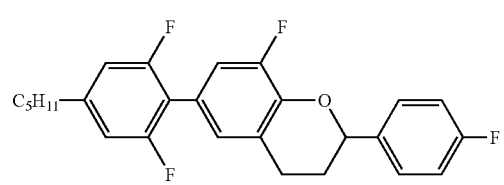
(M4-19)
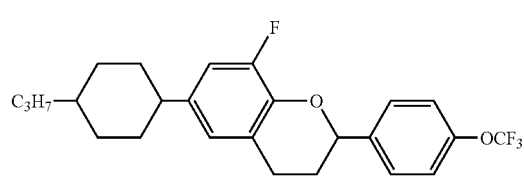
(M4-20)
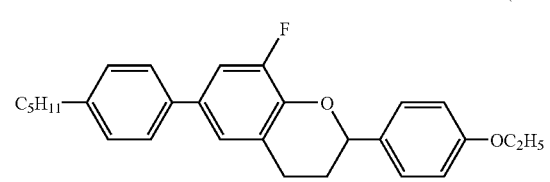
(M4-21)
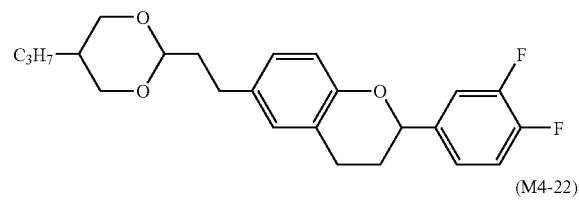
(M4-22)
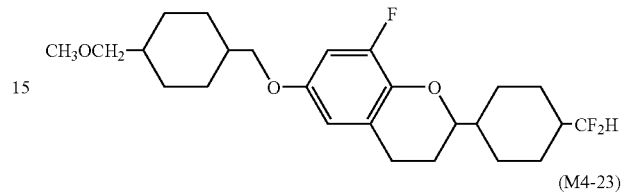
(M4-23)
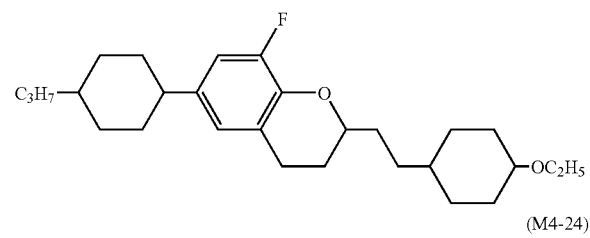
(M4-24)
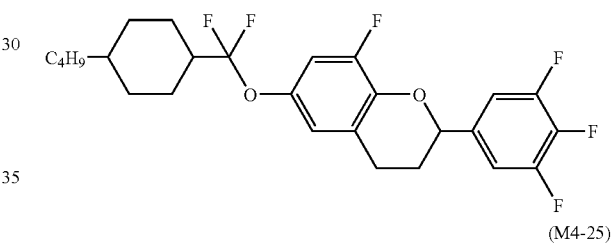
(M4-25)
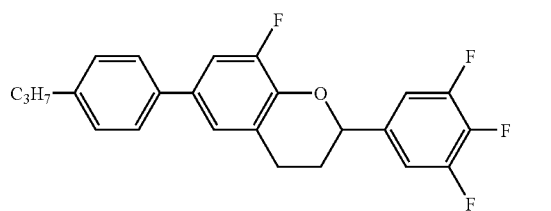
(M5-01)
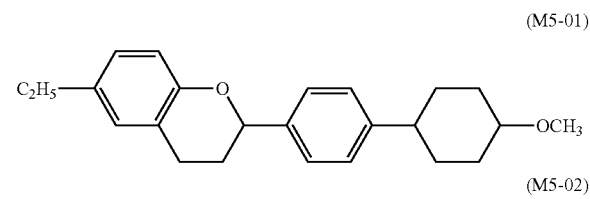
(M5-02)
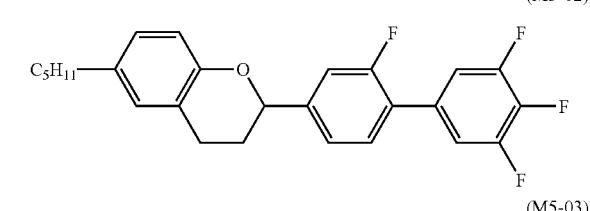
(M5-03)
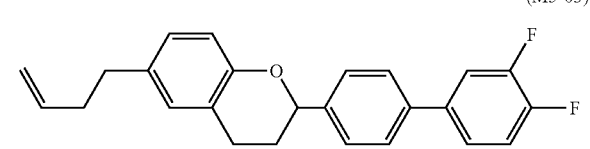

-continued (M5-04)

(M5-05)

(M5-06)

(M5-07)

(M5-08)

(M5-09)

(M5-10)

(M5-11)

(M5-12)

(M5-13)

(M5-14)

(M5-15)

(M5-16)

(M5-17)

(M5-18)

(M5-19)
(M5-20)
(M6-01)
(M6-02)
(M6-03)
(M6-04)
(M6-05)
(M6-06)
(M6-07)
(M6-08)
(M6-09)
(M6-10)
(M6-11)
(M6-12)
(M6-13)
(M6-14)
(M6-15)
(M6-16)
(M6-17)

-continued
(M6-18)
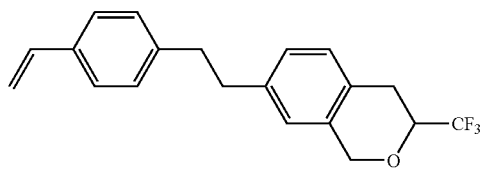
(M6-19)
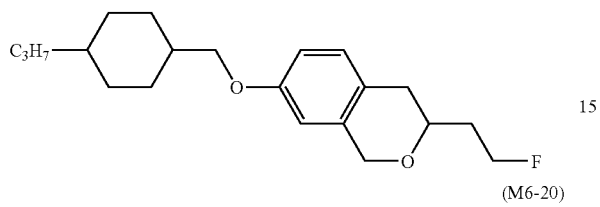
(M6-20)
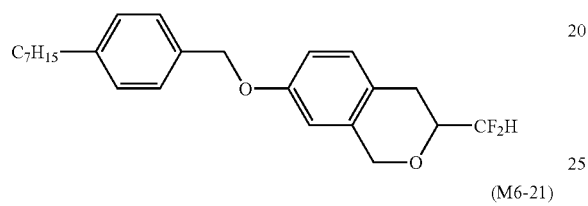
(M6-21)
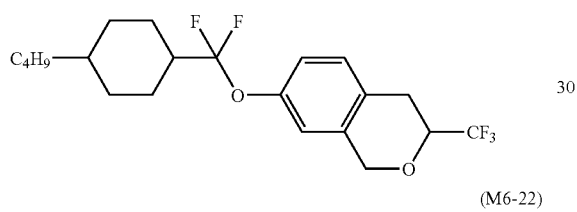
(M6-22)
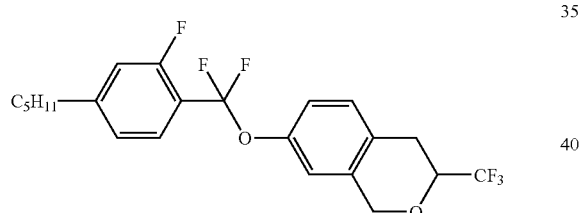
(M6-31)
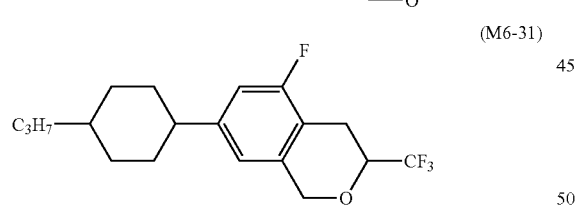
(M6-32)
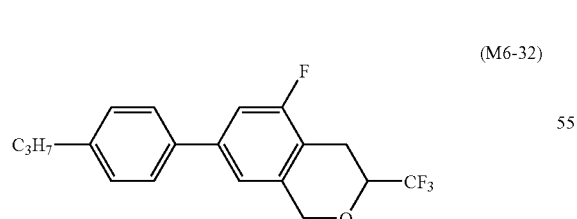
(M6-33)
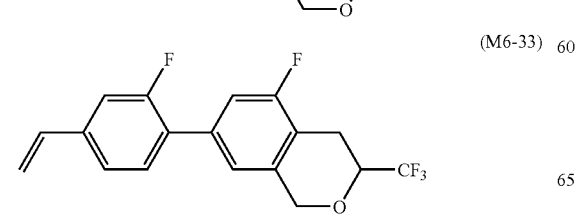
-continued
(M6-34)
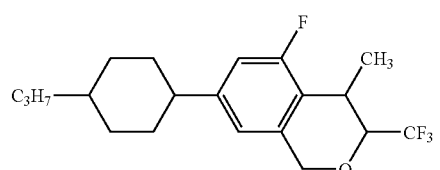
(M6-35)
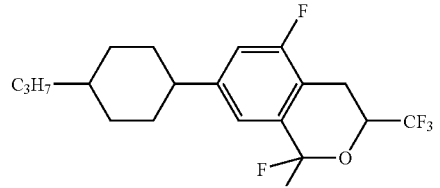
(M6-36)
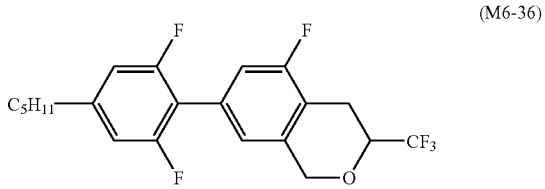
(M6-37)
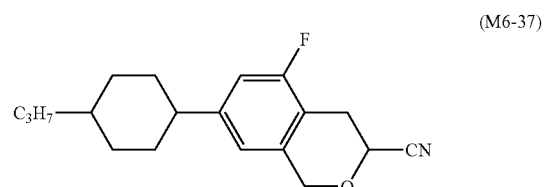
(M6-38)
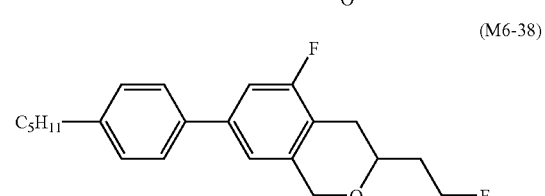
(M6-39)
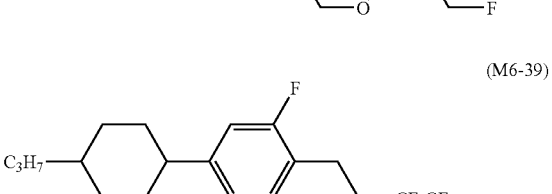
(M6-40)
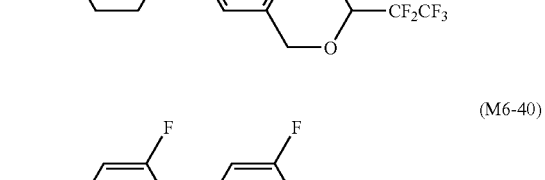
(M6-41)
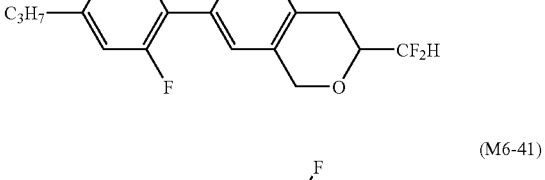

-continued
(M6-42) 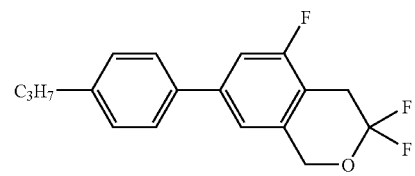
(M6-43)
(M6-44)
(M6-45)
(M6-46)
(M6-47)
(M6-48)
(M6-49)
-continued
(M6-50) 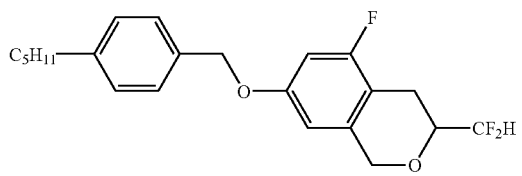
(M6-51) 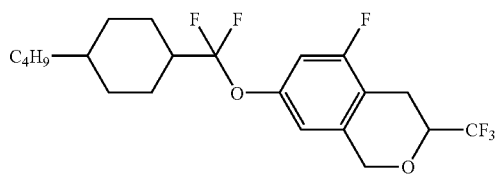
(M6-52) 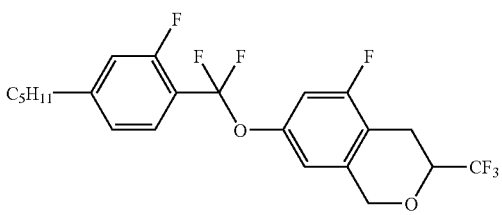
(M7-01) 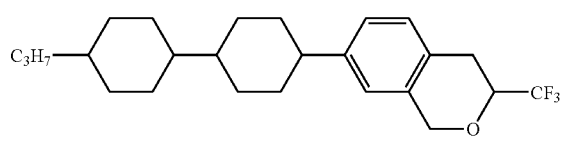
(M7-02) 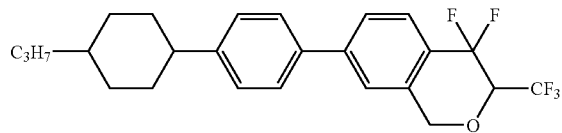
(M7-03) 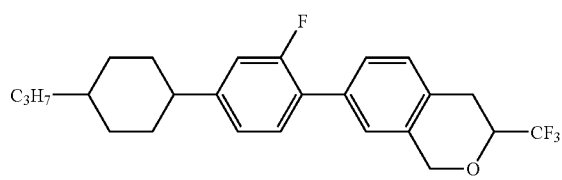
(M7-04) 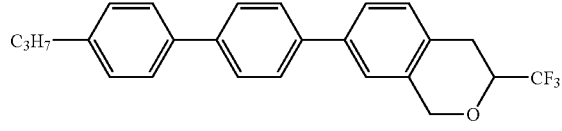
(M7-05) 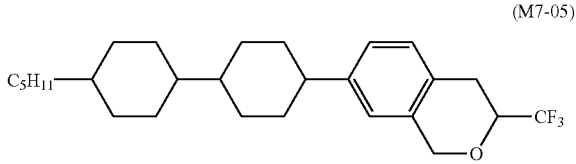

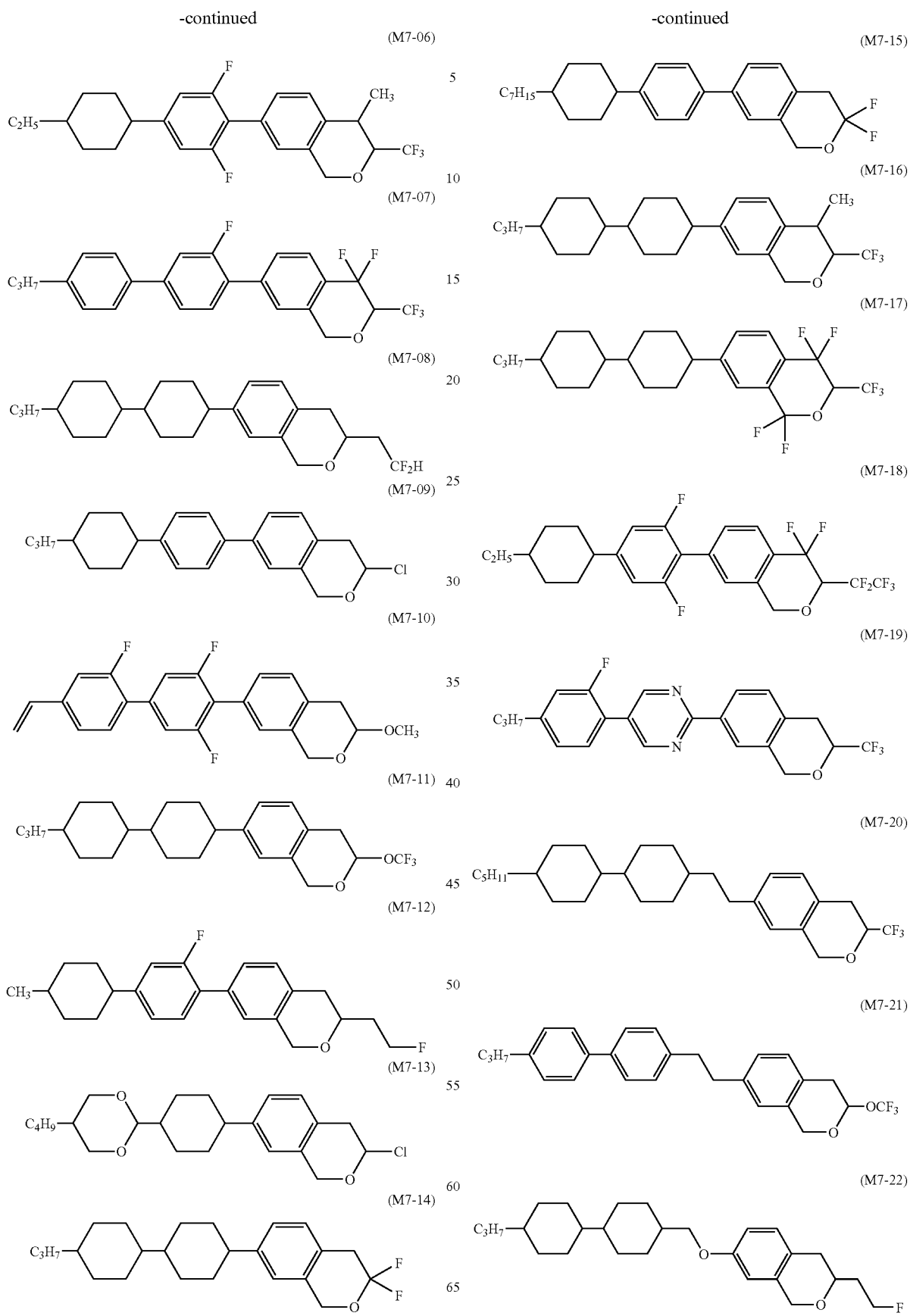

-continued
(M7-23)
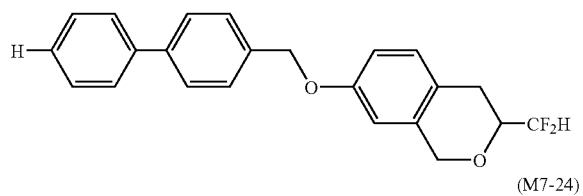
(M7-24)
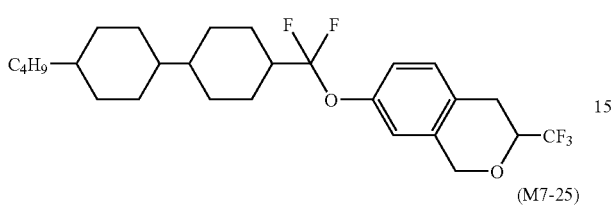
(M7-25)
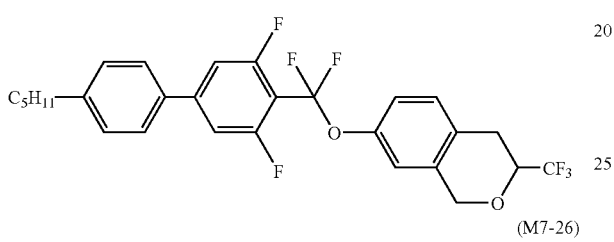
(M7-26)
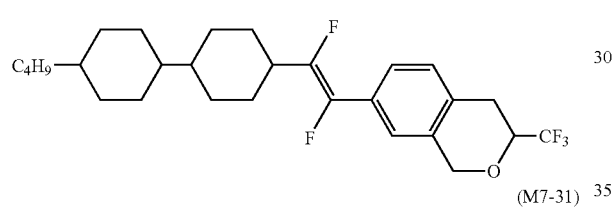
(M7-31)
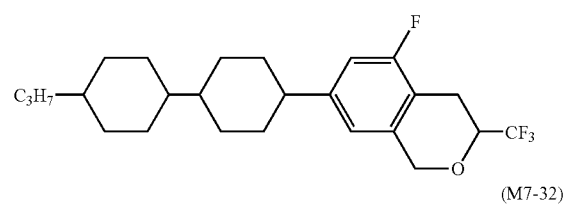
(M7-32)
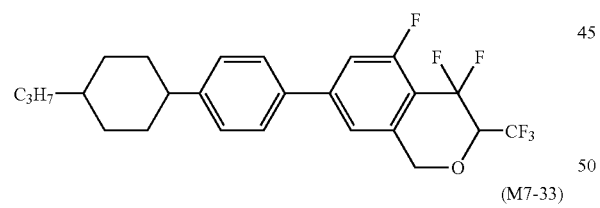
(M7-33)
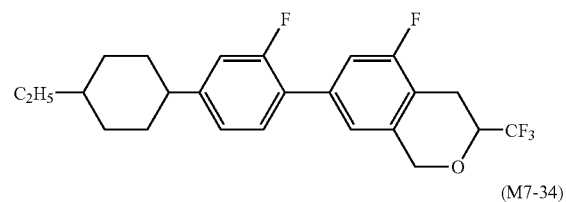
(M7-34)
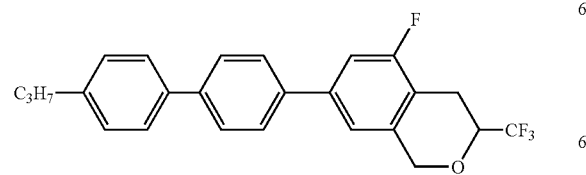
-continued
(M7-35)
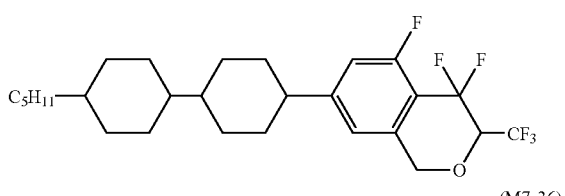
(M7-36)
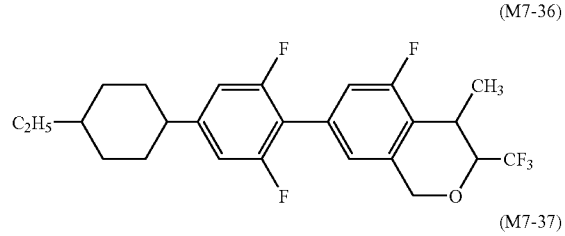
(M7-37)
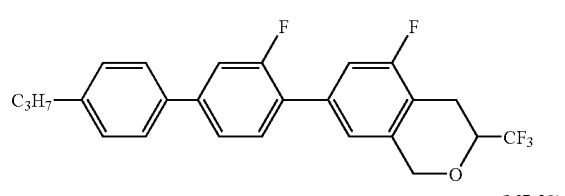
(M7-38)
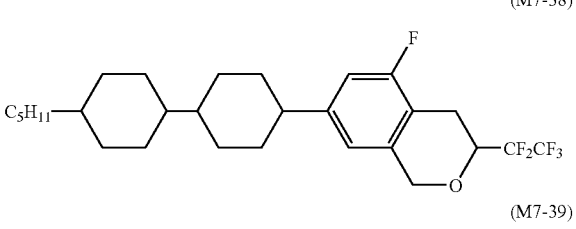
(M7-39)
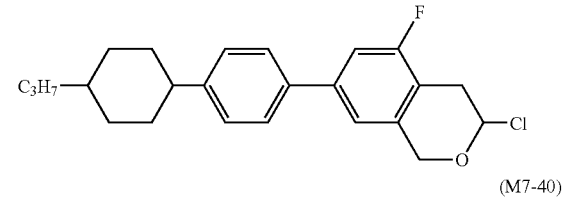
(M7-40)
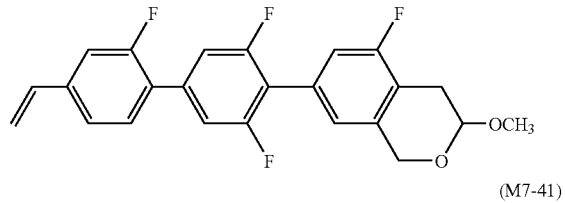
(M7-41)
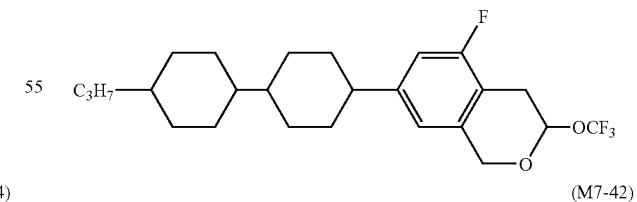
(M7-42)
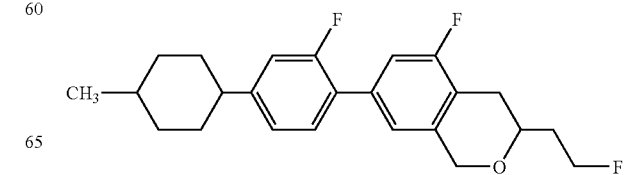

-continued
(M7-43)
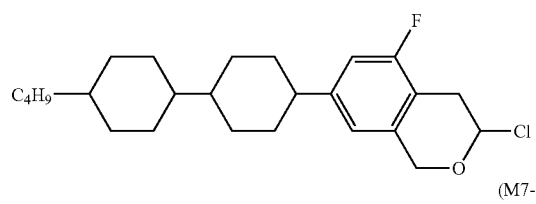
(M7-44)
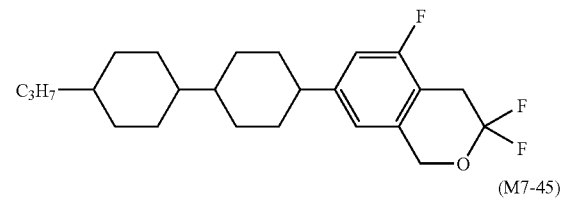
(M7-45)
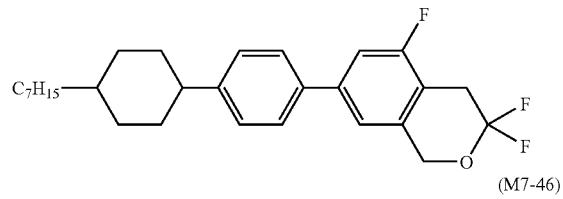
(M7-46)
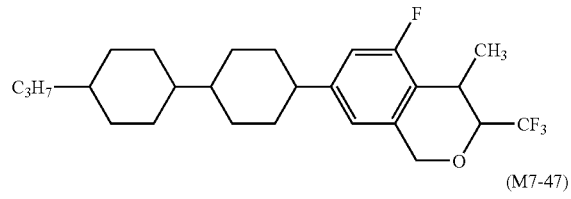
(M7-47)
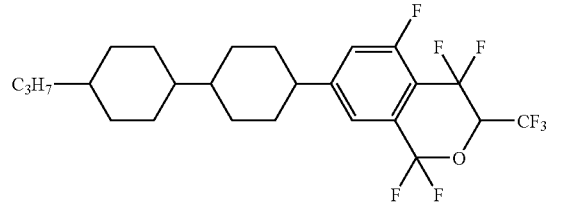
(M7-48)
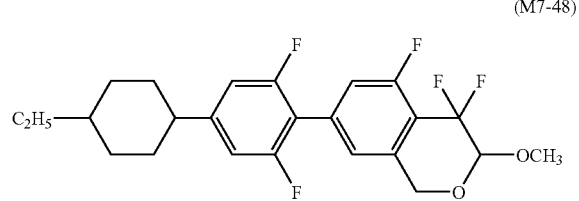
(M7-49)
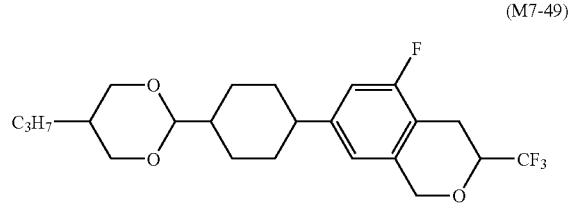
(M7-50)
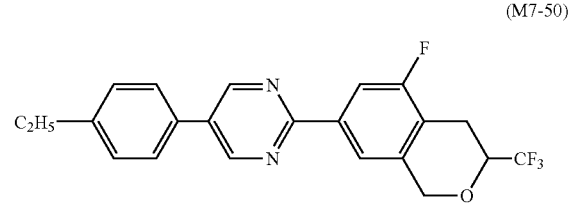
-continued
(M7-51)
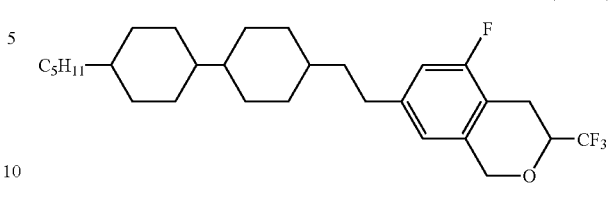
(M7-52)
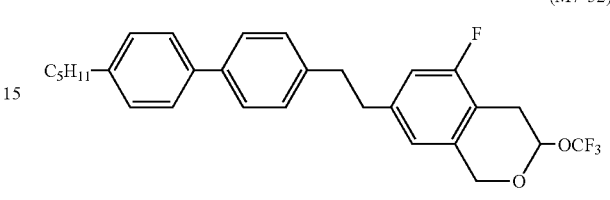
(M7-53)
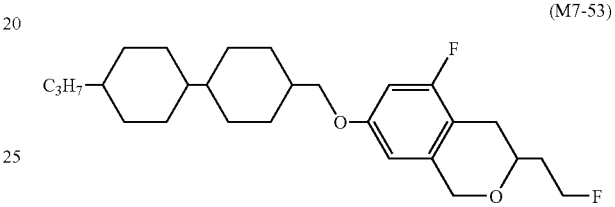
(M7-54)
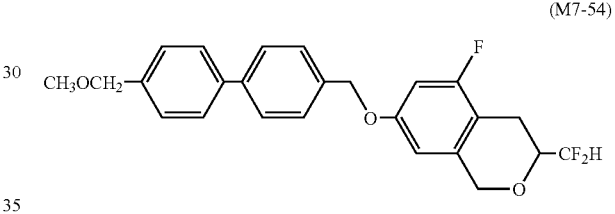
(M7-55)
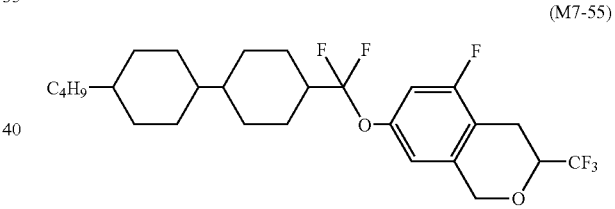
(M7-56)
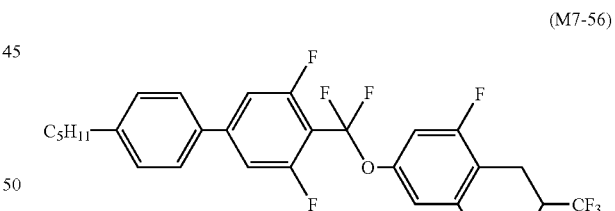
(M7-57)
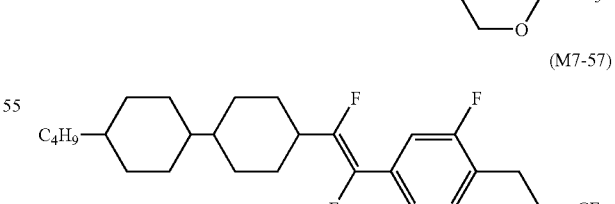
(M8-01)
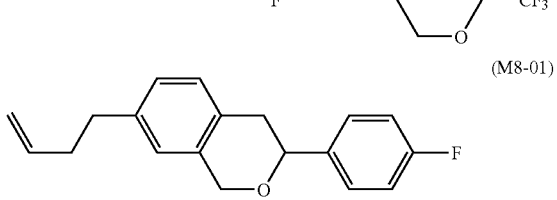

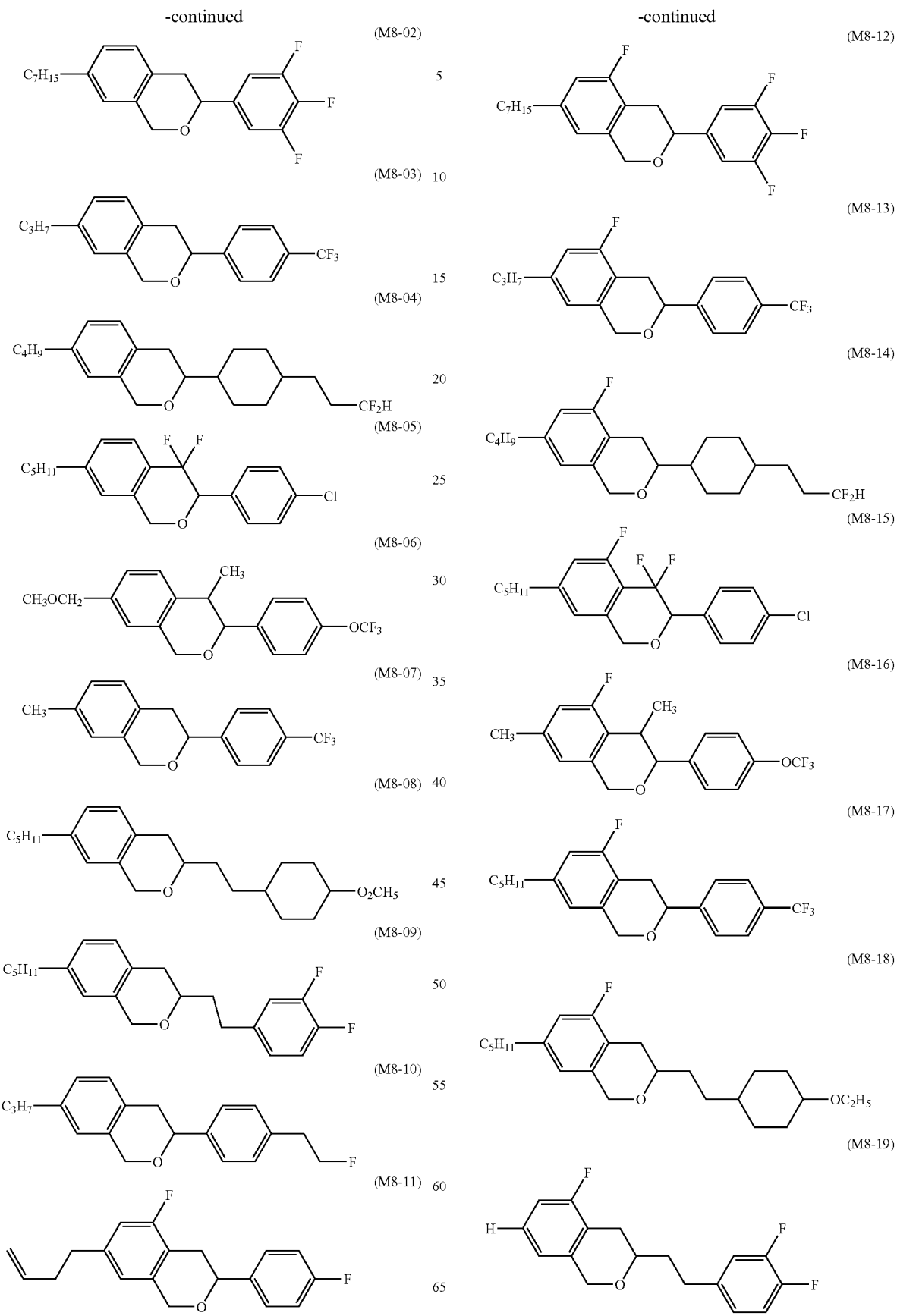

-continued (M8-20)

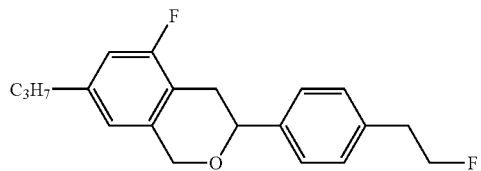

Example 10

The following compounds were mixed to prepare the composition A (mother liquid crystal) having a nematic phase.
4-(4-Propylcyclohexyl)benzonitrile (24%)
4-(4-Pentylcyclohexyl)benzonitrile (36%)
4-(4-Heptylcyclohexyl)benzonitrile (25%)
4-(4-Pentylcyclohexyl)-4'-cyanobenzonitrile (15%)

Physical properties of composition A were as follows.
Upper limit temperature (NI)=71.7° C.
Optical anisotropy ($\Delta n$)=0.137
Dielectric anisotropy ($\Delta \epsilon$)=11.0

Composition B comprising 90 wt % of the composition A and 10 wt % of the compound (M2-03) obtained in Example 2 was prepared.

Physical properties of the compound (M2-03) were determined by extrapolation from those of the composition B.
Optical anisotropy ($\Delta n$): 0.127
Dielectric anisotropy ($\Delta \epsilon$): 9.6

Example 11

Composition C comprising 90 wt % of the composition A and 10 wt % of the compound (M9-14) obtained in Example 4 was prepared. Physical properties of the compound (M9-14) were determined by extrapolation from those of the composition C.

Optical anisotropy ($\Delta n$): 0.154
Dielectric anisotropy ($\Delta \epsilon$): 18.8

Example 12

Composition D comprising 90 wt % of the composition A and 10 wt % of the compound (M12-02) obtained in Example 5 was prepared. Physical properties of the compound (M12-02) were determined by extrapolation from those of the composition D.
Optical anisotropy ($\Delta n$): 0.128
Dielectric anisotropy ($\Delta \epsilon$): 8.5

Example 13

Composition E comprising 95 wt % of the composition A and 5 wt % of the compound (M2-27) obtained in Example 7 was prepared. Physical properties of the compound (M2-27) were determined by extrapolation from those of the composition D.
Optical anisotropy ($\Delta n$): 0.197
Dielectric anisotropy ($\Delta \epsilon$): 21.7

Example 14

Composition F comprising 85 wt % of the composition A and 15 wt % of the compound (M4-25) obtained in Example 8 was prepared. Physical properties of the compound (M4-25) were determined by extrapolation from those of the composition D.
Optical anisotropy ($\Delta n$): 0.124
Dielectric anisotropy ($\Delta \epsilon$): 17.7

Representative compositions of the present invention are summarized in Application Examples 1 to 13. Each component and content (wt %) of the compositions are given. The component compound is represented by the symbols of left terminal group, bonding group, ring structure and right terminal group, as defined in Table 1 below. 1,4-Cyclohexylene and 1,3-dioxane-2,5-diyl have trans steric arrangement. When there is no symbol for the terminal group, the terminal group is hydrogen. Physical properties of the compositions are also presented.

TABLE 1

Symbolic representation of compounds
R-(A1)-Z1 - - - Zn-(An)-X

| 1) Left terminal group R- | Symbol |
|---|---|
| $C_nH_{2n+1}$— | n- |
| $C_nH_{2n+1}OC_mH_{2m}$— | nOm- |
| $CH_2=CH$— | V— |
| $C_nH_{2n+1}CH=CH$— | nV— |
| $CH_2=CHC_nH_{2n}$— | Vn- |
| $C_nH_{2n+1}CH=CHC_mH_{2m}$— | nVm- |
| $CF_2=CH$— | VFF- |
| $CF_2=CHC_nH_{2n}$— | VFFn- |

TABLE 1-continued
Symbolic representation of compounds
R-(A1)-Z1 - - - Zn-(An)-X
2) Ring structure -An-
| Structure | Symbol |
|---|---|
|  | B |
| 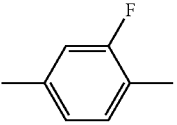 | B(F) |
| 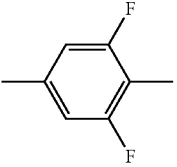 | B(F,F) |
| 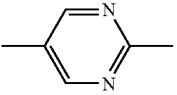 | Py |
|  | H |
| 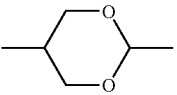 | G |
| 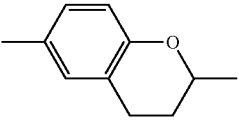 | Cro1 |
| 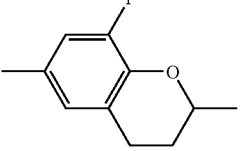 | Cro1(BF) |
| 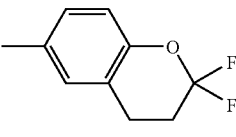 | Cro1(F2) |
| 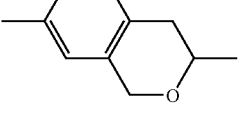 | Cro2 |
| 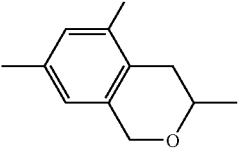 | Cro2(5F) |

TABLE 1-continued

Symbolic representation of compounds
R-(A1)-Z1 - - - Zn-(An)-X

| Structure | Symbol |
|---|---|
| | Cro2(F2) |
| | Cro3 |
| | Cro3(5F) |
| | Cro3(F2) |

| 3) Bonding group —Zn— | Symbol |
|---|---|
| —C$_2$H$_4$— | 2 |
| —C$_4$H$_8$— | 4 |
| —CH═CH— | V |
| —COO— | E |
| —C≡C— | T |
| —CF$_2$O— | X |

| 4) Right terminal group -X | Symbol |
|---|---|
| —F | —F |
| —Cl | —CL |
| —CN | —C |
| —OCF$_2$H | —OCF2H |
| —OCF$_3$ | —OCF3 |
| —CF$_3$ | —CF3 |
| —C$_n$H$_{2n+1}$ | -n |
| —OC$_n$H$_{2n+1}$ | —On |
| —CH═CH$_2$ | —V |
| —C$_n$H$_{2n}$CH═CH$_2$ | -nV |
| —C$_n$H$_{2n}$CH═CHC$_m$H$_{2m+1}$ | -nVm |
| —CH═CF$_2$ | -VFF |
| —COOCH$_3$ | -Eme |
| —C$_n$H$_{2n}$CF$_2$H | -nCF2H |

5) Examples of expression

Example 1 2-BEB(F)-C

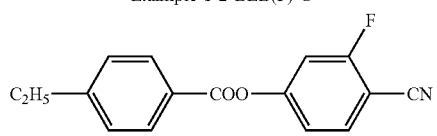

Example 2 1O1-HBBH-5

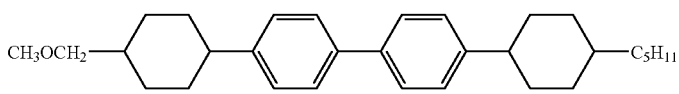

Example 3 3-HBCro1-CF3

TABLE 1-continued

Symbolic representation of compounds
R-(A1)-Z1 - - - Zn-(An)-X

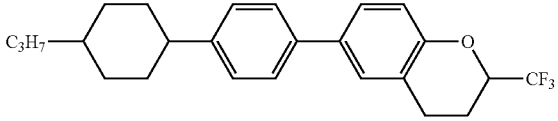

Application Example 1

| | |
|---|---|
| 3-HBCro1-CF3 | 4% |
| 2-HB(F)Cro1-CF3 | 4% |
| 2-BEB(F)-C | 5% |
| 3-BEB(F)-C | 4% |
| 4-BEB(F)-C | 12% |
| 1V2-BEB(F, F)-C | 16% |
| 3-HB-O2 | 10% |
| 3-HH-4 | 3% |
| 3-HHB-F | 3% |
| 3-HHB-1 | 8% |
| 3-HHB-O1 | 3% |
| 3-HBEB-F | 3% |
| 3-HHEB-F | 4% |
| 5-HHEB-F | 4% |
| 3-H2BTB-2 | 4% |
| 3-H2BTB-3 | 4% |
| 3-H2BTB-4 | 4% |
| 3-HB(F)TB-2 | 5% |

NI: 84.4° C.
Δn: 0.147
Δε: 28.2
$V_{th}$: 1.06 V.

Application Example 2

| | |
|---|---|
| 3-HHCro1-CF3 | 5% |
| 3-HHCro1(8F)-CF3 | 4% |
| 2-HB-C | 5% |
| 3-HB-C | 12% |
| 3-HB-O2 | 15% |
| 2-BTB-1 | 3% |
| 3-HHB-F | 4% |
| 3-HHB-1 | 8% |
| 3-HHB-O1 | 5% |
| 3-HHB-3 | 10% |
| 3-HHEB-F | 4% |
| 5-HHEB-F | 4% |
| 2-HHB(F)-F | 5% |
| 3-HHB(F)-F | 5% |
| 5-HHB(F)-F | 6% |
| 3-HHB(F, F)-F | 5% |

Application Example 3

| | |
|---|---|
| 3-HBCro1(8F)-CF3 | 4% |
| 3-BBCro1-CF3 | 3% |
| 5-BB(F)Cro1(8F)-CF3 | 3% |
| 3-BEB(F)-C | 8% |
| 3-HB-C | 8% |

-continued

| | |
|---|---|
| V-HB-C | 8% |
| 1V-HB-C | 8% |
| 3-HB-O2 | 3% |
| 3-HH-2V | 14% |
| 3-HH-2V 1 | 7% |
| V2-HHB-1 | 5% |
| 3-HHB-1 | 5% |
| 3-HHEB-F | 7% |
| 3-H2BTB-2 | 6% |
| 3-H2BTB-3 | 6% |
| 3-H2BTB-4 | 5% |

Application Example 4

| | |
|---|---|
| 3-HBCro1-CL | 3% |
| 3-HHCro1(F2) | 3% |
| 5-BEB(F)-C | 5% |
| V-HB-C | 11% |
| 5-PyB-C | 6% |
| 4-BB-3 | 11% |
| 3-HH-2V | 10% |
| 5-HH-V | 11% |
| V-HHB-1 | 7% |
| V2-HHB-1 | 11% |
| 3-HHB-1 | 7% |
| 1V2-HBB-2 | 10% |
| 3-HHEBH-3 | 5% |

Application Example 5

| | |
|---|---|
| 3-HHCro2-CF3 | 5% |
| 3-HBCro2(5F)-CF3 | 4% |
| 1V2-BEB(F, F)-C | 6% |
| 3-HB-C | 18% |
| 2-BTB-1 | 10% |
| 5-HH-VFF | 30% |
| 3-HHB-1 | 3% |
| VFF-HHB-1 | 5% |
| VFF2-HHB-1 | 6% |
| 3-H2BTB-2 | 5% |
| 3-H2BTB-3 | 4% |
| 3-H2BTB-4 | 4% |

Application Example 6

| | |
|---|---|
| 3-HBCro1-CF3 | 5% |
| 2-HB(F)Cro1-CF3 | 5% |
| 5-HB-CL | 16% |
| 3-HH-4 | 12% |
| 3-HH-5 | 4% |
| 3-HHB-F | 4% |
| 3-HHB-CL | 3% |
| 4-HHB-CL | 4% |
| 3-HHB(F)-F | 6% |
| 4-HHB(F)-F | 6% |
| 5-HHB(F)-F | 6% |
| 7-HHB(F)-F | 6% |
| 5-HBB(F)-F | 6% |
| 101-HBBH-5 | 3% |
| 3-HHBB(F, F)-F | 2% |
| 4-HHBB(F, F)-F | 3% |
| 5-HHBB(F, F)-F | 3% |
| 3-HH2BB(F, F)-F | 3% |
| 4-HH2BB(F, F)-F | 3% |

NI: 113.6° C.
Δn: 0.099
Δε: 3.7
$V_{th}$: 2.73 V

When 0.25 wt % of Op-5 was added to 100 wt % of the composition, the pitch was 61.0 μm.

Application Example 7

| | |
|---|---|
| 3-BB(F)Cro2-CF3 | 3% |
| 3-HCro2(5F)-C | 5% |
| 3-HHB(F, F)-F | 9% |
| 3-H2HB(F, F)-F | 8% |
| 4-H2HB(F, F)-F | 8% |
| 5-H2HB(F, F)-F | 8% |
| 3-HBB(F, F)-F | 15% |
| 5-HBB(F, F)-F | 18% |
| 3-H2BB(F, F)-F | 10% |
| 5-HHBB(F, F)-F | 3% |
| 5-HHEBB-F | 3% |
| 3-HH2BB(F, F)-F | 2% |
| 101-HBBH-4 | 4% |
| 101-HBBH-5 | 4% |

Application Example 8

| | |
|---|---|
| 3-HBCro2-CL | 3% |
| 3-HHCro2-1CF2H | 2% |
| 5-HB-F | 12% |
| 6-HB-F | 9% |
| 7-HB-F | 7% |
| 2-HHB-OCF3 | 7% |
| 3-HHB-OCF3 | 7% |
| 4-HHB-OCF3 | 7% |
| 5-HHB-OCF3 | 5% |
| 3-HH2B-OCF3 | 4% |
| 5-HH2B-OCF3 | 4% |
| 3-HHB(F, F)-OCF2H | 4% |
| 3-HHB(F, F)-OCF3 | 5% |
| 3-HH2B(F)-F | 3% |
| 3-HBB(F)-F | 8% |
| 5-HBB(F)-F | 7% |

-continued

| | |
|---|---|
| 5-HBBH-3 | 3% |
| 3-HB(F)BH-3 | 3% |

Application Example 9

| | |
|---|---|
| 3-HHCro2(F2) | 3% |
| 2-BCro2B(F, F)-F | 4% |
| 3-HHCro3-CF3 | 3% |
| 5-HB-CL | 11% |
| 3-HH-4 | 8% |
| 3-HHB-1 | 5% |
| 3-HHB(F, F)-F | 8% |
| 3-HBB(F, F)-F | 15% |
| 5-HBB(F, F)-F | 10% |
| 3-HHEB(F, F)-F | 10% |
| 4-HHEB(F, F)-F | 3% |
| 5-HHEB(F, F)-F | 3% |
| 2-HBEB(F, F)-F | 3% |
| 3-HBEB(F, F)-F | 5% |
| 5-HBEB(F, F)-F | 3% |
| 3-HHBB(F, F)-F | 6% |

Application Example 10

| | |
|---|---|
| 3-HHCro3(5F)-CF3 | 5% |
| 3-BB(F)Cro3-CF3 | 4% |
| 3-HB-CL | 6% |
| 5-HB-CL | 4% |
| 3-HHB-OCF3 | 5% |
| 3-H2HB-OCF3 | 5% |
| 5-H4HB-OCF3 | 15% |
| V-HHB(F)-F | 4% |
| 3-HHB(F)-F | 4% |
| 5-HHB(F)-F | 4% |
| 3-H4HB(F, F)-CF3 | 8% |
| 5-H4HB(F, F)-CF3 | 10% |
| 5-H2HB(F, F)-F | 5% |
| 5-H4HB(F, F)-F | 7% |
| 2-H2BB(F)-F | 3% |
| 3-H2BB(F)-F | 6% |
| 3-HBEB(F, F)-F | 5% |

Application Example 11

| | |
|---|---|
| 3-HCro3(5F)—C | 4% |
| 3-HBCro3—CL | 4% |
| 5-HB—CL | 14% |
| 7-HB(F, F)—F | 3% |
| 3-HH-4 | 10% |
| 3-HH-5 | 5% |
| 3-HB—O2 | 10% |
| 3-HHB-1 | 8% |
| 3-HHB—O1 | 5% |
| 2-HHB(F)—F | 7% |
| 3-HHB(F)—F | 7% |
| 5-HHB(F)—F | 7% |
| 3-HHB(F, F)—F | 6% |
| 3-H2HB(F, F)—F | 5% |
| 4-H2HB(F, F)—F | 5% |

Application Example 12

| | |
|---|---|
| 3-HHCro3-1CF2H | 7% |
| 3-HHCro3(F2) | 3% |
| 5-HB—CL | 3% |
| 7-HB(F)—F | 7% |
| 3-HH-4 | 9% |
| 3-HH—EMe | 15% |
| 3-HHEB—F | 7% |
| 5-HHEB—F | 7% |
| 3-HHEB(F, F)—F | 10% |
| 4-HHEB(F, F)—F | 5% |
| 4-HGB(F, F)—F | 5% |
| 5-HGB(F, F)—F | 6% |
| 2-H2GB(F, F)—F | 4% |
| 3-H2GB(F, F)—F | 5% |
| 5-GHB(F, F)—F | 7% |

Application Example 13

| | |
|---|---|
| 2-BCro3(5F)B(F, F)—F | 5% |
| 3-HH-4 | 8% |
| 3-HHB-1 | 6% |
| 3-HHB(F, F)—F | 10% |
| 3-H2HB(F, F)—F | 9% |
| 3-HBB(F, F)—F | 15% |
| 3-BB(F, F)XB(F, F)—F | 30% |
| 101-HBBH-5 | 7% |
| 2-HHBB(F, F)—F | 3% |
| 3-HHBB(F, F)—F | 3% |
| 3-HH2BB(F, F)—F | 4% |

INDUSTRIAL APPLICABILITY

The compounds of the present invention have superior stability against heat, light, etc., adequate optical anisotropy, adequate dielectric anisotropy and superior compatibility with other liquid crystal compounds. The liquid crystal composition of the present invention, which comprises at least one of the compounds, has low lower limit temperature of the nematic phase, low viscosity, adequate optical anisotropy and low threshold voltage. The liquid crystal device of the invention, which comprises the composition, has broad available temperature range, short response time, large contrast ratio and small driving voltage.

While the present invention has been described in detail with reference to the preferred embodiments, those skilled in the art will appreciate that various modifications and substitutions can be made thereto without departing from the spirit and scope of the invention as set forth in the appended claims.

What is claimed is:

1. A compound represented by formula (1):

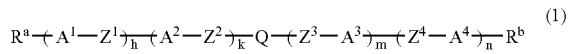

where $R^a$ is hydrogen or $C_1$-$C_{20}$ alkyl (any —$CH_2$— of which may be replaced by —O—, —CH=CH— or —C≡C—); $R^b$ is halogen, —CN, $C_1$-$C_{20}$ alkyl (at least one hydrogen of which is replaced by halogen), $C_2$-$C_{20}$ alkenyl (at least one hydrogen of which may be replaced by halogen), or $C_1$-$C_{20}$ alkoxy (at least one hydrogen of which may be replaced by halogen); each of $A^1$, $A^2$, $A^3$ and $A^4$ is independently 1,4-cyclohexylene, 1,4-cyclohexenylene, or 1,4-phenylene (any —$CH_2$— of which may be replaced by —O— or —S—, any —CH= of which may be replaced by —N= and any hydrogen of which may be replaced by halogen, methyl or —$CF_3$); each of $Z^1$, $Z^2$, $Z^3$ and $Z^4$ is independently a single bond, or $C_1$-$C_4$ alkylene (any —$CH_2$— of which may be replaced by —O—, —S—, —CH=CH—, —CF=CF— or —C≡C— and any hydrogen of $C_1$-$C_4$ alkylene may be replaced by halogen); each of h, k, m and n is independently 0, 1 or 2, the sum of h, k, m and n being 1, 2 or 3; and Q is any one of the groups represented by formulas (q1), (q2) and (q3):

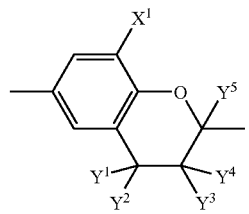
(q1)

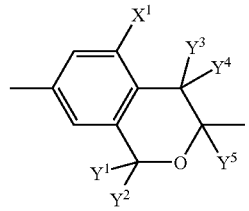
(q2)

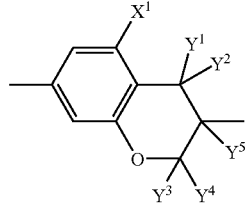
(q3)

where $X^1$ is hydrogen or halogen; and each of $Y^1$, $Y^2$, $Y^3$, $Y^4$ and $Y^5$ is independently hydrogen, halogen or methyl.

2. The compound according to claim 1, wherein Q is the group represented by formula (q1), $X^1$ is hydrogen and each of $Y^1$, $Y^2$, $Y^3$, $Y^4$ and $Y^5$ is independently hydrogen or fluorine.

3. The compound according to claim 1, wherein Q is the group represented by formula (q1), $X^1$ is fluorine and each of $Y^1$, $Y^2$, $Y^3$, $Y^4$ and $Y^5$ is independently hydrogen or fluorine.

4. The compound according to claim 1, wherein Q is the group represented by formula (q2), $X^1$ is hydrogen or fluorine and each of $Y^1$, $Y^2$, $Y^3$, $Y^4$ and $Y^5$ is independently hydrogen or fluorine.

5. The compound according to claim 1, wherein Q is the group represented by formula (q3), $X^1$ is hydrogen or fluorine and each of $Y^1$, $Y^2$, $Y^3$, $Y^4$ and $Y^5$ is independently hydrogen or fluorine.

6. A compound represented by any one of formulas (1-1) to (1-5):

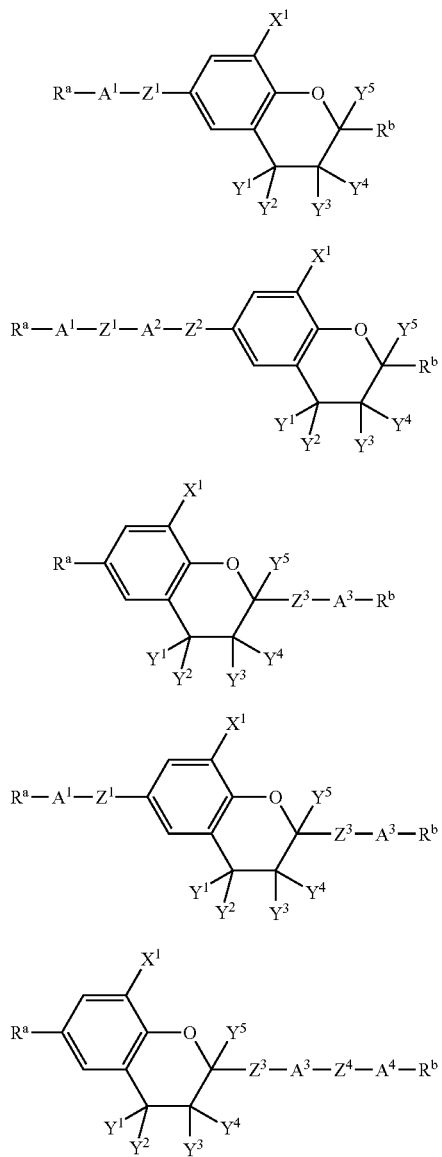

where $R^a$ is hydrogen, $C_1$-$C_{10}$ alkyl, $C_1$-$C_{10}$ alkoxy or $C_2$-$C_{10}$ alkenyl; $R^b$ is halogen, —CN, $C_1$-$C_{10}$ alkyl (at least one hydrogen of which is replaced by halogen), $C_2$-$C_{10}$ alkenyl (at least one hydrogen of which may be replaced by halogen), or $C_1$-$C_{10}$ alkoxy (at least one hydrogen of which may be replaced by halogen); each of $A^1$, $A^2$, $A^3$ and $A^4$ is independently 1,4-cyclohexylene, 1,3-dioxane-2,5-diyl, pyrimidine-2,5-diyl or 1,4-phenylene (any hydrogen of which may be replaced by fluorine); each of $Z^1$, $Z^2$, $Z^3$ and $Z^4$ is independently a single bond, —CH$_2$CH$_2$—, —CH$_2$O—, —OCH$_2$—, —CF$_2$CH$_2$—, —CH$_2$CF$_2$—, —CF$_2$O— or —OCF$_2$—; $X^1$ is hydrogen or fluorine; and each of $Y^1$, $Y^2$, $Y^3$, $Y^4$ and $Y^5$ is independently hydrogen, halogen or methyl.

7. The compound according to claim 6, wherein $X^1$ is fluorine.

8. The compound according to claim 6, wherein $X^1$ is fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —CH$_2$CH$_2$—; each of $Y^1$, $Y^2$, $Y^3$ and $Y^4$ is independently hydrogen, fluorine or methyl; and $Y^5$ is hydrogen.

9. The compound according to claim 6, wherein $X^1$ is fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —CH$_2$CH$_2$—; each of $Y^1$, $Y^2$, $Y^3$ and $Y^4$ is hydrogen; and $Y^5$ is fluorine or chlorine.

10. The compound according to claim 6, wherein $X^1$ is fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; each of $Y^1$, $Y^2$, $Y^3$ and $Y^4$ is independently hydrogen, fluorine or methyl; and $Y^5$ is hydrogen.

11. The compound according to claim 6, wherein $X^1$ is fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; and each of $Y^1$, $Y^2$, $Y^3$, $Y^4$ and $Y^5$ is hydrogen.

12. The compound according to claim 6, wherein $X^1$ is hydrogen.

13. The compound according to claim 6, wherein $X^1$ is hydrogen; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —CH$_2$CH$_2$—; each of $Y^1$, $Y^2$, $Y^3$ and $Y^4$ is independently hydrogen, fluorine or methyl; and $Y^5$ is hydrogen.

14. The compound according to claim 6, wherein $X^1$ is hydrogen; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —CH$_2$CH$_2$—; each of $Y^1$, $Y^2$, $Y^3$ and $Y^4$ is hydrogen; and $Y^5$ is fluorine or chlorine.

15. The compound according to claim 6, wherein $X^1$ is hydrogen; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; each of $Y^1$, $Y^2$, $Y^3$ and $Y^4$ is independently hydrogen, fluorine or methyl; and $Y^5$ is hydrogen.

16. The compound according to claim 6, wherein $X^1$ is hydrogen; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; and each of $Y^1$, $Y^2$, $Y^3$, $Y^4$ and $Y^5$ is hydrogen.

17. A compound represented by any one of formulas (1-6) to (1-10):

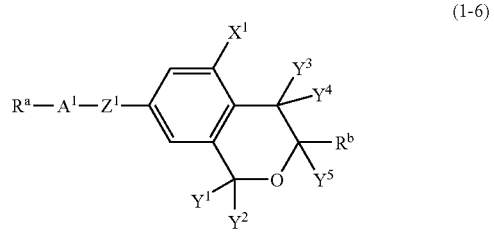
(1-6)

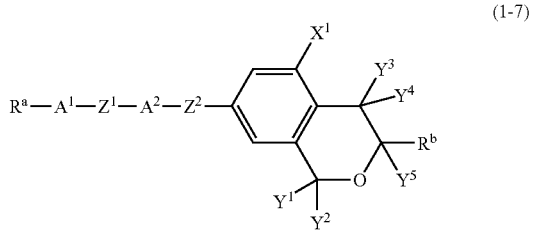
(1-7)

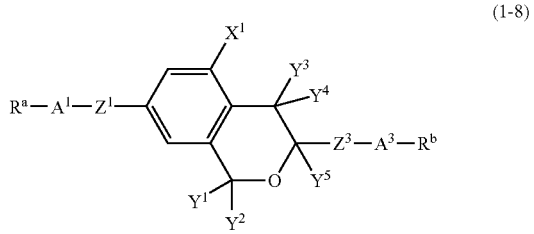
(1-8)

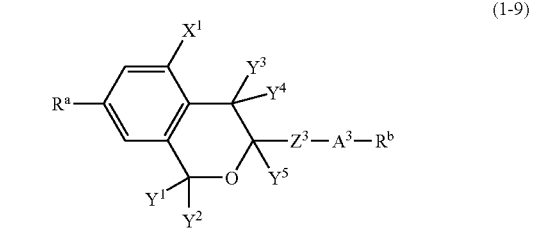
(1-9)

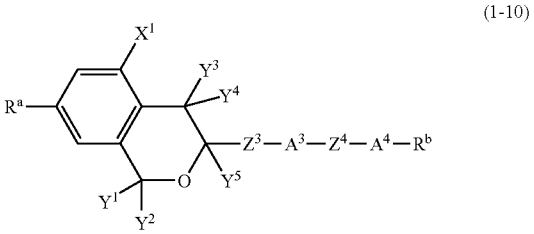
(1-10)

where $R^a$ is hydrogen, $C_1$-$C_{10}$ alkyl, $C_1$-$C_{10}$ alkoxy or $C_2$-$C_{10}$ alkenyl; $R^b$ is halogen, —CN, $C_1$-$C_{10}$ alkyl (at least one hydrogen of which is replaced by halogen), $C_1$-$C_{10}$ alkoxy (at least one hydrogen of which may be replaced by halogen), or $C_2$-$C_{10}$ alkenyl (at least one hydrogen of which may be replaced by halogen); each of $A^1$, $A^2$, $A^3$ and $A^4$ is independently 1,4-cyclohexylene, 1,3-dioxane-2,5-diyl, pyrimidine-2,5-diyl or 1,4-phenylene (any hydrogen of which may be replaced by fluorine); each of $Z^1$, $Z^2$, $Z^3$ and $Z^4$ is independently a single bond, —CH$_2$CH$_2$—, —CH$_2$O—, —OCH$_2$—, —CF$_2$CH$_2$—, —CH$_2$CF$_2$—, —CF$_2$O— or —OCF$_2$—; $X^1$ is hydrogen or fluorine; and each of $Y^1$, $Y^2$, $Y^3$, $Y^4$ and $Y^5$ is independently hydrogen, halogen or methyl.

18. The compound according to claim 17, wherein $X^1$ is hydrogen or fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —CH$_2$CH$_2$—; each of $Y^1$, $Y^2$, $Y^3$ and $Y^4$ is independently hydrogen, fluorine or methyl; and $Y^5$ is hydrogen.

19. The compound according to claim 17, wherein $X^1$ is hydrogen or fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —CH$_2$CH$_2$—; each of $Y^1$, $Y^2$, $Y^3$ and $Y^4$ is hydrogen; and $Y^5$ is fluorine or chlorine.

20. The compound according to claim 17, wherein $X^1$ is hydrogen or fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; each of $Y^1$, $Y^2$, $Y^3$ and $Y^4$ is independently hydrogen, fluorine or methyl; and $Y^5$ is hydrogen.

21. The compound according to claim 17, wherein $X^1$ is hydrogen or fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; and each of $Y^1$, $Y^2$, $Y^3$, $Y^4$ and $Y^5$ is hydrogen.

22. A compound represented by any one of formulas (1-11) to (1-15):

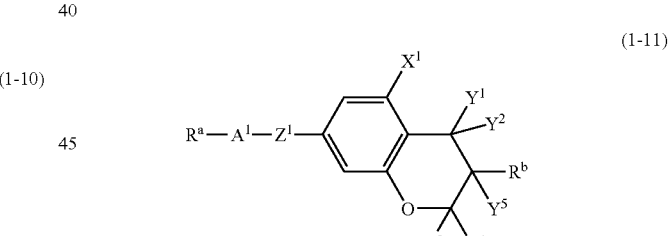
(1-11)

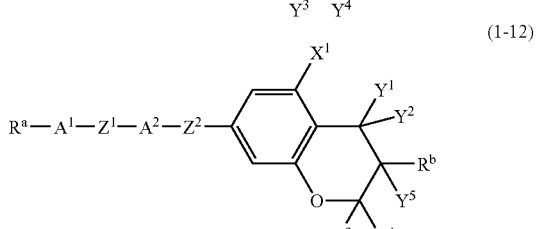
(1-12)

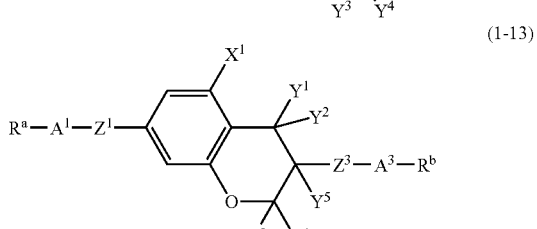
(1-13)

-continued

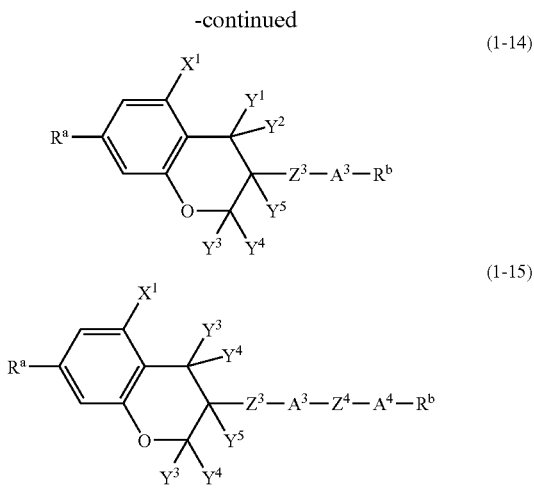

where $R^a$ is hydrogen, $C_1$-$C_{10}$ alkyl, $C_1$-$C_{10}$ alkoxy or $C_2$-$C_{10}$ alkenyl; $R^b$ is halogen, —CN, $C_1$-$C_{10}$ alkyl (at least one hydrogen of which is replaced by halogen), $C_1$-$C_{10}$ alkoxy (at least one hydrogen of which may be replaced by halogen), or $C_2$-$C_{10}$ alkenyl (at least one hydrogen of which may be replaced by halogen); each of $A^1$, $A^2$, $A^3$ and $A^4$ is independently 1,4-cyclohexylene, 1,3-dioxane-2,5-diyl, pyrimidine-2,5-diyl or 1,4-phenylene (any hydrogen of which may be replaced by fluorine); each of $Z^1$, $Z^2$, $Z^3$ and $Z^4$ is independently a single bond, —CH$_2$CH$_2$—, —CH$_2$O—, —OCH$_2$—, —CF$_2$CH$_2$—, —CH$_2$CF$_2$—, —CF$_2$O— or —OCF$_2$—; $X^1$ is hydrogen or fluorine; and each of $Y^1$, $Y^2$, $Y^3$, $Y^4$ and $Y^5$ is independently hydrogen, halogen or methyl.

23. The compound according to claim 22, wherein $X^1$ is hydrogen or fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —CH$_2$CH$_2$—; each of $Y^1$, $Y^2$, $Y^3$ and $Y^4$ is independently hydrogen, fluorine or methyl; and $Y^5$ is hydrogen.

24. The compound according to claim 22, wherein $X^1$ is hydrogen or fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is independently a single bond or —CH$_2$CH$_2$—; each of $Y^1$, $Y^2$, $Y^3$ and $Y^4$ is hydrogen; and $Y^5$ is fluorine or chlorine.

25. The compound according to claim 22, wherein $X^1$ is hydrogen or fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; each of $Y^1$, $Y^2$, $Y^3$ and $Y^4$ is independently hydrogen, fluorine or methyl; and $Y^5$ is hydrogen.

26. The compound according to claim 22, wherein $X^1$ is hydrogen or fluorine; $R^a$ is hydrogen, $C_1$-$C_7$ alkyl or $C_2$-$C_7$ alkenyl; $R^b$ is halogen, —CN, —OCF$_3$, —OCF$_2$H, or $C_1$-$C_7$ alkyl (at least one hydrogen of which is replaced by fluorine); each of $A^1$, $A^2$, $A^3$ and $A^4$ is independently 1,4-cyclohexylene or 1,4-phenylene (any hydrogen of which may be replaced by fluorine); each of $Z^1$, $Z^2$, $Z^3$ and $Z^4$ is a single bond; and each of $Y^1$, $Y^2$, $Y^3$, $Y^4$ and $Y^5$ is hydrogen.

27. A liquid crystal composition which comprises at least two compounds, at least one of which is a compound of claim 1 and at least one of which may be an optically active compound.

28. A liquid crystal composition which comprises at least one compound of claim 1 and at least one compound selected from the group consisting of the compounds represented by formulas (2), (3) and (4), and may comprise at least one optically active compound:

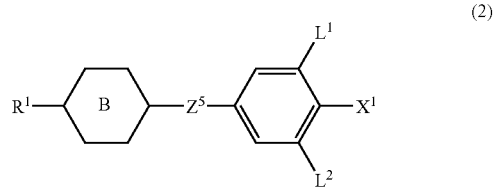

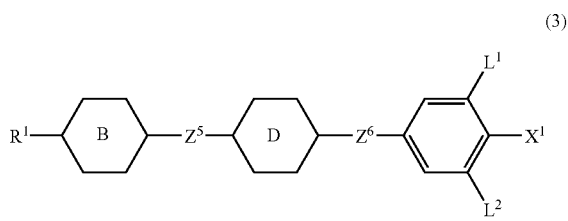

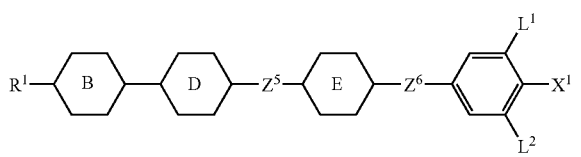

where $R^1$ is $C_1$-$C_{10}$ alkyl (any —CH$_2$— of which may be replaced by —O— or —CH═CH— and any hydrogen of which may be replaced by fluorine); $X^2$ is fluorine, chlorine, —OCF$_3$, —OCHF$_2$, —CF$_3$, —CHF$_2$, —CH$_2$F, —OCF$_2$CHF$_2$, or —OCF$_2$CHFCF$_3$; each of ring B and ring D is independently 1,4-cyclohexylene, 1,3-dioxane-2,5-diyl or 1,4-phenylene (any hydrogen of which may be replaced by fluorine); ring E is 1,4-cyclohexylene or 1,4-phenylene (any hydrogen of which may be replaced by fluorine); each of $Z^5$ and $Z^6$ is independently —(CH$_2$)$_2$—, —(CH$_2$)$_4$—, —COO—, —CF$_2$O—, —OCF$_2$—, —CH═CH— or a single bond; and each of $L^1$ and $L^2$ is independently hydrogen or fluorine.

29. A liquid crystal composition which comprises at least one compound of claim 1 and at least one compound selected from the group consisting of the compounds represented by formulas (5) and (6), and may comprise at least one optically active compound:

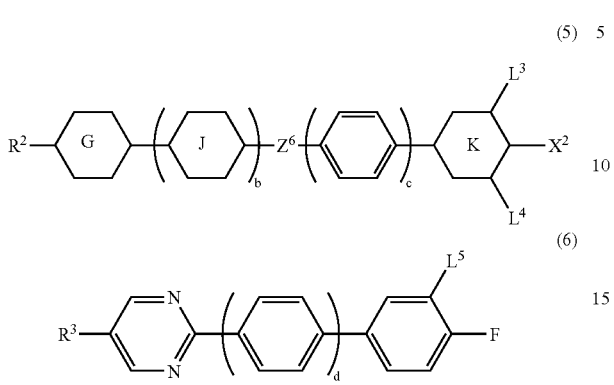

(5)

(6)

where each of $R^2$ and $R^3$ is independently $C_1$-$C_{10}$ alkyl (any —$CH_2$— of which may be replaced by —O— or —CH=CH— and any hydrogen of which may be replaced by fluorine); $X^3$ is —CN or —C≡C—CN; ring G is 1,4-cyclohexylene, 1,4-phenylene, 1,3-dioxane-2,5-diyl or pyrimidine-2,5-diyl; ring J is 1,4-cyclohexylene, pyrimidine-2,5-diyl or 1,4-phenylene (any hydrogen of which may be replaced by fluorine); ring K is 1,4-cyclohexylene or 1,4-phenylene; $Z^7$ is —$(CH_2)_2$—, —COO—, —$CF_2$O—, —$OCF_2$— or a single bond; each of $L^3$, $L^4$ and $L^5$ is independently hydrogen or fluorine; and each of b, c and d is independently 0 or 1.

30. A liquid crystal composition which comprises at least one compound of claim 1 and at least one compound selected from the group consisting of the compounds represented by formulas (7) to (9), and may comprise at least one optically active compound:

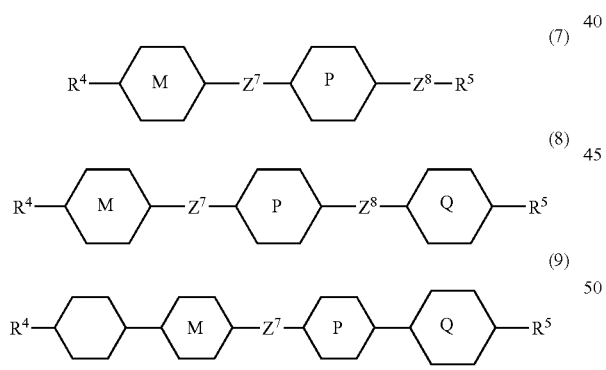

(7)

(8)

(9)

where each of $R^4$ and $R^5$ is independently $C_1$-$C_{10}$ alkyl (any —$CH_2$— of which may be replaced by —O— or —CH=CH— and any hydrogen of which may be replaced by fluorine); each of ring M, ring P and ring Q is independently 1,4-cyclohexylene, pyrimidine-2,5-diyl or 1,4-phenylene (any hydrogen of which may be replaced by fluorine); and each of $Z^7$ and $Z^8$ is independently —C≡C—, —COO—, —$(CH_2)_2$—, —CH=CH— or a single bond.

31. The composition according to claim 28, which further comprises at least one compound selected from the group consisting of the compounds represented by formulas (5) and (6):

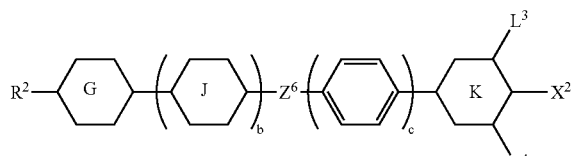

(5)

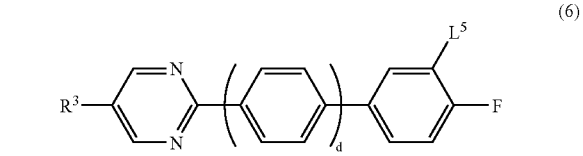

(6)

where each of $R^2$ and $R^3$ is independently $C_1$-$C_{10}$ alkyl (any —$CH_2$— of which may be replaced by —O— or —CH=CH— and any hydrogen of which may be replaced by fluorine); $X^3$ is —CN or —C≡C—CN; ring G is 1,4-cyclohexylene, 1,4-phenylene, 1,3-dioxane-2,5-diyl or pyrimidine-2,5-diyl; ring J is 1,4-cyclohexylene, pyrimidine-2,5-diyl or 1,4-phenylene (any hydrogen of which may be replaced by fluorine); ring K is 1,4-cyclohexylene or 1,4-phenylene; $Z^7$ is —$(CH_2)_2$—, —COO—, —$CF_2$O—, —$OCF_2$— or a single bond; each of $L^3$, $L^4$ and $L^5$ is independently hydrogen or fluorine; and each of b, c and d is independently 0 or 1.

32. The composition according to claim 28, which further comprises at least one compound selected from the group consisting of the compounds represented by formulas (7), (8) and (9):

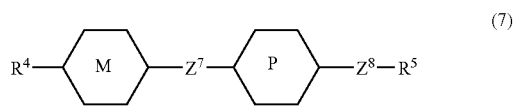

(7)

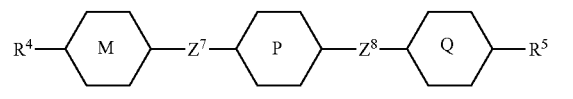

(8)

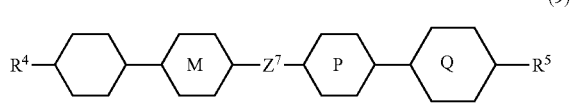

(9)

where each of $R^4$ and $R^5$ is independently $C_1$-$C_{10}$ alkyl (any —$CH_2$— of which may be replaced by —O— or —CH=CH— and any hydrogen of which may be replaced by fluorine); each of ring M, ring P and ring Q is independently 1,4-cyclohexylene, pyrimidine-2,5-diyl or 1,4-phenylene (any hydrogen of which may be replaced by fluorine); and each of $Z^7$ and $Z^8$ is independently —C≡C—, —COO—, —$(CH_2)_2$—, —CH=CH— or a single bond.

33. The composition according to claim 29, which further comprises at least one compound selected from the group consisting of the compounds represented by formulas (7), (8) and (9):

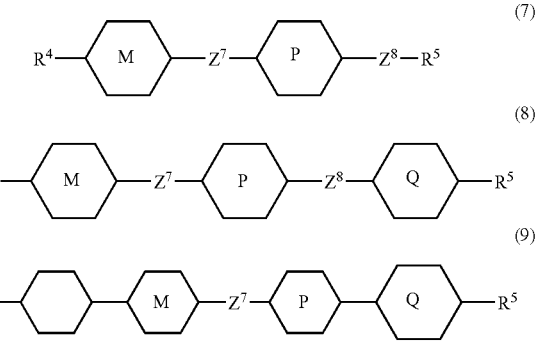

where each of $R^4$ and $R^5$ is independently $C_1$-$C_{10}$ alkyl (any —$CH_2$— of which may be replaced by —O— or —CH=CH— and any hydrogen of which may be replaced by fluorine); each of ring M, ring P and ring Q is independently 1,4-cyclohexylene, pyrimidine-2,5-diyl or 1,4-phenylene (any hydrogen of which may be replaced by fluorine); and each of $Z^7$ and $Z^8$ is independently —C≡C—, —COO—, —$(CH_2)_2$—, —CH=CH— or a single bond.

34. A liquid crystal device comprising the liquid crystal composition of claim 27.

35. A liquid crystal device comprising the liquid crystal composition of claim 28.

36. A liquid crystal device comprising the liquid crystal composition of claim 29.

37. A liquid crystal device comprising the liquid crystal composition of claim 30.

38. A liquid crystal device comprising the liquid crystal composition of claim 31.

39. A liquid crystal device comprising the liquid crystal composition of claim 32.

40. A liquid crystal device comprising the liquid crystal composition of claim 33.

* * * * *